(12) United States Patent
Sakai et al.

(10) Patent No.: US 7,298,733 B2
(45) Date of Patent: Nov. 20, 2007

(54) INTERNET COMMUNICATION SYSTEM, INTERNET COMMUNICATION METHOD, SESSION MANAGEMENT SERVER, RADIO COMMUNICATION DEVICE, COMMUNICATION RELAY SERVER, AND PROGRAM

(75) Inventors: Hiroaki Sakai, Tokyo (JP); Yoshinari Sugegaya, Tokyo (JP); Masashi Mori, Tokyo (JP); Kunio Nakaoka, Tokyo (JP); Kazuyoshi Kojima, Tokyo (JP); Akihiko Naito, Tokyo (JP); Shun Kimura, Tokyo (JP); Hiroki Morioka, Tokyo (JP); Nobuhito Miyauchi, Tokyo (JP)

(73) Assignee: IP Talk Corporation, Tokyo (JP)

( * ) Notice: Subject to any disclaimer, the term of this patent is extended or adjusted under 35 U.S.C. 154(b) by 663 days.

(21) Appl. No.: 10/491,141

(22) PCT Filed: Jul. 29, 2002

(86) PCT No.: PCT/JP02/07665

§ 371 (c)(1),
(2), (4) Date: Mar. 26, 2004

(87) PCT Pub. No.: WO2004/012086

PCT Pub. Date: Feb. 5, 2004

(65) Prior Publication Data

US 2004/0243712 A1    Dec. 2, 2004

(51) Int. Cl.
*G06F 15/16* (2006.01)
(52) U.S. Cl. .............. 370/352; 370/395.2; 370/395.65; 370/401; 709/218; 709/228

(58) Field of Classification Search ............. 455/414.3, 455/414.4, 415, 456.2, 432.2; 709/219, 228, 709/249, 217–218; 370/352–354, 395.2, 370/395.6, 395.65, 400–402
See application file for complete search history.

(56) References Cited

U.S. PATENT DOCUMENTS 5,673,322 A      9/1997   Pepe et al.
6,493,551 B1 *  12/2002  Wang et al. ............. 455/432.1

(Continued)

FOREIGN PATENT DOCUMENTS

EP           0 905 959 A2       3/1999

(Continued)

OTHER PUBLICATIONS

Naoto Makinae et al; Network Architecture for Advanced VoIP Services; The Institute of Electronics, Information and Communication Engineers; Technical Report of IEICE; vol. 100, No. 78, SSE2000-23; pp. 7-12; May 18, 2000. (Abstract attached).

*Primary Examiner*—Binh K. Tieu
(74) *Attorney, Agent, or Firm*—Buchanan Ingersoll & Rooney PC

(57) ABSTRACT

An internet communication system, which is provided with session managing servers 210 and 220. In the system, each session managing server manages wireless communication apparatuses 110 and 120 and call relay servers 310 and 320. For that reason, the processing load of each session managing server is allowed to be equalized. As a result, the operational efficiency of the system may be enhanced, and quality of services offered to the user of the system may be improved.

23 Claims, 89 Drawing Sheets

U.S. PATENT DOCUMENTS

| | | |
|---|---|---|
| 7,099,288 B1 * | 8/2006 | Parker et al. ............... 370/259 |
| 2001/0038626 A1 * | 11/2001 | Dynarski et al. ........... 370/356 |
| 2002/0160790 A1 * | 10/2002 | Schwartz et al. ........... 455/456 |
| 2003/0002637 A1 | 1/2003 | Miyauchi et al. |
| 2004/0114744 A1 * | 6/2004 | Trossen ................ 379/201.01 |
| 2004/0125790 A1 * | 7/2004 | Hiller et al. ................ 370/352 |
| 2004/0153549 A1 | 8/2004 | Naito et al. |
| 2005/0210143 A1 * | 9/2005 | Wengrovitz ................ 709/228 |
| 2005/0254485 A1 * | 11/2005 | Parker et al. ............... 370/356 |

FOREIGN PATENT DOCUMENTS

| | | |
|---|---|---|
| JP | 11-507152 | 6/1999 |
| JP | 11-191791 | 7/1999 |
| JP | 2001-223748 | 8/2001 |
| JP | 2001-268075 | 9/2001 |
| JP | 2001-282998 | 10/2001 |
| JP | 2001-519982 | 10/2001 |
| JP | 2002-125069 | 4/2002 |
| JP | 2002-185523 | 6/2002 |
| WO | 97/35402 | 9/1997 |
| WO | 98/47270 | 10/1998 |
| WO | 02/35816 | 5/2001 |

* cited by examiner

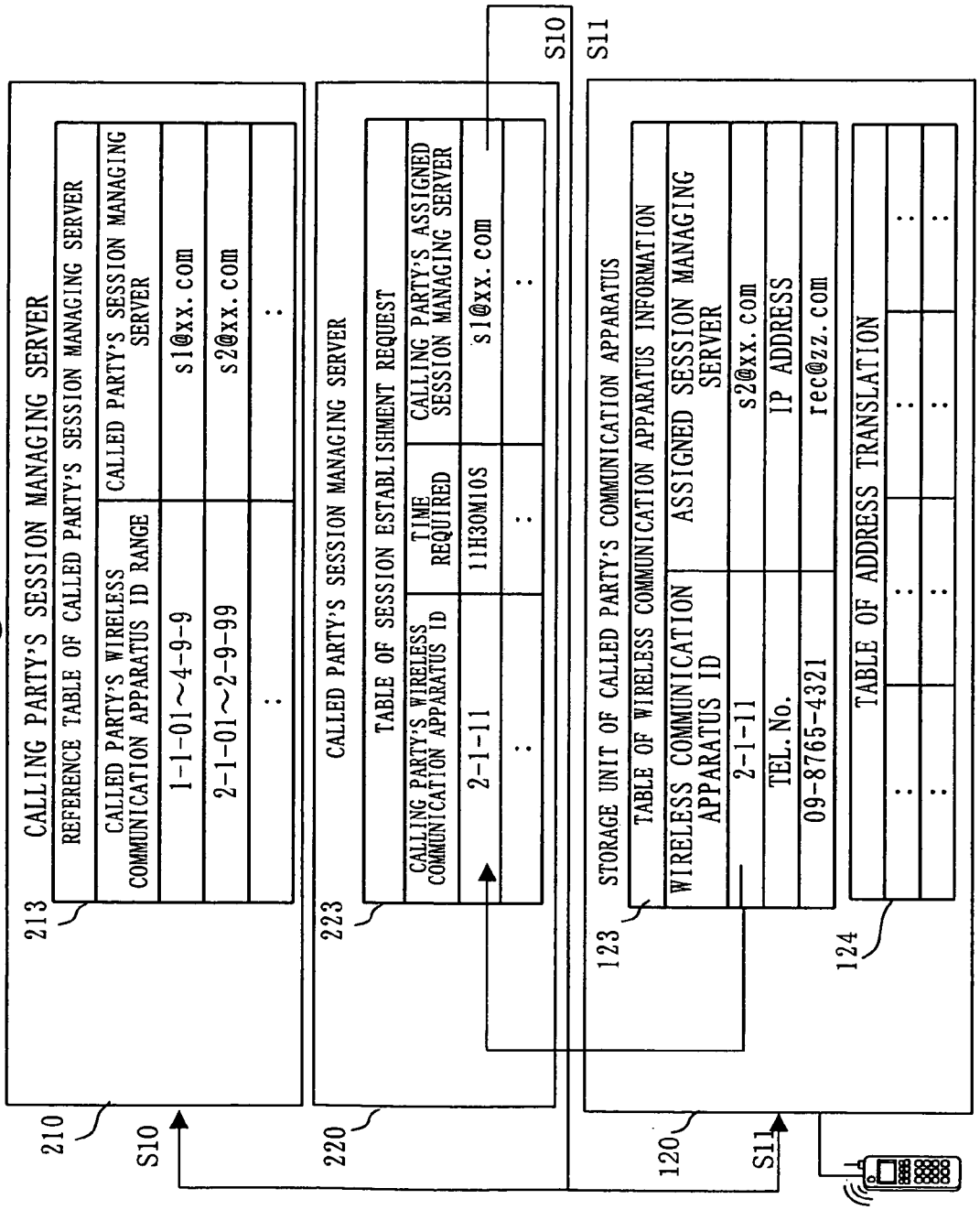

Fig. 11

| No. | ITEM | DETAIL | COMMENT |
|---|---|---|---|
| 1 | CALL ENABLE/ DISENABLE INFORMATION | OTHER PARTY'S CALL STATUS (CALL ENABLE STATUS OR CALL DISENABLED STATUS) | VALID ONLY FOR CALLING PARTY |
| 2 | IP ADDRESS OF CALLED PARTY'S CALL RELAY SERVER | CALLED PARTY'S CALL RELAY SERVER IP ADDRESS (RELAY SERVER BETWEEN CALLING PARTY'S WIRELESS COMMUNICATION APPARATUS AND CALLED PARTY'S WIRELESS COMMUNICATION APPARATUS IS INDICATED IN THE FIRST PHASE TRANSMISSION OF RELAYED VOICE DATA, AND CALLED PARTY'S CALL RELAY SERVER IS INDICATED IN THE SECOND PHASE UDP VOICE DATA TRANSMISSION.) | |
| 3 | SESSION ID BETWEEN CALLED PARTY'S CALL RELAY SERVER AND CALLED PARTY'S TELEPHONE ADAPTER | ID NUMBER FOR MANAGING A SESSION. SESSION ID NUMBER BETWEEN CALLED PARTY'S RELAY SERVER AND CALLED PARTY'S WIRELESS COMMUNICATION APPARATUS. | |
| 4 | CALLING PARTY'S CALL RELAY SERVER IP ADDRESS | CALLING PARTY'S CALL RELAY SERVER IP ADDRESS (CALLING PARTY'S CALL RELAY SERVER IS INDICATED BECAUSE IT IS REQUIRED TO HAVE TWO SETS OF RELAY SERVES BETWEEN CALLING PARTY'S WIRELESS COMMUNICATION APPARATUS AND CALLED PARTY'S WIRELESS COMMUNICATION APPARATUS IN THE SECOND PHASE UDP VOICE DATA TRANSMISSION.) | VALID ONLY FOR RELAYED VOICE DATA TRANSMISSION IN THE SECOND PHASE VALID ONLY FOR CALLED PARTY |
| 5 | SESSION ID BETWEEN CALLING PARTY'S WIRELESS COMMUNICATION APPARATUS AND CALLING PARTY'S CALL RELAY SERVER | ID NUMBER FOR MANAGING A SESSION. SESSION ID NUMBER BETWEEN CALLING PARTY'S WIRELESS COMMUNICATION APPARATUS AND CALLING PARTY'S CALL RELAY SERVER. | VALID ONLY FOR RELAYED VOICE DATA TRANSMISSION IN THE SECOND PHASE VALID ONLY FOR CALLED PARTY |

Fig. 13

| ITEM | DETAIL | COMMENT |
|---|---|---|
| IP HEADER | IP HEADER INFORMATION | |
| TCP HEADER | TCP HEADER INFORMATION | |
| POST METHOD HEADER | POST METHOD HEADER INFORMATION | |
| VOICE DATA | VOICE DATA TRANSMITTED FROM CALLING PARTY'S WIRELESS COMMUNICATION APPARATUS | |
| VOICE DATA DISTRIBUTION MODE | VOICE DATA DISTRIBUTING METHOD (FIRST PHASE, SECOND PHASE) IS INDICATED. (IN THE FIRST PHASE, RELAYING VOICE DATA ONLY THROUGH HTTP, AND IN THE SECOND PHASE, VOICE DATA IS RELAYED THROUGH UDP BETWEEN CALL RELAY SERVERS. | |

Fig.14

| ITEM | DETAIL | COMMENT |
|---|---|---|
| IP HEADER | IP HEADER INFORMATION | |
| TCP HEADER | TCP HEADER INFORMATION | |
| VOICE DATA | VOICE DATA RECEIVED FROM CALLING PARTY'S WIRELESS COMUNICATION APPARATUS | |

Fig. 24

| No. | ITEM | DETAIL | STATEMENT |
|---|---|---|---|
| 1 | STATUS | VALID/INVALID OF ASSIGNED SESSION MANGING SERVER DATA IS IDENTIFIED. | VALID : 1<br>INVALID : 0 |
| 2 | I S P IDENTIFIER | IDENTIFIER OF ASSIGNED INTERNET PROVIDER. FORMED BY 2 BYTES. | |
| 3 | AREA IDENTIFIER | AREA IDENTIFIER OF ASSIGNED INTERNET PROVIDER. FORMED BY 2 BYTES. | |
| 4 | ASSIGNED SESSION MANAGING SERVER IP ADDRESS | IP ADDRESS OF ASSIGNED SESSION MANAGING SERVER CORRESPONDING TO THE ABOVE ISP IDENTIFIER, AND AREA IDENTIFIER. | |

Fig. 38

| MONTH | TOTAL NUMBER OF CALLS | TOTAL DURATION OF CALLS | AVARAGE/MAX NUMBER OF CALLS PER USER | AVERAGE/MAX DURATION OF CALLS PER USER | AVERAGE/MAX NUMBER OF CALLS PER DAY | INSTANTANEOUS AVERAGE/MAX NUMBER OF SIMULTANEOUS CALLS | DATE OF INSTANTANEOUS MAX NUMBER OF SIMULTANEOUS CALLS | TOTAL NUMBER OF CALL ERRORS |
|---|---|---|---|---|---|---|---|---|
| 2002.1 | | | | | | | | |
| 2002.2 | | | | | | | | |
| 2002.3 | | | | | | | | |

| DAY | TOTAL NUMER OF CALLS | TOTAL DURATION OF CALLS | AVARAGE/MAX NUMBER OF CALLS PER USER | AVERAGE/MAX DURATION OF CALLS PER USER | AVERAGE/MAX NUMBER OF CALLS PER HOUR | INSTANTANEOUS AVERAGE/MAX NUMBER OF SIMULTANEOUS CALLS | DATE OF INSTANTANEOUS MAX NUMBER OF SIMULTANEOUS CALL | TOTAL NUMBER OF CALL ERRORS |
|---|---|---|---|---|---|---|---|---|
| 0:00 | | | | | | | | |
| 1:00 | | | | | | | | |
| 2:00 | | | | | | | | |

Fig. 40

| ADDRESS TYPES \ CALL RELAY SERVER INSTALLATION | (i-1) | (i-2) | (ii-1) | (ii-2) |
|---|---|---|---|---|
| (1) | A | P | B | Q |
| (2) | A | P | C | P |
| (3) | A | P | D | R |
| (4) | A | P | E | P |

Fig. 42

| RECEPTION / TRANSMISSION | A | B | C | D | E |
|---|---|---|---|---|---|
| A | [2] | [2] | [2] | [2] | [2] |
| B | [2] | [1] | — | [1] | — |
| C | [2] | — | [1] | — | [1] |
| D | [2] | [1] | — | [1] | — |
| E | [2] | — | [1] | — | [1] |

Fig. 43

| TRANSMISSION \ RECEPTION | A | B | C | D | E | P | Q | R |
|---|---|---|---|---|---|---|---|---|
| A | [3] | [3] | [3] | [3] | [3] | [2] TRANSMIS-SION SIDE | [2] TRANSMIS-SION SIDE | [2] TRANSMIS-SION SIDE |
| B | [3] | [1] | [3] | [3] | [3] | [2] TRANSMIS-SION SIDE | [1] | [1] |
| C | [3] | [3] | [3] | [3] | [3] | [2] TRANSMIS-SION SIDE | [2] TRANSMIS-SION SIDE | [2] TRANSMIS-SION SIDE |
| D | [3] | [3] | [3] | [1] | [3] | [2] TRANSMIS-SION SIDE | [1] | [1] |
| E | [3] | [3] | [3] | [3] | [3] | [2] TRANSMIS-SION SIDE | [2] TRANSMIS-SION SIDE | [2] TRANSMIS-SION SIDE |
| P | [2] TRANSMIS-SION SIDE | [2] TRANSMIS-SION SIDE | [2] TRANSMIS-SION SIDE | [2] TRANSMIS-SION SIDE | [2] TRANSMIS-SION SIDE | [2] | [2] | [2] |
| Q | [2] TRANSMIS-SION SIDE | [1] | [2] TRANSMIS-SION SIDE | [1] | [2] TRANSMIS-SION SIDE | [2] | [1] | [1] |
| R | [2] TRANSMIS-SION SIDE | [1] | [2] TRANSMIS-SION SIDE | [1] | [2] TRANSMIS-SION SIDE | [2] | [1] | [1] |

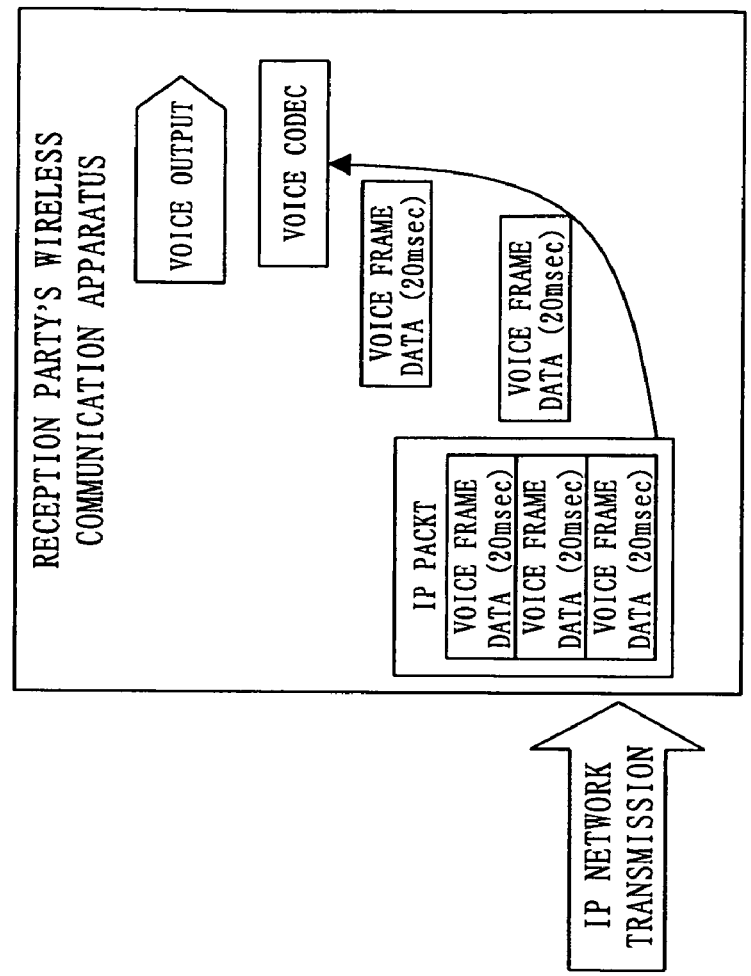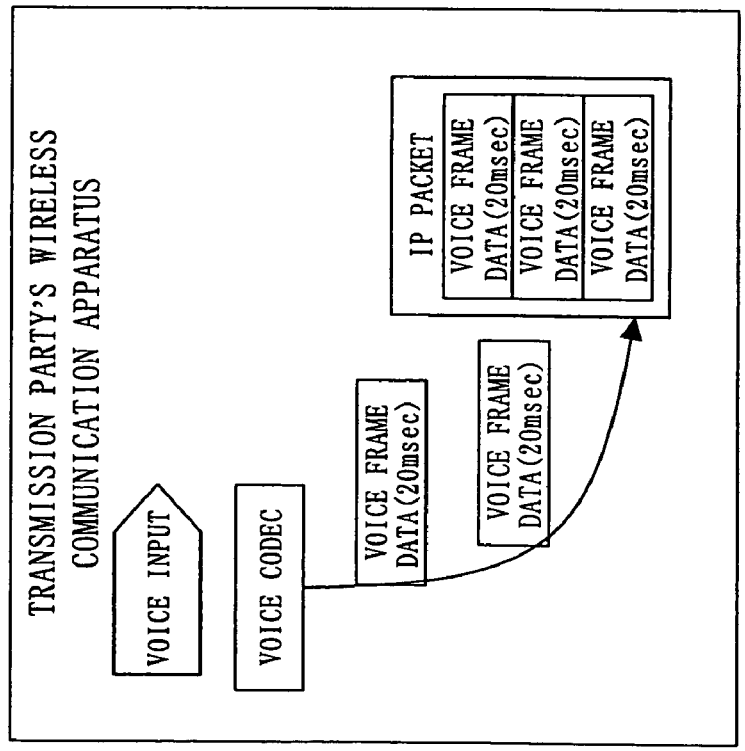
Fig. 67

INTERNET COMMUNICATION SYSTEM, INTERNET COMMUNICATION METHOD, SESSION MANAGEMENT SERVER, RADIO COMMUNICATION DEVICE, COMMUNICATION RELAY SERVER, AND PROGRAM

TECHNICAL FIELD

This invention relates to a wireless communication apparatus for transmitting and receiving such as voice data (data for displaying moving pictures or 3D graphics is similarly applicable as data having a real-time characteristic), an internet communication system, in which voice data is transmitted and received over the Internet between a calling party's wireless communication apparatus and a called party's wireless communication apparatus, and its internet communication method. More specifically, this invention relates to an internet communication system, which is provided with a calling party's session managing server for managing a calling party's wireless communication apparatus and a called party's session managing server for managing a called party's wireless communication apparatus, and its internet communication method.

In addition, this invention relates to a session managing server, which is connected with the calling party's wireless communication apparatus and the called party's wireless communication apparatus, for managing both the wireless communication apparatuses of a calling party and a called party, and a program, which operates on the session managing server.

Furthermore, this invention relates to a wireless communication apparatus, which is connected with the calling party's session managing server and the called party's session managing server, for communicating with both the session managing servers of the calling party and the called party, and a program, which operates on the wireless communication apparatus.

Still further, this invention relates to an internet communication system, which carries out data communications between two of the calling party's wireless communication apparatus, a calling party's communication relay server, the called party's wireless communication apparatus and a called party's communication relay server, by using a predetermined communication procedure, and its internet communication method.

Still more, this invention relates to a communication relay server, which carries out data communications between a wireless communication apparatus and a server apparatus by using a predetermined communication procedure, and a program, which operates on the communication relay server.

BACKGROUND ART

According to an Internet telephone network system, in which voice data is transmitted and received over the Internet, including a wireless network, with a wireless communication apparatus disposed as a terminal device, IP (Internet Protocol) addresses are allocated for communication to the wireless communication apparatuses of a calling party and a called party. It is to be noted that an IP address is an address for discriminating between a transmission source and a destination in TCP/IP (Transmission Control Protocol/Internet Protocol) communications. IP addresses include a global IP address, which has a globally unique identification attribute, and a local IP address (or a private IP address in some cases), which is set up by the user privately.

However, it is to be noted that "IP address" used by itself hereinafter, means a global IP address.

In addition, it is to be noted that when a calling party's wireless communication apparatus and a called party's wireless communication apparatus communicate with each other, a relay server may be provided for relaying communications between the calling party's wireless communication apparatus and the called party's wireless communication apparatus. For example, in the case where the called party is in the wireless network environment where it is protected by the firewall, an appropriate communication means may be selected according to the wireless network environment of the called party to connect the calling party and the called party by the relay server.

Furthermore, it is to be noted that in the case where the wireless network apparatus of the called party is arranged in a lower layer than an ADSL (Asymmetric digital subscriber line) connection apparatus, an address may be allocated dynamically, or a local IP address may be allocated. In this case, the calling party's wireless communication apparatus may be in the network environment where it is not allowed to be connected with the called party's wireless communication apparatus directly. In such a network environment, an appropriate communication means may be selected according to the network environment of the called party to connect the calling party and the called party by the relay server.

Still further, it is to be noted that the wireless communication apparatus may be arranged in a lower layer, which is set by a router apparatus, in a variety of wireless internet connection environments such as CATV (Cable Television), FTTH (Fiber To The Home), the Internet apartment and so forth as well as ADSL. In this case, the address of the wireless communication apparatus is allocated dynamically or a local IP address is assigned to the wireless communication apparatus. As a result, the calling party's wireless communication apparatus may not be allowed to be connected with the called party's wireless communication apparatus directly. In such a network environment, an appropriate communication means may be selected according to the wireless network environment of the called party to connect the calling party and the called party by the relay server.

FIG. 27 shows a block diagram of an internet telephone network system, which is disclosed in PCT/JP1/04003. (This PCT application has a filing date of May 15, 2001. Refer to the application of PCT/JP1/04003 for further details thereof.

Or, the application of PCT/JP1/04003 is incorporated herein by reference.) Reference numerals 910 and 920 in FIG. 27 denote telephone sets, which are connected with telephone adapters 912 and 922 through indoor telephone lines 911 and 912, respectively. A relay server 918 is provided between the telephone sets 910 and 920 for relaying the transmission and reception of call data. The relay server 918 consists of a plurality of HTTP (Hyper Text Transfer Protocol) relay servers 918a and 918b, and an HTTP relay server managing server 980 which manages the HTTP relay server. In addition, the relay server 918 is connected with the telephone sets 910 and 920 over the Internet 16. Assuming that the telephone set 910 is in the calling party and the telephone set 920 is in the called party, when a connection is made by the calling party with the called party for a call, the relay server managing server 980 receives a call request from the calling party over the Internet. The HTTP relay server managing server 980 selects an HTTP relay server available for relaying based on the call request received. A selected HTTP relay server relays a communication between the calling party and the called party.

In such a system, a single unit of HTTP relay server managing server manages all the telephone adapters and HTTP relay servers to implement communication relaying.

According to the above mentioned internet telephone network system, if telephone adapters become more popular and some hundreds of thousands of telephone adapters come to be installed all over Japan and all over the world, it is impossible for a single unit of relay server managing server to manage all the relay servers and telephone adapters issuing call requests. This poses a problem in the implementation of the system. Another possible problem is that, even if the relay server managing server is capable of managing all the relay servers, the quality of services, which can be offered may be degraded.

It is an object of this invention, for example, to make a communication system operable even in the case where the number of wireless communication apparatuses is increased.

Furthermore, mobile phone penetration shows a remarkable growth in recent years, where wireless Internet service of mobile phones, etc. started in February 1999. The number of wireless Internet service users continues to grow rapidly. On the other hand, mobile phone calls are charged at a meter rate in the same way as regular and public phone calls. A growing number of Internet services provide a constant Internet access environment for fixed monthly fee these days. Also for mobile phones, some Internet services can be provided on a fixed monthly fee basis. Thus, mobile phone services can be used at low cost if such fixed monthly fee based Internet communication paths for data are used in voice communications. However, it is not possible in the current mobile Internet environment to allocate a fixed global IP address dynamically to a communication apparatus. In addition, it would not be possible to build Internet telephone system in the current IP phone standards based mobile environment without penetration of new Internet protocol standards such as IPv6 (Internet Protocok Version 6) and Mobile IP.

An objective of the present invention is to allow it possible to manage Internet telephone systems in the mobile environment of mobile phones, etc. only through current Internet protocol standards in widespread use instead of using new Internet protocol standards such as IPv6 and Mobile IP.

DISCLOSURE OF THE INVENTION

An internet communication system according to this invention, which carries out data communications by using the Internet, is characterized by including a calling party's wireless communication apparatus; a calling party's wireless base station apparatus connecting the calling party's wireless base station and the Internet, and converting between wireless communication and wired communication; a called party's wireless communication apparatus; a called party's wireless base station apparatus connecting the called party's wireless base station and the Internet, and converting between the wireless communication and the wired communication; a calling party's session managing server which manages the calling party's wireless communication apparatus; and a called party's session managing server which manages the called party's wireless communication apparatus. The calling party's wireless communication apparatus may transmit the wireless communication apparatus ID of the called party's wireless communication apparatus to the calling party's session managing server via the calling party's wireless base station apparatus. The calling party's session managing server may receive the wireless communication apparatus ID of the called party's wireless communication apparatus from the calling party's wireless communication apparatus, and transmits back to the calling party's wireless communication apparatus the server ID of the called party's session managing server managing the called party's wireless communication apparatus which is identified by the wireless communication apparatus ID. The calling party's wireless communication apparatus may receive the server ID of the called party's session managing server from the calling party's session managing server via the calling party's wireless base station apparatus, transmit the wireless communication apparatus ID of the called party's wireless communication apparatus to the called party's session managing server which is identified by the server ID received, and transmit an establishment request of a session with the called party's wireless communication apparatus. The called party's session managing server may receive the wireless communication apparatus ID of the called party's wireless communication apparatus from the calling party's wireless communication apparatus, and store that the establishment request of the session with the adapter identified by the wireless communication apparatus ID received is received. The called party's wireless communication apparatus may search via the called party's wireless base station apparatus by using the wireless communication apparatus ID of self for the establishment request of the session if it is stored in the called party's session managing server, and transmit a communication enable state of the self to the called party's session managing server in the case where the establishment request of the session is stored in the called party's session managing server and also the self is in the communication enable state. The called party's session managing server may allow the calling party's wireless communication apparatus and the called party's wireless communication apparatus to establish the session by using the Internet in the case where the communication enable state is notified from the called party's wireless communication apparatus.

In addition, an internet communication system according to this invention, which carries out data communications by using the Internet, is characterized by having a calling party's wireless communication apparatus; a calling party's wireless base station apparatus connecting the calling party's wireless communication apparatus and the Internet; a called party's wireless communication apparatus; a called party's wireless base station apparatus connecting the called party's wireless communication apparatus and the Internet; a calling party's session managing server which manages the calling party's wireless communication apparatus; and a called party's session managing server which manages the called party's wireless communication apparatus. The calling party's wireless communication apparatus may transmit an establishment request of a session including the wireless communication apparatus ID of the called party's wireless communication apparatus to the calling party's session managing server. The calling party's session managing server may receive the wireless communication apparatus ID of the called party's wireless communication apparatus from the calling party's wireless communication apparatus, transfer a call message including the wireless communication apparatus ID of the called party's wireless communication apparatus to the called party's session managing server identified by the server ID which manages the called party's wireless communication apparatus identified by the wireless communication apparatus ID, and transmit the establishment request of the session with the called party's wireless communication apparatus. The called party's session managing server may receive the wireless communication apparatus ID of the called party's wireless communication apparatus from the calling party's wireless communication apparatus, and store that it has received the establishment request of the session with the adapter identified by the wireless communication apparatus ID received. The called party's wireless communication apparatus may transmit, in advance, that it is in a communication enable state to the called party's session managing server if it is in a communication enable state, and receive information that the establishment request of the session has been made with the called party's wireless communication apparatus, as a result of the called party's session managing server searching for the establishment request of the session stored based on its wireless communication apparatus ID. The called party's session managing server may allow the calling party's wireless communication apparatus and the called party's wireless communication apparatus to establish the session using the Internet in the case where the communication enable state is notified from the called party's wireless communication apparatus. The calling party's wireless communication apparatus may receive communication enable state information from the calling party's session managing server when it is in a communication enable state, and then establish the session using the Internet.

An internet communication system according to this invention, the internet communication system carrying out data communications by using the Internet, is characterized by including:

a calling party's wireless communication apparatus;

a wireless base station apparatus connecting the calling party's wireless communication apparatus and the Internet;

a called party's wireless communication apparatus;

a wireless base station apparatus connecting the called party's wireless communication apparatus and the Internet;

a calling party's session managing server which manages the calling party's wireless communication apparatus; and a called party's session managing server which manages the called party's wireless communication apparatus;

wherein the calling party's wireless communication apparatus may transmit an establishment request of a session including the wireless communication apparatus ID of the called party's wireless communication apparatus to the calling party's session managing server;

wherein the calling party's session managing server may receive the adapter ID of the called party's wireless communication apparatus from the calling party's wireless communication apparatus, search for the server ID of the called party's session managing server which manages the called party's wireless communication apparatus, the server ID being identified by the wireless communication apparatus ID, transmit the wireless communication apparatus ID to the called party's session managing server identified by the server ID searched for, and transmit the establishment request of the session with the called party's wireless communication apparatus;

wherein the called party's session managing server may receive the wireless communication apparatus ID of the called party's wireless communication apparatus from the calling party's session managing server, store that the establishment request of the session with an identified adapter by the received wireless communication apparatus ID is received, receive a communication enable state from the called party's wireless communication apparatus, and allow the session between the calling party's session managing server and the called party's wireless communication apparatus using the Internet to be established in the case where the establishment request of the session with the called party's wireless communication apparatus in the communication enable state received is stored;

wherein the called party's wireless communication apparatus, in the communication enable state, may transmit that self is in the communication enable state to the called party's session managing server; and wherein the calling party's wireless communication apparatus may receive from the calling party's session managing server that the session using the Internet is allowed to be established by the called party's session managing server.

In addition, the internet communication system according to this invention is characterized by further including an assignment notification server which receives an wireless communication apparatus ID from a wireless communication apparatus, assigns a session managing server which manages the wireless communication apparatus based on the wireless communication apparatus ID, and notifies the wireless communication apparatus of the server ID of the session managing server assigned.

In addition, the internet communication system according to this invention is characterized by further including a called party's communication relay server, which relays communications between the calling party's wireless communication apparatus and the called party's wireless communication apparatus. The called party's session managing server may transmit a called party's communication relay server ID for identifying the called party's communication relay server to the calling party's wireless communication apparatus and the called party's wireless communication apparatus. The calling party's wireless communication apparatus and the called party's wireless communication apparatus, upon reception of the called party's communication relay server ID, may establish the session via the called party's communication relay server which is identified by the called party's communication relay server ID.

In addition, the internet communication system according to this invention is characterized by further including a calling party's communication relay server, which relays communications between the calling party's wireless communication apparatus and the called party's wireless communication apparatus. The calling party's session managing server may transmit a calling party's communication relay server ID for identifying the calling party's communication relay server to the calling party's wireless communication apparatus. The calling party's wireless communication apparatus may receive the calling party's communication relay server ID, and transmit the calling party's communication relay server ID to the called party's session managing sever. The called party's session managing server may transmit the calling party's communication relay server ID to the called party's wireless communication apparatus. The called party's wireless communication apparatus may receive the calling party's communication relay server ID. The calling party's wireless communication apparatus and the called party's wireless communication apparatus may establish the session via the called party's communication relay server which is identified by the calling party's communication relay server ID.

In addition, the wireless communication apparatus ID is characterized by including the identifier of the domain where respective connection terminals may be managed based on their individual local IP addresses such as an internet service provider (ISP).

In addition, the wireless communication apparatus ID is characterized by including the identifier of the domain of a local IP (Internet Protocol) address which may be managed by the internet service provider (ISP).

In addition, the wireless communication apparatus ID is characterized by including the identifier of the area where the wireless communication apparatus may be installed. (The area here may mean not only a physical area but also a group of a plurality of terminals, which are grouped logically.)

In addition, the wireless communication apparatus ID is characterized by including a group identifier for grouping wireless communication apparatuses.

An internet communication method according to this invention for carrying out data communications by using the Internet is characterized by making an inquiry with the calling party's session managing server for a called party's session managing server which manages a called party's wireless communication apparatus, by a calling party's wireless communication apparatus; responding to the calling party's wireless communication apparatus about the called party's session managing server which manages the called party's wireless communication apparatus, by the calling party's session managing server; transmitting an establishment request of a session with the called party's wireless communication apparatus to the called party's session managing server from the calling party's wireless communication apparatus; storing in the called party's session managing server that the establishment request of the session with the called party's wireless communication apparatus has been issued, by the calling party's wireless communication apparatus; making an inquiry with the called party's session managing server for the establishment request if it is issued, by the called party's wireless communication apparatus; notifying the called party's session managing server that the called party's wireless communication apparatus is in a communication enable state, from the called party's wireless communication apparatus, in the case where the establishment request is issued and where the called party's wireless communication apparatus is in the communication enable state; and allowing a session between the calling party's wireless communication apparatus and the called party's wireless communication apparatus to be established by using the Internet by the called party's session managing server in the case where it is notified that the called party's wireless communication apparatus is in the communication enable state.

An internet communication method according to this invention for carrying out data communications by using the Internet is characterized by transmitting an establishment request of a session with a called party's wireless communication apparatus including the wireless communication apparatus ID of the called party's wireless communication apparatus to the calling party's session managing server by a calling party's wireless communication apparatus, further transferring from the calling party's session managing server the establishment request of the session to the called party's session managing server which manages the called party's wireless communication apparatus, storing in the called party's session managing server that the establishment request of the session with the called party's wireless communication apparatus has been made from the calling party's wireless communication apparatus, transmitting by the called party's wireless communication apparatus, in advance, when it is in a communication enable state, its communication enable state to the called party's session managing server, allowing by the called party's session managing server the establishment of the session using the Internet between the calling party's wireless communication apparatus and the called party's wireless communication apparatus, in the case of the called party's session managing server receiving information indicating that the establishment request of the session has been issued with the called party's wireless communication apparatus, as a result of searching for the establishment request of the session stored based on the wireless communication apparatus ID of the called party's wireless communication apparatus itself by the called party's session managing server, and transmitting by the calling party's session managing server communication enable state information based on the allowed establishment of the session to the calling party's wireless communication apparatus if the calling party's wireless communication apparatus is in a communication enable state.

An internet communication method according to this invention, the internet communication method carrying out data communications by using the Internet, is characterized by:

transmitting an establishment request of a session with a called party's wireless communication apparatus to a calling party's session managing server from a calling party's wireless communication apparatus;

transmitting from the calling party's session managing server to a called party's session managing server which manages the called party's wireless communication apparatus the establishment request of the session received from the calling party's wireless communication apparatus;

storing in the called party's session managing server that the establishment request of the session with the called party's wireless communication apparatus has been received from the calling party's wireless communication apparatus;

notifying the called party's session managing server from the called party's wireless communication apparatus that the called party's wireless communication apparatus itself is in a communication enable state in the case where the called party's wireless communication apparatus is in the communication enable state;

allowing by the called party's session managing server the session between the calling party's session managing server and the called party's wireless communication apparatus using the Internet to be established in the case where it is notified of the communication enable state from the called party's wireless communication apparatus, and where the establishment request of the session has been issued with the called party's wireless communication apparatus which is in the communication enable state; and notifying by the calling party's session managing server the calling party's wireless communication apparatus that the session using the Internet has been allowed to be established between the calling party's session managing server and the called party's wireless communication apparatus in the case where the session is allowed to be established.

A session managing server according to this invention, which is connected to a calling party's wireless communication apparatus and a called party's wireless communication apparatus, is characterized by having a calling party's session managing unit, which may receive the wireless communication apparatus ID of the called party's wireless communication apparatus from the calling party's wireless communication apparatus, and transmit back to the calling party's wireless communication apparatus the server ID of a called party's session managing server which manages the called party's wireless communication apparatus identified by the wireless communication apparatus ID; and a called party's session managing unit, which may receive the wireless communication apparatus ID of the called party's wireless communication apparatus from the calling party's wireless communication apparatus, store that an establishment request of a session with the adapter identified by the wireless communication apparatus ID received is received, make the called party's wireless communication apparatus search for the establishment request of the session stored, and allow the session between the calling party's wireless communication apparatus and the called party's wireless communication apparatus using the Internet to be established in the case where a communication enable state is notified by the called party's wireless communication apparatus.

A session managing server according to this invention, which is connected to a calling party's wireless communication apparatus and a called party's wireless communication apparatus, is characterized by having a calling party's session managing unit, which may receive an establishment request of a session including the wireless communication apparatus ID of the called party's wireless communication apparatus from the calling party's wireless communication apparatus, transfer a message of the establishment request of the session including the wireless communication apparatus ID of the called party's wireless communication apparatus to the called party's session managing server which manages the called party's wireless communication apparatus identified by the wireless communication apparatus ID, and return information indicating a communication enable state or not to the calling party's wireless communication apparatus; and a called party's session managing unit, which may receive the wireless communication apparatus ID of the called party's wireless communication apparatus from the calling party's wireless communication apparatus, store that the establishment request of the session with the adapter identified by the received wireless communication apparatus ID has been received, control the called party's session managing server to search for the establishment request of the session stored, and allow the establishment of the session between the calling party's wireless communication apparatus and the called party's wireless communication apparatus using the Internet in the case where it is determined that the called party's wireless communication apparatus is in a communication enable state.

A session managing server according to this invention, which is connected to a calling party's wireless communication apparatus and a called party's wireless communication apparatus, is characterized by having a calling party's session managing unit, which may receive an establishment request of a session including the wireless communication apparatus ID of the called party's wireless communication apparatus from the calling party's wireless communication apparatus, and transmit the establishment request of the session including the wireless communication apparatus ID of the called party's wireless communication apparatus received from the calling party's wireless communication apparatus to a called party's session managing server which manages the called party's wireless communication apparatus identified by the wireless communication apparatus ID, and a called party's session managing unit, which may receive the wireless communication apparatus ID of the called party's wireless communication apparatus from the calling party's session managing server, store that the establishment request of the session with the adapter identified by the wireless communication apparatus ID received has been received, search for the establishment request of the session stored and allow the establishment of the session between the calling party's wireless communication apparatus and the called party's wireless communication apparatus using the Internet in the case where the communication enable state is notified from the called party's wireless communication apparatus.

A wireless communication apparatus according to this invention, which is connected to a calling party's session managing server and a called party's session managing server via a wireless base station apparatus converting between wireless communication and wired communication, is characterized by having a calling party's communication processing unit, which may convert between wireless communication and wired communication via the wireless base station apparatus, transmit the wireless communication apparatus ID of a called party's wireless communication apparatus to the calling party's session managing server, receive from the calling party's session managing server a server ID of the called party's session managing server which manages the called party's wireless communication apparatus, transmit the wireless communication apparatus ID of the called party's wireless communication apparatus to the called party's session managing server which is identified by the server ID received, and transmit an establishment request of a session; and a called party's communication processing unit, which may convert between wireless communication and wired communication via the wireless base station apparatus, search for the establishment request of the session whether or not it is stored in the called party's session managing server by using the wireless communication apparatus ID of self, and transmit to the called party's session managing server that the called party's wireless communication apparatus itself is in a communication enable state in the case where the establishment request of the session is stored in the called party's session managing server and where the called party's wireless communication apparatus itself is in the communication enable state.

A wireless communication apparatus according to this invention, which is connected to a calling party's session managing server and a called party's session managing server, is characterized by having a calling party's communication processing unit, which may transmit an establishment request of a session including the wireless communication apparatus ID of a called party's wireless communication apparatus to the calling party's session managing server, wherein the calling party's session managing server may transfer a message of the establishment request of the session including the wireless communication apparatus ID of the called party's wireless communication apparatus to the called party's session managing server which manages the called party's wireless communication apparatus, and receive from the calling party's session managing server information indicating that the called party's wireless communication apparatus is in a communication enable state or not from the called party's session managing server which manages the called party's wireless communication apparatus; and the called party's communication processing unit, which may transmit, in advance, that it is in a communication enable state to the called party's session managing server if it is in a communication enable state, and receive information that the establishment request of the session has been made with the called party's wireless communication apparatus, as a result of the called party's session managing server searching for the establishment request of the session stored based on its wireless communication apparatus ID.

An internet communication system according to this invention which carries out data communications by using the Internet between a calling party's wireless communication apparatus and a called party's wireless communication apparatus, is characterized by having a calling party's communication relay server, which may carry out data communications with the calling party's wireless communication apparatus over the Internet by using Hyper Text Transfer Protocol (HTTP); and a called party's communication relay server, which may carry out data communications with the called party's wireless communication apparatus over the Internet by using HTTP, and also carry out data communications with the calling party's communication relay server by using a protocol other than HTTP.

In addition, it is characterized in that the protocol other than HTTP is a User Datagram Protocol (UDP).

In addition, it is characterized in that the protocol other than HTTP is a Real-time Transport Protocol (RTP).

In addition, it is characterized in that the protocol other than HTTP is a protocol designed for an application based on Transmission Control Protocol (TCP).

In addition, it is characterized in that the protocol other than HTTP is a protocol designed for an application based on Simple Control Transmission Protocol (SCTP).

In addition, it is characterized in that the calling party's communication relay server and the called party's communication relay server are connected through a private network of an Internet Service Provider (ISP).

In addition, it is characterized in that the calling party's communication relay server and the called party's communication relay server are connected over a general internet network.

An internet communication method for carrying out data communications between a calling party's wireless communication apparatus and a called party's wireless communication apparatus by using the Internet according to this invention is characterized by carrying out data communications between the calling party's wireless communication apparatus and the calling party's communication relay server over the Internet by using Hyper Text Transfer Protocol (HTTP); carrying out data communications between the calling party's communication relay server and the called party's communication relay server by using a protocol other than HTTP; and carrying out data communications between the called party's communication relay server and the called party's wireless communication apparatus over the Internet by using HTTP.

A communication relay server according to this invention which relays data communications between a wireless communication apparatus and a server apparatus is characterized by having an HTTP communication unit, which may carry out data communications with the wireless communication apparatus over the Internet by using Hyper Text Transfer Protocol (HTTP); and a UDP communication unit, which may carry out data communications with the server apparatus by using User Datagram Protocol (UDP).

A program operating with a session managing server which is connected with a calling party's wireless communication apparatus and a called party's wireless communication apparatus according to this invention is characterized by causing a computer to carry out a calling party's session managing process for receiving the wireless communication apparatus ID of the called party's wireless communication apparatus from the calling party's wireless communication apparatus, and transmitting back to the calling party's wireless communication apparatus the server ID of a called party's session managing server which manages the called party's wireless communication apparatus identified by the wireless communication apparatus ID, and a called party's session managing process for receiving the wireless communication apparatus ID of the called party's wireless communication apparatus from the calling party's wireless communication apparatus, storing that an establishment request of a session with the wireless communication apparatus identified by the wireless communication apparatus ID received has been received, making the called party's wireless communication apparatus search for the establishment request of the session stored, and allowing the session between the calling party's wireless communication apparatus and the called party's wireless communication apparatus using the Internet to be established in the case where a communication enable state is notified from the called party's wireless communication apparatus.

A program operating with a session managing server which is connected to a calling party's wireless communication apparatus and a called party's wireless communication apparatus according to this invention is characterized by causing a computer to carry out a calling party's session managing process and a called party's session managing process. The calling party's session managing process may include receiving an establishment request of a session including the wireless communication apparatus ID of the called party's wireless communication apparatus from the calling party's wireless communication apparatus, transferring the establishment request of the session to the called party's session managing server which manages the called party's wireless communication apparatus identified by the wireless communication apparatus ID, receiving from the called party's session managing server information indicating whether or not the called party's wireless communication apparatus is in a communication enable state, and returning the information to the calling party's wireless communication apparatus. The called party's session managing process may include receiving the establishment request of the session including the wireless communication apparatus ID of the called party's wireless communication apparatus from the calling party's wireless communication apparatus, storing that the establishment request of the session with the adapter identified by the wireless communication apparatus ID received has been received, searching the called party's session managing server for the establishment request of the session stored, allowing the session to be established between the calling party's wireless communication apparatus and the called party's wireless communication apparatus using the Internet, in the case where the communication enable state of the called party's wireless communication apparatus is judged, and transmitting information indicating that the establishment request of the session with the called party's wireless communication apparatus has been received to the called party's wireless communication apparatus.

A program according to this invention is characterized by operating with a session managing server connected with a calling party's wireless communication apparatus and a called party's wireless communication apparatus, and causing a computer to carry out:

a calling party's session managing process for receiving an establishment request of a session including the wireless communication apparatus ID of the called party's wireless communication apparatus from the calling party's wireless communication apparatus, and transmitting back to a called party's session managing server which manages the called party's wireless communication apparatus identified by the wireless communication apparatus ID the establishment request of the session received from the calling party's wireless communication apparatus, and a called party's session managing process for receiving the establishment request of the session including the wireless communication apparatus ID of the called party's wireless communication apparatus from the calling party's session managing server, storing that the establishment request of the session with the adapter identified by the wireless communication apparatus ID received has been received, searching in the case where a communication enable state of the called party's wireless communication apparatus is notified for the establishment request of the session stored, allowing the session between the calling party's wireless communication apparatus and the called party's wireless communication apparatus using the Internet to be established, and notifying the called party's wireless communication apparatus that the establishment request of the session has been received.

A program operating with a wireless communication apparatus which is connected with a calling party's session managing server and a called party's session managing server according to this invention is characterized by causing a computer to carry out a calling party's wireless communication apparatus process for transmitting the wireless communication apparatus ID of a called party's wireless communication apparatus to the calling party's session managing server, receiving the server ID of the called party's session managing server which manages the called party's wireless communication apparatus from the calling party's session managing server, transmitting the server ID of the called party's wireless communication apparatus to the called party's session managing server identified by the server ID received, and transmitting an establishment request of a session, and a called party's wireless communication apparatus process for searching for the establishment request of the session stored by the called party's session managing server by using the wireless communication apparatus ID of the called party's wireless communication apparatus itself, and transmitting to the called party's session managing server that the called party's wireless communication apparatus itself is in a communication enable state in the case where the establishment request of the session is stored in the called party's session managing server and the called party's wireless communication apparatus itself is in the communication enable state.

A program operating with a wireless communication apparatus which is connected with a calling party's session managing server and a called party's session managing server according to this invention is characterized by causing a computer to carry out a calling party's wireless communication apparatus process and a called party's wireless communication apparatus process. The calling party's wireless communication apparatus process may include transmitting an establishment request of a session including the wireless communication apparatus ID of a called party's wireless communication apparatus to the calling party's session managing server, and receiving information indicating whether or not the called party's wireless communication apparatus is in a communication enable state from the calling party's session managing server by way of the called party's session managing server which manages the called party's wireless communication apparatus. The called party's wireless communication apparatus process may include transmitting its communication enable state to the called party's session managing server when the called party's wireless communication apparatus is in the communication enable state, and receiving information that the establishment request of the session has been received from the calling party's wireless communication apparatus.

A program according to this invention is characterized by operating with a wireless communication apparatus which is connected with a calling party's session managing server and a called party's session managing server and causing a computer to carry out:

a calling party's wireless communication process for transmitting an establishment request of a session including the wireless communication apparatus ID of a called party's wireless communication apparatus to the calling party's session managing server, and a called party's wireless communication process for transmitting to the called party's session managing server that the called party's wireless communication apparatus itself is in a communication enable state in the case where the called party's wireless communication apparatus itself is in the communication enable state, and receives from the called party's session managing server that the establishment request has been received.

A program according to this invention is characterized by operating with a communication relay server for relaying data communication between a wireless communication apparatus and a server apparatus and causing a computer to carry out an HTTP communication process for carrying out data communications with the wireless communication apparatus over the Internet by using Hyper Text Transfer Protocol (HTTP), and a UDP communication process for carrying out data communication with the server apparatus by using User Datagram Protocol (UDP).

A wireless communication apparatus according to this invention, with the called party's session managing server, is characterized by transmitting to a communication apparatus connected to the wireless communication apparatus information indicating that the other party is busy communicating with a third party terminal, when the called party's wireless communication apparatus is busy communicating with a third party terminal, and therefore in a state of communication disenabled, and the wireless communication apparatus receives information indicating the state by way of the calling party's session managing server at the time of issuing a call.

A wireless communication apparatus according to this invention is characterized by a calling party's wireless communication apparatus which is connected with a calling party's session managing server and a called party's session managing server via a wireless base station apparatus converting between wireless communication and wired communication, and the calling party's wireless communication apparatus may output that the called party's wireless communication apparatus is busy communicating and therefore is in a state of communication disenabled at the moment, upon reception from the called party's session managing server through conversion between wireless communication and wired communication via the wireless base station apparatus by way of the calling party's session managing server that the called party's wireless communication apparatus is busy communicating now and therefore is in a state of communication disenabled at the moment.

It is characterized in that the called party's wireless communication apparatus transmits the information indicating that communication will be started with the third party terminal to the called party's session managing server at the time of starting the communication, and the called party's wireless communication apparatus transmits information indicating that the communication has ended with the third party terminal to the called party's session managing server at the end of the communication.

A wireless communication apparatus according to this invention is characterized by being connected to a calling party's session managing server and a called party's session managing server via a wireless base station apparatus converting between wireless communication and wired communication, and transmitting the start of a communication to the called party's session managing server through conversion between wireless communication and wired communication via the wireless base station apparatus in the case of starting the communication, and transmitting the end of the communication to the called party's session managing server in the case of ending the communication.

In addition, the communication state with the third party terminal may include communications by way of the public line based communications the function of which is equipped in the wireless communication apparatus and communications based on other call control systems such as H.323 system and SIP system by way of an IP network in addition to communications based on a call control system according to this invention. Then, it is characterized in that the wireless communication apparatus transmits the session managing server information indicating the type of communication to be used in the communication, and the session managing server holds the information so as to recognize the type of communication being carried out between the calling party's session managing server and wireless communication apparatus.

In addition, the wireless communication apparatus is characterized by starting the communication based on a predetermined call control method, and transmitting the start of the communication to the called party's session managing server together with information for identifying the predetermined call control method.

In addition, it is characterized in that, in addition to the communication state with the third party terminal mentioned above, the wireless communication apparatus transmits information indicating the operational state of the telephone connected to the wireless communication apparatus to the session managing server, the session managing server transfers to the session managing server of the other party in communication the information indicating the operational state of the telephone, and also transfers it to the wireless communication apparatus of the other party in communication, and as a result the operational state of the telephone is recognizable by the other party in communication.

In addition, the calling party's wireless communication apparatus is characterized by transmitting information indicating that a predetermined operation performed by a user to the calling party's session managing server,
wherein the calling party's session managing server is characterized by transmitting the information received indicating that the predetermined operation has been performed to the called party's session managing server, and
wherein the called party's session managing server is characterized by transmitting the information received indicating that the predetermined operation has been performed to the called party's wireless communication apparatus.

A wireless communication apparatus according to this invention is characterized by setting up a connection type of the wireless communication apparatus according to an IP address acquisition type based on the environment of a connected network, and transmitting the connection type of the wireless communication apparatus to the session managing server of the calling party or called party when requesting the establishment of the session, and the session managing server is characterized by selecting HTTP or UDP based on the connection type for data communications with a server apparatus or a third party's wireless communication apparatus.

In addition, the calling party's wireless communication apparatus and the called party's wireless communication apparatus each are characterized by being installed in a predetermined network environment and assigned an IP (Internet Protocol) address according to the predetermined network environment, and storing a connection type of the wireless communication apparatus which is determined according to an assignment type of the IP address,
wherein the calling party's wireless communication apparatus is characterized by transmitting the connection type of the calling party's wireless communication apparatus to the calling party's session managing server,
wherein the called party's wireless communication apparatus is characterized by transmitting the connection type of the called party's wireless communication apparatus to the called party's session managing server,
wherein the called party's session managing server is characterized by determining to communicate data with the called party's wireless communication apparatus by using one communication protocol of Hyper Text Transfer Protocol (HTTP) and User Datagram Protocol (UDP) based on the connection type transmitted from the called party's wireless communication apparatus, and then transmitting information notifying of the one communication protocol determined to the called party's wireless communication apparatus,
wherein the calling party's session managing server is characterized by determining to communicate data with the calling party's wireless communication apparatus by using one communication protocol of Hyper Text Transfer Protocol (HTTP) and User Datagram Protocol (UDP) based on the connection type transmitted from the calling party's wireless communication apparatus, and then transmitting information notifying of the communication protocol determined to the calling party's wireless communication apparatus,
wherein the calling party's wireless communication apparatus is characterized by communicating the data according to the information notifying of the communication protocol transmitted from the calling party's session managing server, and
wherein the called party's wireless communication apparatus is characterized by communicating the data according to the information notifying of the communication protocol transmitted from the called party's session managing server.

The connection type of the wireless communication apparatus according to this invention is characterized by including five types below depending on an IP address type allocated in the domain such as an ISP, which the wireless communication apparatus belong to and is managed:
(1) A global IP address is statically allocated.
(2) A private IP address is statically allocated.
(3) A global IP address is dynamically allocated by using DHCP.
(4) A private IP address is dynamically allocated by using DHCP.
(5) One of (1) to (4) above. Such as a router equipped with network address translation (NAT function) may be installed between the wireless communication apparatus and the network connecting point to the network whose IP address is allocated to the wireless communication apparatus. As a result, the wireless communication apparatus may be allocated a further localized local IP address.

In addition, it is characterized in that the IP address which is assigned to the calling party's wireless communication apparatus according to the predetermined network environment and the IP address which is assigned to the called party's wireless communication apparatus according to the predetermined network environment each are assigned based on at least one of the cases in which a global IP (Internet Protocol) address is statically assigned, a private IP address is statically assigned, a global IP address is dynamically assigned by using Dynamic Host Configuration Protocol (DHCP), a private IP address is dynamically assigned by using DHCP, and a local IP address is assigned.

A called party's wireless communication apparatus according to this invention is characterized by issuing the GET method of HTTP to the called party's session managing server in order to receive information indicating that the establishment request of a session has been made from the calling party's wireless communication apparatus, and receiving the information indicating that the establishment request of a session has been made from the calling party's wireless communication apparatus based on the content information of the status response.

In addition, the called party's wireless communication apparatus is characterized by issuing a GET method of Hyper Text Transfer Protocol (HTTP) to the called party's session managing server in order to confirm that the establishment request of the session from the calling party's wireless communication apparatus is stored in the called party's session managing server, wherein the called party's session managing server is characterized by searching, upon reception of the GET method issued by the called party's wireless communication apparatus, for the establishment request of the session with the called party's wireless communication apparatus which issued the GET method if it is stored, and transmitting a result of the establishment request of the session searched for, which is included in a GET response to the GET method, to the called party's wireless communication apparatus.

A calling party's wireless communication apparatus according to this invention is characterized by issuing the GET method of HTTP to the calling party's session managing server in order to receive information via the called party's wireless communication apparatus on events including that the receiver is off-hooked so that the other party is answering the call and that the receiver is on-hooked to cut the line, and receiving the information from the called party's wireless communication apparatus indicating various events occurred based on the content information of the status response.

In addition, the called party's wireless communication apparatus is characterized by transmitting information indicating contents of a predetermined operation performed by a user to the calling party's session managing server, wherein the calling party's session managing server is characterized by storing the information, which is transmitted from the called party's wireless communication apparatus, indicating the contents of the predetermined operation, and wherein the calling party's wireless communication apparatus is characterized by acquiring the information, which is stored in the calling party's session managing server, indicating the contents of the predetermined operation of the communication apparatus by using a GET method of Hyper Text Transfer Protocol (HTTP).

In addition, it is characterized in that the called party's wireless communication apparatus issues the GET method of HTTP to the called party's session managing server in a fixed cycle, receives from the called party's session managing server information indicating that no establishment request of a session has been made from the calling party's wireless communication apparatus while no call processing is performed, and receives from the called party's session managing server information indicating that the establishment request of a session has been made by the calling party's wireless communication apparatus at the start of call processing only when the establishment request of the session is received from the calling party's wireless communication apparatus.

In addition, the called party's wireless communication apparatus is characterized by transmitting a GET method of Hyper Text Transfer Protocol (HTTP) to the called party's session managing server at fixed intervals, and wherein the called party's session managing server is characterized by, upon reception of the GET method from the called party's wireless communication apparatus, transmitting information to the called party's wireless communication apparatus indicating that there is no establishment request of the session from the calling party's wireless communication apparatus in the case where the establishment request of the session has been issued by the calling party's wireless communication apparatus but a communication has not been started yet between the calling party's wireless communication apparatus and the called party's wireless communication apparatus, and transmitting information indicating that the establishment request of the session is received from the calling party's wireless communication apparatus to the called party's wireless communication apparatus in the case where the establishment request of the session has been issued by the calling party's wireless communication apparatus and a communication has been started between the calling party's wireless communication apparatus and the called party's wireless communication apparatus.

In addition, it is characterized in that the called party's wireless communication apparatus issues the GET method of HTTP to the called party's session managing server once at the time of initialization, and receives, at the start of call processing, information indicating that the establishment request of the session has been made by the calling party's wireless communication apparatus based on the content information of the status response transmitted to the called party's wireless communication apparatus from the called party's session managing server when the establishment request of the session is made by the calling party's wireless communication apparatus.

In addition, the called party's wireless communication apparatus is characterized by transmitting a GET method of Hyper Text Transfer Protocol (HTTP) to the called party's session managing server when one of applying power and preparing for a start of a call immediately after completing a call processing, and wherein the called party's session managing server is characterized by holding the GET method transmitted from the called party's wireless communication apparatus, and transmitting to the called party's wireless communication apparatus as a response to the GET method held that the establishment request of the session is received from the calling party's wireless communication apparatus in the case where the establishment request of the session is received from the calling party's wireless communication apparatus.

In addition, it is characterized in that the called party's wireless communication apparatus issues the GET method of HTTP to the called party's session managing server once at the time of initialization, the called party's session managing server transmits immediately header information alone except body information as a response to the called party's wireless communication apparatus, the called party's session managing server keeps transmitting Keep-Alive information (information for confirming alive by issuing continuous signals) for keeping the TCP connection to the called party's wireless communication apparatus as part of the body information in a fixed cycle while no call processing is performed, and the called party's wireless communication apparatus receives at the start of call processing information indicating that the establishment request of the session has been made by the calling party's wireless communication apparatus based on the content information of the status response transmitted to the called party's wireless communication apparatus from the called party's session managing server when the establishment request of the session is made by the calling party's wireless communication apparatus.

In addition, the called party's wireless communication apparatus is characterized by transmitting a GET method of Hyper Text Transfer Protocol (HTTP) to the called party's session managing server when power is applied or when a call is prepared to be started immediately after completing call processing, and wherein the called party's session managing server is characterized by, upon reception of the GET method transmitted from the called party's wireless communication apparatus, continuing transmitting to the called party's wireless communication apparatus alive confirmation information for maintaining a line connection between the called party's wireless communication apparatus and the called party's session managing server, in the case where the establishment request of the session is not issued by the calling party's wireless communication apparatus, and transmitting to the called party's wireless communication apparatus that the establishment request of the session is received from the calling party's wireless communication apparatus in the case where the establishment request of the session is issued by the calling party's wireless communication apparatus.

In addition, the called party's wireless communication apparatus which issues the GET method of HTTP is characterized in that while the called party's session managing server is in process of keeping transmitting the Keep-Alive information for keeping the TCP connection in a fixed cycle to the called party's wireless communication apparatus, the wireless communication apparatus makes a new TCP connection in case of not receiving the Keep-Alive information in the fixed cycle and even after a given timeout value, and then reissues another GET method of HTTP to the called party's session managing server in order to receive information indicating that an establishment request of a session has been made. Thus, the wireless communication apparatus resets the condition for receiving the information indicating that the establishment request of the session has been made from the calling party's wireless communication apparatus.

In addition, the called party's wireless communication apparatus is characterized by transmitting the GET method of Hyper Text Transfer Protocol (HTTP) again to the called party's session managing server in the case of not receiving the alive confirmation information to be transmitted from the called party's session managing server even after a predetermined period of time.

In addition, it is characterized in that the called party's wireless communication apparatus, which issued the GET method of HTTP, connected by TCP may disconnect the current TCP connection depending on such as a timeout condition, make a new TCP reconnection, reissue the GET method of HTTP to the called party's session managing serer in order to receive information indicating that an establishment request of a session has been made, and add information indicating that it is a reissue to the reissued GET method of HTTP in consideration of possible failure in reception of the information, in case of retrying preparation for receiving information indicating that the establishment request of the session has been made from the calling party's wireless communication apparatus, and upon reception of the information indicating that the establishment request of the session has been made with the calling party's wireless communication apparatus from the session managing server, and the session managing server, upon reception of the GET method, may transmit again the information indicating that the establishment request of the session has been received to the called party's wireless communication apparatus.

In addition, the called party's wireless communication apparatus is characterized by transmitting the GET method of Hyper Text Transfer Protocol (HTTP) again to the called party's session managing server together with information indicating a repeated transmission.

A wireless communication apparatus and an assignment notification server which notifies the wireless communication apparatus of the server ID of a session managing server according to this invention are characterized in that the wireless communication apparatus may transmit information indicating the operational state of the wireless communication apparatus to the assignment notification server in a fixed cycle or at every operation for making a telephone call, and the assignment notification server may confirm based on the information indicating that the operational state of the wireless communication apparatus is normal or not, and return information indicating the operational state of an internet telephone system including the session managing server and the call relay server as a response of the above transmission.

In addition, the calling party's wireless communication apparatus is characterized by transmitting information notifying of an operational state of the calling party's wireless communication apparatus to the assignment notification server, and wherein the assignment notification server is characterized by checking the calling party's wireless communication apparatus if it is normal or not based on the information notifying of the operational state transmitted from the calling party's wireless communication apparatus, and transmitting an operational state of the assignment notification server itself together with a check result to the calling party's wireless communication apparatus as a response to the information notifying of the operational state transmitted from the calling party's wireless communication apparatus.

In addition, it is characterized in that as an operational state of the internet telephone system, information indicating that the assignment notification server or the session managing server is to be replaced by another assignment notification server or session managing server for such as a maintenance or expansion purpose may be included in the transmission response to the wireless communication apparatus. Hence, the wireless communication apparatus may change the assignment notification server or session managing server accessed.

In addition, it is characterized in that as an operational state of the internet telephone system, information about not only the IP address of the assignment notification server or the session managing server each alone but also the IP address of an alternative server to the assignment notification server or session managing server, which is accessible in case that the assignment notification server or session managing server is not available due to some fault such as a failure, may be included in the transmission response to the wireless communication apparatus. Hence, if the assignment notification server or the session managing server is inaccessible due to a failure, the wireless communication apparatus may continue processing without brake by accessing the alternative server.

In addition, the assignment notification server is characterized by being configured with a plurality of server devices, which may include one as a primary server for acting as the assignment notification server and another as a secondary server. Then, the assignment notification server is characterized by being switched over from the primary server to the secondary server so that the secondary server acts as the assignment notification server, in case of the primary server operating abnormally, and notifying the calling party's wireless communication apparatus that the secondary server is replaced to act as the assignment notification server.

In addition, the calling party's session managing server is characterized by being configured with a plurality of server devices, which may include one as a primary server for acting as the calling party's session managing server and another as a secondary server. Then, the calling party's session managing server is characterized by being switched over from the primary server to the secondary server so that the secondary server acts as the calling party's session managing server, in case of the primary server operating abnormally, and notifying the calling party's wireless communication apparatus that the secondary server is replaced to act as the calling party's session managing server.

In addition, the called party's session managing server is characterized by being configured with a plurality of server devices, which may include one as a primary server for acting as the called party's session managing server and another as a secondary server. Then, the called party's session managing server is characterized by being switched over from the primary server to the secondary server so that the secondary server acts as the called party's session managing server, in case of the primary server operating abnormally, and notifying the called party's wireless communication apparatus that the secondary server is replaced to act as the called party's session managing server.

In addition, it is characterized in that, in the case where information indicating the state of accessing the assignment notification server is transmitted based on service charge information for an internet telephone system of the user of the wireless communication apparatus and response information to it is received, if the service charge is not paid, the response information may include information indicating the fact accordingly. Then, the wireless communication apparatus, upon reception of the response information, may set the communication function of the internet telephone system to be inoperable.

In addition, the internet communication system is characterized by further having a customer management database for managing the service charge for a system for each calling party's wireless communication apparatus, wherein the assignment notification server is characterized by acquiring the service charge for the calling party's wireless communication apparatus from the customer management database in the case of transmitting the server ID of the session managing server which manages the wireless communication apparatus to the calling party's wireless communication apparatus, and transmitting the service charge acquired and the server ID to the calling party's wireless communication apparatus, and wherein the calling party's wireless communication apparatus is characterized by determining whether to set the communication function of itself to be inoperable based on the service charge received from the assignment notification server.

In addition, it is characterized in that information indicating that the user of the wireless communication apparatus of which the communication function of the internet telephone system is made inoperable as aforementioned has paid the service charge may also be included in the response information from the assignment notification server. Then, upon reception of the information indicating that the service charge has been paid, the wireless communication apparatus may set the communication function of the internet telephone system to be operable.

In addition, the calling party's wireless communication apparatus is characterized by determining whether to set the communication function of itself to be operable based on the service charge received from the assignment notification server in the case where the communication function of itself is set to be inoperable.

In addition, it is characterized in that, in the case where information indicating the state of accessing the assignment notification server is transmitted based on the version information of built-in software which is installed in the wireless communication apparatus, and response information thereto is received, information indicating that a new version of the built-in software may be obtained from the administrator side of the internet telephone system based on the response information may be included. Then, the wireless communication apparatus, upon reception of the response information, may set up so that predetermined updating processing of the built-in software of the wireless communication apparatus may be started.

In addition, the calling party's wireless communication apparatus is characterized by installing software, which may include version information, for executing the function of the wireless communication apparatus, and transmitting the version information of the software together with the information notifying of the operational state of the calling party's wireless communication apparatus to the assignment notification server, wherein the assignment notification server is characterized by determining whether to replace the software installed in the calling party's wireless communication apparatus by another software with a different version based on the version information transmitted from the calling party's wireless communication apparatus, and transmitting a determination result to the calling party's wireless communication apparatus.

In addition, it is characterized in that, as the predetermined processing for updating the built-in software of the wireless communication apparatus, the wireless communication apparatus downloads it from the Web server having an assigned URL address which is notified by the response information from the assignment notification server, updates it and start it again.

In addition, the assignment notification server is characterized by managing the address of a Web server which manages the software installed in the calling party's wireless communication apparatus, and transmitting the address of a Web server of the another software with the different version to the calling party's wireless communication apparatus in the case of determining that the software installed in the calling party's wireless communication apparatus is to be replaced by the another software with the different version.

A wireless communication apparatus according to this invention is characterized, in the case of an excess performance of relaying beyond the relayable communication capacity by a communication relay server managed by a session managing server so that communication is disenabled by way of the communication relay server, and when trying to start communication by way of the communication relay server, by receiving information indicating that relaying by the communication relay server is saturated which is transmitted by the session managing server at the time of the calling party's wireless communication apparatus issuing a call. Hence, the user of a communication apparatus connected with the wireless communication apparatus is allowed to be notified by means of such as a voice reproduction device or a display device that relaying by the communication relay server is saturated, so that relayed communication is not available.

In addition, the session managing server is characterized by managing a number of communication relaying by the calling party's communication relay server, and transmitting to the calling party's wireless communication apparatus information indicating that relaying by the communication relay server is saturated in the case where the establishment request of the session is received from the calling party's wireless communication apparatus and the number of communication relaying exceeds a preset number of communication relaying, wherein the calling party's wireless communication apparatus is characterized by outputting information indicating that the relaying by the calling party's communication relay server is saturated and therefore no communication is available via the calling party's communication relay server upon reception of the information indicating that the relaying by the calling party's communication relay server is saturated from the session managing server.

In addition, the session managing server is characterized by managing a number of communication relaying by the called party's communication relay server, and transmitting to the calling party's wireless communication apparatus information indicating that relaying by the communication relay server is saturated in the case where the establishment request of the session is received from the calling party's wireless communication apparatus and the number of communication relaying exceeds a preset number of communication relaying, wherein the calling party's wireless communication apparatus is characterized by outputting information indicating that the relaying by the called party's communication relay server is saturated and therefore no communication is available by the called party's communication relay server upon reception of the information indicating that the relaying by the called party's communication relay server is saturated from the session managing server.

A wireless communication apparatus according to this invention is characterized, in the case of having another communication line such as a public line other than an IP network, by carrying out communications by using the another communication line if relaying capacity by a communication relay server is saturated, or a session managing server or a communication relay serve is not available due to a network condition.

In addition, the internet communication system is characterized by further having a PSTN (Public Switched Telephone Network), wherein the calling party's wireless communication apparatus is characterized by connecting the PSTN, and calling the called party's wireless communication apparatus by using the PSTN, upon reception of the information indicating that the relaying by the calling party's communication relay server is saturated from the session managing server.

In addition, the internet communication system is characterized by further having a PSTN (Public Switched Telephone Network), wherein the calling party's wireless communication apparatus is characterized by connecting the PSTN and calling the called party's wireless communication apparatus by using the PSTN upon reception of the information indicating that the relaying by the called party's communication relay server is saturated from the session managing server.

A wireless communication apparatus according to this invention is characterized, when making a connection by using such as TCP with the session managing server or the communication relay server, by performing cancellation of processing which interrupts the connection processing in case of not having a successful connection even after a fixed timeout value, and repeating the start of connection processing until a successful connection is achieved, and the number of times of reconnection reaches a maximum number.

In addition, the wireless communication apparatus is characterized by issuing a connection request to the session managing server, prior to starting communication with the session managing server, by using TCP (Transmission Control Protocol), canceling the connection request upon reception of no response from the session managing server to the connection request after a preset fixed timeout value, and repeating the connection request until the connection succeeds or the number of repetitions of the connection request reaches a preset maximum number.

In addition, the wireless communication apparatus is characterized by issuing a communication request to the communication relay server, prior to starting communication with the communication relay server, by using TCP (Transmission Control Protocol), canceling the connection request upon reception of no response from the communication relay server to the connection request even after a preset fixed timeout value, and repeating the connection request until the connection succeeds or the number of repetitions of the connection request reaches a preset maximum number.

In addition, it is characterized in that, with respect to processing timeout value for connection by using such as TCP of the wireless communication apparatus to the session managing server or the communication relay server and a maxim number of times of reconnections, automatic changes are made to the timeout value so as to extend the period of time and to the maximum number of times of reconnections so as to increase the number whenever a connection by using such as TCP ends in failure, and automatic changes are made to the timeout value so as to shorten the period of time and to the maximum number of times of reconnections so as to decrease the number whenever a connection by using such as TCP ends in success.

In addition, the wireless communication apparatus is characterized by making one of the changes of increasing the timeout value and increasing the maximum number in the case where the request for making the connection by using TCP (Transmission control Protocol) ends in failure, and making one of the changes of reducing the timeout value and decreasing the maximum number in the case where the request for making the connection by using TCP (Transmission control Protocol) ends in success.

In addition, the wireless communication apparatus is characterized by making one of the changes of increasing the timeout value and increasing the maximum number of times in the case where the request for making the connection by using TCP (Transmission control Protocol) ends in failure, and making one of the changes of reducing the timeout value and decreasing the maximum number in the case where the request for making the connection by using TCP (Transmission control Protocol) ends in success.

A wireless communication apparatus according to this invention, in the process of connecting the session managing server or the communication relay server by using such as TCP, is characterized by notifying through a voice reproduction device or a display device the user of a communication apparatus connected with the wireless communication apparatus that relayed communication is not available due to the network condition, in the case of failing to achieve a successful connection even after a given timeout value, or even after repeating the reconnection a predetermined maximum number of times.

In addition, the wireless communication apparatus is characterized by outputting information indicating that the communication cannot be relayed by using the Internet in one of the cases where the request for making the connection by using TCP (Transmission Control Protocol) ends in failure even after the preset fixed timeout value and the connection does not succeed even after the preset maximum number.

In addition, the wireless communication apparatus is characterized by making one of the changes of increasing the timeout value and increasing the maximum number of times in the case where the request for making the connection by using TCP (Transmission control Protocol) ends in failure, and making one of the changes of reducing the timeout value and decreasing the maximum number in the case where the request for making the connection by using TCP (Transmission control Protocol) ends in success.

A session managing server or a communication relay server according to this invention is characterized by measuring regularly the arrival time interval between the transmission of a general IP packet and the reception thereof at another party's session managing server, communication relay server, or wireless communication apparatus, judging the traffic condition of the communication path based on whether a given value is exceeded or not, and notifying, when determining that the network is very congested, through a voice reproduction device or a display device the user of a communication apparatus connected with the wireless communication apparatus, before the wireless communication apparatus starts communication, that the network is very congested so that the quality of communication is deteriorated.

In addition, the session managing server is characterized by transmitting a packet to the wireless communication apparatus managed by the session managing server and the communication relay server, measuring an arrival time interval between a transmission of the packet and a reception of response information thereto received from the wireless communication apparatus and the communication relay server, judging a level of congestion for each communication path, and transmitting a judgment result to the wireless communication apparatus; and wherein the wireless communication apparatus is characterized by outputting the judgement result transmitted from the session managing server.

In addition, the communication relay server is characterized by transmitting a packet to the wireless communication apparatus and the session managing server, measuring an arrival time interval between a transmission of the packet and a reception of response information received from the wireless communication apparatus and the session managing server, judging a level of congestion for each communication path, and transmitting a judgement result of the level of congestion to the wireless communication apparatus; and wherein the wireless communication apparatus is characterized by outputting the judgement result transmitted from the communication relay server.

A session managing server or a communication relay server according to this invention is characterized by measuring regularly the arrival time interval between the transmission of a general IP packet and the reception thereof at another party's session managing server, communication relay server, or wireless communication apparatus while the wireless communication apparatus is communicating, judging the traffic condition of the communication path based on whether a give value is exceeded or not, and notifying through a voice reproduction device or a display device, when the network becomes very congested and the arrival of communication data is likely to delay, the user of a communication apparatus connected with the wireless communication apparatus that the network is very congested so that the quality of communication is deteriorated as poor as it is not practically applicable.

A session managing server according to this invention is characterized by setting up a communication path such that communications may be relayed not only between a calling party's communication relay server and a called party's communication relay server in a two-stage relay, but also with third and other communication relay servers added between the calling party's communication relay server and the called party's communication relay server.

In addition, the internet communication system is characterized by further having a bypass communication relay server for bypassing communication paths, other than the communication relay server, wherein the session managing server is characterized by switching over from a first communication path through which communications are relayed between the calling party's wireless communication apparatus and the called party's wireless communication apparatus by way of the communication relay server, to a second communication path through which communications are relayed between the calling party's wireless communication apparatus and the called party's wireless communication apparatus by way of the bypass communication relay server, based on the judgement result of the level of congestion of the communication path.

In addition, it is characterized, with respect to the selection of the third and other communication relay servers mentioned above, in that when the network is congested, communications may be carried out between the wireless communication apparatuses of the calling party and the called party by selecting a communication relay server in the path through which no or little delay is caused in communication based on communication path delay measurement information which is obtained from such as the session managing server, and setting up a communication path so that the third and other communication relay servers carry out communication relaying between both the servers.

In addition, the bypass communication relay server is characterized by being replaced with a plurality of bypass communication relay servers, and wherein the session managing server is characterized by transmitting the packet to the plurality of bypass communication relay servers, measuring an arrival time at which response information to the packet is received from each of the plurality of bypass communication relay servers, judging a level of congestion for each communication path including one of the plurality of bypass communication relay servers connected, selecting one of the plurality of bypass communication relay servers whose communication path is less congested, and switching over from the first communication path to the second communication path through which communications are relayed between the calling party's wireless communication apparatus and the called party's wireless communication apparatus by way of a selected one of the plurality of the bypass communication relay servers.

In addition, when the wireless communication apparatuses of the calling party and the called party are communicating with each other by way of a communication relay server, the condition in network communication may get deteriorated, so that the communication path should be switched over to one having a better condition in network communication so that the third and other communication relay servers relay communications between both the servers mentioned above. In this case, it is characterized in that the user of the communication apparatus connected with the wireless communication apparatus is notified through a voice reproduction device or a display device that the network gets heavily congested, and therefore the quality of communication is deteriorated as poor as it is practically inapplicable, so that the communication path will be changed.

In addition, the session managing server is characterized by transmitting to the wireless communication apparatus that the first communication path is to be switched over to the second communication path, and wherein the wireless communication apparatus is characterized by outputting the information transmitted from the session managing server indicating that the first communication path is to be switched over to the second communication path.

A session managing server according to this invention is characterized, when installed in a LAN environment of a specific limited area such as a company or an organization, by setting up extension numbers which are only applicable within the area through the telephones connected to wireless communication apparatuses installed in that area. Consequently, when one of the extension numbers is inputted through a telephone for making a telephone call, extension number information thereof is transmitted to the session managing server. Then, a call may be made with a wireless communication apparatus corresponding to the extension number based on a table which is set up in the session managing server for translating the telephone number to the IP address or identifier of the wireless communication apparatus.

In addition, the internet communication system is characterized by further having a LAN (Local Area Network), which communicates by using extension number information available within a specific network area;

wherein the calling party's wireless communication apparatus and the calling party's session managing server are characterized by being connected to the LAN;

wherein the calling party's wireless communication apparatus is characterized by inputting the extension number information of a destination, and transmitting the extension number information inputted to the calling party's session managing server; and wherein the calling party's session managing server is characterized by including an extension_number_information_storing_unit which manages the extension number information and the wireless communication apparatus ID of the called party's wireless communication apparatus, making them correspond, acquiring the wireless communication apparatus ID of the called party's wireless communication apparatus corresponding to the extension number information from the extension_number_information_storing_unit by using the extension number information transmitted from the calling party's wireless communication apparatus, and transmitting the server ID of the called party's session managing server which is identified by the wireless communication apparatus ID acquired back to the calling party's wireless communication apparatus.

In addition, the internet communication system is characterized by further having a LAN (Local Area Network) which communicates by using extension number information available within a specific network area;

wherein the calling party's wireless communication apparatus and the calling party's session managing server are characterized by being connected to the LAN;

wherein the calling party's wireless communication apparatus is characterized by inputting the extension number information of a destination, and transmitting the extension number information inputted to the calling party's session managing server; and wherein the calling party's session managing server is characterized by including an extension_number_information_storing_unit which manages the extension number information and the wireless communication apparatus ID of the called party's wireless communication apparatus, making them correspond, acquiring the wireless communication apparatus ID of the called party's wireless communication apparatus corresponding to the extension number information from the extension_number_information_storing_unit by using the extension number information transmitted from the calling party's wireless communication apparatus, transmitting the wireless communication apparatus ID acquired and the server ID of the called party's session managing server which manages the called party's wireless communication apparatus identified by the wireless communication apparatus ID acquired to the called party's session managing server, and transmitting the establishment request of the session with the called party's wireless communication apparatus.

In addition, it is characterized in that the determination process may be carried out by recognizing, when an extension number is inputted through the telephone, that the inputted is an extension number based on the prefix number of the extension number previously set up in a wireless communication apparatus, so that call control may be carried out by referring not to a built-in translation table in the wireless communication apparatus but to a translation table in a session managing server.

A session managing server according to this invention is characterized, when installed in a LAN environment of a specific limited area such as a company or an organization, by having a storage unit for registering wireless communication apparatuses in groups which are substitutable for busy wireless communication apparatuses in the case where an outside call is received through an IP line but the called wireless communication apparatus is busy with another call, and automatically transferring the telephone call to one of the substitutable wireless communication apparatuses registered therein.

In addition, the internet communication system is characterized by having a plurality of called party's wireless communication apparatuses, wherein the calling party's session managing server is characterized by storing a group ID for grouping and managing the plurality of called party's wireless communication apparatuses, the extension number information, and the wireless communication apparatus IDs of the called party's wireless communication apparatuses, making them correspond, in the extension_number_information_storing_unit, acquiring the wireless communication apparatus ID of a called party's wireless communication apparatus whose group ID is the same as the group ID of a called party's wireless communication apparatus which is busy with a call from the extension_number_information_storing_unit in the case where the called party's wireless communication apparatus which is requested by the calling party's wireless communication apparatus to establish the session is busy with the call, and transmitting the wireless communication apparatus ID acquired and a server ID of the called party's session managing server, which manages the called party's wireless communication apparatus identified by the wireless communication apparatus ID acquired, back to the calling party's wireless communication apparatus, and wherein the calling party's wireless communication apparatus is characterized by receiving the wireless communication apparatus ID of the called party's wireless communication apparatus and the server ID of the called party's session managing server from the calling party's session managing server, transmitting the wireless communication apparatus ID received to the called party's session managing server identified by the server ID received, and transmitting the establishment request of the session with the called party's wireless communication apparatus.

In addition, the internet communication system is characterized by having a plurality of called party's wireless communication apparatuses;

wherein the calling party's session managing server is characterized by storing a group ID for grouping and managing the plurality of called party's wireless communication apparatuses, the extension number information, and the wireless communication apparatus IDs of the called party's wireless communication apparatuses, making them correspond, in the extension_number_information_storing_unit, acquiring the wireless communication apparatus ID of a called party's wireless communication apparatus whose group ID is the same as the group ID of a called party's wireless communication apparatus which is busy with a call from the extension_number_information_storing_unit in the case where the called party's wireless communication apparatus which is requested by the calling party's wireless communication apparatus to establish the session is busy with the call, transmitting the wireless communication apparatus ID acquired to the called party's session managing server which manages the called party's wireless communication apparatus identified by the wireless communication apparatus ID acquired, and transmitting the establishment request of the session with the called party's wireless communication apparatus.

About the GET method of HTTP of the wireless communication apparatus for the communication relay server transmitting and receiving voice information, in the process of continuing transmitting Keep-Alive information for holding TCP connection from the wireless communication apparatus of the other party in communication to the wireless communication apparatus in a fixed cycle by way of the communication relay server mentioned above, the wireless communication apparatus according to this invention is characterized by making a new TCP connection and at the same time requesting the wireless communication apparatus of the other party to make another TCP connection by way of the session managing server, in case that the Keep-Alive information did not arrive at the wireless communication apparatus in the fixed cycle and even after a given timeout value.

The wireless communication apparatus according to this invention is characterized by forming an IP packet by accumulating at least one piece of voice frame data, which is an encoding and decoding unit of a voice codec (a device or software for voice encoding and decoding), within a specified period of time determined by the wireless communication apparatus, and transmitting the IP packet, wherein the wireless communication apparatus is characterized by transmitting the IP packet immediately after storing voice frame data indicating an end of a sequence in the IP packet, even before the specified period of time passes, at a time when the voice frame data indicating the end is generated, at an end of the sequence of the voice data when it has silence.

In addition, the wireless communication apparatus is characterized by having a plurality of communication facilities for mobile phone including PHS (PERSONAL HANDYPHONE SYSTEM), and carrying out communications by use of one of the plurality of communication facilities that is selected by a user.

In addition, the wireless communication apparatus is characterized by selecting and inputting at least one of a plurality of communication modules, each communication module having a communication facility for mobile phone including PHS (PERSONAL HANDYPHONE SYSTEM), and carrying out communications by use of an inputted communication module.

In addition, the plurality of communication modules are characterized by including a communication module that can be connected to a wired network and is capable of carrying out communications. Then, the wireless communication apparatus is characterized by selecting from among the plurality of communication modules the communication module that can be connected to a wired network and is capable of carrying out communications, and inputting the communication module selected.

In addition, the wireless communication apparatus is characterized by receiving phone number information from a user. Then, the wireless communication apparatus is characterized by including, an IP based communication processing unit for carrying out communications over the internet, a public line based communication processing unit for carrying out communications by way of a public line for analog data communications, a selection unit for selecting between the internet and the public line, and an address translation unit for translating the phone number information to an identification number of a destination wireless communication apparatus. Then, the public line based communication processing unit is characterized by including calling means, and carrying out telephone communications by inputting the phone number information received from the user directly to the calling means, in the case where the public line is selected by the selection unit. Then, the address translation unit is characterized by inputting the phone number information received from the user and translating the phone number information received to the identification number of the destination wireless communication apparatus, in the case where the internet is selected by the selection unit. Then, the IP based communication processing unit is characterized by acquiring the identification number of the destination wireless communication apparatus translated by the address translation unit, and carrying out the telephone communications with the destination wireless communication apparatus.

In addition, the wireless communication apparatus is characterized by receiving phone number information from a user. Then, the calling party's session managing server is characterized by including an address translation unit for translating the phone number information to an identification number of a destination wireless communication apparatus. Then, the wireless communication apparatus is characterized by including an IP based communication processing unit for carrying out communications over the internet, a public line based communication processing unit for carrying out communications by way of a public line for analog data communications, and a selection unit for selecting between the internet and the public line. Then, the public line based communication processing unit is characterized by including calling means, inputting the phone number information received from the user directly to the calling means to carry out telephone communications, in the case where the public line is selected by the selection unit. Then, the address translation unit is characterized by inputting the phone number information received from the user and translating the phone number information received to the identification number of the destination wireless communication apparatus, in the case where the internet is selected by the selection unit. Then, the IP based communication processing unit is characterized by acquiring the identification number of the destination wireless communication apparatus translated by the address translation unit, and carrying out the telephone communications with the destination wireless communication apparatus.

In addition, the wireless communication apparatus is characterized by transmitting the phone number information received from a user to a session managing server to which the wireless communication apparatus is assigned, in the case where the internet is selected by the selection unit. Then, the session managing server is characterized by connecting to the predetermined gateway for IP phone set up in the IP phone network. Then, the wireless communication apparatus is characterized by, upon connection to the predetermined gateway for IP phone and transmission of the phone number information by the session managing server, carrying out telephone communications with a telephone communication apparatus over the IP phone network where the gateway for IP phone is set up via the session managing server.

In addition, the called party's session managing server is characterized by carrying out connections to accept a call for communication issued by a telephone communication apparatus over an IP phone network, and performing accepting a call for communication with a corresponding wireless communication apparatus to carry out telephone communications.

In addition, the wireless communication apparatus is characterized by including a communication processing unit having a plurality of communication facilities, a measurement unit for measuring radiowave strength for communication affected by at least one of a plurality of communication states in connection with distance from a wireless base station, location relation, topographic features, atmospheric phenomena, communication time zones, and radio wave characteristics, and a communication facility selection unit for selecting, from among the plurality of communication facilities, a communication facility that holds the radio wave strength for communication measured by the measurement unit most stably and strongly. Then, the communication processing unit is characterized by carrying out communications by use of the communication facility selected by the communication facility selection unit.

In addition, the wireless communication apparatus is characterized by including a communication processing unit having a plurality of communication facilities, and a communication facility selection unit for calculating electric power consumption of each of the plurality of communication facilities in case the communication processing unit uses the each communication facility, and selecting a communication facility that consumes electric power as low as possible. Then, the communication processing unit is characterized by carrying out communications by use of the communication facility selected by the communication facility selection unit so that communication can continue.

In addition, the wireless communication apparatus is characterized by including an electric power supply unit with electric power charged. Then, the communication facility selection unit is characterized by managing the consumption of the electric power charged in the electric power supply unit, and selecting a communication facility that consumes electric power as low as possible in case the consumption of the electric power managed exceeds a predetermined value.

In addition, the wireless communication apparatus is characterized by including a communication processing unit having a plurality of communication facilities, a communication facility selection unit for selecting one of the plurality of communication facilities based on a predetermined condition, and a communication charge notification unit for notifying a user of communication charge for the one of the plurality of communication facilities selected by the communication facility selection unit, in case communications are carried out by use of the one of the plurality of communication facilities selected, through at least one of colors, numerical values, graphics, and sounds indicating that the cost of the communication charge for the one of the plurality of communication facilities selected costs one of high and low.

In addition, the wireless communication apparatus is characterized by including a communication processing unit having a plurality of communication facilities, and a GIS processing unit having map information and a GIS (Geographic Information System) facility. Then, the GIS processing unit is characterized by checking present position of the wireless communication apparatus, notifying a user of the present position based on present position information obtained through the GIS facility and the map information, and displaying on a map a range within which low-cost communication facility is available for each of the plurality of communication facilities based on the map information.

In addition, the wireless communication apparatus is characterized by displaying on the map for the each of the plurality of communication facilities based on the map information at least one of a building, a movable traffic vehicle, a movable airplane, and a movable vessel having base station apparatuses set up for low-cost communication facility.

In addition, the wireless communication apparatus is characterized by including an IP based communication processing unit for carrying out communications over an IP (Internet Protocol) network. Then, the IP based communication processing unit is characterized by storing registration information to connect to a plurality of ISPs (Internet Service Providers) on the internet for implementing communication facilities, and selecting one of the plurality of ISPs stored based on a predetermined criterion.

In addition, the IP based communication processing unit is characterized by selecting a most suitable one of the plurality of ISPs based on at least one of conditions including calling charge, access congestion, and accessibility at the wireless base station apparatus.

In addition, the wireless base station apparatus is characterized by being set up on individual basis by an individual having nothing to do with a public institution nor a corporate entity. Then, the wireless base station apparatus is characterized by including information about an ISP (Internet Service Provider) that is accessible at the wireless base station apparatus. Then, the wireless communication apparatus is characterized, in the case of accessing the wireless base station set up on the individual basis, by receiving from the wireless base station apparatus the information about the ISP (Internet Service Provider) that is accessible at the wireless base station apparatus, and carrying out communications by use of the ISP received based on the information about the ISP.

In addition, a plurality of the wireless base station apparatuses is available within communicable range of the wireless communication apparatus. Then, the wireless communication apparatus is characterized by including a base station selection unit for selecting a wireless communication apparatus that holds radio wave strength for communication most stably and strongly from among the plurality of the wireless base station apparatuses within communicable range of the wireless communication apparatus. Then, the wireless communication apparatus is further characterized by carrying out communications by way of the wireless base station apparatus selected by the base station selection unit.

In addition, the plurality of the wireless base station apparatuses are characterized by being also available outside communicable range of the wireless communication apparatus. Then, the base station selection unit is characterized by measuring the radio wave strength for communication in case the wireless communication apparatus moves from within the communicable range of the wireless base station apparatus outward to another range, and changing connection to a wireless base station apparatus that can provide connection more stable than that by a currently connected wireless base station apparatus.

In addition, a plurality of wireless base station apparatuses is characterized by being available within communicable range of the wireless communication apparatus. Then, the wireless communication apparatus within communicable range of the plurality of wireless base stations is characterized by carrying out connections for communication to the each of the plurality of wireless base station apparatuses at a time.

In addition, a plurality of the wireless base station apparatuses are characterized by being available within communicable range of the wireless communication apparatus. Then, the wireless communication apparatus is characterized, in a standby state waiting for communication within the communicable range of the plurality of wireless base stations, by connecting to each of the plurality of the wireless base station apparatuses and a session managing server to which the wireless communication apparatus is assigned, and performing at least one of calling for communication and accepting a call for communication by use of one of connection paths to the plurality of the wireless base station apparatuses.

In addition, the wireless communication apparatus is characterized, in the case of performing the at least one of calling for communication and accepting a call for communication, by transmitting and receiving data about the at least one of calling for communication and accepting a call for communication by way of any one of the connection paths to the plurality of the wireless base station apparatuses.

In addition, the data is characterized by including User Datagram Protocol (UDP) data. Then, the wireless communication apparatus is characterized by transmitting and receiving the UDP data by way of any one of the connection paths to the plurality of wireless base station apparatuses.

In addition, the data is characterized by including Hyper Text Transfer Protocol (HTTP) data. Then, the wireless communication apparatus is characterized by performing Method transmission of the HTTP data and Status Response reception of the HTTP data by way of any one of the connection paths to the plurality of wireless base station apparatuses.

In addition, the internet communication system is characterized by including a plurality of communication relay servers connected to a wireless base station apparatus, each communication relay server relaying communications between the calling party's wireless communication apparatus and the called party's wireless communication apparatus. Then, a plurality of the wireless base station apparatuses are characterized by being available within communicable range of a wireless communication apparatus. Then, the wireless communication apparatus within communicable range of the plurality of the wireless base station apparatuses is characterized, in the case of carrying out communications while moving, by transmitting and receiving communication data by way of one of the plurality of communication relay servers with a dynamic change of connection based on radio wave strength for communication to a wireless base station apparatus with most stable connection among the plurality of the wireless communication apparatuses.

In addition, the internet communication system is characterized by further including a communication relay server, which is connected to a wireless base station apparatus, for relaying communications between the calling party's wireless communication apparatus and the called party's wireless communication apparatus. Then, a plurality of the wireless base station apparatuses are characterized by being available within communicable range of the wireless communication apparatus. Then, the wireless communication apparatus within the communicable range of the plurality of the wireless base station apparatuses is characterized, in the case of carrying out communications, by carrying out communications via the communication relay server by way of any one of the plurality of connection paths to the plurality of the wireless base station apparatuses.

In addition, the communication relay server is characterized by relaying User Datagram Protocol (UDP) data. Then, the wireless communication apparatus is characterized by carrying out UDP data communications via the communication relay server by way of any one of the connection paths to the plurality of the wireless base station apparatuses.

In addition, the communication relay server is characterized by relaying Hyper Text Transfer Protocol (HTTP) data. Then, the wireless communication apparatus is characterized by carrying out Method transmission of the HTTP data and Status Response reception of the HTTP data via the communication relay server by way of any one of the connection paths to the plurality of the wireless base station apparatuses.

In addition, the wireless base station apparatus is characterized by setting up a prescribed number of wireless communication apparatuses that are accessible thereto. Then, the wireless communication apparatus is characterized by including a notification unit for notifying a user of a communication disabled state, in case the wireless base station meets the prescribed number, so that the wireless communication apparatus cannot afford to carry out communications.

In addition, the notification unit is characterized by notifying the user of the communication disabled state by use of display means for display.

In addition, at least one of the wireless communication apparatus and a wireless base station apparatus is characterized by recording at least one of time information indicating period of time for which the wireless communication apparatus used the wireless base station apparatus, communication charge information, and destination information, and transmitting recorded information to the session managing server as communication history information.

In addition, the session managing server is characterized by transmitting access information based on the communication history information to the wireless base station apparatus. Then, the wireless base station apparatus is characterized by receiving the access information transmitted from the session managing server, and outputting the access information received.

In addition, the internet communication system is characterized by further including authentication information management apparatus, which is connected to the wireless base station apparatus, for managing the registration information to connect to the ISP. Then, the authentication information management apparatus is characterized by controlling the registration information so that the registration information is available for a predetermined period, and outputting the registration information controlled to the IP based communication processing unit. Then, the IP based communication processing unit is characterized by inputting the registration information controlled from the authentication information management apparatus, and carrying out connections for communication based on the registration information inputted. Then, the authentication information management apparatus is characterized by charging for a period of connection for communication by way of the IP based communication processing unit based on the registration information.

In addition, the wireless base station apparatus is characterized by managing the registration information to connect to the ISP. Then, the wireless base station apparatus is characterized by controlling the registration information so that registration information is available for a predetermined period, and outputting the registration information controlled to the IP based communication processing unit. Then, the IP based communication processing unit is characterized by inputting the registration information controlled from the wireless base station apparatus, and carrying out connections for communication based on the registration information inputted. Then, the wireless base station apparatus is characterized by charging for a period of connection for communication by way of the IP based communication processing unit based on the registration information.

In addition, the IP based communication processing unit is characterized by inputting the registration information controlled, without being charged by the authentication information management apparatus, in return for at least one of the act of displaying advertisement information on the wireless communication apparatus and the act of purchasing products.

In addition, the IP based communication processing unit is characterized by inputting the registration information controlled, without being charged by the authentication information management apparatus, in return for at least one of the act of displaying advertisement information on the wireless communication apparatus and the act of purchasing products.

In addition, it is characterized by a plurality of the wireless base station apparatuses. Then, the session managing server is characterized by storing a plurality of pieces of authentication information to be used by a wireless communication apparatus that is managed by the session managing server itself so that the wireless communication apparatus can access the plurality of wireless base station apparatuses. Then, the wireless communication apparatus is characterized, while being connected to one of the plurality of the wireless base station apparatuses, by acquiring, from the session managing server by way of an IP (Internet Protocol) line, the plurality of pieces of authentication information to access the plurality of the wireless base station apparatuses other than the one of the plurality of the wireless base station apparatuses currently being connected, and, in the case of moving within accessible range to one of the plurality of the wireless base station apparatuses other than the one of the plurality of the wireless base station apparatuses currently being connected, carrying out connections for communication with the one of the plurality of the wireless base station apparatuses within the accessible range based on the plurality of pieces of authentication information acquired.

In addition, the GIS processing unit is characterized by including position information of a wireless base station apparatus newly accessed, and outputting to the session managing server the position information of the wireless base station apparatus. Then, the session managing server is characterized by including a database for storing the position information of the wireless base station apparatuses. Then, the session managing server is characterized by transmitting the position information of the wireless base station apparatuses stored in the database to another wireless communication apparatus, and persuading the another wireless communication apparatus to use the position information of the wireless base station apparatuses displayed on a map.

In addition, the GIS processing unit is characterized by acquiring from another party's wireless communication apparatus position information indicating position of the other party's wireless communication apparatus by way of the session managing server. Then, the GIS processing unit is characterized by displaying on the map acquired position information as at least one of text information and map information.

In addition, the internet communication system is characterized by further including an authentication information management apparatus, which is connected to the wireless base station apparatus, for managing a plurality of pieces of toll charge service registration information to connect to the ISP. Then, the IP based communication processing unit is characterized by inputting one of the plurality of pieces of toll charge service registration information from the authentication information management apparatus and carrying out connections for communication based on the one of the plurality of pieces of toll charge service registration information inputted, in the case where the wireless communication apparatus and the wireless base station apparatus are within communicable range of each other.

In addition, the wireless communication apparatus is characterized by including a GIS (Geographic Information System) processing unit, which is equipped with map information and a GIS facility. Then, the GIS processing unit is characterized by detecting that the wireless communication apparatus is approaching a wireless base station apparatus that requires the toll charge service registration information. Then, the IP based communication processing unit is characterized by inputting the toll charge service registration information while carrying out connections for communication by way of a currently accessing wireless base station apparatus, in the case where it is detected by the GIS processing unit that the wireless communication apparatus is approaching the wireless base station apparatus that requires the toll charge service registration information.

In addition, the authentication information management apparatus is characterized by controlling the registration information so that the registration information is available for the predetermined period, and storing software performing output processing of the registration information controlled to the IP based communication processing unit. Then, the IP based communication processing unit is characterized by inputting the software stored in the authentication information management apparatus in return for the act of displaying the advertisement information on the wireless communication apparatus, and inputting the registration information controlled by use of the software inputted.

In addition, the authentication information management apparatus is characterized by controlling the registration information so that the registration information is available for the predetermined period, and storing software performing output processing of the registration information controlled to the IP based communication processing unit. Then, the IP based communication processing unit is characterized by inputting the software stored in the authentication information management apparatus in return for the act of displaying the advertisement information on the wireless communication apparatus, and inputting the registration information controlled by use of the software inputted.

In addition, the wireless base station apparatus is characterized by distributing the advertisement information. Then, the wireless communication apparatus is characterized by automatically receiving the advertisement information and displaying the advertisement information received, in the case of moving within communicable range of the wireless base station apparatus distributing the advertisement information.

In addition, the wireless base station apparatus is characterized by distributing the advertisement information. Then, the wireless communication apparatus is characterized by automatically receiving the advertisement information and displaying the advertisement information received, in the case of moving within communicable range of the wireless base station apparatus distributing the advertisement information.

In addition, the wireless communication apparatus is characterized by dividing information to be transmitted, and transmitting and receiving divided information to be transmitted one after another in order through paths connected to the plurality of the wireless base station apparatuses in turn.

In addition, the wireless communication apparatus is characterized by dividing information to be transmitted, and transmitting and receiving divided information to be transmitted one after another in order through paths connected to the plurality of the wireless base station apparatuses in turn.

In addition, the wireless communication apparatus is characterized by changing codec systems of voice data according to various wireless communication systems and corresponding wireless communication bands for the plurality of wireless base stations.

In addition, the wireless communication apparatus is characterized by displaying information about the wireless communication systems, the wireless communication bands corresponding to the wireless communication systems, and the codec systems of voice data.

In addition, the wireless communication apparatus is characterized by displaying the one of the connection paths through which communications are currently being carried out.

In addition, the wireless communication apparatus is characterized by displaying the one of the connection paths through which communications are currently being carried out by use of at least one of graphic information and text information indicating which paths are currently being taken to transmit and receive communication data.

In addition, the session managing server is characterized by storing software that can control the access information. Then, the wireless base station apparatus is characterized by inputting the software, receiving the access information by use of the software inputted, and outputting the access information received.

In addition, the wireless base station apparatus is characterized by outputting the access information received to the user of the wireless base station apparatus so that the user can confirm the access information.

In addition, the wireless communication apparatus is characterized by receiving the access information, outputting to the user of the wireless communication apparatus access history based on the access information so that the user can confirm the access history.

In addition, the access information is characterized by including area information of an area around the wireless base station apparatus that the user of a wireless communication apparatus has visited. Then, the wireless communication apparatus is characterized by outputting to the user of the wireless communication apparatus the area information of the area around the wireless base station apparatus that the user has visited so that the user can confirm the area information.

BRIEF DESCRIPTION OF THE DRAWINGS

FIG. 10 is a diagram illustrating the processing procedure of receiving a session request by the called party according to the first embodiment.

FIG. 11 is a diagram illustrating the items and details of call relay server response information according to the first embodiment.

FIG. 13 is a diagram illustrating the items and details of calling party's voice data transmission information according to the first embodiment.

FIG. 14 is a diagram illustrating the items and details of called party's voice data reception information according to the first embodiment.

FIG. 24 is a diagram illustrating the items and details of assigned session managing server data file information according to the third embodiment.

FIG. 38 is a diagram illustrating an example of displaying call history information by day and by month according to the fifth embodiment.

FIG. 40 is a diagram illustrating terminal connection types according to the sixth embodiment.

FIG. 42 is a diagram explaining relay system determining method in a communication carried out within the same domain according to the sixth embodiment.

FIG. 43 is a diagram explaining a relay system determining method in a communication carried out between different domains according to the sixth embodiment.

FIG. 67 is a diagram explaining the transmission and reception of a general voice data IP packet between wireless communication apparatuses according to a thirteenth embodiment.

BEST MODE FOR CARRYING OUT THE INVENTION

With the embodiments which are discussed hereinafter, a server is installed for relaying data between a calling party and a called party in order to handle the firewall which could cause a nuisance to HTTP based voice data distribution. This server will be referred to hereinafter as a "communication relay server".

In addition, in the case of relaying communication data (voice data) from a wireless communication apparatus by means of the communication relay server, it is necessary to install two or more communication relay servers so that load is shared among the respective communication relay servers. For that reason, a managing server is installed for managing wireless communication apparatuses and communication relay servers. This managing server will be referred to hereinafter as a "session managing server".

Furthermore, a plural number of session managing servers are provided, and it is predetermined which wireless communication apparatuses are to be managed by a session managing server. A notification server receives an inquiry from a wireless communication apparatus about a session managing server, which manages the wireless communication apparatus itself, and notifies of the session managing server, which manages it. The notification server will be referred to hereinafter as an "assignment notification server".

It is assumed that the wireless communication apparatus communicates with the communication relay server, the session managing server, the assignment notification server, etc. by way of a wireless base station (wireless base station apparatus), even if it is not specifically stated hereinafter. However, the communication relay server, the session managing server, the assignment notification server, etc. may be configured with the wireless base station facility. In such a case, the wireless communication apparatus communicates directly with the communication relay server, the session managing server, the assignment notification server, etc. The wireless base station connects the wireless communication apparatus and the Internet, and converts between wireless communication and wired communication.

Embodiment 1

With a first embodiment, an internet communication system is explained with an example in which communication data such as voice data is transmitted to a called party from a calling party over the Internet.

Figure 1:
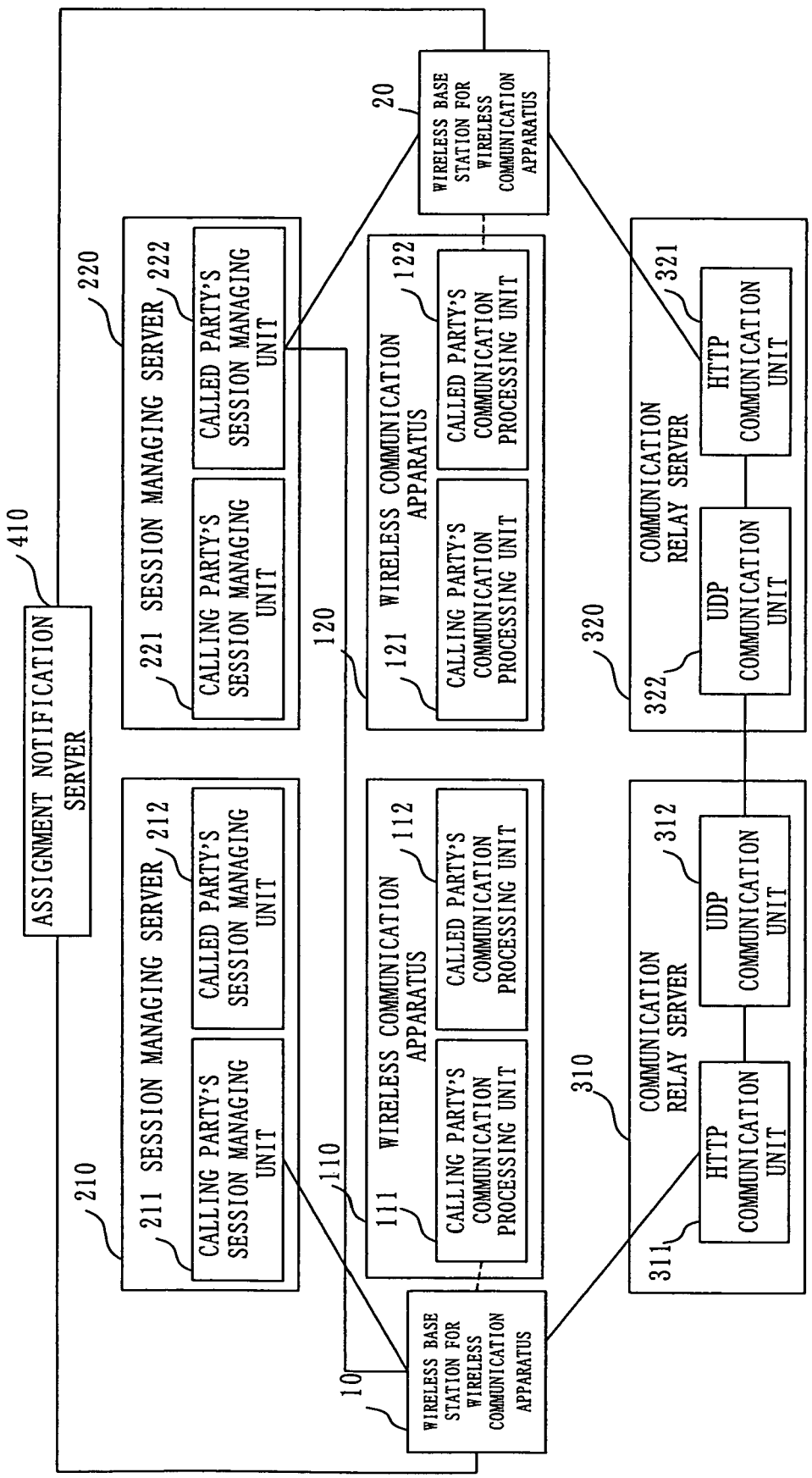
FIG. 1 is a diagram illustrating the system configuration of an internet communication system according to a first embodiment.

FIG. 1 is a diagram of the configuration of an internet communication system according to the first embodiment, which illustrates the elements of the system.

With referring to FIG. 1, reference numerals 10 and 20 are wireless base stations for transmitting and receiving communication data (voice data). The wireless base station connects a wireless communication apparatus and the Internet, and converts between wireless communication and wired communication. Reference numerals 110 and 120 denote wireless communication apparatuses. They are relayed, respectively, by the wireless base stations 10 and 20. The wireless communication apparatus 110 is equipped with a calling party's wireless communication apparatus unit 111 and a called party's wireless communication apparatus unit 112. The wireless communication apparatus 120 is equipped with a calling party's wireless communication apparatus unit 121 and a called party's wireless communication apparatus unit 122. Each wireless communication apparatus 110, 120, being equipped with both the calling party's wireless communication apparatus unit and the called party's wireless communication apparatus unit, is allowed to be used as either a calling party's wireless communication apparatus or a called party's wireless communication apparatus. The wireless communication apparatus 110, 120 is provided with a program operating on the wireless communication apparatus for causing a computer to execute a calling party's communication processing or for causing a computer to execute a called party's communication processing.

Mobile phone including PHS (Personal Handyphone System) is an example of the wireless communication apparatus 110, 120. However, the mobile phone is only one example.

Reference numerals 210 and 220 are session managing servers. The session managing servers manage the calling party's wireless communication apparatus, the called party's wireless communication apparatus, and a communication relay server for relaying communication data (e.g., voice data) for distribution. The session managing server specifies a communication relay server to be used for communication in response to a communication request (a call message) from the calling party's wireless communication apparatus. In addition, the session managing server, in response to a communication inquiry (a call arrival message) from the called party's wireless communication apparatus, notifies of the presence of the communication request. The session managing server 210 is equipped with a calling party's session managing unit 211 and a called party's session managing unit 212. The session managing server 220 is equipped with a calling party's session managing unit 221 and a called party's session managing unit 222. Therefore, the session managing server 210, 220 is allowed to be used as the session managing server of the calling party or the called party. The session managing server 210, 220 is provided with a program operating on the session managing server for causing a computer to execute a calling party's session managing process or for causing a computer to execute a called party's session managing process, respectively.

Reference numerals 310 and 320 denote communication relay servers according to the first embodiment. The communication relay server relays data between the calling party and the called party for distributing HTTP based communication data (e.g., voice data) in a communication between the wireless communication apparatuses. The communication relay server 310 is equipped with an HTTP communication unit 311 and a UDP (User Datagram Protocol) communication unit 312. The communication relay server 320 is equipped with an HTTP communication unit 321 and a UDP communication unit 322. The communication relay server 310, 320 is provided with a program operating on the communication relay server for causing a computer to execute an HTTP communication process or for causing a computer to execute a UDP communication process, respectively.

The wireless communication apparatus 110, 120 and the communication relay server 310, 320 carry out data communications over the Internet by using HTTP through the HTTP communication unit 311, 321, respectively. The communication relay server 310, 320 performs data communications over the Internet by using UDP through the UDP communication unit 312, 322, respectively.

It is to be noted that a RTP communication unit (not shown) based on RTP (Real-time Transport Protocol or Transport protocol for Real-time Application) may be replaced for the UDP communication unit 312, 322. Still alternatively, instead of using UDP or RTP, SCTP (Simple Control Transmission Protocol) or a protocol designed for a variety of applications using TCP are applicable.

A reference numeral 410 denotes an assignment notification server. The assignment notification server 410 notifies the wireless communication apparatus 110, 120 of the session managing server 210, 220 which manages the wireless communication apparatus 110, 120 upon request from the wireless communication apparatus 110, 120, respectively.

In the explanation stated below, voice data is taken as one example of communication data. Thus, the internet communication system is explained in the case where the calling party and the called party transmit and receive voice data to and from each other. For that reason, the communication data is referred to as call data, and the communication relay server as a call relay server.

Figure 2:
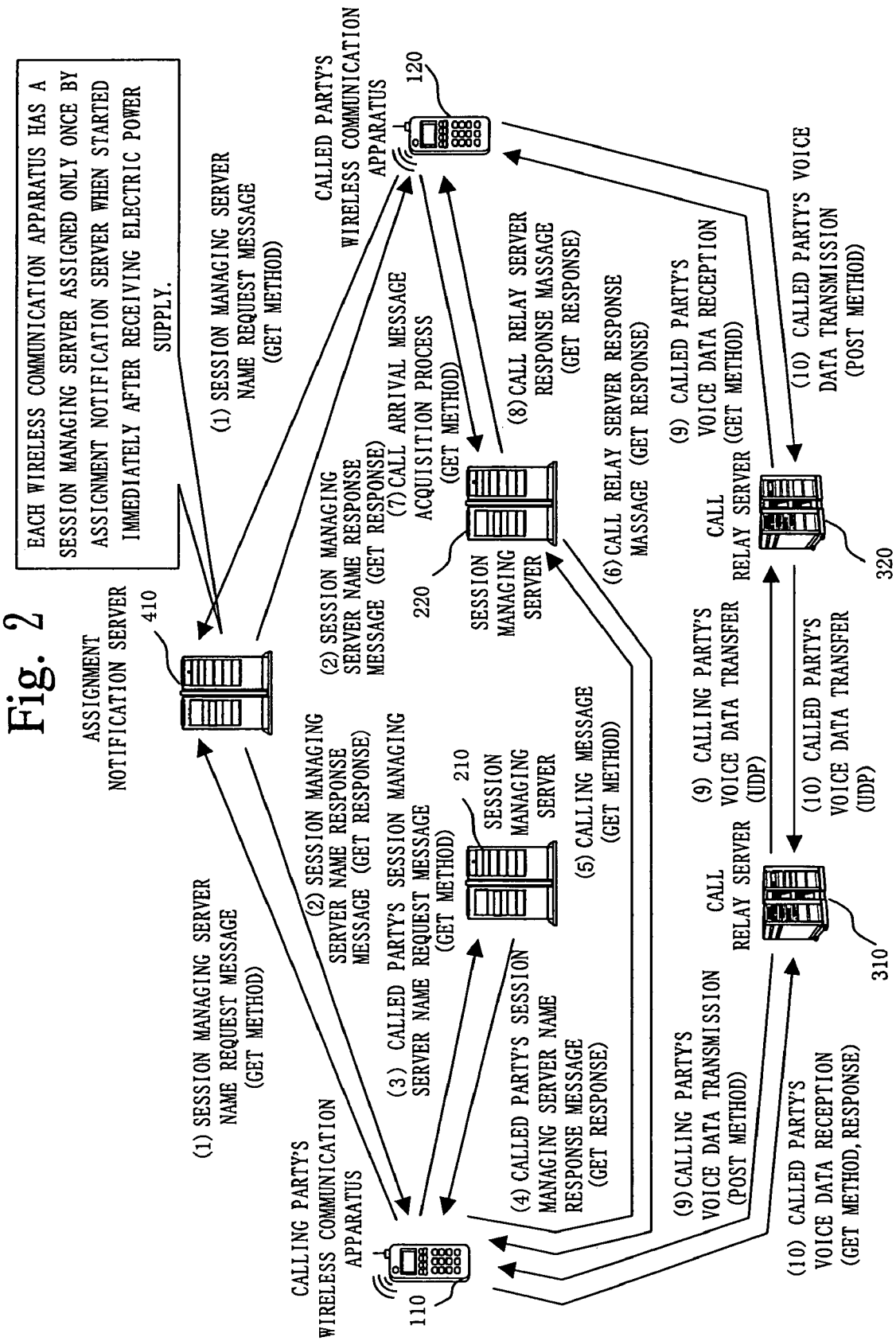
FIG. 2 is a diagram illustrating procedure of data transmission and reception carried out between a calling party and a called party according to the first embodiment.
Figure 28:
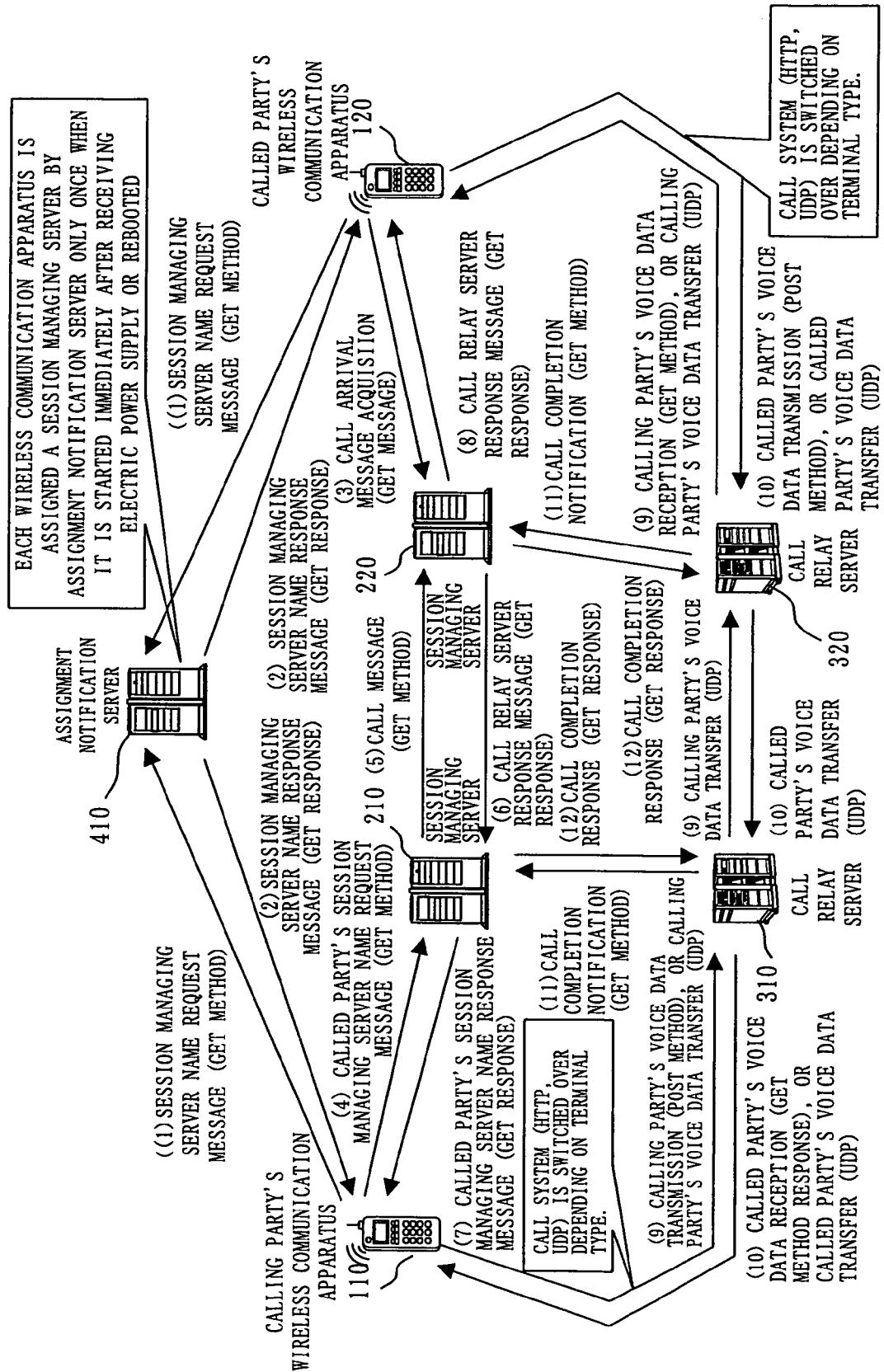
FIG. 28 is a diagram illustrating the procedure of data transmission and reception carried out between the calling party and the called party according to the first embodiment.

FIG. 2 and FIG. 28 are diagrams illustrating the procedures of data transmission and reception carried out by the calling party and the called party according to the first embodiment.

The assignment notification servers, the calling parity's wireless communication apparatus, the called party's wireless communication apparatus, the calling party's session managing server, and the called party's session managing server in FIG. 2 and FIG. 28 are provided with reference tables shown in FIG. 5, FIG. 6, FIG. 9, and FIG. 10, respectively. Then, they search the reference tables and acquires destination's addresses.

Figure 3:
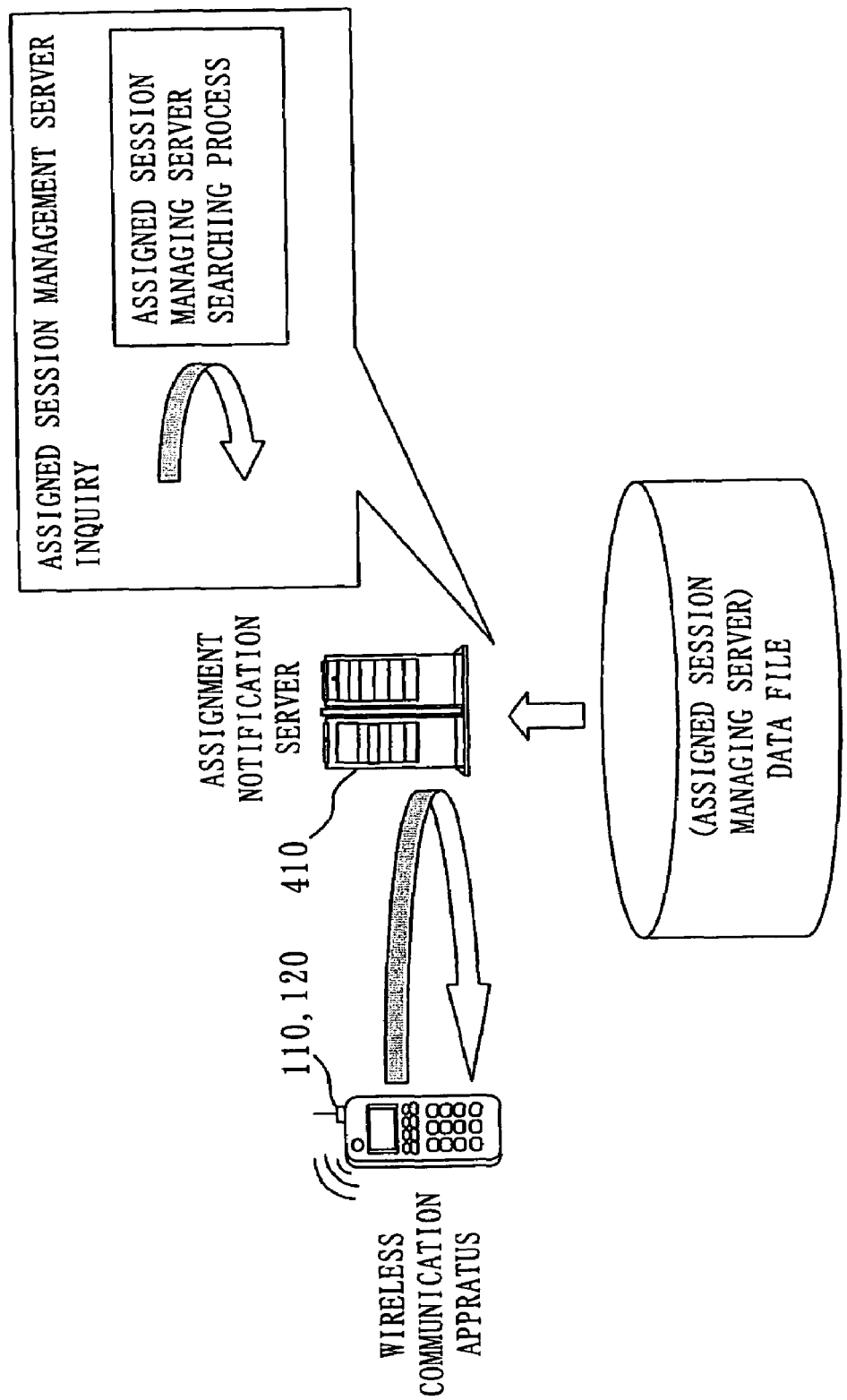
FIG. 3 is a diagram illustrating an environment of an assignment notification server according to the first embodiment.

The assignment notification server 410 in FIG. 2 and FIG. 28 manages the session managing servers to which the wireless communication apparatuses are assigned. The assignment notification server, when the power of the wireless communication apparatus is turned ON, receives an inquiry from a wireless communication apparatus about a session managing server to which the wireless communication apparatus itself is assigned. Then, the assignment notification server, in response to the inquiry, notifies the wireless communication apparatus as the inquiring source of the session managing server to which the wireless communication apparatus is assigned. The process of receiving the inquiry from the wireless communication apparatus for the session managing server, to which the wireless communication apparatus itself is assigned, when the power is turned ON, is an "assigned session managing server searching process". The session managing server is provided with a data file storing information indicating which session managing server manages which wireless communication apparatus is stored. In the "assigned session managing server searching process", by using data in the data file storing the information indicating which session managing server manages which wireless communication apparatus is stored in a memory when the power is turned ON, a corresponding session managing server is searched for in response to the inquiry from the wireless communication apparatus, and a response is sent with a search result to the wireless communication apparatus as the source of inquiry. According to the first embodiment, in order to share the processing load for each session managing server, a plural number of session managing servers are installed, and the assignment notification server notifies each wireless communication apparatus of the session managing server, which manages the wireless communication apparatus. The data file stated above is to be added with data or updated manually by the administrator. For that reason, in the case of adding data to or updating the data file, the assigned session managing server searching process is suspended, and then restarted after the data is updated. FIG. 3 shows an environment of the assignment notification server mentioned above.

On the ground that information relating to the session managing server may thus be updated, the wireless communication apparatus may alternatively make the same inquiry as that performed when the power is turned ON to the assignment notification server regularly. This may eliminate the necessity of the user of the wireless communication apparatus resupplying power or resetting in compliance with the update of the server information.

The procedure for connecting the calling party's wireless communication apparatus and the called party's wireless communication apparatus is explained now in order of (1) to (10) of FIG. 2. (Also with FIG. 28, a supplementary explanation will be made in order of (1) to (12) distinguishing the procedure from that of FIG. 2.)

Figure 4:
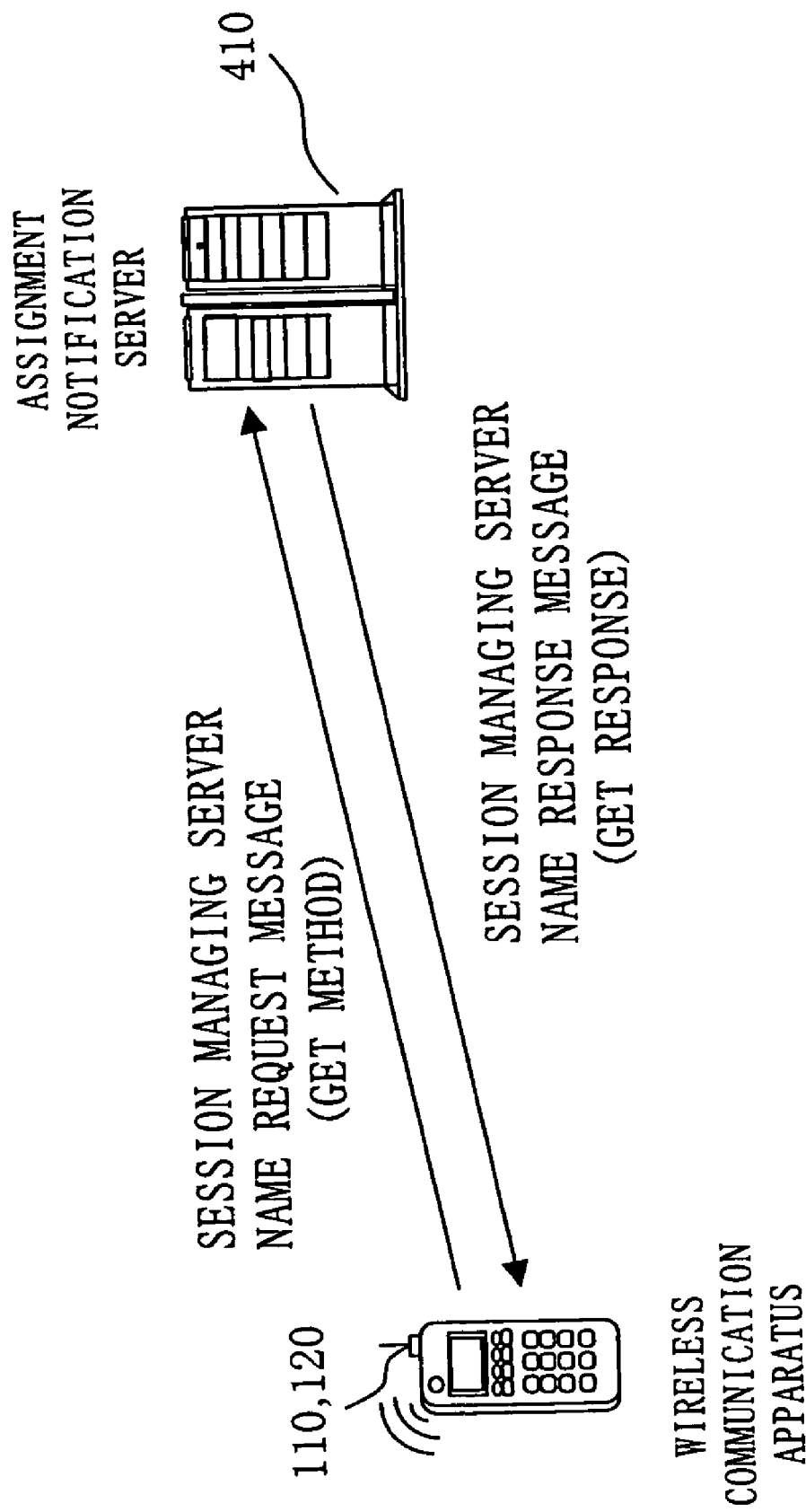
FIG. 4 is a diagram explaining the acquisition of an assigned session managing server name according to the first embodiment.

Reference numerals (1) and (2) in FIG. 2 (FIG. 28 as well) denote acquisition processing of assigned session managing server information. Every wireless communication apparatus makes an inquiry only once when the power is turned on to the assignment notification server for the assigned session managing server information. With this example, the calling party's wireless communication apparatus 110 and the called party's wireless communication apparatus 120 each make a session managing server information acquisition request to the assignment notification server 410 about the session managing server to which it is assigned. The assignment notification server 410 searches for the session managing server to which the wireless communication apparatus as the requesting source is assigned, and transmits the assigned session managing server information as a response message to the wireless communication apparatus as the requesting source. The wireless communication apparatus as the requesting source acquires a "session managing server name response" from the assignment notification server 410 and registers the assigned session managing server information in a storage unit provided in the wireless communication apparatus of the requesting source itself. FIG. 4 shows the acquisition processing of the assigned session managing server information of the session managing server to which the wireless communication apparatus is assigned.

According to the first embodiment, two or more session managing servers are to be provided, and the session managing server information for each wireless communication apparatus is to be notified from the assignment notification server. A single session managing server is to manage a finite number of wireless communication apparatuses for sharing the processing load of a session managing server. For that reason, it is necessary for the wireless communication apparatus to acquire the assigned session managing server information.

Figure 5:
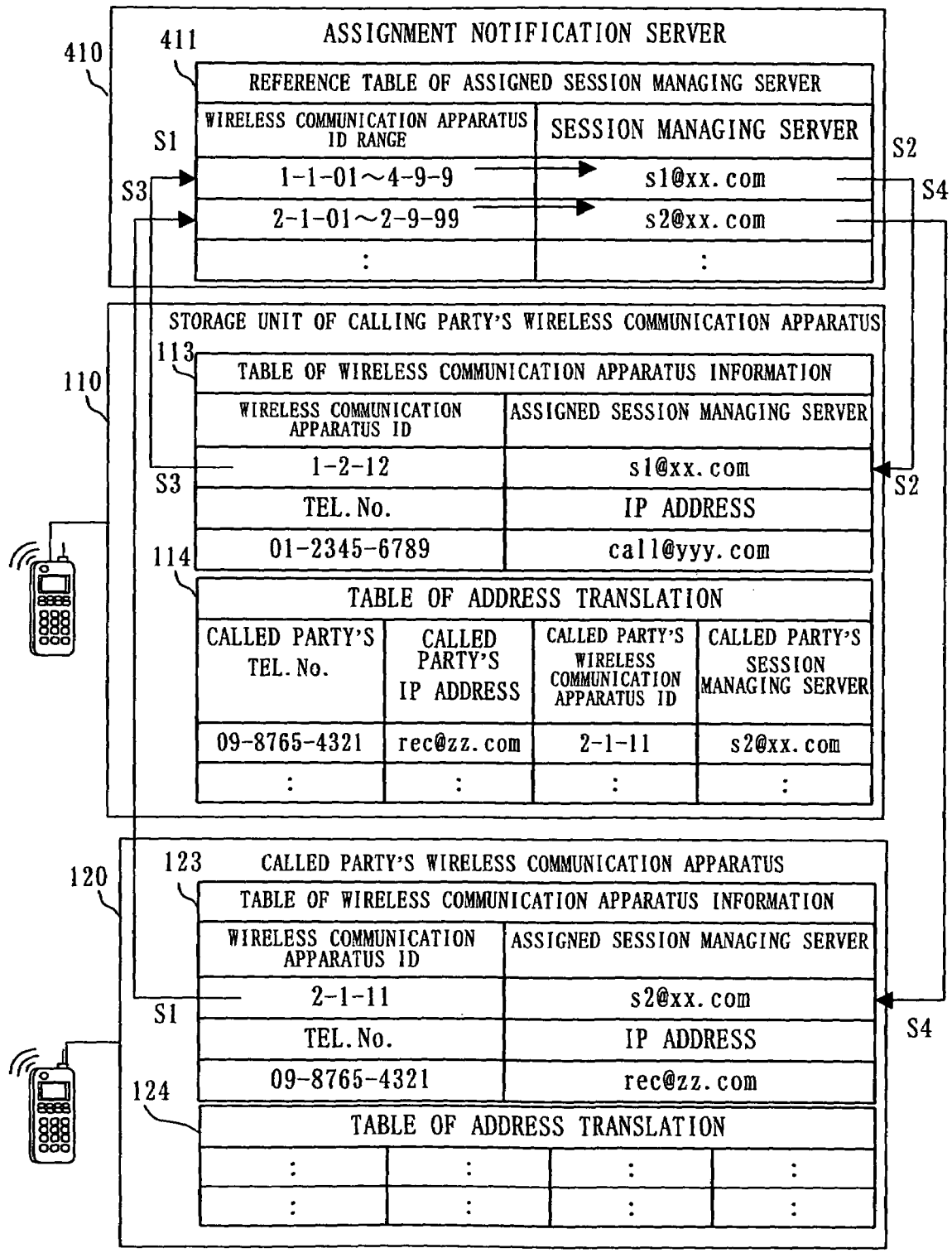
FIG. 5 is a diagram illustrating the acquisition procedure of the assigned session managing server name according to the first embodiment.

A reference sign S1 of FIG. 5 corresponds to (1) of FIG. 2 ((1) of FIG. 28 as well). With referring to FIG. 5, the calling party's wireless communication apparatus 110 is provided with a table of wireless communication apparatus information 113 which stores wireless communication apparatus IDs, each of which is a unique number allocated to each wireless communication apparatus, and addresses for accessing assigned session managing servers, which manage the wireless communication apparatuses, making them correspond. As the wireless communication apparatus has a manufacturer's serial number unique to each wireless communication apparatus, the manufacturer's serial number is used as the ID of the wireless communication apparatus. The wireless communication apparatus makes the session managing server information acquisition request as shown in (1) of FIG. 2 ((1) of FIG. 28 as well) by using the manufacturer's serial number. The calling party's wireless communication apparatus 110 sets the "wireless communication apparatus ID" to "1-2-12" in the session managing server information acquisition request when the power is turned on, and transmits it to the assignment notification server 410 as a GET method message. The assignment notification server 410 extracts the "wireless communication apparatus ID "1-2-12"" from the session managing server information acquisition request received, and searches a reference table of assigned session management 411 for it. In the reference table of assigned session management 411, the addresses of the session managing servers which manage the wireless communication apparatuses in a range specified by a wireless communication apparatus ID are stored. The assignment notification server 410 searches the range of the wireless communication apparatus ID in the reference table of assigned session managing server 411 based on the wireless communication apparatus ID "1-2-12", and then acquires the address of the session managing server to which it is assigned. With this example, "s1@xx.com" (or a 32-bit global IP address such as 210.54.10.156) is acquired as the address of the session managing server. The assignment notification server 410 notifies the calling party's wireless communication apparatus 110 of the address acquired of the session managing server as a GET response message through (2) of FIG. 2 ((2) of FIG. 28 as well) and S2 of FIG. 5. The wireless communication apparatus registers the address of the assigned session managing server notified by making it correspond to the wireless communication apparatus ID "1-2-12" in a table of wireless communication apparatus information 113. The called party's wireless communication apparatus 120 also carried out the processing of (1) and (2) through S3 and S4 of FIG. 5 in the same manner as that of the calling party's wireless communication apparatus 110.

Reference numerals (3) and (4) of FIG. 2 denote the acquisition processing, which is performed by the calling party, of the session managing server information of the session managing server to which the called party's wireless communication apparatus is assigned. The calling party's wireless communication apparatus 110 makes a called party's session managing server name request to the session managing server to which it is assigned (the calling party's session managing server 210). The calling party's session managing serer 210 transmits information about the session managing server to which the called party's wireless communication apparatus is assigned (the called party's session managing server 220) to the wireless communication apparatus as the inquiring source by sending a response message as a session managing server name response. According to the first embodiment, for processing load sharing of the session managing server, the wireless communication apparatus to be managed by the session managing server is specified for each wireless communication apparatus ID range, for example. For that reason, it is necessary for the calling party's wireless communication apparatus 110 to know the session managing server, which manages the called party's wireless communication apparatus when connecting a session with the called party's wireless communication apparatus 120.

Figure 6:
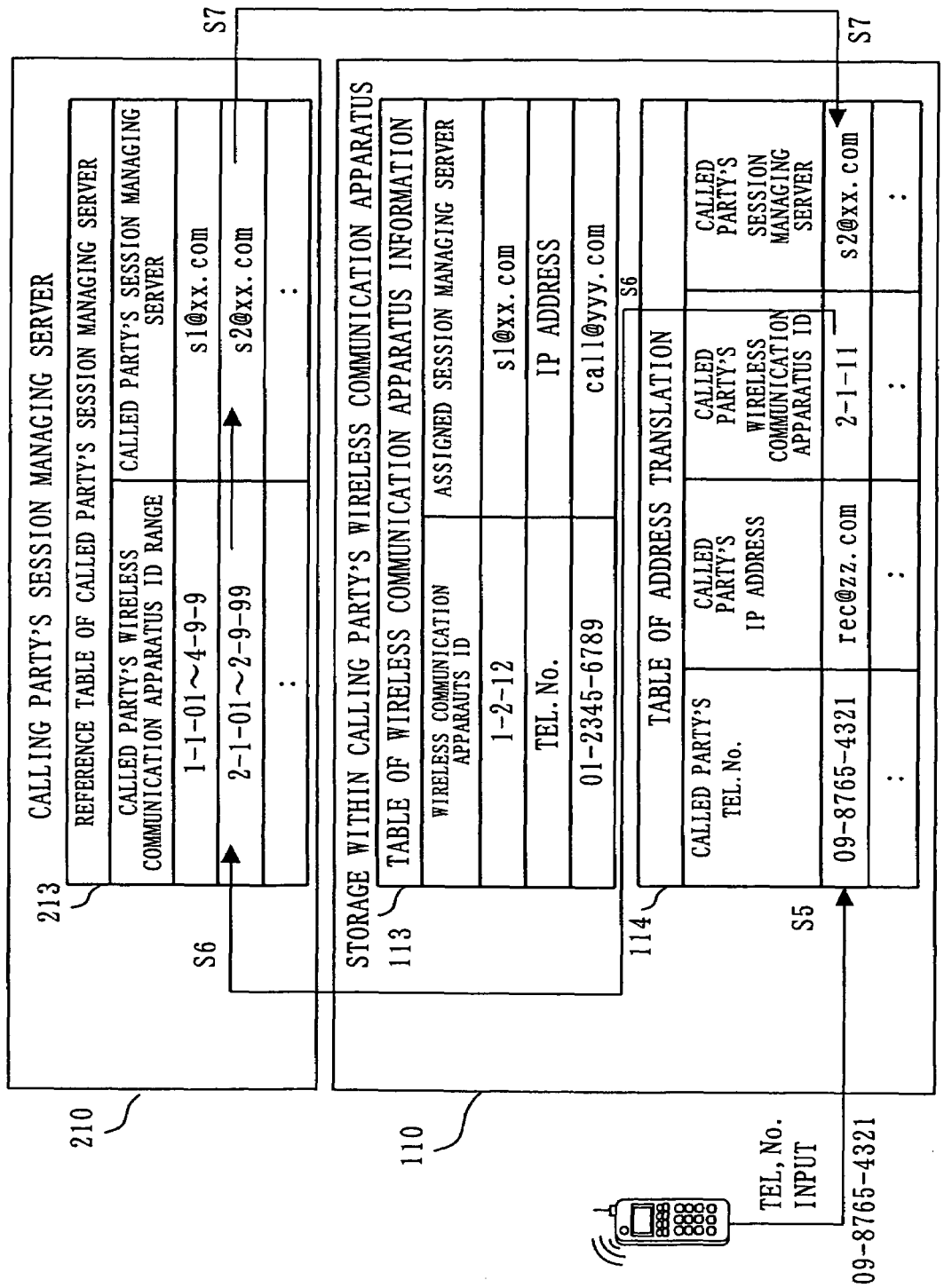
FIG. 6 is a diagram illustrating the acquisition procedure of the assigned session managing server name of the called party according to the first embodiment.
Figure 7:
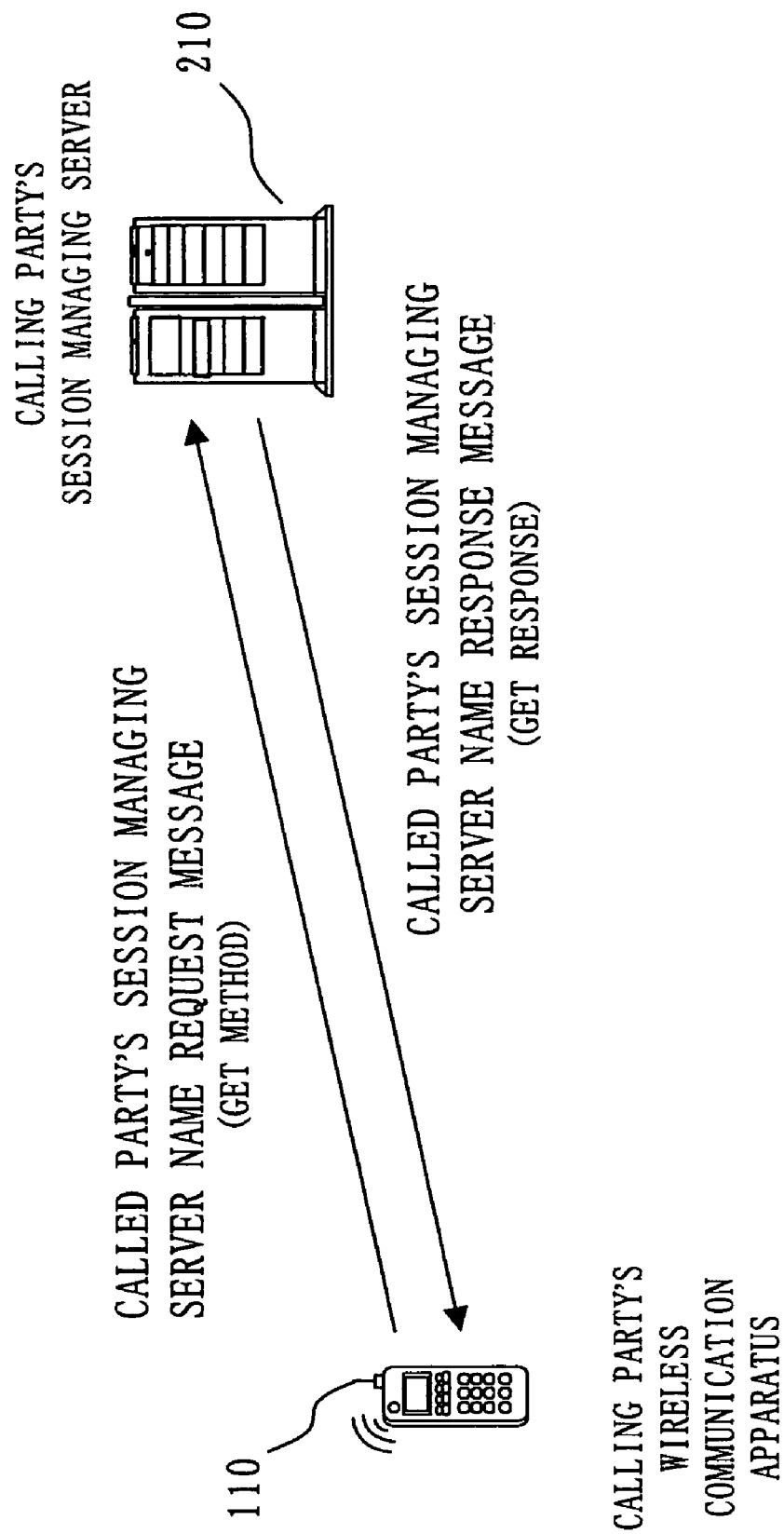
FIG. 7 is a diagram explaining the acquisition of the assigned session managing server name of the called party according to the first embodiment.

Reference signs S5, S6 and S7 of FIG. 6 correspond to the processing of (3) and (4) of FIG. 2. With referring to FIG. 6, when a called parity's telephone number is input through a telephone unit 10 (S5), the calling party's wireless communication apparatus 110 receives this telephone number, and acquires the called party's wireless communication apparatus ID corresponding to the called party's telephone number with referring to a table of address translation 114. The table of address translation 114 stores the called party's telephone (TEL) number, an IP address for accessing the called party's wireless communication apparatus, a wireless communication apparatus ID unique to the called party's wireless communication apparatus, and the address of the session managing server which manages the called party's wireless communication apparatus by making them correspond. The calling party's wireless communication apparatus 110 includes the called party's wireless communication apparatus ID acquired in the called party's session managing server name, and transmits it as the GET method message to the session managing server (the calling party's session managing server 210) obtained through S2 (S6). The calling party's session managing server 210, upon reception of the called party's session managing server name request, acquires the address of the called party's session managing server to which the called party's wireless communication apparatus is assigned with referring to the reference table of called party's session managing server 213. The session managing server manages wireless communication apparatuses for each wireless communication apparatus ID range. For that reason, the reference table of called party's session managing server 213 stores the range of the called party's wireless communication apparatus ID and the address of the called party's session managing server by making them correspond. Since the called party's wireless communication apparatus ID is "2-1-11", then "s2@xx.com" (or a 32-bit global IP address such as 210.54.10.156) is to be acquired as the called party's session managing server. The calling party's session managing server 210 includes "s2@xx.com" (or a 32-bit global IP address such as 210.54.10.156) as the address of the called party's session managing server acquired in the called party's session managing server name response, and notifies the calling party's wireless communication apparatus 110 of it as the GET message (S7). The calling party's wireless communication apparatus 110 acquires "s2@xx.com" (or a 32-bit global IP address such as 210.54.10.156) as the address of the called party's session managing server from the called party's session managing server name response received, and then registers it by making it correspond to the "called party's wireless communication apparatus ID "2-1-11" in the table of address conversion 114. FIG. 7 shows the called party's session managing server name acquisition processing.

Figure 29:
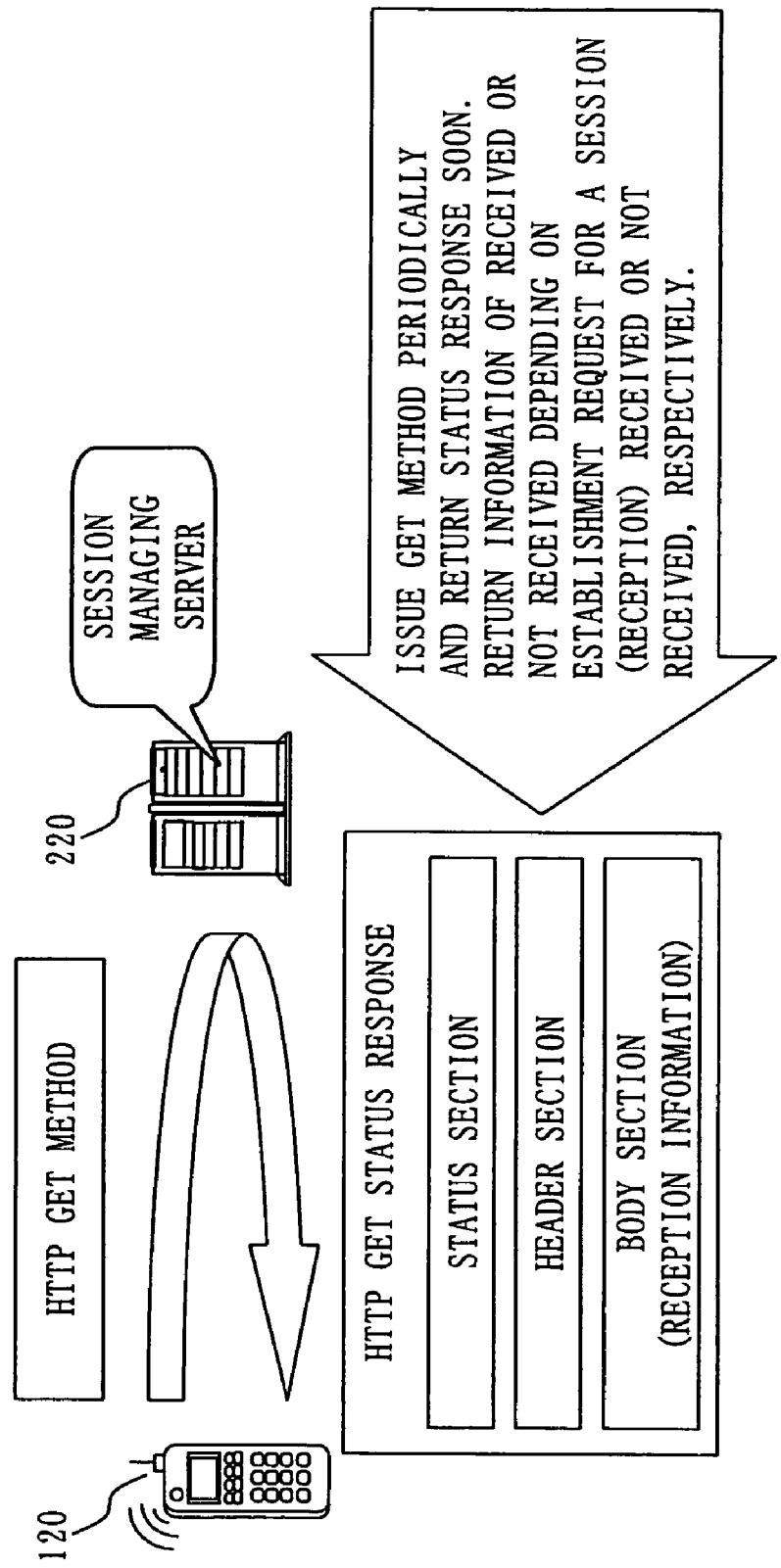
FIG. 29 is a diagram explaining that a call arrival inquiry is issued to a session managing server by a called party's wireless communication apparatus according to the first embodiment.
Figure 30:
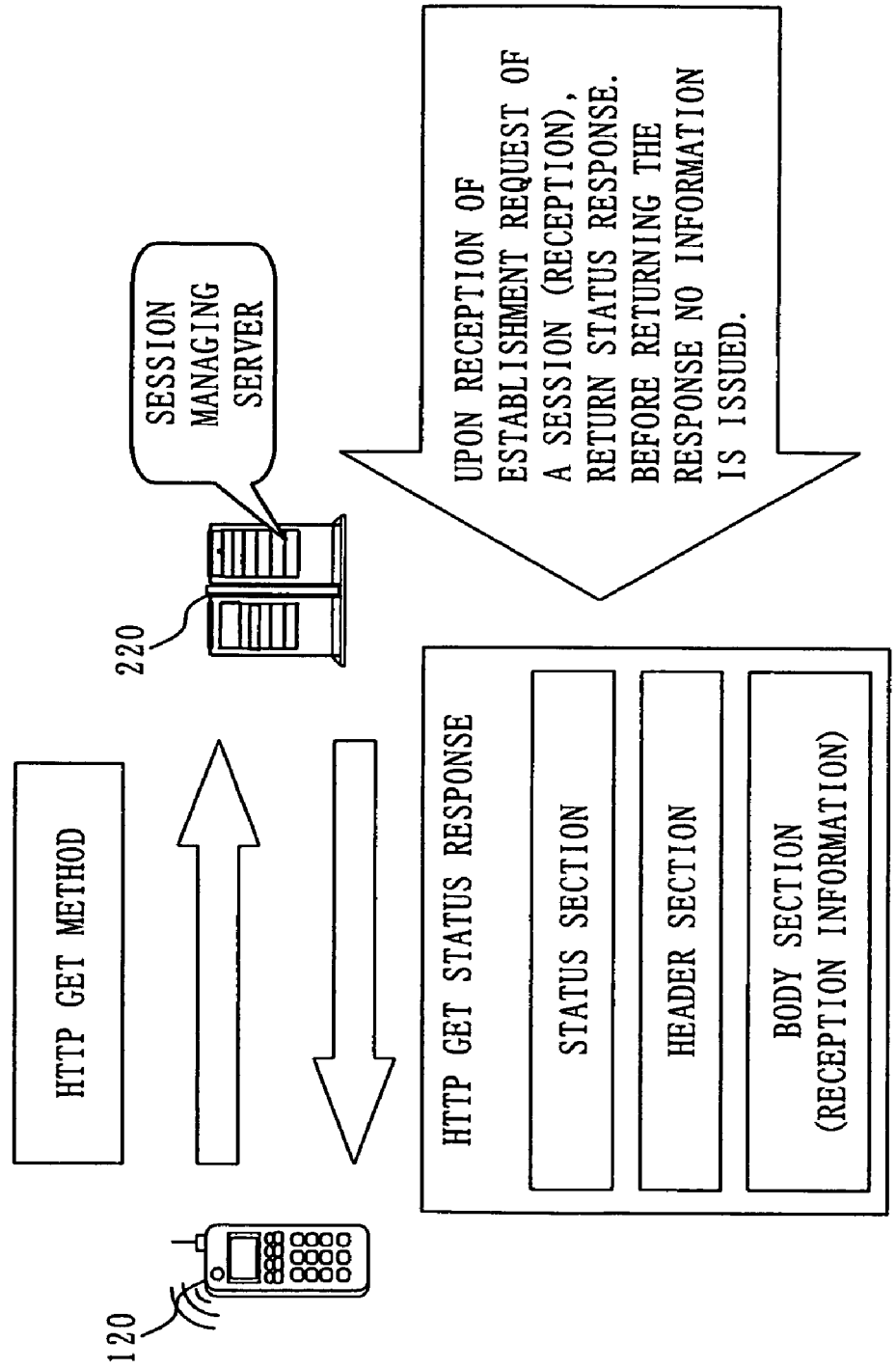
FIG. 30 is a diagram explaining that a call arrival inquiry is issued to a session managing server by a called party's wireless communication apparatus according to the first embodiment.
Figure 31:
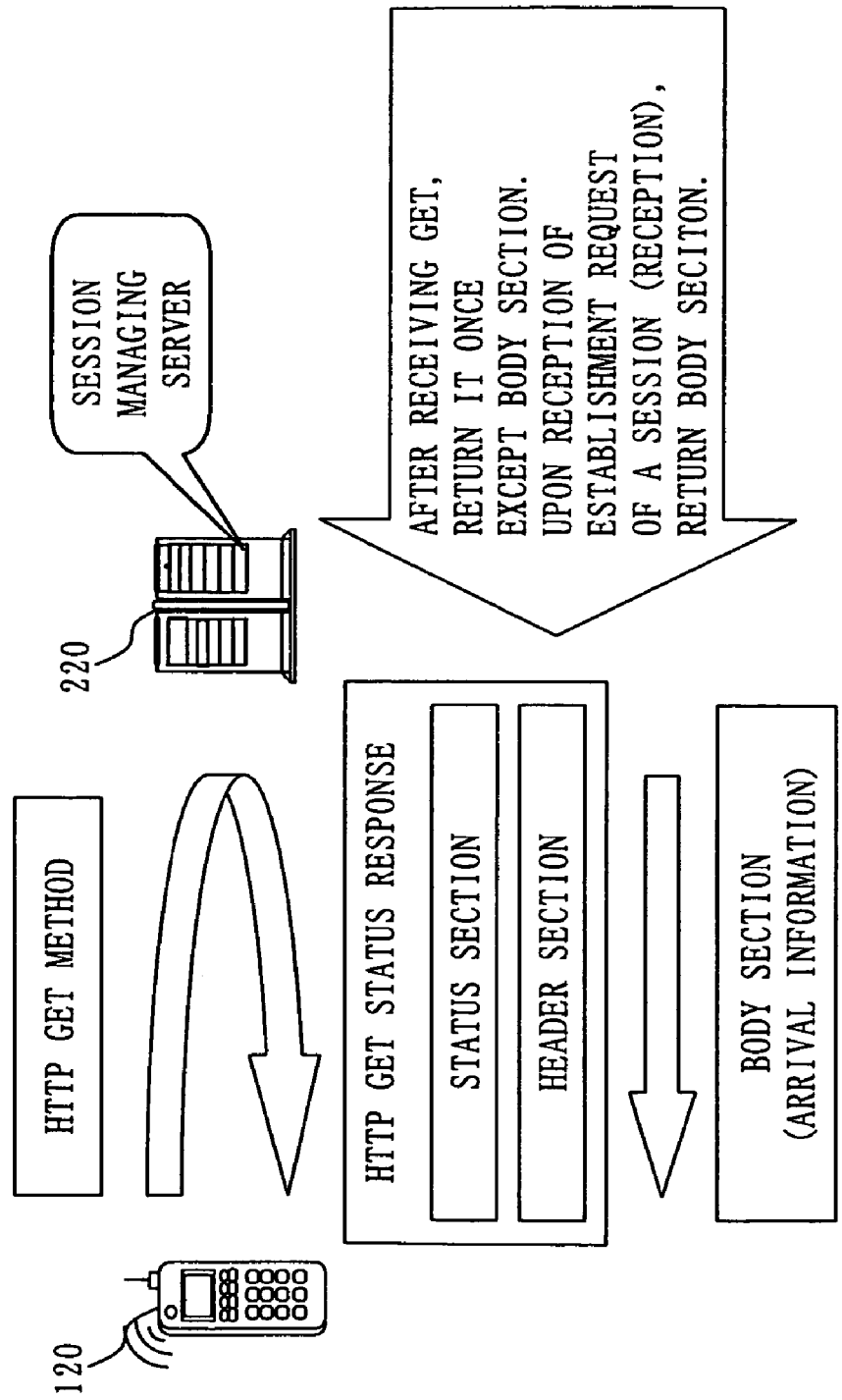
FIG. 31 is a diagram explaining that a call arrival inquiry is issued to a session managing server by a called party's wireless communication apparatus according to the first embodiment.
Figure 32:
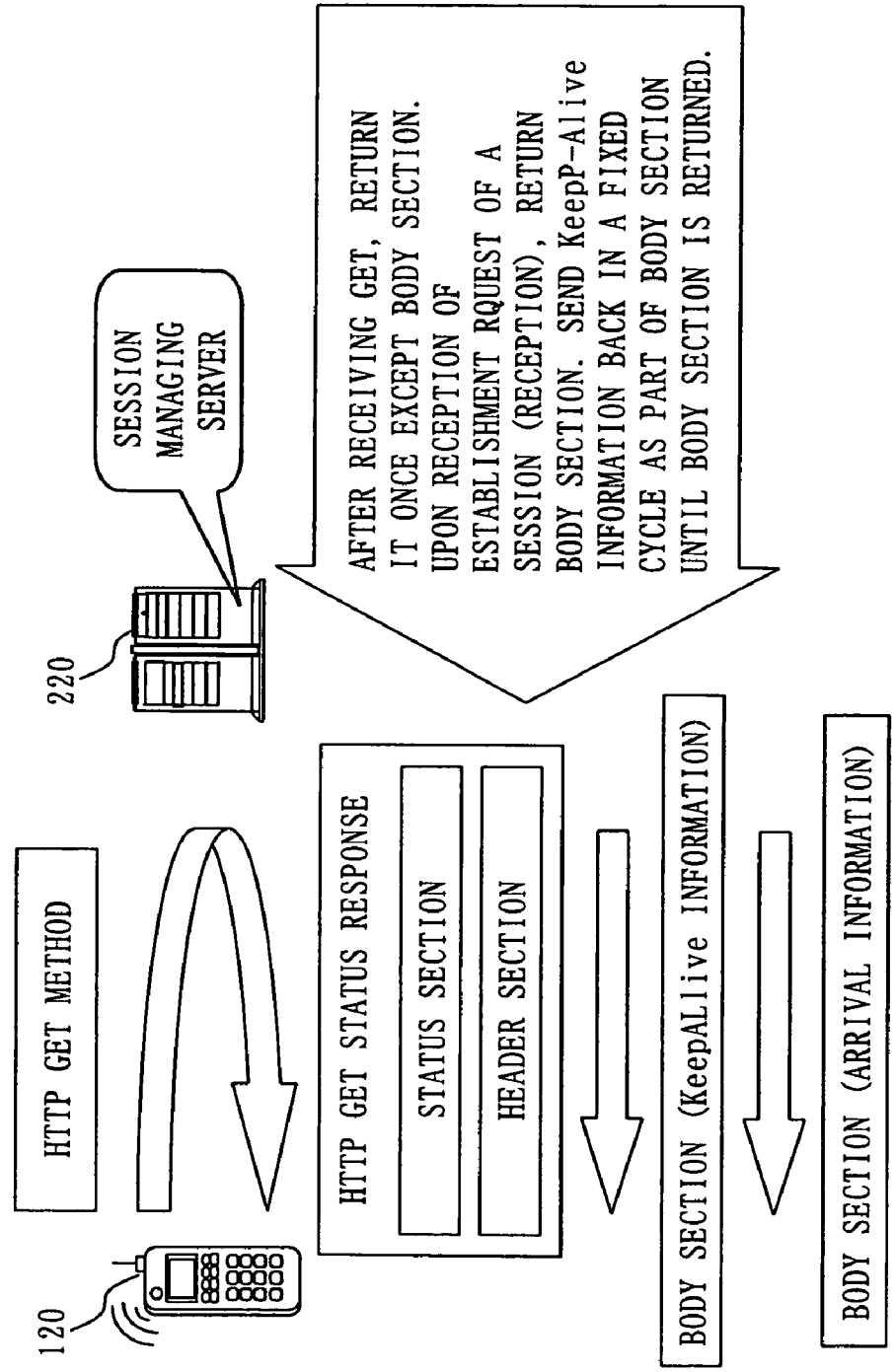
FIG. 32 is a diagram explaining that a call arrival inquiry is issued to a session managing server by a called party's wireless communication apparatus according to the first embodiment.
Figure 33:
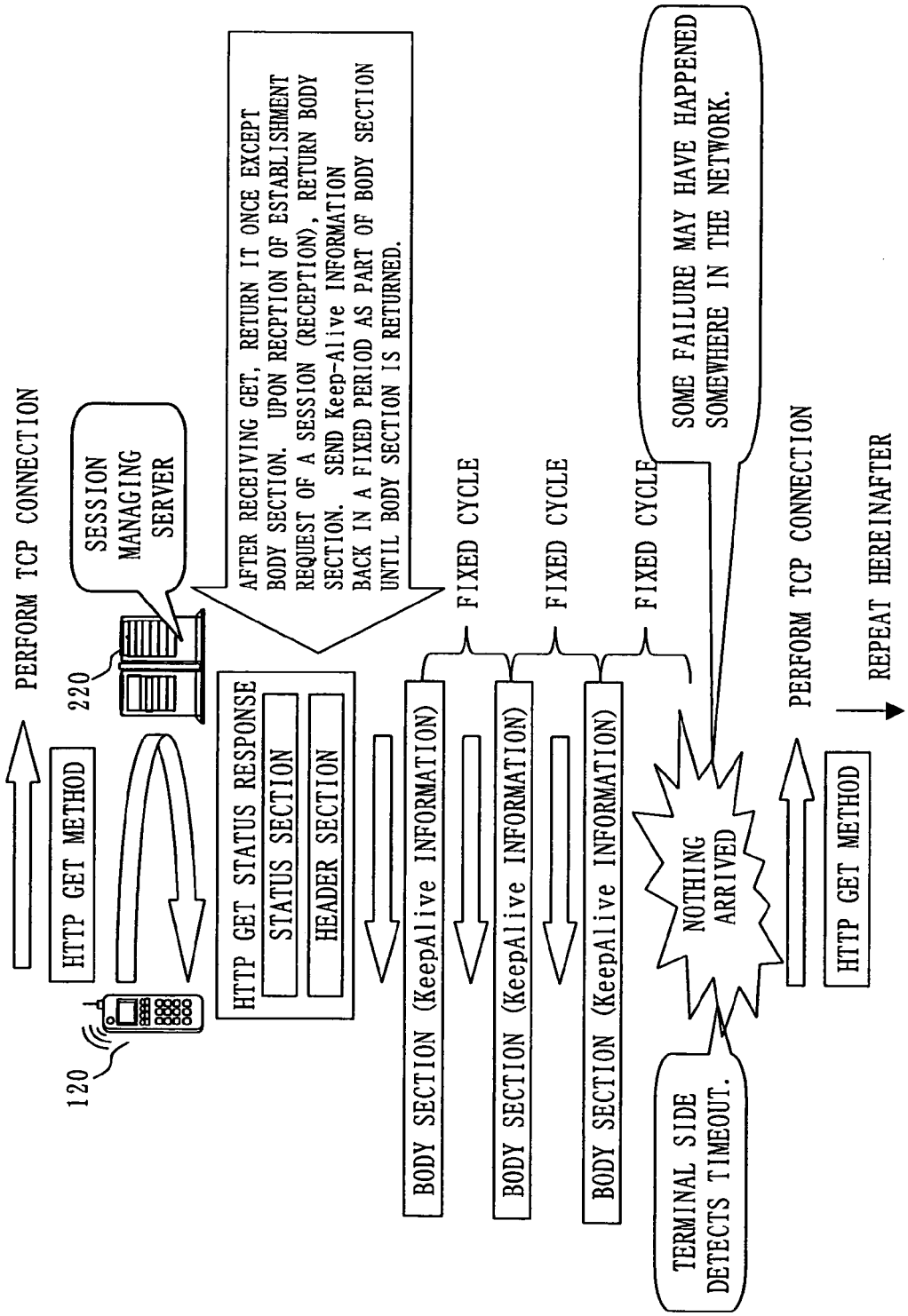
FIG. 33 is a diagram explaining that a call arrival inquiry is issued to a session managing server by a called party's wireless communication apparatus according to the first embodiment.

Reference numerals (5) and (6) of FIG. 2 denote processing of call message issuance (session ID acquisition). The call message is a message to be transmitted to the called party's session managing server 220 from the calling party's wireless communication apparatus 110. The called party's session managing server 220 becomes aware, upon reception of the call message, that a call request has been issued to the called party's wireless communication apparatus 120 which it manages, judges the state of the intended party of the call (the called parity's wireless communication apparatus), at the same time obtains a call relay server available, and then responds with call relay server response information. According to the first embodiment, as shown in FIG. 29, the called party's wireless communication apparatus 120 makes a call arrival inquiry periodically (e.g., at intervals of one second or three seconds) to the session managing server assigned 220. Alternatively, as shown in FIG. 30 or FIG. 31, the periodic inquiry may be replaced by the method of waiting until call arrival information is returned after the HTTP based GET is issued once. With this method, the processing load of the periodic inquiry may be saved. However, according to this method, an HTTP connection or a TCP connection has to be held for a long time even in a state where no data is transmitted or received. For this reason, in the actual internet environment, the TCP connection in a communication path from the wireless communication apparatus to the session managing server may be cut without prior notice by the router or the like which is managed by such as ISP. As a result, there is no guarantee of successful acquisition of the call arrival information. For an improvement of this method, in order to hold a continuous TCP connection of Keep-Alive information, FIG. 32 shows a method of continuously transmitting dummy data indicating that data is still being outputted to the wireless communication apparatus from the session managing server. On top of it, even if this method of continuously transmitting dummy data is employed, the TCP connection may possibly be cut somewhere on the communication path, and neither the session managing server nor the wireless communication apparatus may become aware of the disconnection. FIG. 33 shows an improvement method for that kind of situation. According to the method, the dummy data of the Keep-Alive information is to be transmitted to the wireless communication apparatus from the session managing server at a fixed cycle. In this situation, the receiving party's wireless communication apparatus sets up a timeout value having a period little longer than the period of the cycle. Then, in case of the dummy data not arriving at the wireless communication apparatus at the fixed cycle, it is considered that the TCP connection is disconnected, and then another TCP connection is made anew from the wireless communication apparatus to the session managing server. In addition, it is possible that the TCP reconnection and the transmission of the call arrival information to the wireless communication apparatus from the session managing server share the timing. In case of thus sharing the timing of the reconnection with the transmission, the call arrival information maybe lost before reaching the wireless communication apparatus. For that reason, the GET method of HTTP of a TCP reconnection, is added with information indicating that it is a reissue so that the call arrival information reaches the wireless communication apparatus without fail. This allows the session managing server to distinguish it from the GET method of HTTP, which is issued in a normal state. Then, the same call arrival information is to be transmitted again for fear of a transmission failure of the call arrival information. In addition, when this call arrival information maybe added with information indicating that it is a retransmission, then the wireless communication apparatus is allowed to become aware that the call arrival information received is of the retransmission. This provides the state where another new GET method of HTTP can be issued next in the normal state.

In addition, the GET method of HTTP has been explained in the case where the called party's wireless communication apparatus receives the establishment request information of the session from the calling party's wireless communication apparatus as a response. However, the same mechanism as that explained above of receiving the response information of the GET method of HTTP without fail may also be applied to the case of receiving each information indicating that the receiver has been picked up at the other party's wireless communication apparatus (off-hook) (or a call start button has been pressed), the receiver has been hung up to end the telephone call (on-hook)(or a call end button has been pressed), ringing is started at the other party, as the response of this GET method of HTTP.

As aforementioned, when the calling party's wireless communication apparatus 110 makes a call, it is required that the calling party's wireless communication apparatus 110 issues a call message to the session managing server 220 to which the called party's wireless communication apparatus 120 is assigned.

The processing of call message issuance discussed above is based on (3) through (6) of FIG. 2, which may be replaced by a series of the operations of (3) through (8) of FIG. 28. The message flow of the calling party includes (4), (5), (6) and (7).

With the called party, the called party's wireless communication apparatus 120 makes a periodic call arrival inquiry (e.g., at intervals of one second or three seconds) in advance to the assigned session managing server 220 to which it is assigned in the same manner as that of the case of FIG. 2 as shown in (3) of FIG. 28. Instead of making the periodic inquiry, however, the called party's wireless communication apparatus 120 may alternatively take the method of waiting until the call arrival information is returned after issuing the HTTP based GET message once.

A reference numeral (4) of FIG. 28 is the processing of call message issuance (session ID acquisition). The call message is a message to be transmitted to the calling party's session managing server 210 from the calling party's wireless communication apparatus 110. The calling party's session managing serer 210 obtains the information of the session managing server to which the called party's wireless communication apparatus is assigned (the called party's session managing server 220) in the same manner as that of the case of FIG. 2. Then, the calling party's session managing serer 210 transmits it as another call message to the called party's session managing server 220 from the calling party's session managing server 210 in (5) of FIG. 28.

The called party's session managing server 220, upon reception of the call message, becomes aware that a call request has been issued to the called party's wireless communication apparatus 120 which it manages. Then, the called party's session managing server 220 judges the state of the intended party of the call (the called party's wireless communication apparatus), and at the same time, obtains a call relay server available. Then, the called party's session managing server 220 transmits a response message in the call relay server response information to the calling party's session managing server 210 in (6) of FIG. 28. Further, in (7) of FIG. 28, the response message is transferred to the calling party's wireless communication apparatus 110 from the calling party's session managing server 210. In addition, in (8) of FIG. 28, the called party's session managing server 220 transmits a response message indicating that a call has been received to the called party's wireless communication apparatus 120 which it manages.

Figure 8:
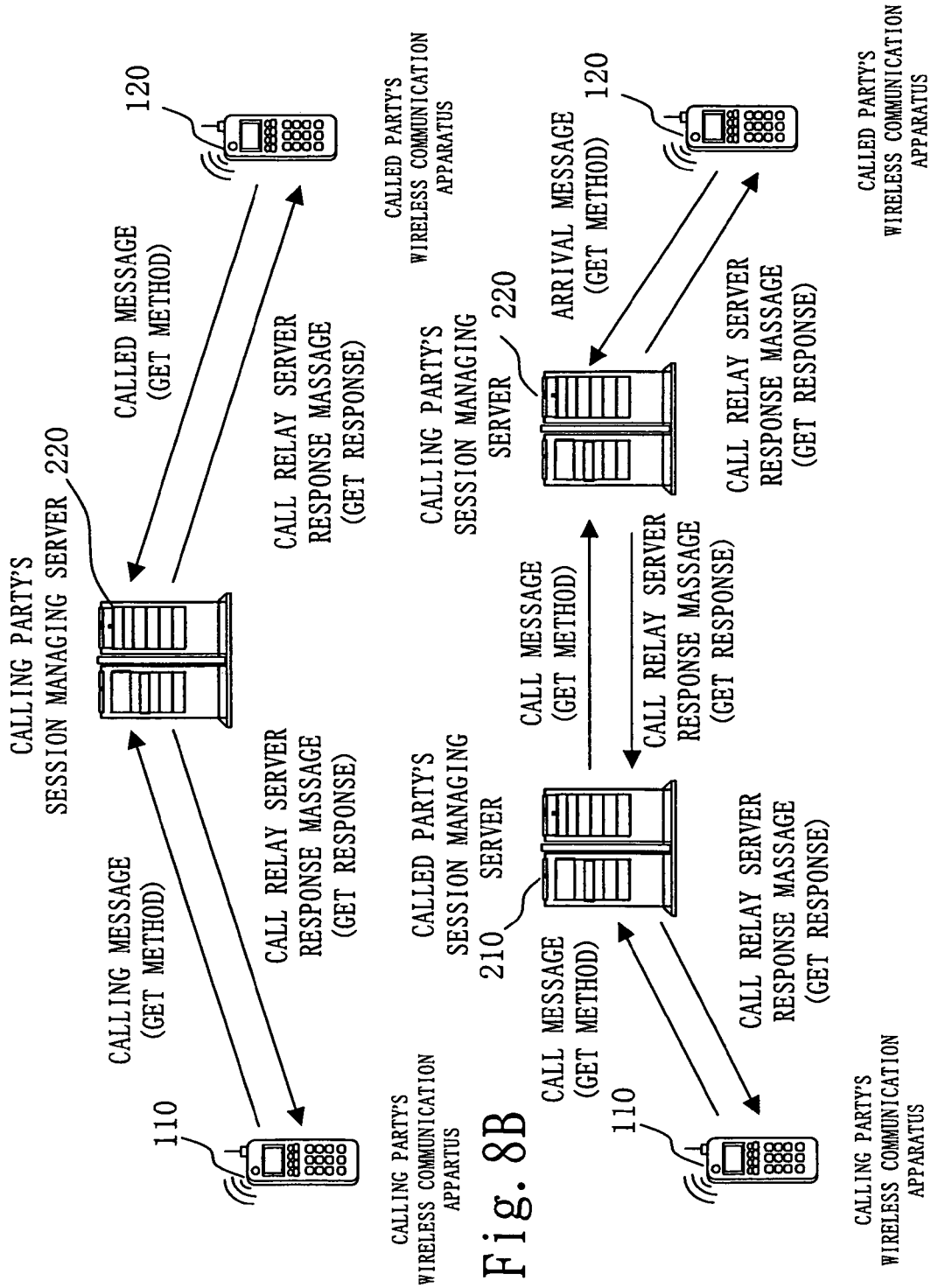
FIG. 8 is a diagram explaining a call control system according to the first embodiment.
Figure 34:
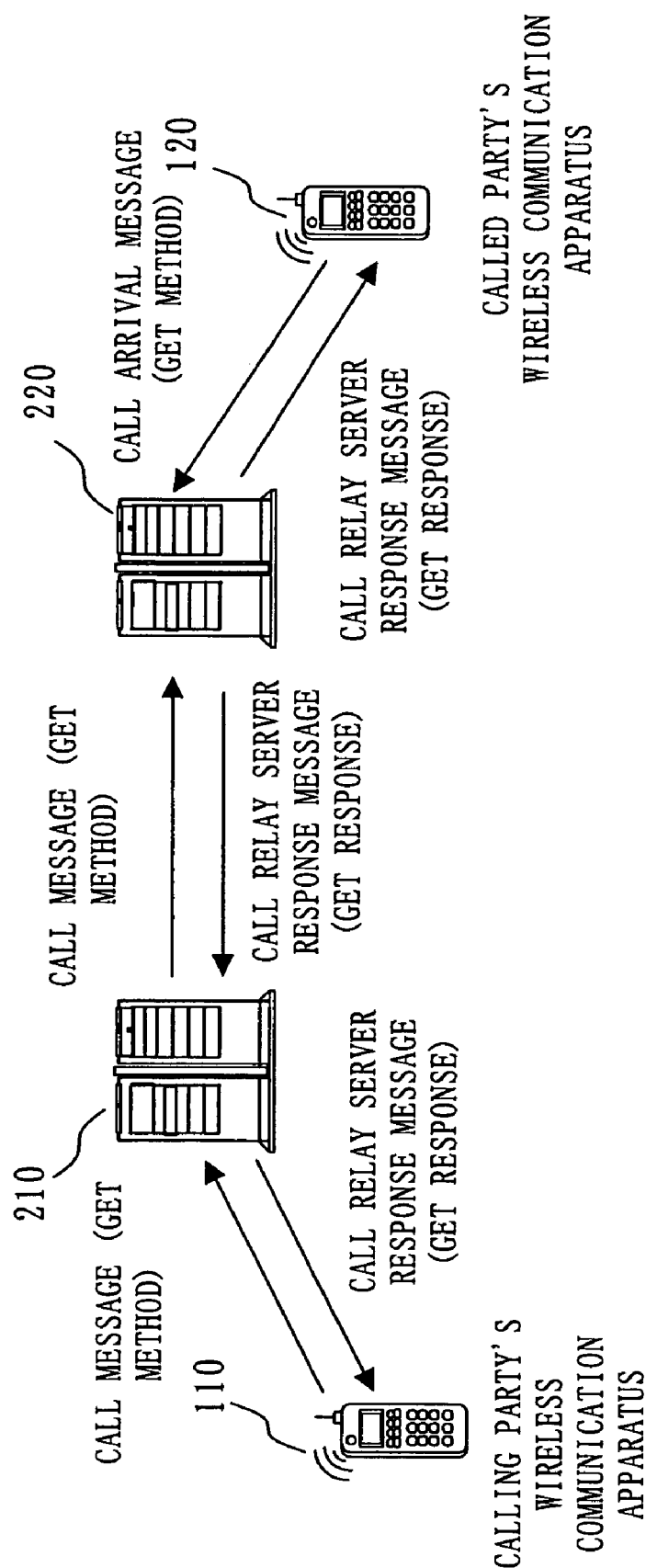
FIG. 34 is a diagram illustrating a call control system according to the first embodiment.

FIG. 8 and FIG. 34 show call control methods. A call control method shown in FIG. 8 corresponds to FIG. 2 and a call control method shown in FIG. 34 corresponds to FIG. 28.

The call control method of FIG. 8 indicates that the calling party's wireless communication apparatus 110 issues a call to the called party's session managing server 220, and the called party's wireless communication apparatus 120 checks the called party's session managing server 220 for the arrival of a call.

The call control method of FIG. 34 indicates that the calling party's wireless communication apparatus 110 issues a call to the called party's session managing server 220 by way of the calling party's session managing server 210, and the called party's wireless communication apparatus 120 checks the called party's session managing server 220 for the arrival of a call.

Figure 9:
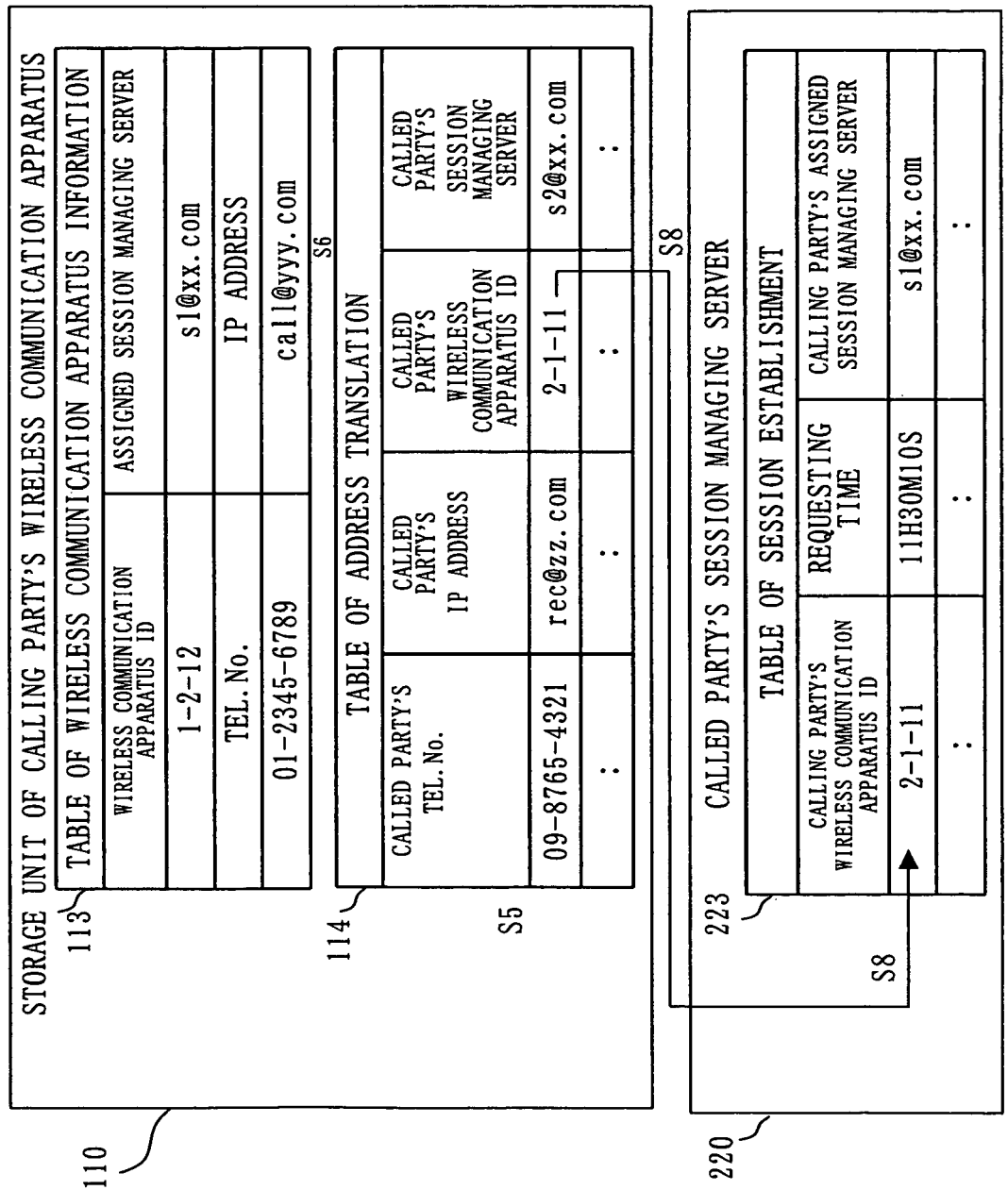
FIG. 9 is a diagram illustrating the procedure of making an establishment request of a session according to the first embodiment.

A reference sign S8 of FIG. 9 corresponds to the processing of (5) and (6) of FIG. 2, or the processing of (5) and (6) of FIG. 28.

In S8 of FIG. 9, the calling party's wireless communication apparatus 110, addressing to the address ("s2@xx.com") acquired in S7 of the called party's session managing server 220 to which the called party's wireless communication apparatus 120 is assigned, issues a call message to the called party's wireless communication apparatus whose wireless communication apparatus ID is "2-1-11". The call message is issued by the issuance of the GET method message. The called party's session managing server 220 receives the issuance of the call message, and then registers the adapter ID of the called party's wireless communication apparatus with which the establishment of a session is requested, the requesting time, and the address of the calling party's session managing server to which the calling party's wireless communication apparatus transmitting the establishment request of the session is assigned in a table of session establishment request 223 of FIG. 9 by making them correspond. The table of session establishment request 223 of FIG. 9 is the table in which the adapter ID of the called party's wireless communication apparatus to which the call message request has been made, the requesting time at which the request was made, and the address of the calling party's session managing server to which the calling party's wireless communication apparatus is assigned are stored by making them correspond. The called party's session managing server 220, after storing them in the table, judges the state of the called party's wireless communication apparatus 120, and obtains a call relay server available. Then, the called party's session managing server 220 responds by information indicating the call relay server obtained in call relay server response information to the calling party's wireless communication apparatus 110 with FIG. 2, and to the calling party's session managing server 210 with FIG. 28. In the case where all the call relay servers to be used for relaying a call are engaged, then this fact is included in the call relay server response information and notified to the calling party's wireless communication apparatus 110 with FIG. 2, and the calling party's session managing server 210 with FIG. 28. A response to the calling party's wireless communication apparatus 110 or the calling party's session managing serve 210 is made by the GET response message.

Reference numerals (7) and (8) of FIG. 2, or (3) and (8) of FIG. 28 denote the processing of inquiring about call arrival verification (session ID acquisition). This is the same as the processing of the called party's wireless communication apparatus and the called party's session managing server of FIG. 8 illustrating the call control methods. The called party's wireless communication apparatus 120 makes a call arrival message request to the called party's session managing server 220 ((7) of FIG. 2 or (3) of FIG. 28) only when it is in a call enable state. For that reason, with FIG. 2, the called party's session managing server 220 judges that the called party's wireless communication apparatus 120 is engaged if no call arrival message has been received from the called party's wireless communication apparatus 120.

With the example of FIG. 2 above, the internet communication system has been discussed with the method in which the calling party's wireless communication apparatus issues a call to the called party's wireless communication apparatus via the session managing server. However, the above method is only one example. Now, the method of FIG. 28 is explained about the transmission and reception of a call control message to and from the session managing server.

With the method of the example of FIG. 2, the message of the call arrival information is transmitted to the called party's session managing server from the called party's wireless communication apparatus only when it is in a call enable state. However, there is the case where the called party's wireless communication apparatus cannot transmit the message of the call arrival information due to some failure. In such a case, there is a possibility of falling into the situation that the abnormal state of the called party's wireless communication apparatus is not noticed at all, and the called party's wireless communication apparatus is left being engaged through. Furthermore, in order to implement a call waiting function, it is necessary to transmit call arrival information from another party's wireless communication apparatus even to the wireless communication apparatus, which is engaged. Therefore, in order to solve those problems, the wireless communication apparatus, no matter if being engaged or not, always transmits the message of the call arrival information to the session managing server so as to provide the session managing server with information notifying of the state of the called party's wireless communication apparatus. This method is considered desirable.

With a call from another party's wireless communication apparatus, the information is transmitted to the called party's wireless communication apparatus from the session managing server, whereby the arrival of the call is verified. This is the same as that of the above-mentioned example of FIG. 2.

Thus, the message of the call arrival information is to be continuously outputted to the session managing server. This allows the called party's wireless communication apparatus to be always aware of the presence of a calling from another party's wireless communication apparatus. In addition, the message of the call arrival information is continuously transmitted to the session managing server waiting for the arrival of the message of the call arrival information from the called party's wireless communication apparatus. Therefore, if it is not received, the session managing server may become aware of the abnormal state of the wireless communication apparatus, which may allow some recovery processing to be started.

With the example of FIG. 28, the called party's session managing server 220 receives the call arrival message from the called party's wireless communication apparatus 120 while it is engaged even. The called party's session managing server 220 judges that the called party's wireless communication apparatus 120 is being engaged even if the session managing server is not involved in the call because the engaged state of the called party's adapter during a PSTN (Public Switched Telephone Network) based call, for example, is notified to the called party's session managing server 220 through some system from the called party's wireless communication apparatus itself.

In addition, the called party's session managing server obtains a call relay server available, and responds to the called party's wireless communication apparatus 120 in the call relay server response information. In the case where all the call relay servers for call relaying are engaged, this fact is included in the call relay server response information so as to notify the called party's wireless communication apparatus 120 of it. The called party's session managing server 220 included in the call relay server response information a search result of the call request to the called party's wireless communication apparatus 120, and transmits it as a response message of call relay server ((8) of FIG. 2 or (8) of FIG. 28). The response message of call relay server is responded by the GET response message.

According to the first embodiment, session managing servers manages wireless communication apparatuses from each other. In other words, the session managing servers assigned to the calling party's wireless communication apparatus and the called party's wireless communication apparatus are not necessarily the same. For that reason, the wireless communication apparatus knows the presence of a call from the intended party only by making a call arrival inquiry to the session managing server to which it is assigned directly with FIG. 2 and by way of the calling party's session managing server with FIG. 28.

Reference signs S9, S10 and S11 of FIG. 10 correspond to the processing of (7) and (8) of FIG. 2 or the processing of (3) and (8) of FIG. 28. In S9, the called party's wireless communication apparatus 120 acquires the wireless communication apparatus ID of its own and an address indicating the called party's session managing server from the table of wireless communication apparatus information 123. The called party's wireless communication apparatus 120, issues the call arrival message request (S9) to the address of the called party's session managing server acquired. A call arrival message request is transmitted to the called party's session managing server 220 as the GET method message.

The called party's session managing server 220 searches the table of session establishment request 223 based on the wireless communication apparatus ID of the wireless communication apparatus to which a call arrival message request is issued, and checks the presence of the session request. With the example of FIG. 10, there is a request having been issued to the address of the wireless communication apparatus ID "2-1-11" in the table of session establishment request 223. Consequently, the called party's session managing server 220 sets the presence of a session request in the call relay server response message, and notifies the called party's wireless communication apparatus 120 of it (S11). The call processing performed by the called party's wireless communication apparatus 120 and the called party's session managing server 220 of the call control method shown in FIG. 8 corresponds to the processing of S9 and S11. In addition, the called party's session managing server 220 acquires from the table of session establishment request 223 the address of the calling party's session managing server 210 of the establishment request of the session based on the call arrival message request. Then, the called party's session managing server 220 notifies the calling party's session managing server 210 of the establishment request of the session based on the call arrival message request that the call arrival message request has been issued (S10).

The reference numerals (3), (4), (5), (6), (7) and (8) of FIG. 2, or (3), (4), (5), (6), (7) and (8) of FIG. 28 discussed above are the processing of call relay management performed by the session managing server 220. The session managing serve 220 starts performing a call relay upon reception of a call message from the wireless communication apparatus as a trigger. A call relaying method is elaborated below.

(a) A call message originated from the calling party's wireless communication apparatus 110 is received.

(b) It is judged whether or not a call arrival message is received from the recipient (the called party's wireless communication apparatus 120) of the call message received is received.

(c) In the case where the call arrival message has been received from the intended party (the called party's wireless communication apparatus 120) of the call message received, then a call relay server which is not engaged in a call relay is searched for. The session managing server 220 judges the possibility of call relaying based on the call message and call arrival message received, and area managing data. (The area managing data will be elaborated in a later embodiment.) Call relaying is not allowed in the condition that:

A call arrival message from the intended party (the called party's wireless communication apparatus 120) of the call message received has not been received (FIG. 2), or the intended party (the called party's wireless communication apparatus 120) of the call message received is engaged or busy (FIG. 28); or All the sessions of the call relay server for call relaying are used.

The session managing server 220 manages the call relay servers to be used for call relaying based on the "area managing data" which is created for each area. The session managing server 220 reads out data from the "assigned session managing server data file" when the calling management process of the session managing server 220 is started, and creates and stores the "area managing data", "relay server managing data", and "session managing data" in a memory. The "assigned session managing server data file", the "area managing data", the "relay server managing data", and the "session managing data" will be elaborated in a later embodiment.

In the case where no call relay server available for call relaying is found as a search result, a log is outputted and the administrator is notified of it. In addition, an error is notified also to the wireless communication apparatus 110, 120 so as to notify the user who operates via the wireless communication apparatus 110, 120 (by LED lighting, etc.) of the abnormal state.

(d) The call relay server response information is transmitted to the calling party's wireless communication apparatus 110 and the called party's wireless communication apparatus 120 from the called party's session managing server 220 (FIG. 2). The call relay server response information is transmitted to the calling party's wireless communication apparatus 110 from the calling party's session managing server 210 and to the called party's wireless communication apparatus 120 from the called party's session managing server 220 (FIG. 28). FIG. 11 shows information, which is included in the call relay server response information.

The reference numerals (9) and (10) of FIG. 2 and FIG. 28 are the processing of voice data distribution. With this example, a first phase transmission of relay data and a second phase transmission of relay data are discussed individually. In the first phase transmission of relay data, a call is relayed between the calling party's wireless communication apparatus 110 and the called party's wireless communication apparatus 120 by means of a single unit of call relay server. In the second phase transmission of relay data, a call is relayed between the calling party's wireless communication apparatus 110 and the called party's wireless communication apparatus 120 by means of two (or more) units of call relay servers.

Firstly, the first phase transmission of relay data is discussed.

Figure 12:
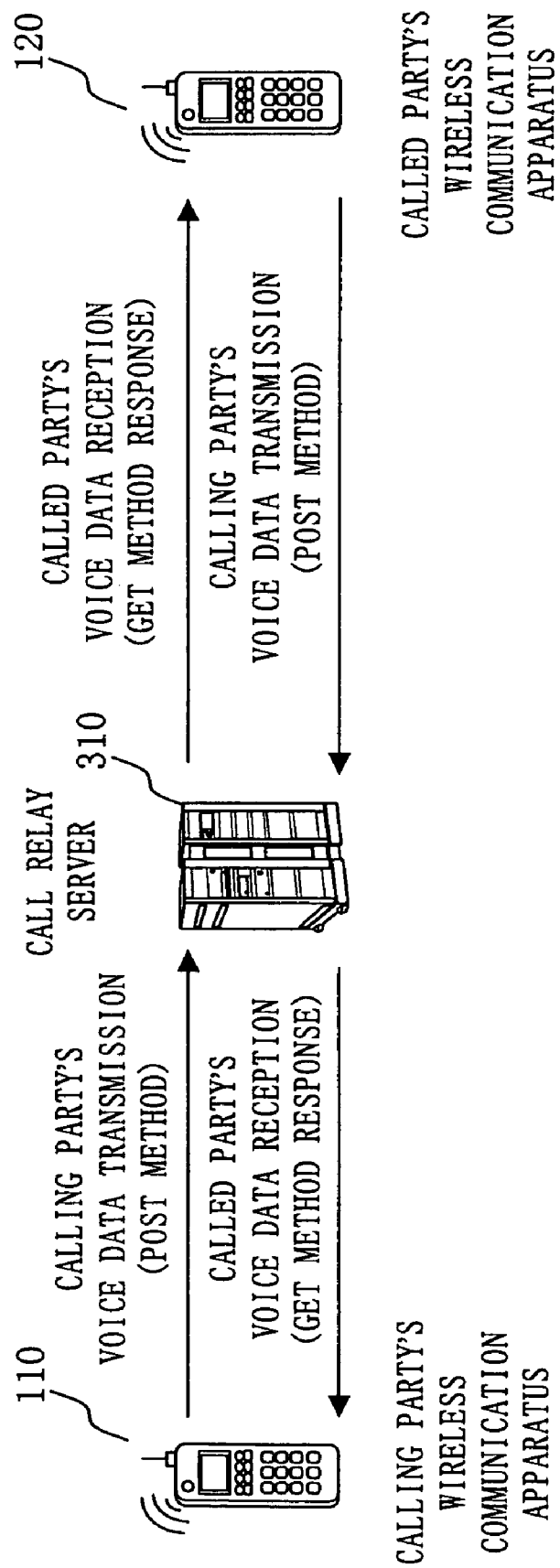
FIG. 12 is a diagram explaining the transmission of a call message according to the first embodiment.

FIG. 12 shows the processing of the first phase transmission of relay data. In the first phase transmission of relay data, data is distributed by way of the single unit of the call relay server 310, which is capable of clearing firewall. With the first phase transmission of relay data, the calling party's wireless communication apparatus 110 transmits "calling party's voice data" through a POST method to the call relay server 310 available which is included in the "call relay server response message" acquired from the called party's session managing server 220 through (6) of FIG. 2 or (7) of FIG. 28. The calling party's wireless communication apparatus 110 receives "called party's voice data" through the GET method from the call relay server 310 available which is included in the "call relay server response message" acquired from the called party's session managing server 220 through (6) of FIG. 2 or (7) of FIG. 28. Then, in the case where the calling and called parties are changed, the called party's wireless communication apparatus 120 transmits voice data to the call relay server 310. The calling party's wireless communication apparatus 110 makes a voice data reception request to the call relay server in order to acquire the voice data of the called party's wireless communication apparatus 120.

The call relay server 310 receives "calling party's voice data transmission information" from the calling party's wireless communication apparatus 110 as voice data. FIG. 13 shows the items and contents of the calling party's voice data transmission information.

The call relay server 310 edits "called party's voice data reception information" as voice data to be transmitted to the called party based on the voice data received from the calling party's wireless communication apparatus 110. FIG. 14 shows the items and contents of the called party's voice data reception information.

It is to be noted that "calling party's voice data transmission (POST method)" from the calling party's wireless communication apparatus 110 is notified after transmitting a response to the "called party's voice data reception (GET method)" to the called party's wireless communication apparatus 120.

Next, the second phase transmission of relay data will be discussed.

Figure 15:
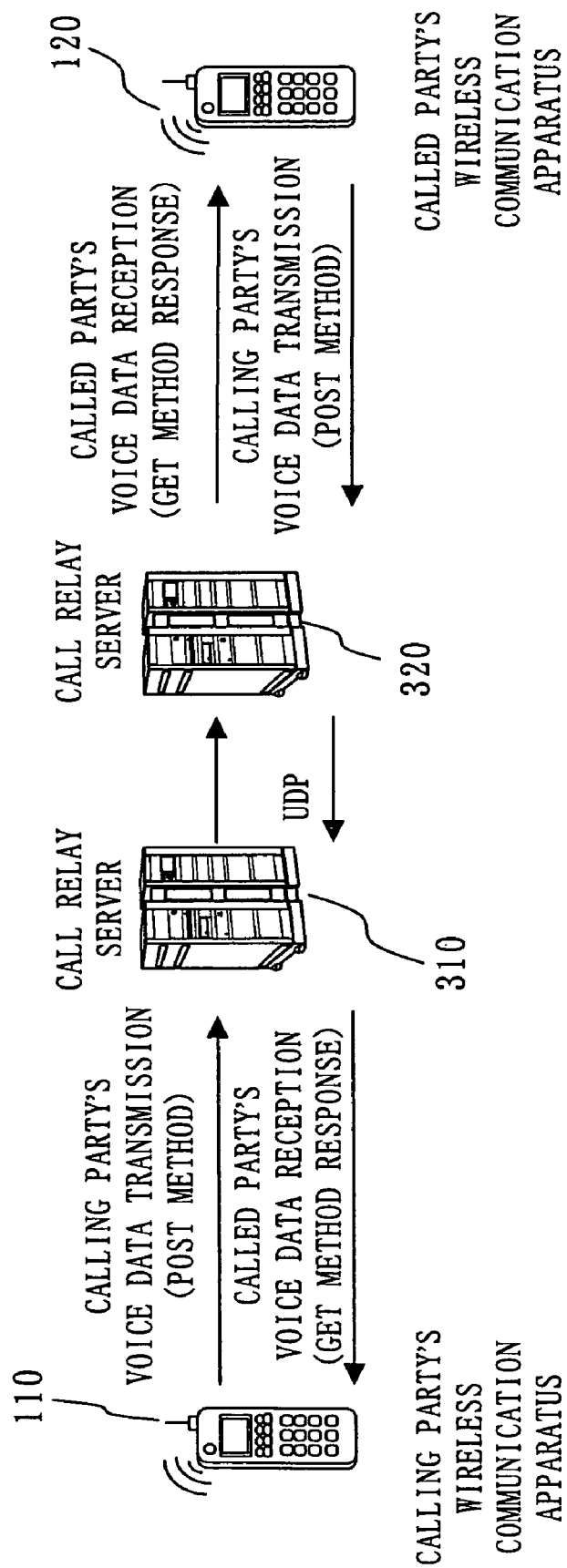
FIG. 15 is a diagram explaining the transmission of a call message according to the first embodiment.

FIG. 15 shows the processing of the second phase transmission of relay data.

In the second phase transmission of voice data, voice data is transmitted between the call relay servers 310 and 320 by using UDP. The calling party's wireless communication apparatus 110 transmits the "calling party's voice data" through the POST method to the call relay server 310 available which is included in the "call relay server response message" acquired from the called party's session managing server 220 through (6) of FIG. 2 or (7) of FIG. 28. The call relay server (of the calling party) 310, upon reception of the POST method, transfers the voice data to the call relay server (of the called party) 320 by using UDP. The called party's wireless communication apparatus 120 transmits the "calling party's voice data" through the POST method to the call relay server 320 available which is included in the "call relay server response message" acquired from the called party's session managing server 220 through (8) of FIG. 2 or (8) of FIG. 28. The call relay server (of the called party) 320, upon reception of the POST method, transmits the voice data received from the call relay server (of the calling party) 310 by using UDP to the called party's wireless communication apparatus 120 as the GET method response. Then, in the case where the calling and called parties are changed, the called party's wireless communication apparatus 120 transmits the voice data to the call relay server (of the called party) 310, and the call relay server (of the called party) 320 transfers the voice data to the called relay server (of the calling party) 310 by using UDP. The calling party's wireless communication apparatus 110 makes a voice data reception request to the call relay server 310 in order to acquire the voice data of the called party's wireless communication apparatus 120. The call relay server (of the calling party) 310 transmits the voice data received from the cal relay server (of the called party) 320 to the calling party's wireless communication apparatus 110 as the GET method response.

The calling party's call relay server 310 receives the "calling party's voice data transmission information" from the calling party's wireless communication apparatus 110 as voice data. The items and contents of the calling party's voice data transmission information are the same as those of FIG. 13.

The calling party's call relay server 310 transmits the voice data to the called party's call relay server 320 through a UDP transmission after receiving the voice data from the calling party's wireless communication apparatus 110.

It is to be noted that a response to the "calling party's voice data transmission (POST method)" from the calling party is transmitted after receiving a "UDP transmission normal termination" to the called party's call relay server 320.

The called party's call relay server 320 edits the "called party's voice data reception information" as the voice data to be transmitted to the called party's wireless communication apparatus 120 based on the voice data received from the calling party's call relay server 310. The items and contents of the called party's voice data reception information are the same as those of FIG. 14.

It is to be noted that a response to a "UDP transmission" from the calling party is notified or transmitted after transmitting a "called party's voice data reception (GET method)" in reply to the called party.

The processing of call relay management performed by the call relay server is discussed below.

The call relay server starts call relaying upon reception of the calling party's voice data or the called party's voice data from the wireless communication apparatus as a trigger. With this example, the "calling party's voice data" and the "called party's voice data" are the same except for the transmitting sources, and therefore they will be referred to hereinafter as "voice data" as long as it is not necessary to distinguish between them by their transmitting sources.

The call relay server manages the session to be used for call relaying between the "session managing data". The session managing data is generated based on a "server managing data file" which is provided in the call relay server. The "server managing data file" is a file including the limit value of data to be managed by the session managing server and includes data detailed below:

the number of installed call relay servers, which are managed by the session managing server;

a maximum number of sessions per call relay server, which is managed by the session managing server;

server identification information of an assigned call relay server; and

IP addresses of an assigned call relay server.

The session managing data reads out corresponding data from the above detailed data in the "server managing data file" when the HTTP relay server main process of the call relay server is started, and creates the call relay server managing data and the session managing data on the memory. The session managing data and the call relay server managing data will be elaborated in a later embodiment. The corresponding data mentioned above means that the target is data relating to a corresponding session managing server only, since there are two or more server managing data files per session managing server on a single call relay server.

With a first reception as a trigger, the wireless communication apparatus ID (manufacturer's serial number) of the calling party's wireless communication apparatus as the session ID and an IP address (of either the wireless communication apparatus or the call relay server) are included in the "session managing data".

It is to be noted that no call relay error occurs basically with the call relay server because the session managing server judges the possibility of call relaying. However, in case of an error occurred, the log is outputted so that the administrator is notified of it.

In addition, the system administrator performs a real-time surveillance to check whether the session managing server and the call relay server are operating normally based on such as the rate of CPU load and the state of network packet transmission and reception. Besides, because the server knows the number of call processing being executed at the same time or the presence of call processing errors, it is possible to display the real-time surveillance of the information.

The aforementioned includes the transmitting and receiving procedure of voice data between the calling party and the called party in the internet communication (calling) system and the internet communication (calling) method. In addition, it includes the descriptions of the functions and operations of the session managing servers of the calling and called parties, the call relay servers, the wireless communication apparatuses of the calling and called parties, and the assignment notification server.

Embodiment 2

An example of the operational configuration of a system using the internet communication system discussed in the first embodiment is discussed.

Figure 16:
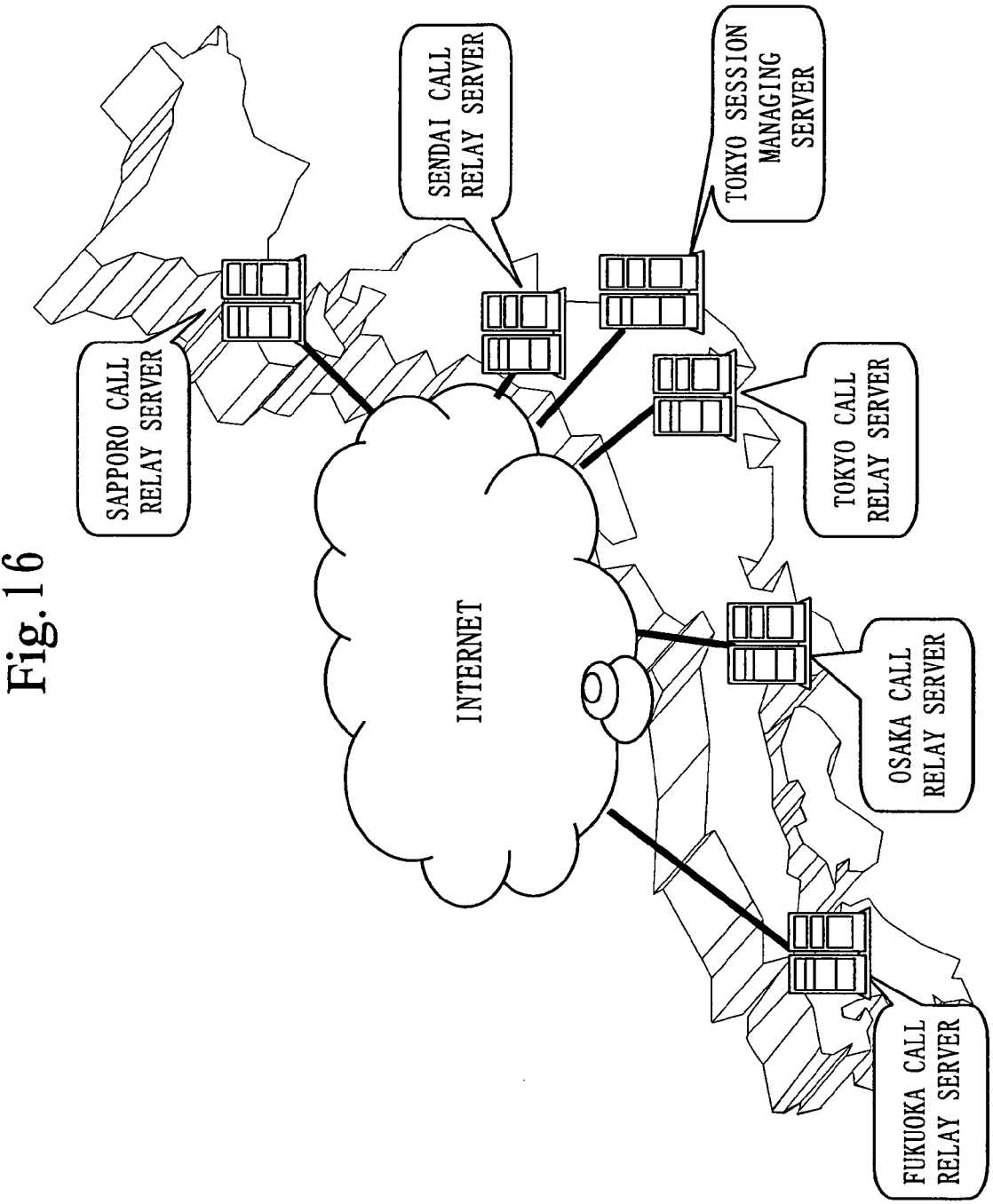
FIG. 16 is a diagram illustrating an example of the operation and configuration of an internet communication system according to a second embodiment.

FIG. 16 is a diagram illustrating an example of the operational configuration of an internet communication system according to a second embodiment. The figure shows a diagram illustrating the operational configuration of the internet communication system using a call control central management system.

Figure 17:
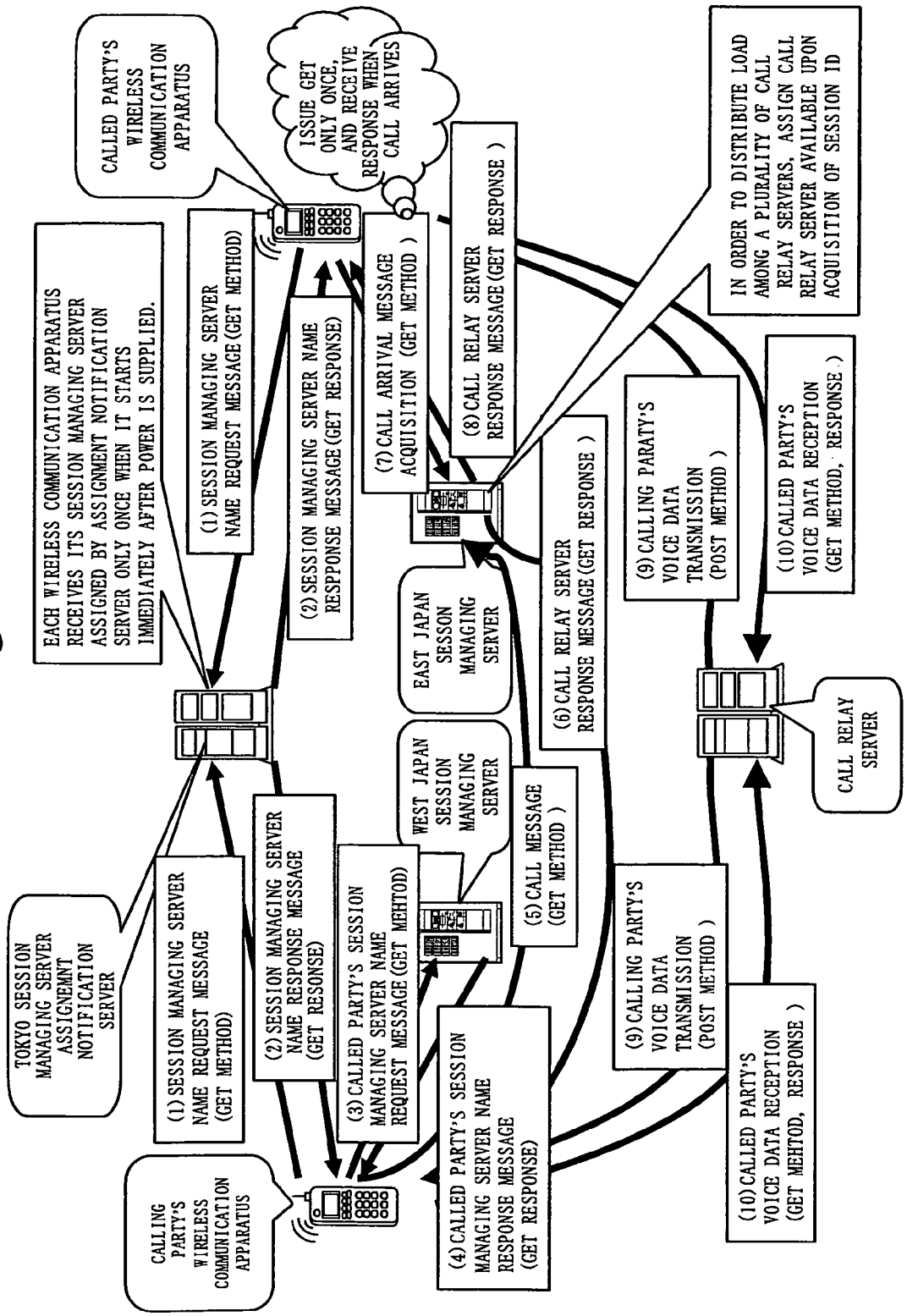
FIG. 17 is a diagram illustrating the procedure of data transmission and reception carried out between the calling party and the called party in the operation and configuration shown in FIG. 16.

With referring to FIG. 16, several call relay servers are installed throughout the country, and grouped into the areas of western part of Japan and eastern part of Japan. Then, one unit of session managing server is arranged in the western part of Japan and one in the eastern part of Japan, and then a session managing server including an assignment notification server function is arranged in Tokyo. According to the internet communication system having the operational configuration shown in FIG. 16, voice data is transmitted and received between calling and called parties based on procedures illustrated in FIG. 17. The procedures of (1) to (10) of FIG. 17 are the same as those of (1) to (10) of FIG. 2. As alternative procedures to those of FIG. 17, (1) to (10) of FIG. 2 is also applicable. As shown in FIG. 16, the session managing server may be arranged in a predetermined area. This allows wireless communication apparatuses assigned to a session managing server so as to be managed according to the area. In the first embodiment, it was explained that the wireless communication apparatus is managed based on the wireless communication apparatus ID (manufacture's serial number). In the case of arranging the session managing servers as shown in FIG. 16, the wireless communication apparatus ID is formed with an "area identifier" and a "wireless communication apparatus identifier". The assignment notification server, upon reception of the session managing server name request message from the wireless communication apparatus, determines the session managing server to which the wireless communication apparatus is assigned based on the "area identifier". According to the case of FIG. 16, the session managing servers are arranged in the western part of Japan and the eastern part of Japan. For that reason, the "area identifier" may be used to determine the session managing server to which it is assigned. Furthermore, the area of the western part of Japan may be divided into segments such as Kyushu block, Kinki block, Sanin block and Shikoku block. Then, a session managing server may be arranged in each block. With this configuration, the "area identifier" may be hierarchized. Then, in the top layer of the hierarchy, an identifier for distinguishing between the western part of Japan and the eastern part of Japan may be arranged, and Kinki block, Sanyo block and Shikoku block may be arranged in a lower layer. This allows determining the session managing server to which a wireless communication apparatus is assigned. Still more, the Tokyo session managing server assignment notification server of FIG. 17 manages a West Japan session managing server and an East Japan session managing server. The West Japan session managing server manages Fukuoka call relay server and Osaka call relay server. The East Japan session managing server manages Sendai call relay server and Sapporo call relay server. In this manner, the call relay servers are managed by the session managing servers, which are arranged in nearby areas to the call relay servers according to the area of the call relay server arranged. This allows voice data to be relayed by the relay server, which is arranged in the nearest place to the area where the wireless communication apparatus is located.

Figure 18:
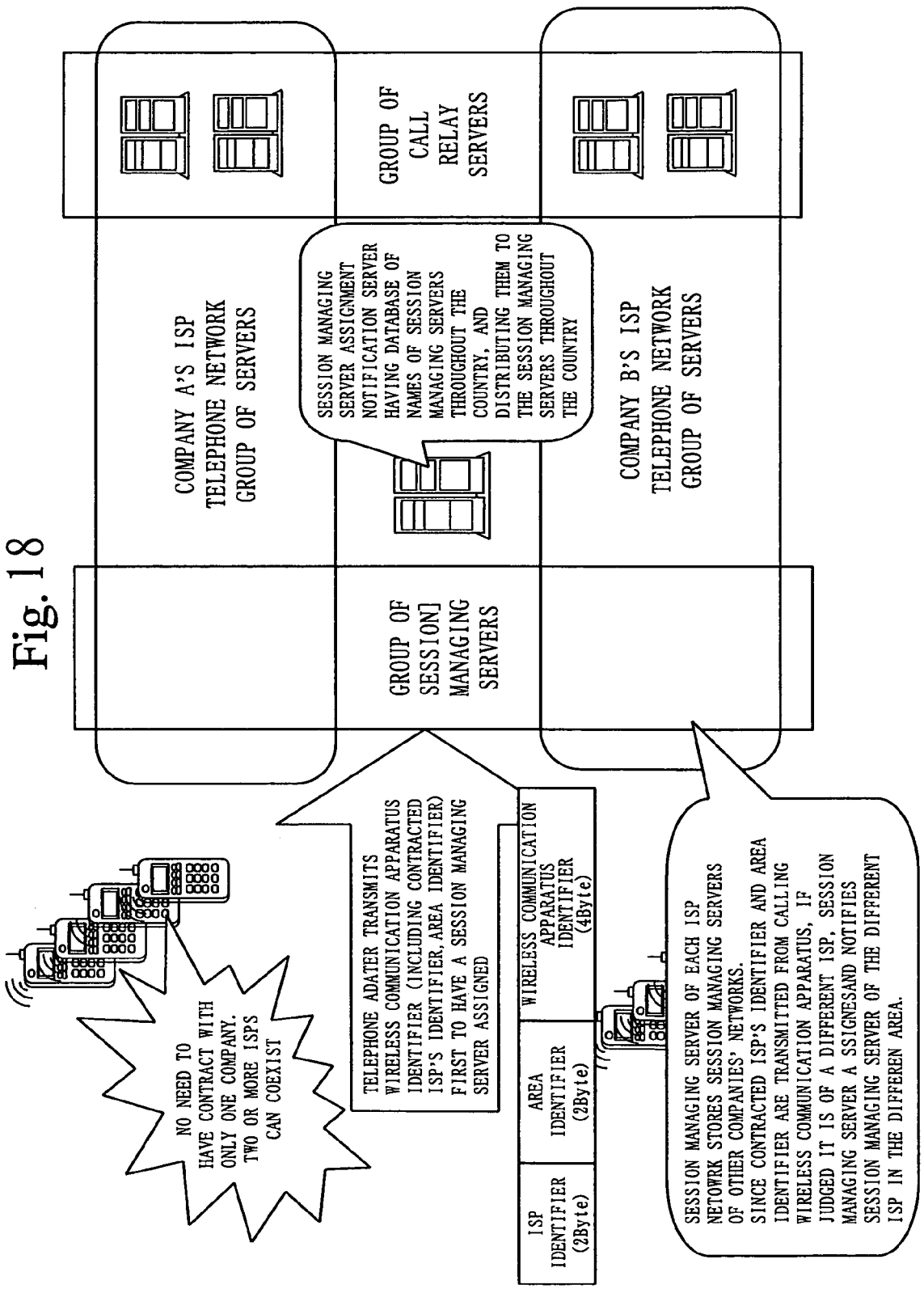
FIG. 18 is a diagram illustrating an example of the configuration of an internet communication system according to a plurality of ISP networks according to the second embodiment.

It is also possible as an alternative operational configuration, by tying up with two or more internet service providers (ISP), to install a session managing server and a call relay server in the places where the servers of the respective ISPs are installed, and connect the groups of servers (session managing servers and call relay servers) installed in the respective ISPs with each other over ISP networks. In this case, the wireless communication apparatus ID is formed by an "ISP identifier" and a "wireless communication apparatus identifier". The assignment notification server, upon reception of the session managing server name request message from a wireless communication apparatus, determines the session managing server to which the wireless communication apparatus is assigned based on the "ISP identifier". In addition, in the case where a single ISP manages one or more session managing servers, an "area identifier" is added to the wireless communication apparatus ID, so that the wireless communication apparatus ID is formed with the "ISP identifier", the "area identifier" and the "wireless communication apparatus identifier". The session managing server to which the wireless communication apparatus is assigned is determined based on the "ISP identifier" and the "area identifier". Thus, the internet communication system may be managed by tying up with not only one ISP company but with two or more ISP companies. Still alternatively, it is also possible that a single ISP company handles a plurality of areas by the area identifiers and manages a plurality of session managing servers installed therein. FIG. 18 shows a diagram illustrating the configuration of a system in which the internet communication system is managed with two or more ISPs tied up.

Figure 19:
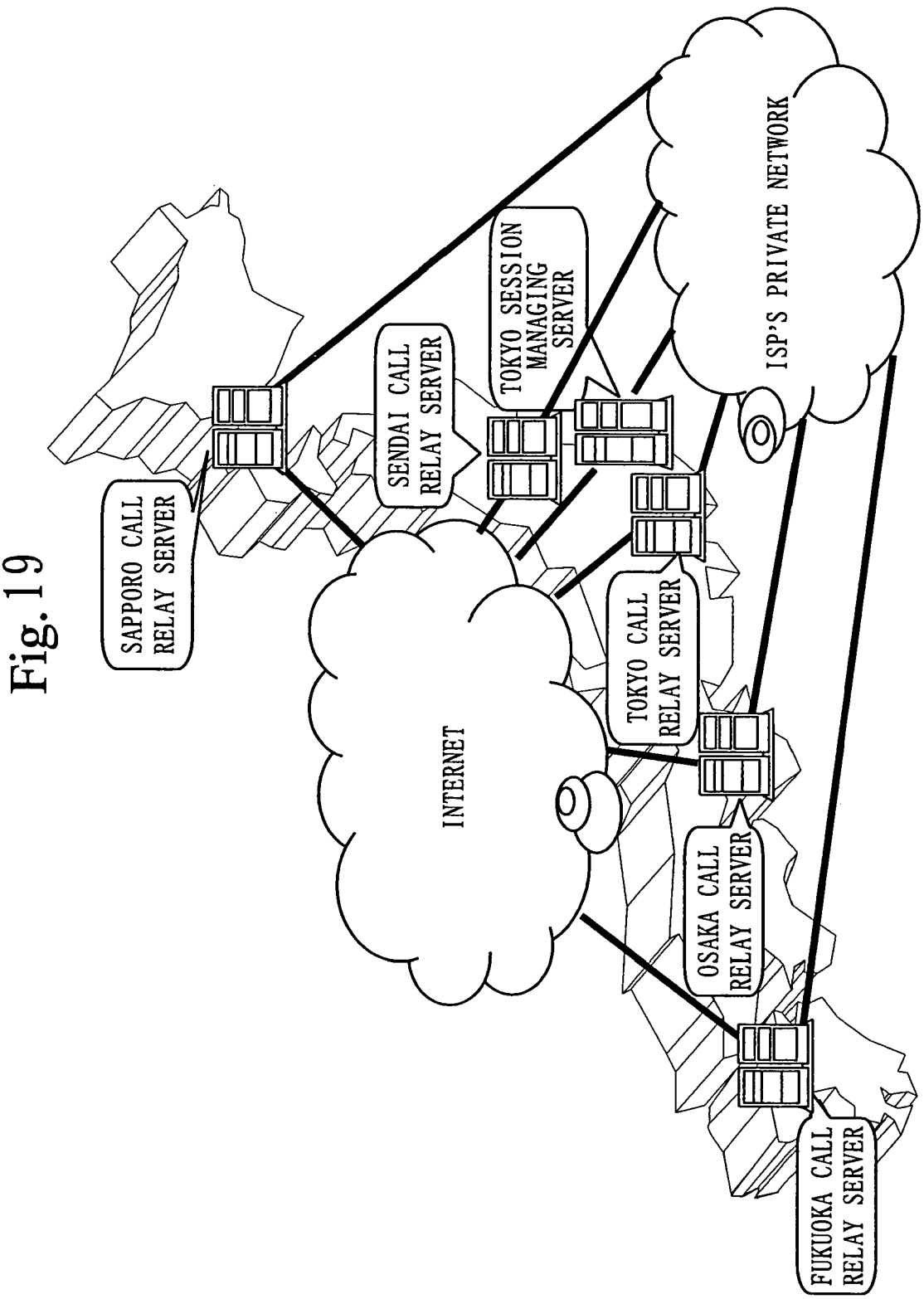
FIG. 19 is a diagram illustrating an example of the configuration of an internet communication system using a private ISP network according to the second embodiment.
Figure 20:
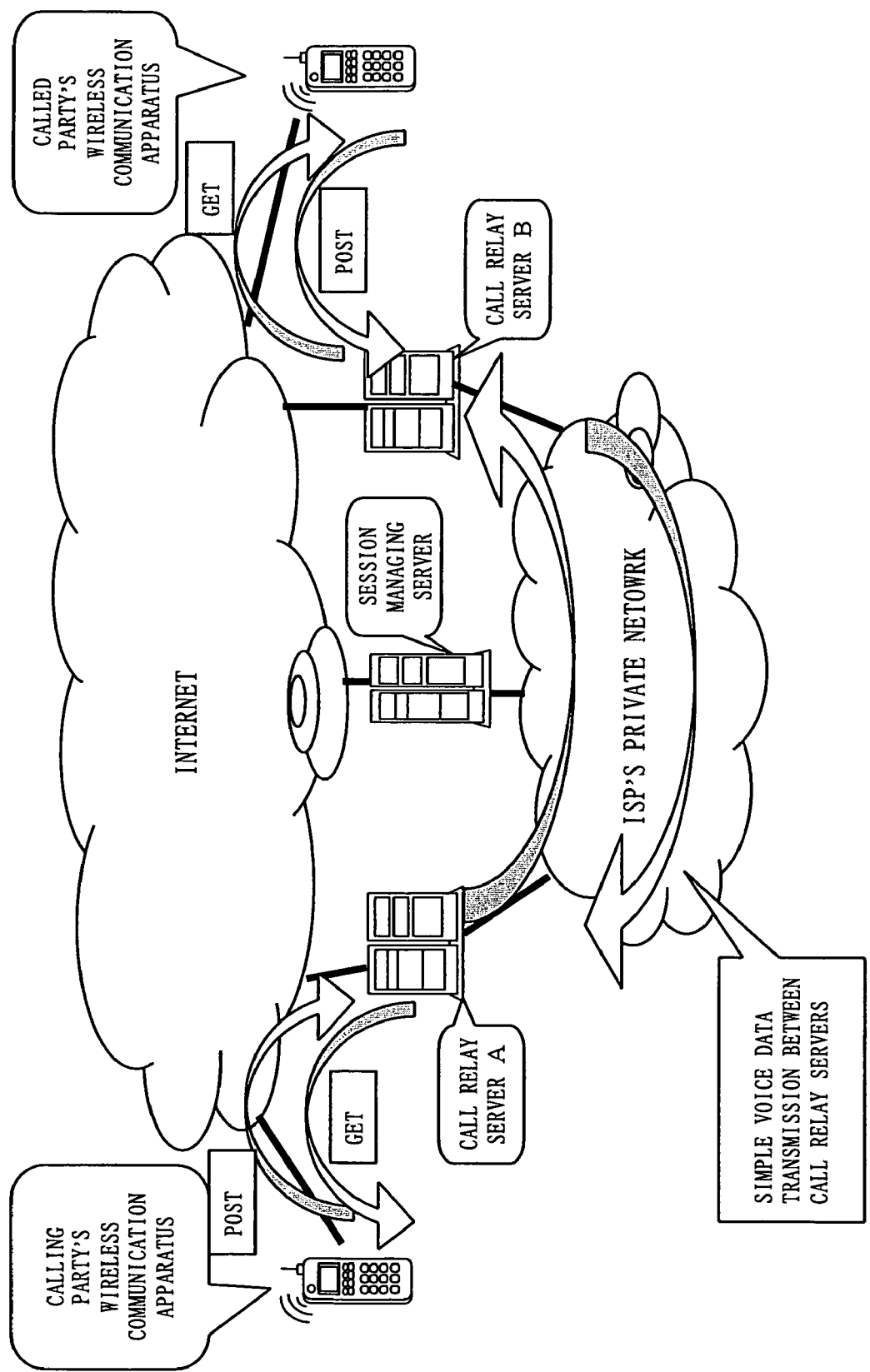
FIG. 20 is a diagram illustrating an example of the configuration of an internet communication system according to a private ISP network of the second embodiment.

It is to be noted that the session managing servers or the call relay servers, which are managed by each ISP may communicate with each other through an ISP network owned by the ISP. In this case, communications through the ISP network between session managing servers, between call relay servers, or between a session managing server and a call relay server, are to be carried out by using UDP. Alternatively, RTP (Transport Protocol for Real-time Application) or TCP (Transmission Control Protocol) is to be used for carrying out communications. It is beyond question that a similar protocol in another transport layer may alternatively be employed. By thus enabling communications between different ISPs, voice data may be transmitted and received between calling and called parties through call relay servers managed by different ISPs. The wireless communication apparatus and the call relay server communicate with each other over the internet by using HTTP in the same manner as that discussed in the first embodiment. FIG. 19 and FIG. 20 each show an operational configuration of the internet communication system, which uses an ISP network. FIG. 19 illustrates that call relay servers and a session managing server are connected respectively with an ISP network. FIG. 20 illustrates an example of transmitting voice data between call relay servers over an ISP network. In the case of transmitting voice data between call relay servers over the ISP network by using predetermined two units out of the call relay servers shown in FIG. 19, a simple voice data transfer is applied to communication between the call relay servers, and "POST (in the case of transmitting data from a wireless communication apparatus to a call relay server)" and "GET (in the case of transmitting data to a wireless communication apparatus from a call relay server)" are applied to communication between the wireless communication apparatus and the call relay server of the calling party, and between the wireless communication apparatus and the call relay server of the called party, as shown in FIG. 20. This has been already discussed in the first embodiment.

Figure 21:
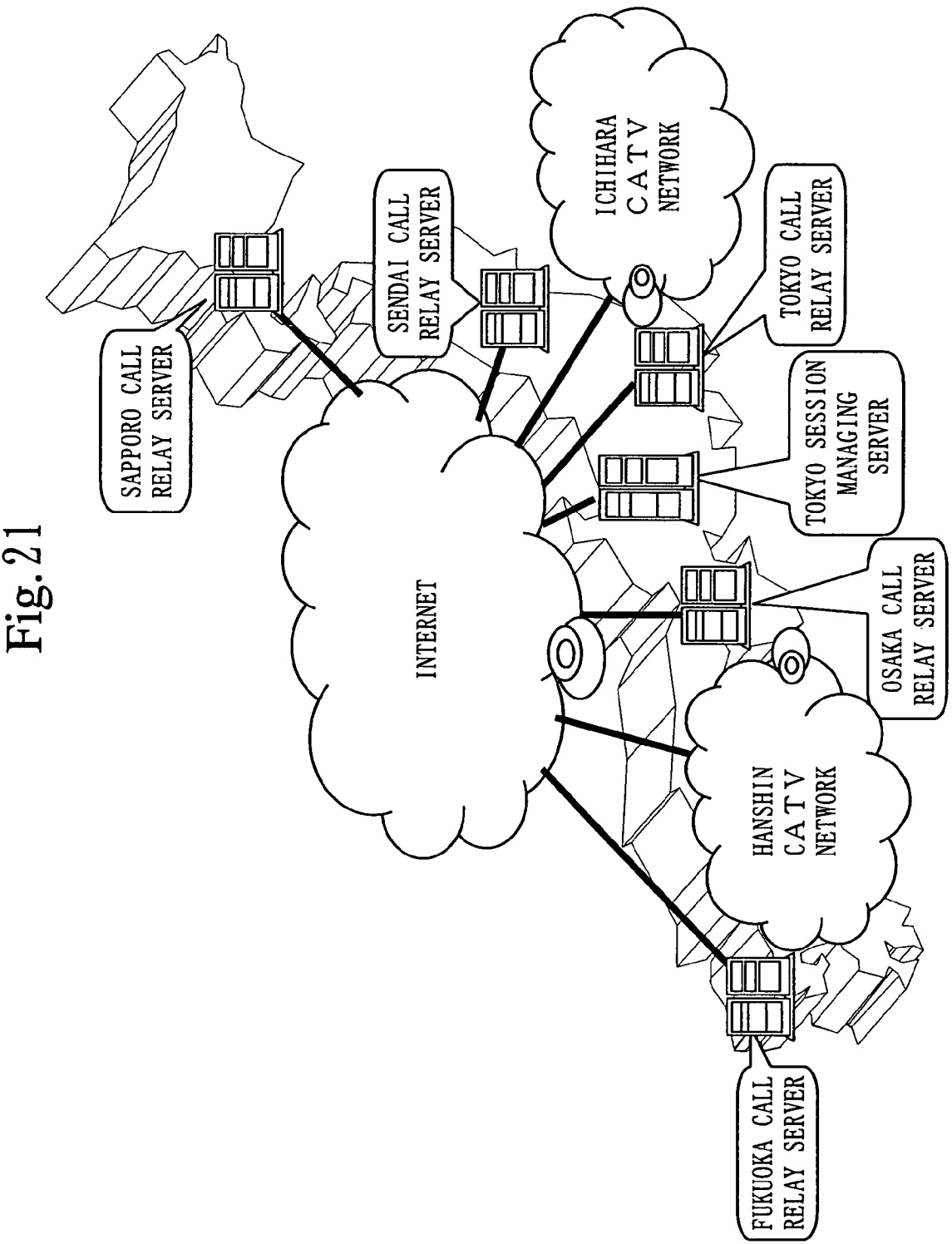
FIG. 21 is a diagram illustrating an internet communication system according to a CATV network of the second embodiment.
Figure 22:
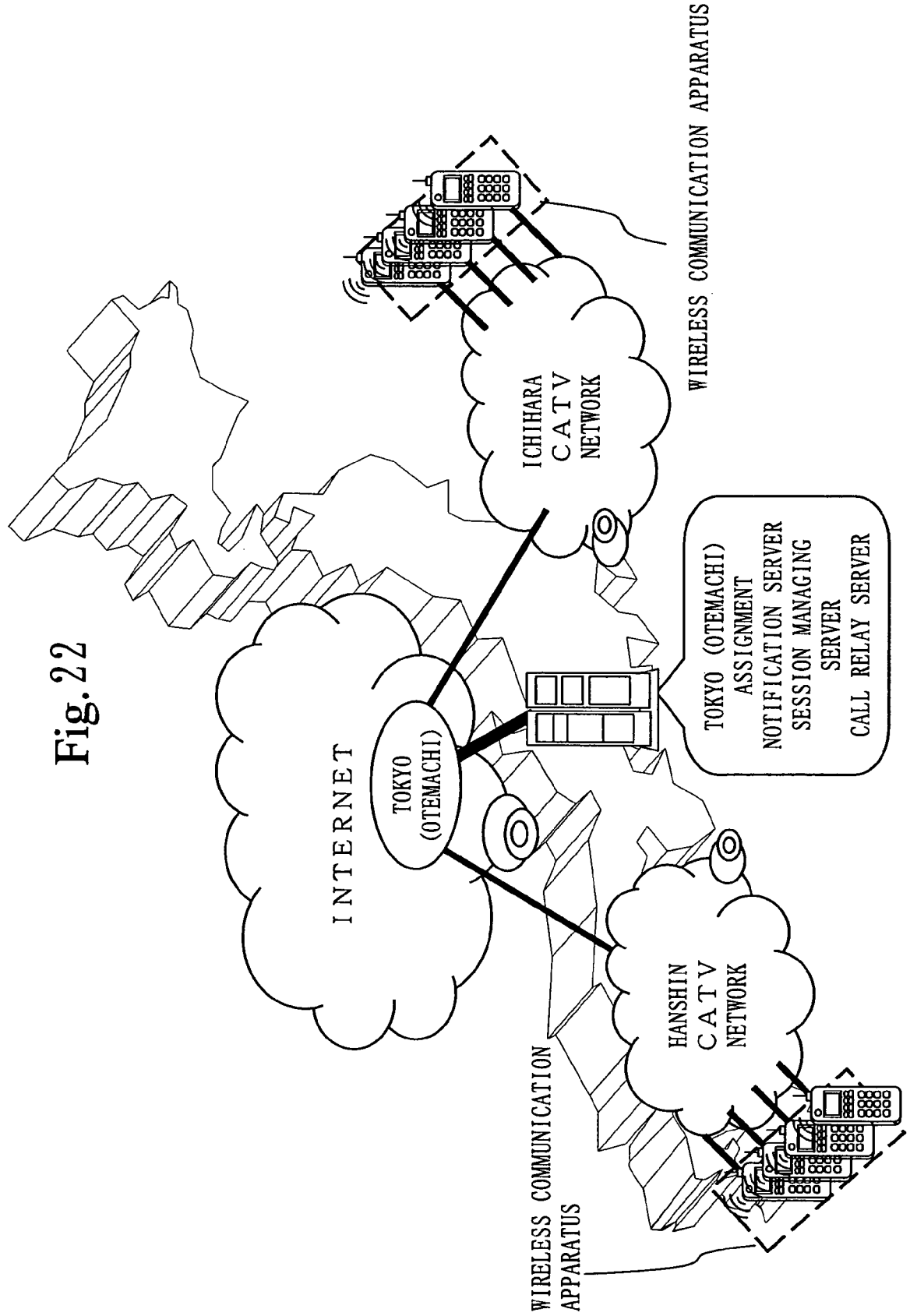
FIG. 22 is a diagram illustrating an example of the configuration of an internet communication system including a predetermined ISP network and CATV networks according to the second embodiment.

In addition, as an example of the ISP network, a CATV network owned by an internet connection service provided by a CATV (cable television) company may be used to manage the internet communication system. FIG. 21 and FIG. 22 show operational examples of the internet communication system using CATV networks. FIG. 21 illustrates that a nearby call relay server having a wide band connection for a CATV company area is assigned to the CATV area. According to the example of FIG. 21, Tokyo session managing server, in the case where an internet telephone is used between Hanshin CATV and Ichihara CATV, designates Osaka call relay server to be used on the Hanshin CATV side and Tokyo call relay server to be used on the Ishihara CATV side. Between Tokyo call relay server and Osaka call relay server, UDP is used for transmitting voice data. FIG. 22 illustrates an example of managing the system by installing servers (a session managing server, a call relay server and an assignment notification server) grouped in one place, and connecting the place having the group of servers to a CATV network. In the current state of communication network arrangement, as shown in FIG. 22, broadest band communication networks are concentrated in Tokyo (Otemachi), in which, therefore, an assignment notification server, a session managing server, and a call relay server are installed. In addition, in many cases, communications are carried out between CATV networks via Tokyo (Otemachi). For that reason, by installing the servers grouped in Tokyo (Otemachi), band may be secured.

That explains the format of the wireless communication apparatus ID and the management examples of the internet communication system.

Embodiment 3

In a third embodiment, a description is given of processes performed by a session managing server.

The session managing servers discussed in the first and second embodiments each perform the "assignment of a call relay server available" and the "management of session IDs" for load sharing and management of call relaying of a call relay server for relaying data between calling and called parties.

There are three processes performed by the session managing server.

One is "call arrival management process" for receiving an inquiry of confirmation for call arrival, which is made in a cycle by a wireless communication apparatus to a session managing server to which the wireless communication apparatus is assigned.

A second one is "called party's assigned session managing server search process" for receiving an inquiry for the session managing server to which the called party is assigned at the session managing server to which the self (calling party's wireless communication apparatus) is assigned when making a call. In the called party's assigned session managing server search process, a corresponding session managing server is searched for in response to the inquiry from the wireless communication apparatus, and a response is made with information indicating a session managing server searched out with FIG. 2. With FIG. 28, on the other hand, a call message is transmitted directly to the session managing server searched out, and a response message from the called party's session managing server is received.

A third one is "call management process" for receiving a call request at the session managing server to which the called party is assigned at the start of communication.

Figure 23:
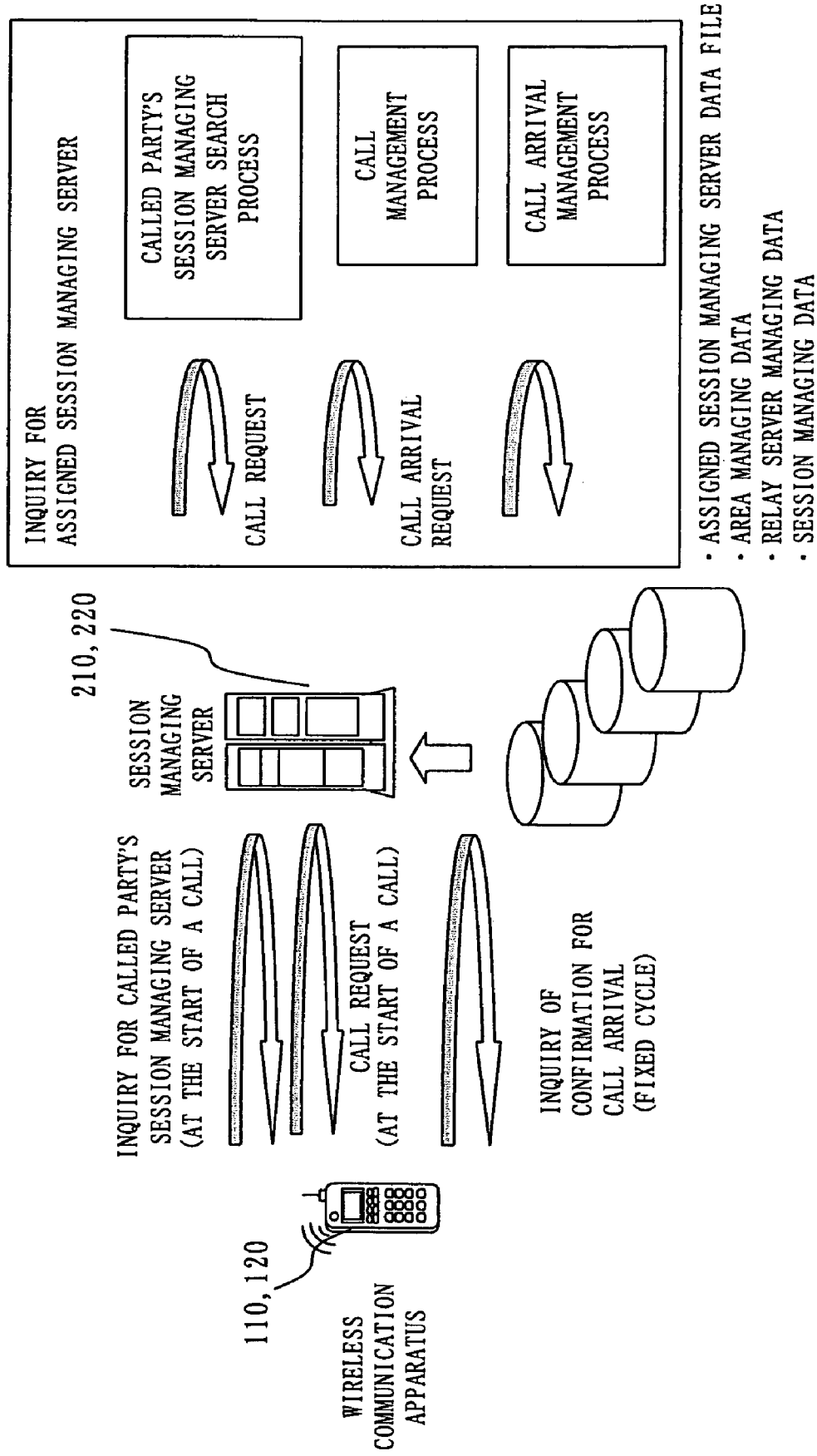
FIG. 23 is a diagram explaining an environment of a session managing server according to a third embodiment.
Figure 35:
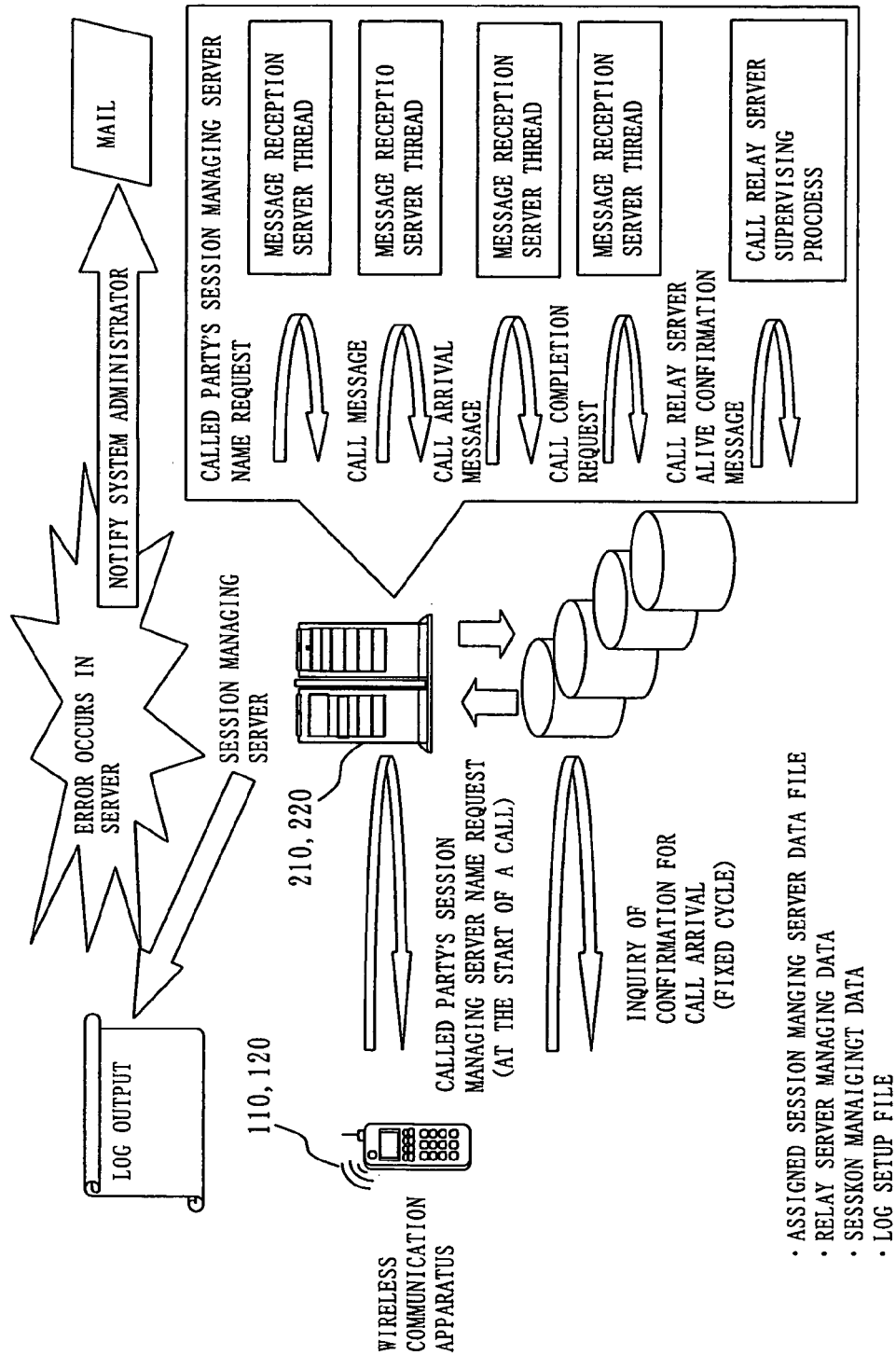
FIG. 35 is a diagram explaining an environment of a session managing server according to the third embodiment.

The internet communication system according to this embodiment has a plurality of session managing servers installed. Each session managing server deals with requests and inquiries from the wireless communication apparatuses assigned to the session managing server itself, so that the load of each session managing server is shared. FIG. 23 illustrates an environment, which corresponds to the case of FIG. 2, of the session managing server in which the three processes discussed above are executed. FIG. 35 illustrates an environment, which corresponds to the case of FIG. 28, of the session managing server in which the three processes discussed above are executed. With referring to FIG. 23 and FIG. 35, the session managing server carries out the processes by using the "assigned session managing server data file", the "area managing data", the "relay server managing data" and the "session managing data".

The "assigned session managing server data file", the "area managing data", the "relay server managing data" and the "session managing data" of FIG. 23 are detailed below. The same applies to those of FIG. 35.

The "assigned session managing server data file" includes items shown in FIG. 24, and is provided for every session managing server. With reference to FIG. 24, "status", "ISP identifier", "area identifier" and "assigned session managing server IP address" are included. The "ISP identifier" is required when a session managing server is managed by two or more ISPs. This assigned session managing server data file is searched so as to determine a session managing server to which the called party's wireless communication apparatus is assigned. Alternatively, the assignment notification server may be provided with the assigned session managing server file, which allows the assignment notification server to reply to the session managing server name request message from the calling party's wireless communication apparatus.

The following details the "are managing data".

Figure 25:
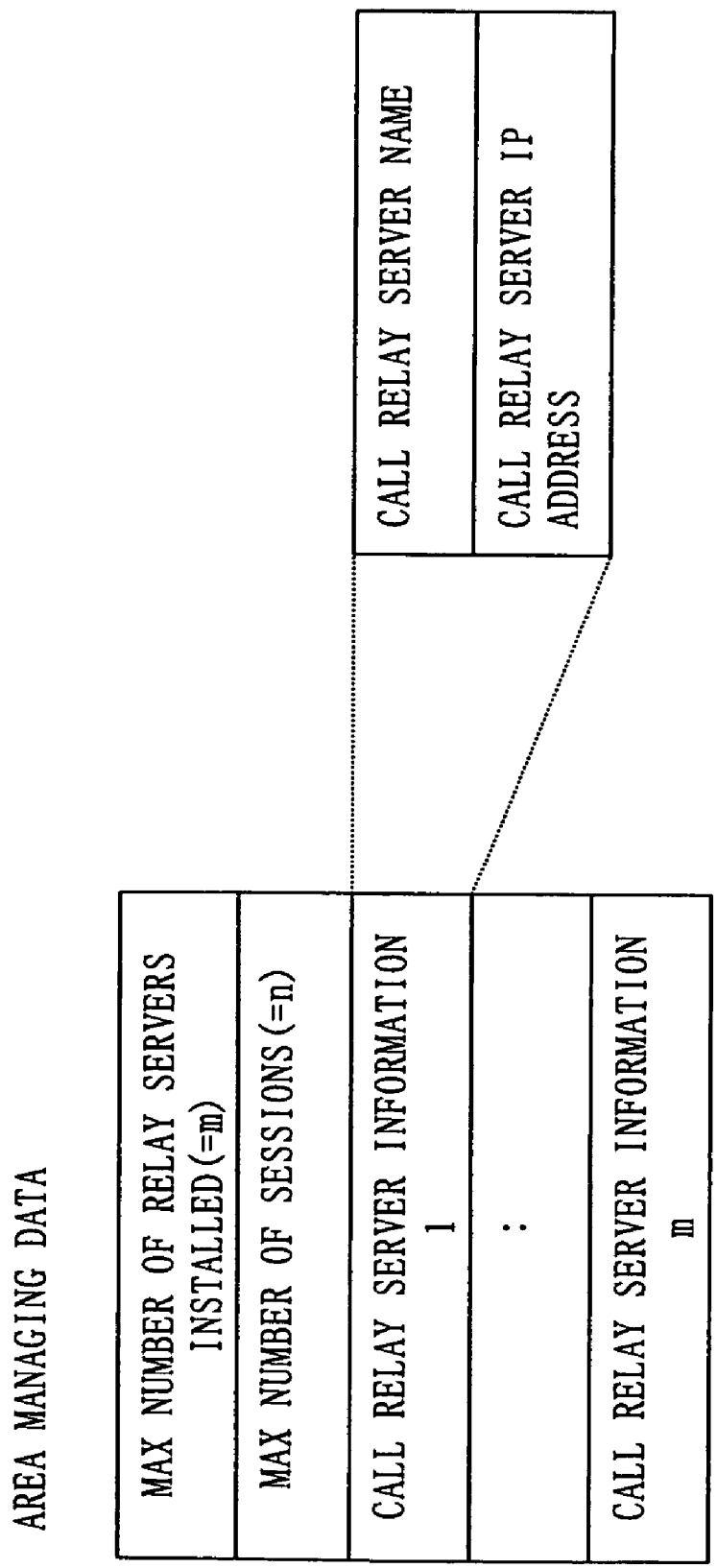
FIG. 25 is a diagram illustrating the items of area managing data according to the third embodiment.

The "area managing data" stores the management information of the call relay server, which is managed by the session managing server. FIG. 25 shows an example of the data structure of the area managing data. The session managing server determines candidates for a call relay server for relaying a call based on this area managing data, confirms the state of each call relay server candidate determined, and selects an acting server for relaying the call.

The following details the relay server managing data.

Figure 26:
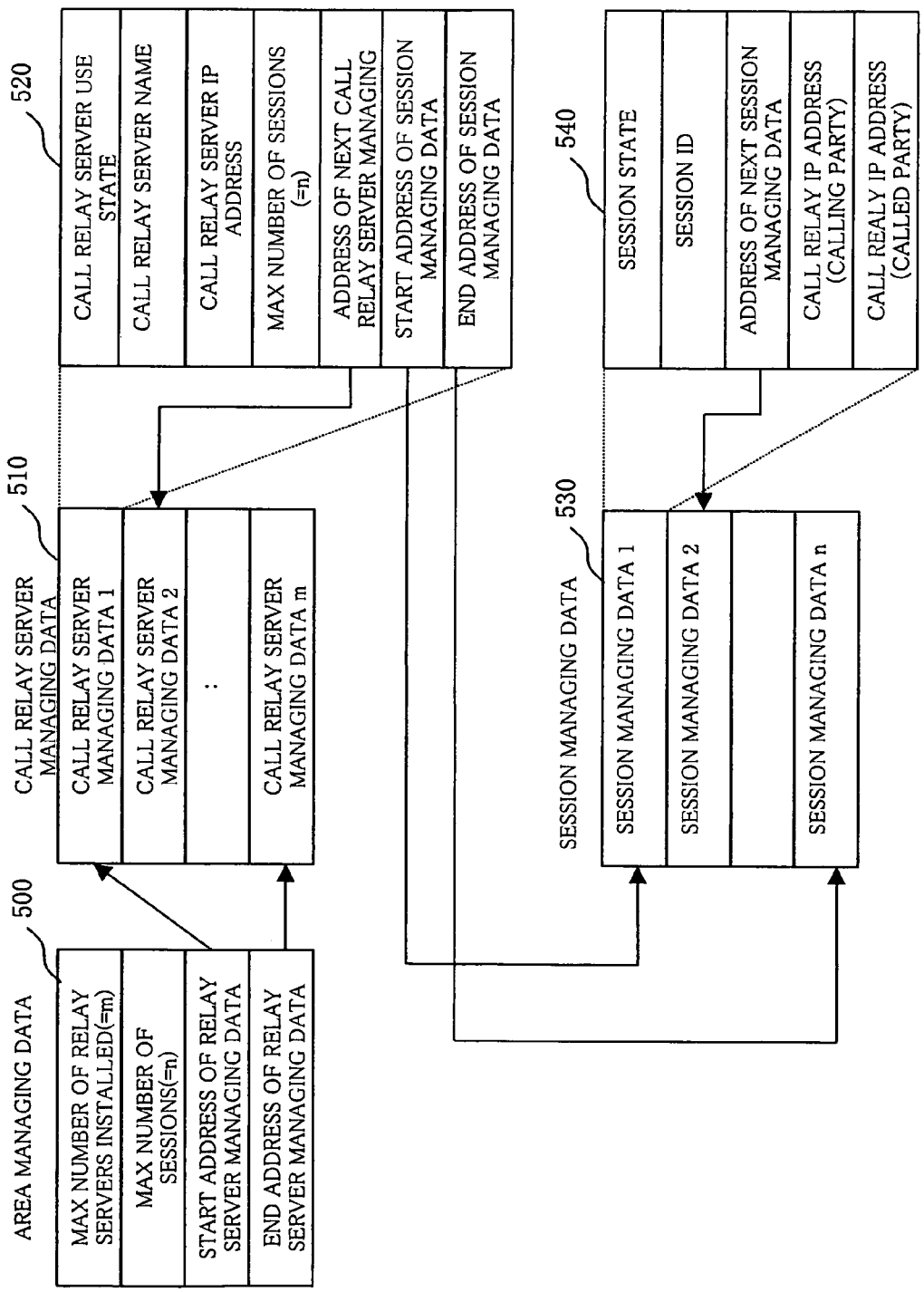
FIG. 26 is a diagram illustrating the items of call relay managing data and session managing data according to the third embodiment.

FIG. 26 shows a relation between the area managing data and the relay server managing data and a relation between the relay server managing data and the session managing data. The relay server managing data links to the call relay server management information of the area managing data. The relay server managing data links to a start address and an end address of the relay server managing data and stores call relay server managing data 510 in the case where the area managing data has the structure of area managing data 500 in FIG. 26. Each piece of call relay server managing data has information including "call relay server use status" through "session managing data end address" in data 520.

The session managing data stores session managing data 530 in FIG. 26. The session managing data 530 has information including the "session state" through the "call relay IP address (called party)" of data 540. The session managing data 530 links to the "session managing data start address" and the "session managing data end address" of the call relay server managing data 520.

The session managing server manages the state of the call relay server based on data shown in FIG. 25 and FIG. 26, and searches for a call relay server available and determines it upon reception of a call request made by a wireless communication apparatus.

That explains the function of the session managing server and data stored therein.

Embodiment 4

In the first through third embodiments, the internet communication system was discussed in the cases where voice data is transmitted and received between calling and called parities. It is to be noted that the voice data is an example of communication data and that the internet communication system is a system for transmitting and receiving communication data between calling and called parties. Furthermore, the mobile phone is an example of wireless communication apparatus, and the call relay server is an example of communication relay server.

In addition, the "ID" may be any one of such as a name, identification information, an identifier or an IP address as long as it can discriminate itself from others.

In addition, it is to be noted that the system components (the calling party's wireless communication apparatus unit 111, 121, the called party's wireless communication apparatus unit 112, 122, the calling party's session managing unit 211, 221, the called party's session managing unit 212, 222, the HTTP communication unit 311, 321, and the UDP communication unit 312, 322 of FIG. 1) are executed by software, hardware or a combination of software and hardware.

In addition, it is to be noted that the system components (the calling party's wireless communication apparatus unit 111, 121, the called party's wireless communication apparatus unit 112, 122, the calling party's session managing unit 211, 221, the called party's session managing unit 212, 222, the HTTP communication unit 311, 321, and the UDP communication unit 312, 322 of FIG. 1) are executed by the process of the program which is executed on a computer.

In addition, it is to be noted that the wireless communication apparatus, the session managing server, the assignment notification server and the communication relay server are all computers. Furthermore, the program is executed by the CPU (central processing unit) of a computer.

In addition, it is to be noted that the program is stored in a storage medium such as a FXD (flexible disk) or ROM (read only memory).

Embodiment 5

Figure 27:
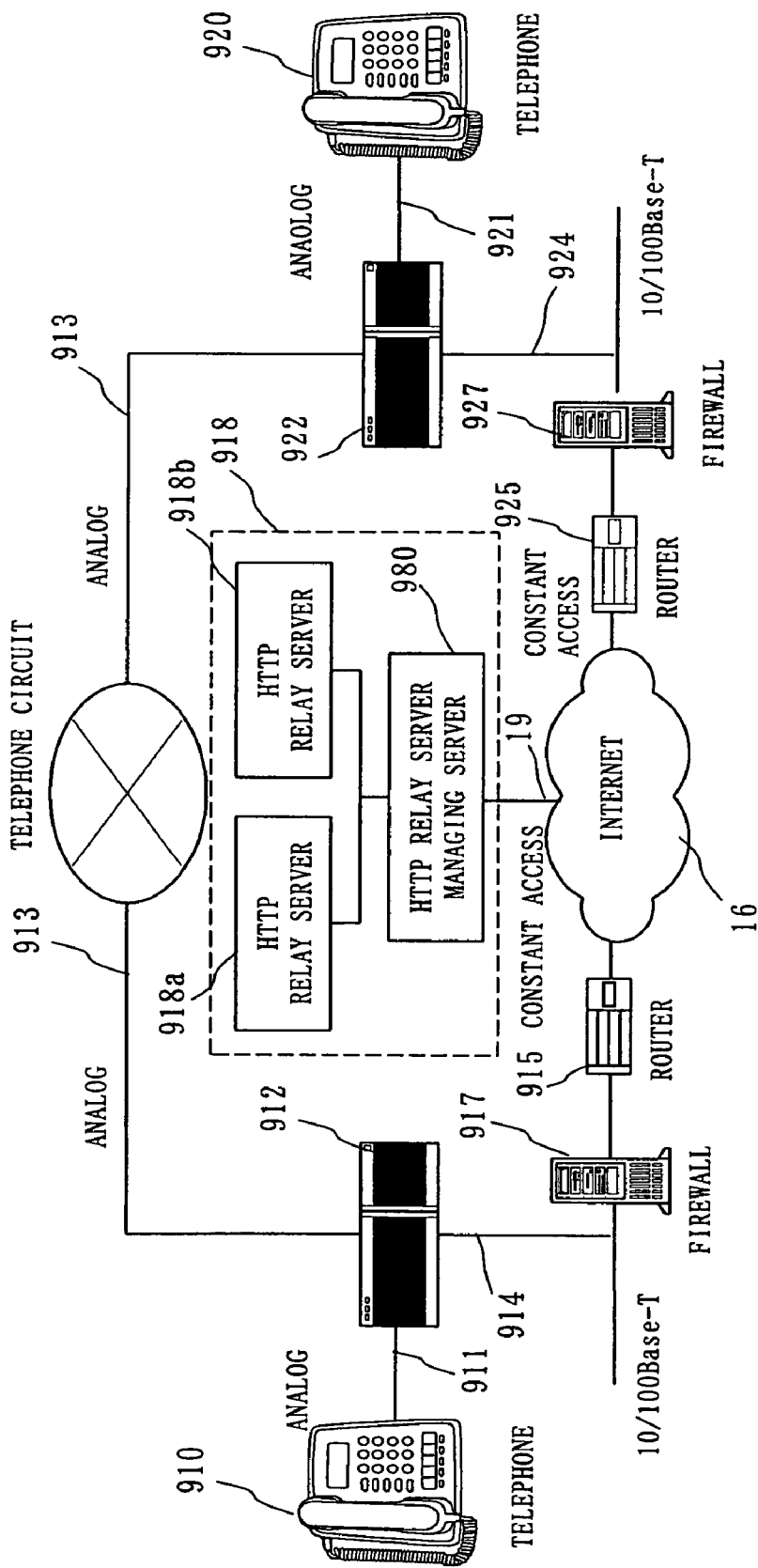
FIG. 27 is a diagram illustrating an example of the system configuration of an internet communication system.

A wireless communication apparatus such as that shown in FIG. 27 explained in the conventional example allows a call to be made through a public line other than through an IP line. This case, however, requires exclusive access control in order to avoid parallel processing with a public line based call if the call is to be processed through the IP line as discussed in the first through fourth embodiments of the present invention.

Figure 36:
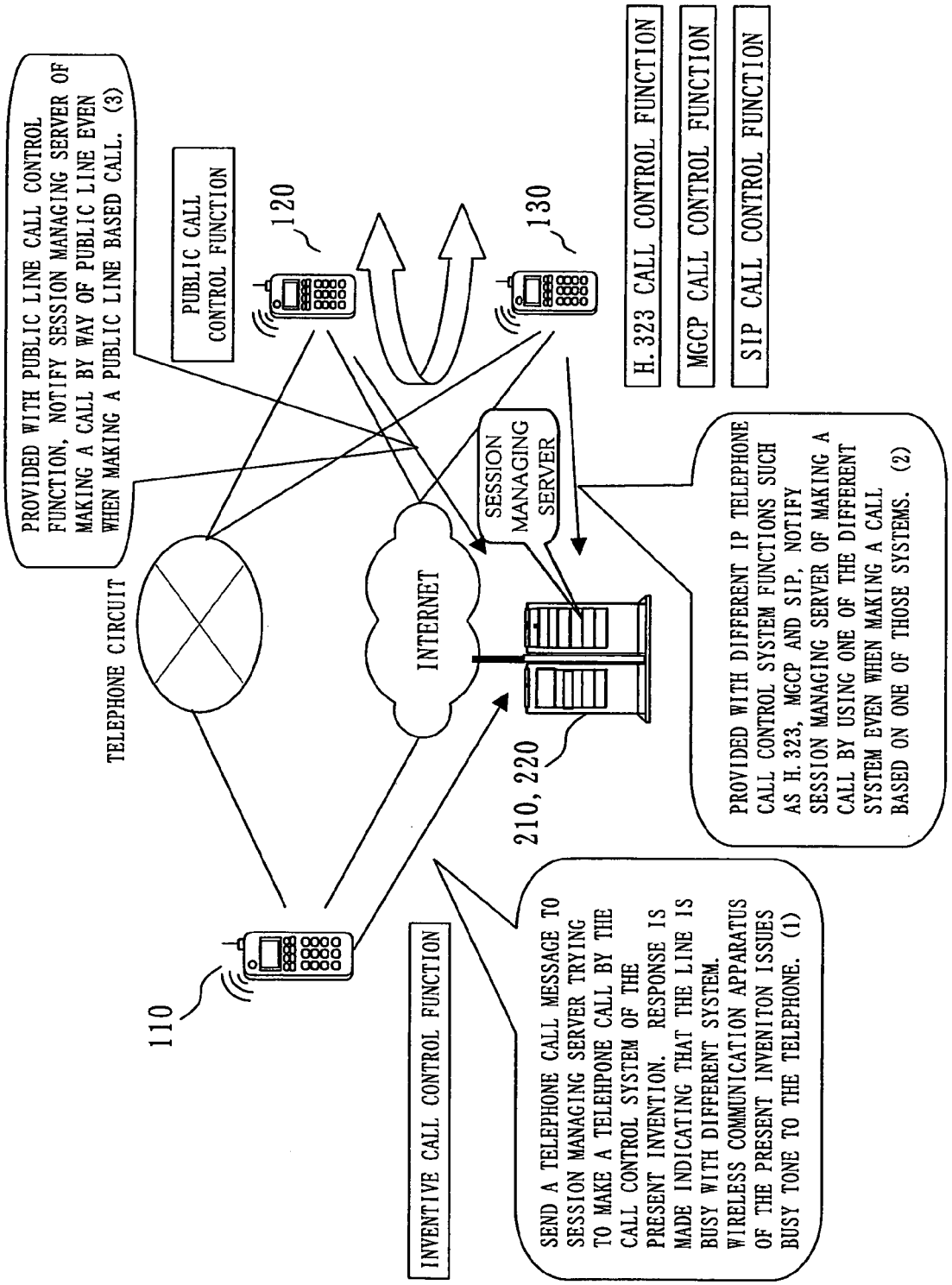
FIG. 36 is a diagram explaining a call control function between a session managing server and a called party's wireless communication apparatus according to a fifth embodiment.

Accordingly, it is designed that a wireless communication apparatus, in the case of making a call through a public line, notifies the session managing server which manages the wireless communication apparatus and also manages call control on the IP (Internet Protocol) line of information about the start and the end of the public line based call at the start and the end of the call, as indicated by (3) in FIG. 36.

In addition, a wireless communication apparatus may be provided with a function for allowing a call not only through a public line but also through other IP line based systems such as H.323 system (terminal rules for voice, video and data communications on the LAN whose service quality is not guaranteed), MGCP (Medical Gateway Control Protocol) system, and SIP (Session Initiation Protocol) system. In this case, exclusive access control is to be performed of call processing based on those communication systems. Accordingly, it is designed that a wireless communication apparatus notifies the session managing server which manages the wireless communication apparatus of information about the start and the end of an IP line based call through such a system as those indicating that the call is being made through the different system at the start and the end of the call through the different system, as indicated by (2) in FIG. 36.

Figure 37:
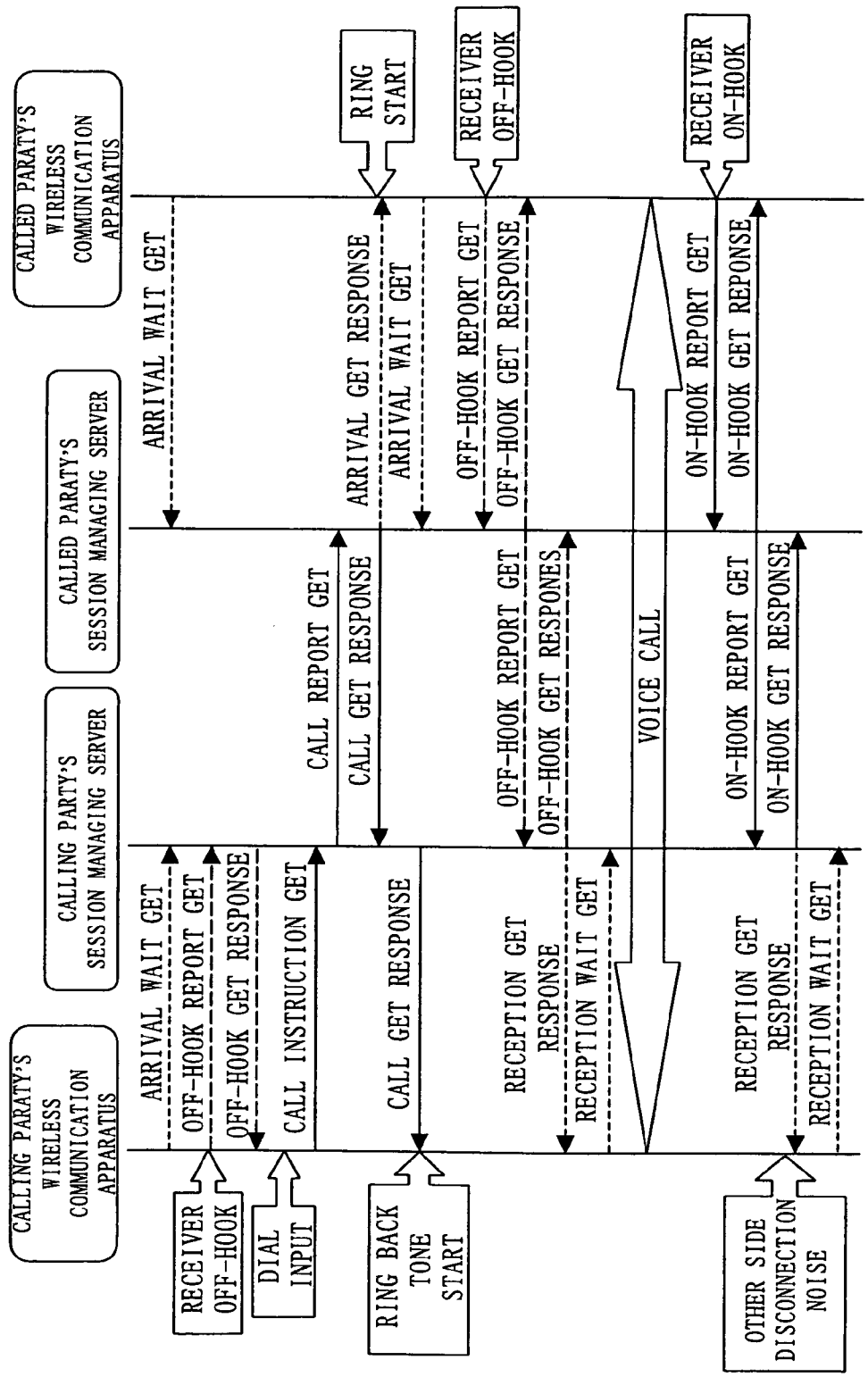
FIG. 37 is a diagram explaining a relation between a telephone operation and a call control message sequence according to the fifth embodiment.

In addition, as indicated by (1) in FIG. 36, the wireless communication apparatuses, which communicate with each other may transmit and receive each other's information about the telephone operations via the session managing server. In this case, if one of the telephones is in a calling state, the other may be controlled to make a ring back tone sound. If the other party picked up the receiver, the call may be started. If the line is cut by the receiver placed on the hook, disconnection noise may be made through the receiver of the other party. FIG. 37 illustrates an example of communication processing of a communication using the GET method of HTTP via the session managing server.

"Receiver off hook" (or, pressing call-start ON button, for example), "dial input", "ring back tone start" and "other side disconnection noise" on the left hand side of FIG. 37 and "ring start", "receiver off hook" (or, pressing call-start ON button, for example) and "receiver on hook" (or, pressing call-end ON button, for example) on the right hand side thereof are telephone operations performed by a telephone as one example of wireless communication apparatus. A call control message sequence using the GET method of HTTP is indicated by the lines with arrows.

As shown in FIG. 37, the calling party's wireless communication apparatus and the called party's wireless communication apparatus each issue a GET method notifying the session managing server of the detail of the receiver operations when performing the operation of the "receiver off hook", "dial input" or "receiver on hook" by a telephone as one example of wireless communication apparatus. Then, the session managing server, upon notification that the calling party's wireless communication apparatus performed the operation of "dial input", transmits a call GET response for performing the operation of "ring back tone start" back to the calling party's wireless communication apparatus until it receives an off hook report from the called party's session managing server. When the receiver off hook is notified to the called party's session managing server from the called party's wireless communication apparatus, an off hook report is notified to the calling party's session managing server from the called party's session managing server. Then, an arrival get response is sent to the calling party's wireless communication apparatus from the calling party's session managing server. After that, voice call is carried out between the calling party's wireless communication apparatus and the called party's wireless communication apparatus. When the voice call ends, and the called party's wireless communication apparatus performs the operation of "receiver on hook", then an on hook report is notified to the calling party's session managing server from the called party's session managing server. Then, the calling party's session managing server notifies the calling party's wireless communication apparatus of the arrival GET response, and the calling party's wireless communication apparatus makes it transmit a disconnection noise informing that the other party's receiver is placed on the hook or on hook, through the telephone.

As aforementioned, the session managing server is allowed to collect information about the start and the end of a call by a different call control system and the telephone operations through notification from the wireless communication apparatus. For that reason, if those pieces of information are outputted and stored as log information when transmitted and received, information about various types of call use used by the user may be collected. As a result, the duration of a call may be confirmed, which may be used as service charge information.

In addition, software for analyzing and arranging this call relating log information may be implemented in such as the session managing server. This may allow the system administrator to refer to call history information by day and by month, as shown in FIG. 38, and check the operating state of the system. FIG. 38 shows an example of tabular display of a day-based summary and a month-based summary. The system administrator is allowed to create a table shown in FIG. 38 (or a corresponding file in such as a CSV (abbreviation of Comma Separated Value) form) based on the respective call information files obtained through a software tool for analyzing the log information of the session managing server, display it through such as the Web browser, and refer to it. The total number of calls and a maximum number of instantaneous and simultaneous calls may alternatively be displayed by graphical representation.

Embodiment 6

If every wireless communication apparatus is allocated a fixed global IP address, it is basically possible to transmit and receive various types of information directly by using any protocols. However, with Ipv4 (Internet Protocol Version 4), most wireless communication apparatuses are connected indirectly to the Internet. Therefore, in many cases, the wireless communication apparatuses are allocated private IP addresses through address translation from the routers having fixed global IP addresses allocated. With those routers, the firewall function for such as blocking access to port numbers not used is set up in many cases together with an address translation function such as NAT (Network Address Translation) and IP Masquerade (Internet Protocol Masquerade).

Furthermore, with an internet line available for ordinary household, a global IP address or a private IP address within a domain is allocated to each household in most cases. For that reason, in many cases, two or more personal computers are connected to the Internet at home by way of a SOHO (Small Office Home Office) router, which is designed for home or small sized office use. Also with this SOHO router, address translation is performed, and the firewall function is installed in many cases.

As aforementioned, the general application level communication protocols which may allow the wireless communication apparatus whose address translation may be performed twice or more into a private IP address as a result of passing through two or more routers to access an external wireless communication apparatus, includes HTTP and SMTP (Simple Mail Transfer Protocol).

In addition, in the current situation where Ipv4 is popular, an IP address, whether it is a global IP address or a private IP address, is allocated dynamically in very many cases. For allocating an IP address thus dynamically, it is designed that the assignment notification server is provided with a DHCP (Dynamic Host Configuration Protocol) server function and each wireless communication apparatus is provided with a DHCP customer function.

For that reason, it is substantially impossible in many cases for a wireless communication apparatus to employ an IP address as addressing for specifying a destination.

Having mentioned previously, a wireless communication apparatus within each domain which is under area management by such as a firewall and a NAT router (referred to in many cases as a SOHO router or a broadband router) communicates with a wireless communication apparatus outside the domain or various types of servers in external domains by way of the session managing server and the call relay server installed in the DMZ (De-Militarized Zone) of that domain.

Figure 39:
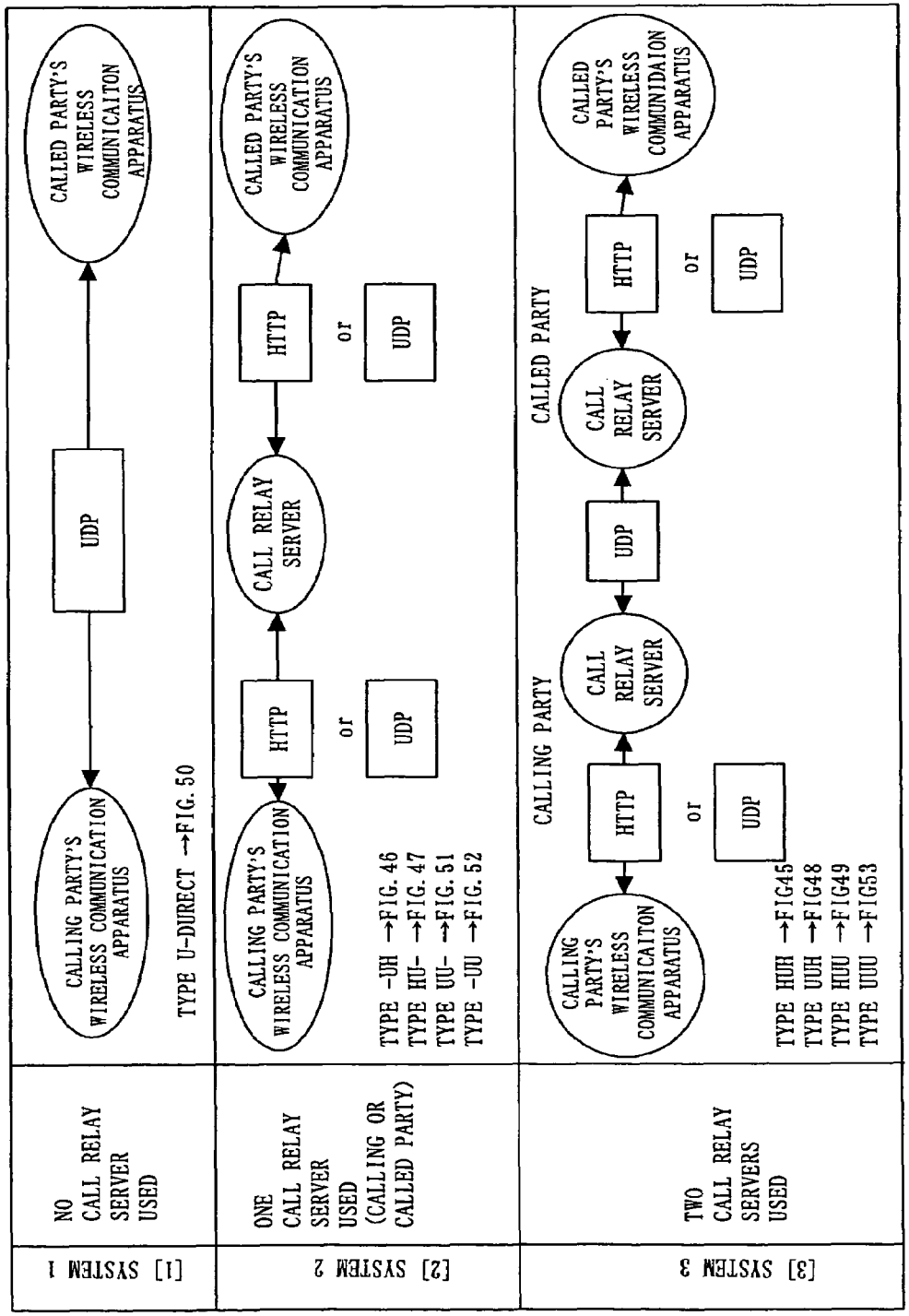
FIG. 39 is a diagram illustrating the types of a call relay system between a wireless communication apparatus and a call relay server according to a sixth embodiment.

FIG. 39 shows types of call relay systems, namely system 1 to system 3, for real-time data communications between a wireless communication apparatus and a call relay server.

With referring to the types of call relay systems of FIG. 39, "System 1" represents the type in which the call relay server is not used, "System 2" represents the type in which a single call relay server is used by one of the calling party and the called party, and "System 3" represents the type in which two call relay servers are used by the calling and called parties, respectively.

With System 1, the calling party's wireless communication apparatus and the called party's wireless communication apparatus communicate with each other by using UDP. This is called Type "U Direct".

With System 2, the calling party's wireless communication apparatus and the call relay server communicate with each other by using HTTP or UDP. Then, the called party's wireless communication apparatus and the call relay server communicate with each other by using HTTP or UDP. The call relay server may be used by the called party, the call relay server and the called party's wireless communication apparatus may communicate with each other by using HTTP, and the calling party's wireless communication apparatus and the called party's call relay server may communicate with each other by using UDP. This is called Type "-UH". The call relay server may be used by the calling party, the calling party's wireless communication apparatus and the call relay server may communicate with each other by using HTTP, and the calling party's call relay server and the called party's wireless communication apparatus may communicate with each other by using UDP. This is called Type "HU-". Furthermore, the call relay server may be used by the calling party, the calling party's wireless communication apparatus and the calling party's call relay server may communicate with each other by using UDP, and the calling party's call relay server and the called party's wireless communication apparatus may communicate with each other by using UDP. This is called Type "UU-". Still further, the call relay server may be used by the called party, the called party's call relay server and the called party's wireless communication apparatus may communicate with each other by using UDP, and the calling party's wireless communication apparatus and the called party's call relay server may communicate with each other by using UDP. This is called Type "-UU".

Then, with System 3, the calling party's wireless communication apparatus and the calling party's call relay server communicate with each other by using HTTP or UDP, the calling party's call relay server and the called party's call relay server communicate with each other by using UDP, and the called party's call relay server and the called party's wireless communication apparatus communicate with each other by using HTTP or UDP. The calling party's wireless communication apparatus and the calling party's call relay server may communicate with each other by using HTTP, and the called party's call relay server and the called party's wireless communication apparatus may communicate with each other by using HTTP. This is called Type "HUH". The calling party's wireless communication apparatus and the calling party's call relay server may communicate with each other by using UDP, and the called party's call relay server and the called party's wireless communication apparatus may communicate with each other by using HTTP. This is called Type "UUH". The calling party's wireless communication apparatus and the calling party's call relay server may communicate with each other by using HTTP, and the called party's call relay server and the called party's wireless communication apparatus may communicate with each other by using UDP. This is called Type "HUU". The calling party's wireless communication apparatus and the calling party's call relay server may communicate with each other by using UDP, and the called party's call relay server and the called party's wireless communication apparatus may communicate with each other by using UDP. This is called Type "UUU".

A method of judging used or unused about the call relay server in a call between wireless communication apparatuses is discussed below.

Procedure in the method of judgement is as follows:
(1) It is judged that the domains assigned to the calling party's wireless communication apparatus and the called party's wireless communication apparatus match or not.
(2) In the case where the assigned domains match, the "call relay server" is judged if it is used or not used based on a "method of intra-domain call relay judgement" shown in FIG. 42.
(3) In the case where the assigned domains do not match, the use or disuse of the "call relay server" is judged based on the server type (general purpose/ISP) of the session managing server and a "method of extra-domain call relay judgement" shown in FIG. 43.

As aforementioned, in the current situation where there are various types of network address environment, any communications may be carried out by using HTTP as a basis. However, it is desirable to use UDP such as RTP wherever possible in real-time communication.

For example, the following shows the cases in which UDP is applicable.

Every wireless communication apparatus is allocated a global IP address (fixed, DHCP).

Every wireless communication apparatus is allocated a private IP address (fixed, DHCP) inside the same domain.

Firewall may be set up such that a desirable UDP port is accessible.

In various cases such as those mentioned above, the type of the connection terminal of the wireless communication apparatus may be prescribed so that UDP can be used as much as possible, and information about the type may be exchanged with each other between the wireless communication apparatuses while call control is, being set up. This enables a UDP based communication.

The following lists access conditions of the wireless communication apparatus according to a sixth embodiment of the present invention.
(1) global IP address (fixed)
(2) private IP address (fixed)
(3) global IP address (DHCP)
(4) private IP address (DHCP)

The private IP address in (2) or (4) means an IP address to be allocated within the assigned domain.
(i) When a further localized IP address is allocated by such as a SOHO router within the domain:
(i-1) A call relay server for managing the domain is installed within the domain.
(i-2) A call relay server for managing the domain is not installed within the domain.
(ii) When a private IP address allocated within the domain is directly used:
(ii-1) A call relay server for managing the domain is installed within the domain.
(ii-2) A call relay server for managing the domain is not installed within the domain.

FIG. 40 shows terminal connection types (A~E, P~R) below based on the combinations of conditions (1) to (4) and (i-1), (i-2), (ii-1) or (ii-2) above. In FIG. 40, (1), (2), (3) and (4) and (i-1), (i-2), (ii-1) and (ii-2) correspond, respectively, to (1) to (4) and (i-1), (i-2), (ii-1) and (ii-2).

Figure 41:
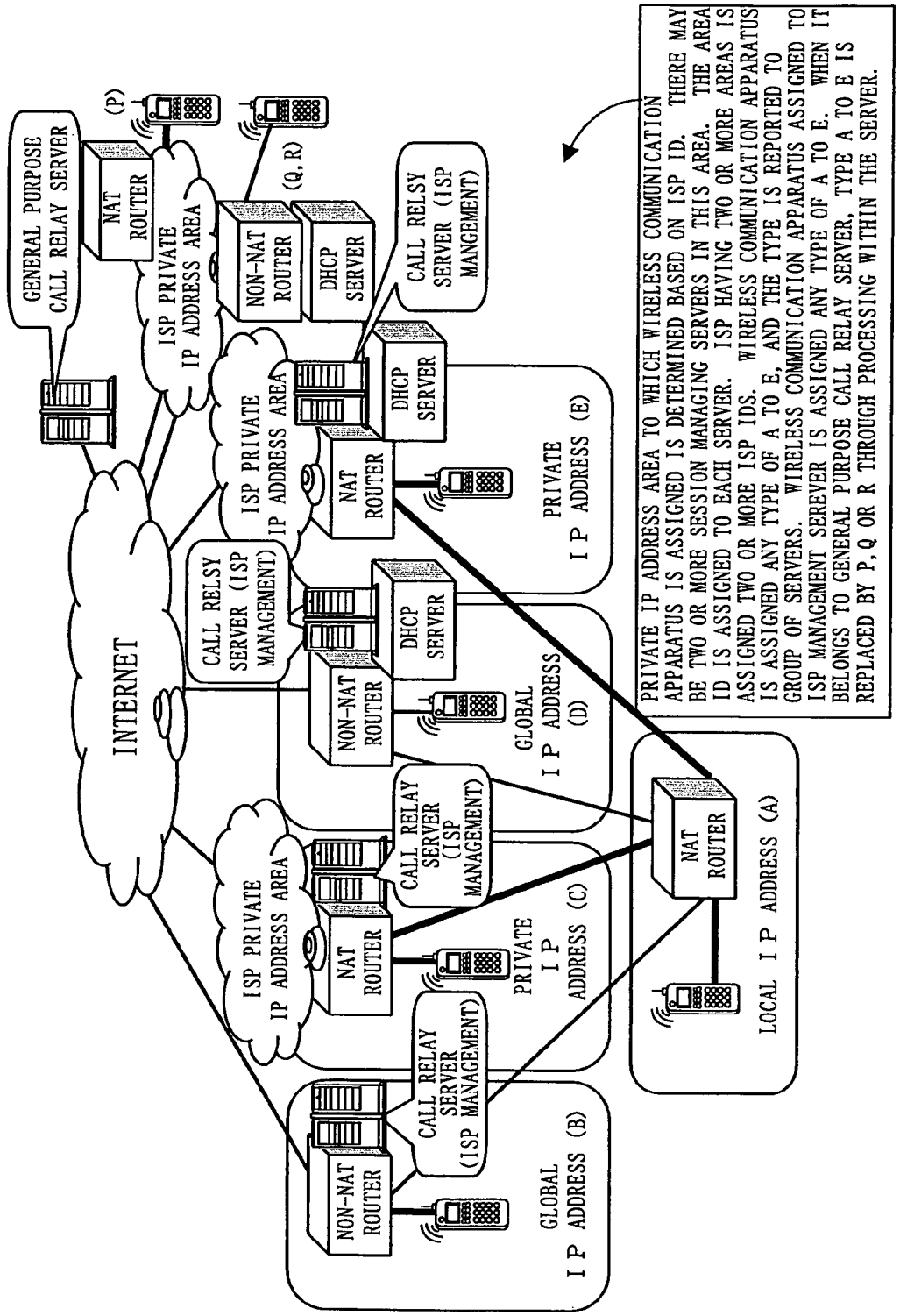
FIG. 41 is a diagram explaining a connection system between a wireless communication apparatus and a call relay server based on the terminal connection type according to the sixth embodiment.

FIG. 41 illustrates connection systems between the wireless communication apparatus and the call relay server for each terminal connection type A~E, P, Q, R shown in FIG. 40.

With referring to FIG. 41, a private IP address area to which the wireless communication apparatus is assigned is determined by an ISP ID (identification information for identifying an internet service provider). There are two or more session managing servers provided in this area in some cases, and an area ID is assigned to each session managing server. An ISP having two or more areas is assigned two or more ISP IDs. The wireless communication apparatus is assigned one of the types of A through E, which is informed to the group of servers. The wireless communication apparatus, which is assigned to an ISP management server, is to be assigned one of the types of A through E. If the wireless communication apparatus is assigned to a general-purpose call relay server, the type A-E is replaced by P, Q, R, through internal processing in the server.

With the type "B" of FIG. 40, a wireless communication apparatus, a router, a call relay server (a session managing server is to be installed also in the same position) and the Internet are connected through a connection mode such as that indicated by (B) in FIG. 41.

Then, with the type "C" of FIG. 40, like (C) shown in FIG. 41, a wireless communication apparatus, a call relay server (a session managing server is to be installed also in the same position), a router and the Internet are connected.

Then, with the type "D" of FIG. 40, as indicated by (D) in FIG. 41., a wireless communication apparatus, a router, a call relay server (a session managing server is to be installed also in the same position), the Internet and a DHCP server are connected.

Then, with the type "E" of FIG. 40, like (E) in FIG. 41, a wireless communication apparatus, a router, a call relay server (a session managing server is to be installed also in the same position), the Internet and a DHCP server are connected.

Then, with the type "A" of FIG. 40, like (A) in FIG. 41, a router connecting a wireless communication apparatus is connected with a higher router in the hierarchy, and the higher router and a call relay server are connected to the Internet. With the type "A", the router has a hierarchical structure, in which a wireless communication apparatus is connected with a lower layer router. For that reason, an IP address assigned to the wireless communication apparatus of this case is to be called a local IP address.

Then, with the type "Q" and the type "R" of FIG. 40, there is no call relay server installed in the domain for managing the domain. For that reason, like (Q) and (R) of FIG. 41, a wireless communication apparatus is connected with a router, a DHCP server, a session managing server (a session managing server is to be installed also in the same position), and the Internet.

Then, with the type "P" of FIG. 40, there is no call relay server installed in the domain for managing the domain. On top of it, a private IP address allocated within the domain is directly used. For that reason, a wireless communication apparatus is connected to the Internet as indicated by (P) of FIG. 41. Further with the type "P", a wireless communication apparatus may be assigned immediately under a SOHO router within the domain. For that reason, It may be considered that a wireless communication apparatus is allocated an IP address under the situation where no call relay sever is installed in the domain for managing the domain. In this case, the wireless communication apparatus is connected to the Internet as indicated by (P) of FIG. 41.

Next, FIG. 42 and FIG. 43 show tables illustrating relay system judging methods for each terminal connection type.

FIG. 42 shows the method of judging a call relay system in a communication between the parties, which belong to the same domain.

In FIG. 42, A through E correspond, respectively, to the A through E of FIG. 40. Then, [1], [2] in FIG. 42 correspond, respectively, to the [1], [2] of FIG. 39.

FIG. 42 illustrates the types of transmitting party's wireless communication apparatuses vertically and the types of receiving party's wireless communication apparatuses horizontally.

With referring to FIG. 42, in the case where a calling party's wireless communication apparatus and a called party's wireless communication apparatus are installed in the same domain, a call between those wireless communication apparatuses involves no call relay server outside the domain. For that reason, if the type of the calling party's wireless communication apparatus matches the type of the called party's wireless communication apparatus, a call is to be made through the relay system [1]. In the case where one of the wireless communication apparatuses of the calling and called parties is arranged immediately under a NAT router and allocated a local IP address, a call is to be made through the relay method [2].

FIG. 43 shows a method of judging a call relay system in a communication between the parties, which do not belong to the same domain.

In FIG. 43, A through E and P through R correspond, respectively, to the A through E and P through R of FIG. 40. Then, [1] through [3] in FIG. 43 correspond, respectively, to the [1] through [3] of FIG. 39.

FIG. 43 illustrates the types of transmitting party's wireless communication apparatuses vertically and the types of receiving party's wireless communication apparatuses horizontally.

It is to be noted that, with the relay method [2], in order to identify the call relay server to be used whether it is of the transmitting side or of the reception side, (transmitting party) or (receiving party) is added thereto for clarity.

The session managing server acquires information about the terminal connection types of the wireless communication apparatuses of the calling and called parities in the call control process, determines a call relay system based on the tables of FIG. 42 and FIG. 43, and transmits information about the system to the respective wireless communication apparatuses. In the case where a call relay server is required, the session managing server notifies the respective wireless communication apparatuses of the IP address of the call relay server and the assignment of HTTP or UDP.

Figure 44:
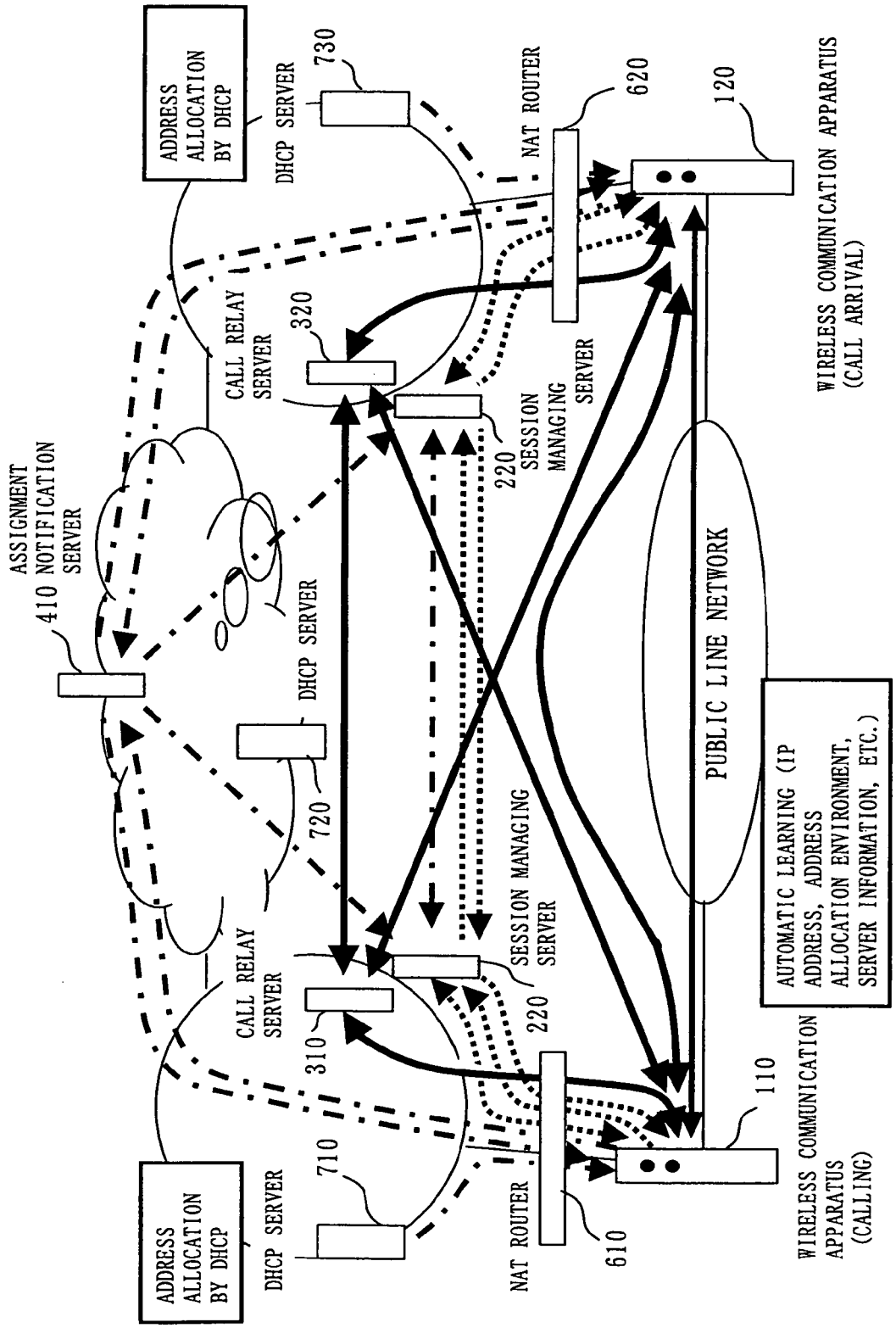
FIG. 44 is a diagram illustrating the procedure of transmission and reception of a call control message according to the connection type of the wireless communication apparatus in the internet telephone network system configuration according to the sixth embodiment.

FIG. 45 through FIG. 53 show the transmitting and receiving procedures of call control messages corresponding to the connection types of the respective wireless communication apparatuses in the system configuration of an internet telephone network system shown in FIG. 44.

It is to be noted that the wireless communication apparatus, which is arranged immediately under the NAT router is allocated the terminal connection type of A or P, and voice data is transmitted and received by HTTP. However, it is possible that (static) NAT setup is made for a NAT router so that the NAT router transmits and receives voice data using UDP via a UDP port directly to and from the wireless communication apparatus. In other words, it is allowed to transmit and receive voice data by using UDP between the communication relay server and the NAT router. For that reason, it is desirable that the wireless communication apparatus should just set up a terminal connection type not of A or P but of B, C, D, E, Q or R corresponding to the location of the NAT router. This allows UDP based voice data transmission and reception even in the case where the wireless communication apparatus is connected immediately under the NAT router. As a result, the call quality is enhanced.

Figure 45:
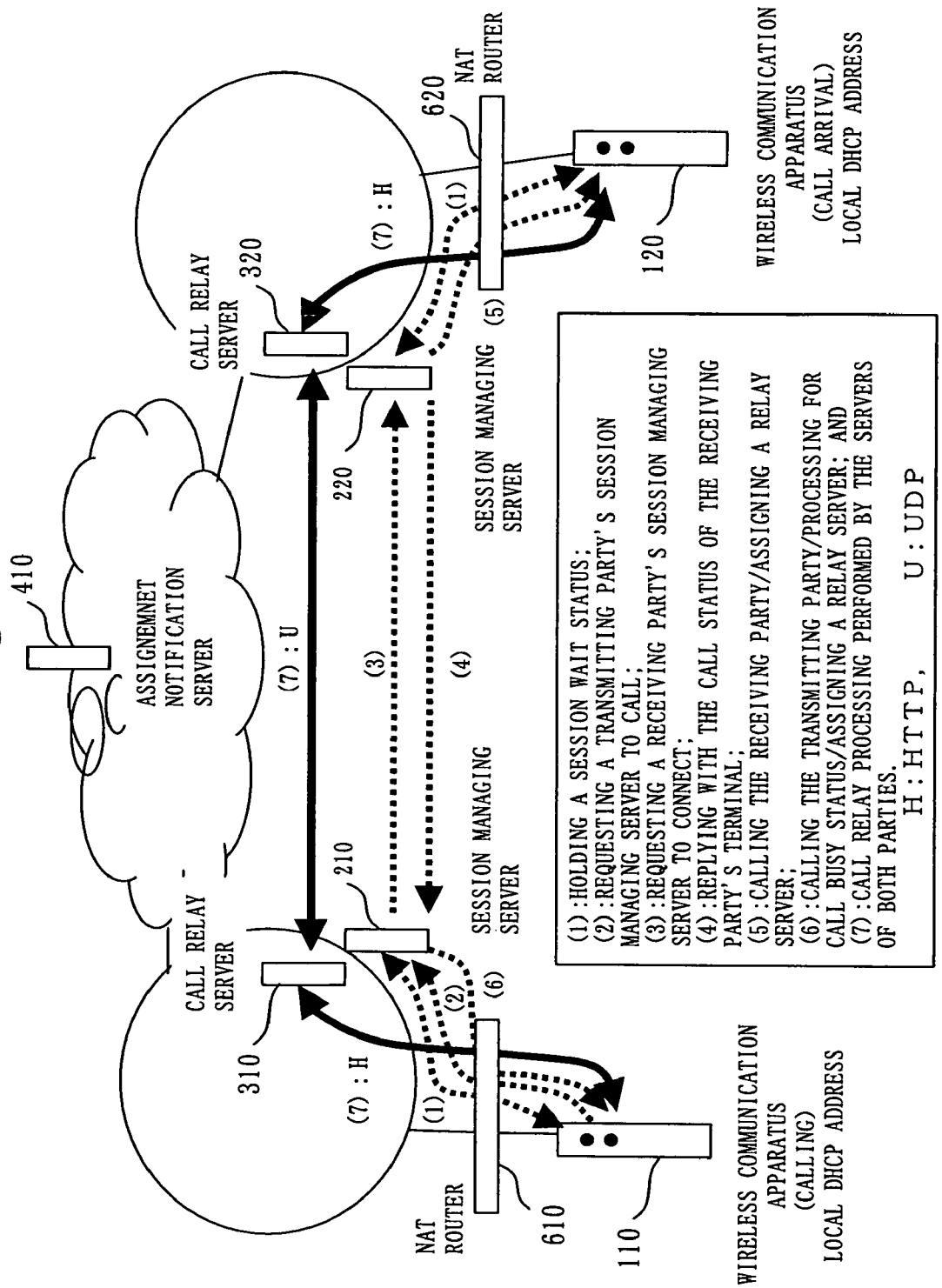
FIG. 45 is a diagram illustrating an example of the procedure of transmission and reception of a message according to the sixth embodiment.

FIG. 45 illustrates a message transmitting and receiving procedure according to Type "HUH" of the system 3 shown in FIG. 39.

With the message transmitting and receiving procedure according to Type "HUH", a message is transmitted and received through the procedure from (1) to (7) shown in FIG. 45. The following details the procedure from (1) to (7).

It is to be noted that "H" in FIG. 45 indicates an HTTP based communication and "U" indicates a UDP based communication.

(1) holding a session wait status;
(2) requesting a transmitting party's session managing server to call;
(3) requesting a receiving party's session managing server to connect;
(4) replying with the call status of the receiving party's terminal;
(5) calling the receiving party/assigning a relay server;
(6) calling the transmitting party/processing for the call busy status/assigning a relay server; and
(7) call relay processing performed by the servers of both parties.

Figure 46:
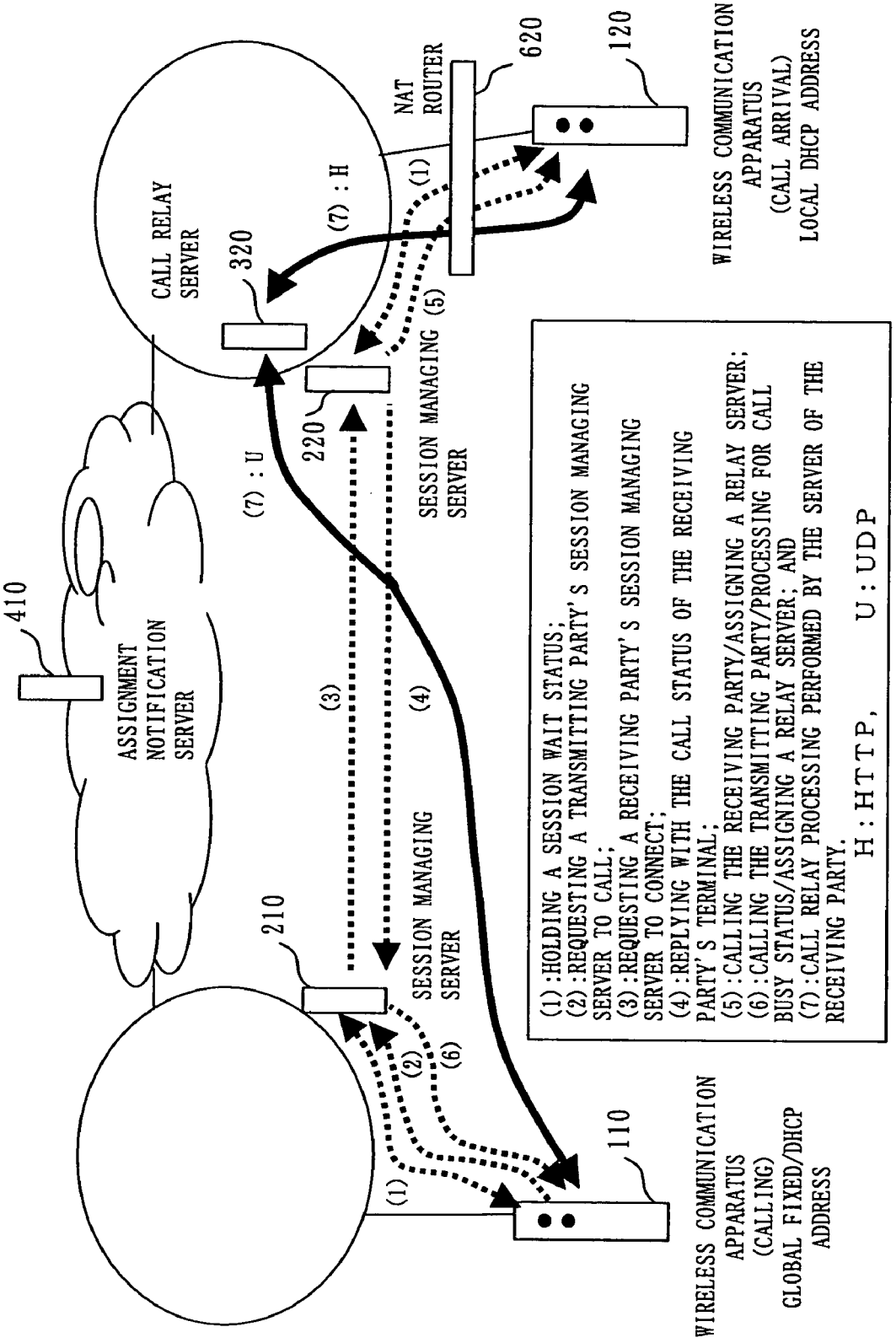
FIG. 46 is a diagram illustrating an example of the procedure of transmission and reception of a message according to the sixth embodiment.

FIG. 46 illustrates a message transmitting and receiving procedure according to Type "-UH" of system 2 shown in FIG. 39.

With Type "-UH", a message is transmitted and received through the procedure from (1) to (7) below.

It is to be noted that "H" in FIG. 46 indicates HTTP and "U" indicates UDP.

(1) holding a session wait status;
(2) requesting a transmitting party's session managing server to call;
(3) requesting a receiving party's session managing server to connect;

(4) replying with the call status of the receiving party's terminal;
(5) calling the receiving party/assigning a relay server;
(6) calling the transmitting party/processing for the call busy status/assigning a relay server; and
(7) call relay processing performed by the receiving party's server.

Figure 47:
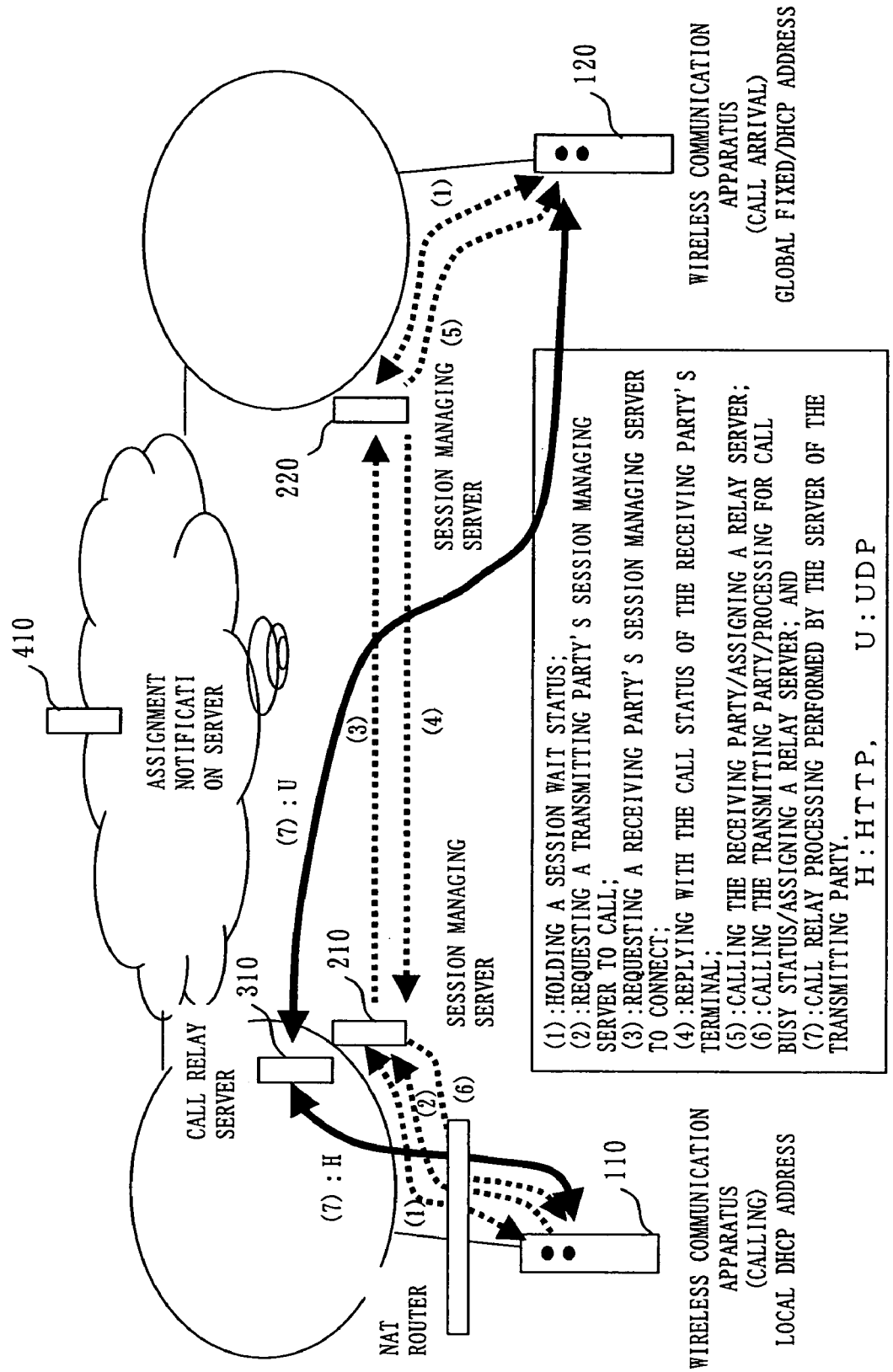
FIG. 47 is a diagram illustrating an example of the procedure of transmission and reception of a message according to the sixth embodiment.

FIG. 47 illustrates a message transmitting and receiving procedure according to Type "-HU" of system 2 shown in FIG. 39.

With Type "-HU", a message is transmitted and received through the procedure from (1) to (7) below.

It is to be noted that "H" in FIG. 47 indicates HTTP and "U" indicates UDP.
(1) holding a session wait status;
(2) requesting a transmitting party's session managing server to call;
(3) requesting a receiving party's session managing server to connect;
(4) replying with the call status of the receiving party's terminal;
(5) calling the receiving party/assigning a relay server;
(6) calling the transmitting party/processing for the call busy status/assigning a relay server; and
(7) call relay processing performed by the transmitting party's server.

Figure 48:
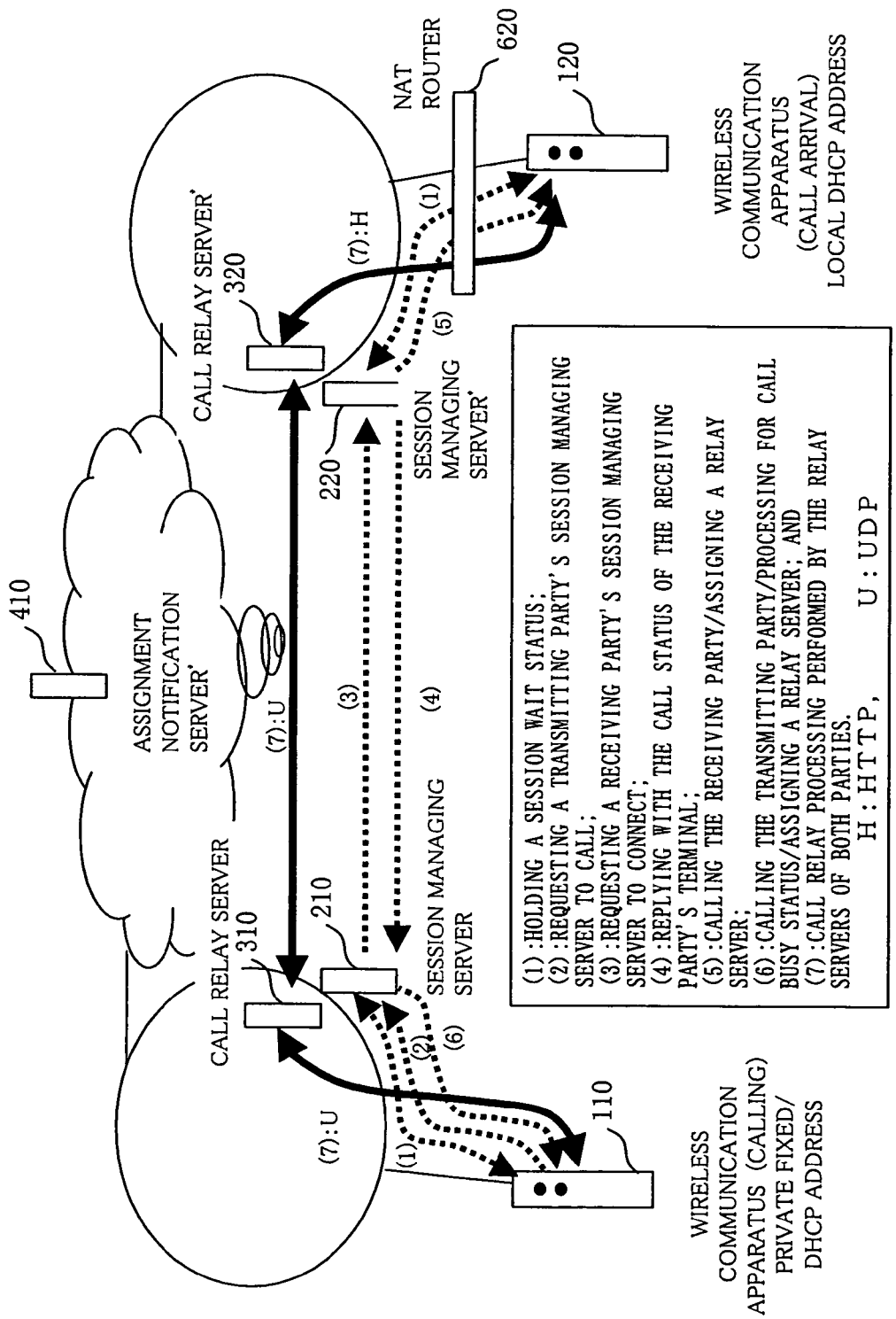
FIG. 48 is a diagram illustrating an example of the procedure of transmission and reception of a message according to the sixth embodiment.

FIG. 48 illustrates a message transmitting and receiving procedure according to Type "UUH" of system 3 shown in FIG. 39.

With Type "UUH", a message is transmitted and received through the procedure from (1) to (7) below.

It is to be noted that "H" in FIG. 48 indicates HTTP and "U" indicates UDP.
(1) holding a session wait status;
(2) requesting a transmitting party's session managing server to call;
(3) requesting a receiving party's session managing server to connect;
(4) replying with the call status of the receiving party's terminal;
(5) calling the receiving party/assigning a relay server;
(6) calling the transmitting party/processing for the call busy status/assigning a relay server; and
(7) call relay processing performed by the relay servers of the both parties.

Figure 49:
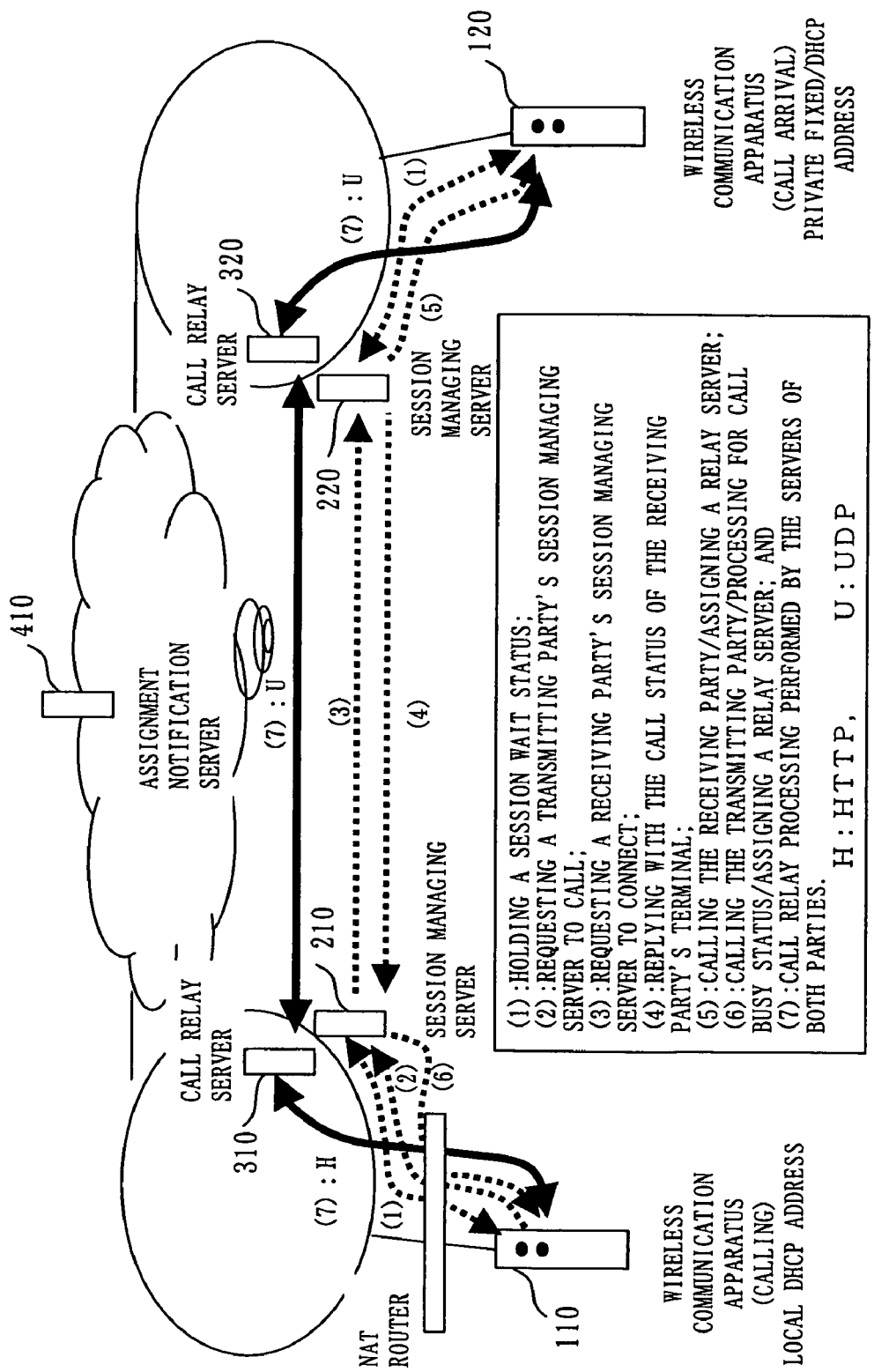
FIG. 49 is a diagram illustrating an example of the procedure of transmission and reception of a message according to the sixth embodiment.

FIG. 49 illustrates a message transmitting and receiving procedure according to Type "HUU" of system 3 shown in FIG. 39.

With Type "HUU", a message is transmitted and received through the procedure from (1) to (7) below.

It is to be noted that "H" in FIG. 49 indicates HTTP and "U" indicates UDP.
(1) holding a session wait status;
(2) requesting a transmitting party's session managing server to call;
(3) requesting a receiving party's session managing server to connect;
(4) replying with the call status of the receiving party's terminal;
(5) calling the receiving party/assigning a relay server;
(6) calling the transmitting party/processing for the call busy status/assigning relay server; and
(7) call relay processing performed by the servers of both parties.

Figure 50:
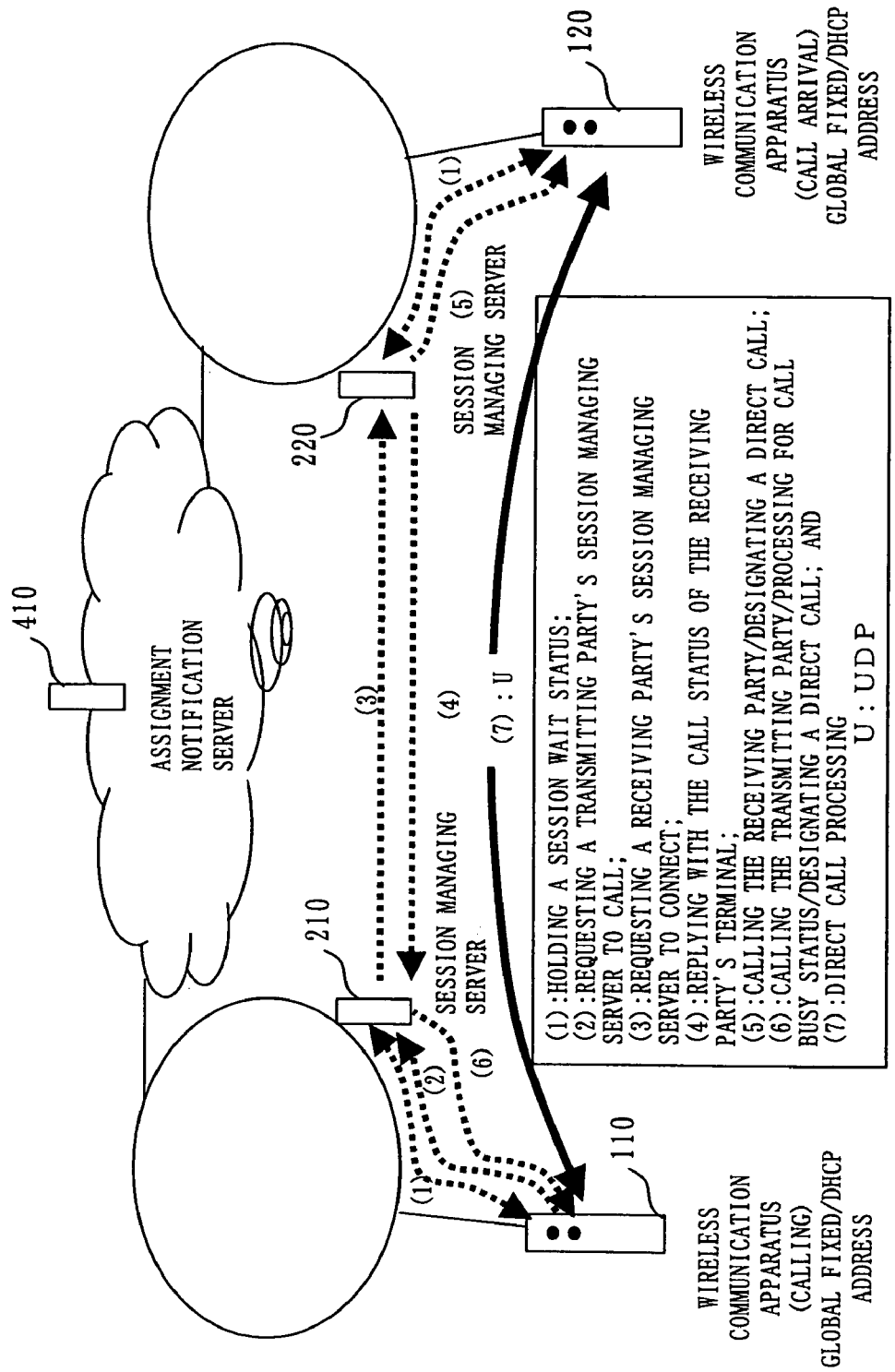
FIG. 50 is a diagram illustrating an example of the procedure of transmission and reception of a message according to the sixth embodiment.

FIG. 50 illustrates a message transmitting and receiving procedure according to Type "U Direct" of system 1 shown in FIG. 39.

With type "UDirect", a message is transmitted and received through the procedure from (1) to (7) below.

It is to be noted that "U" in FIG. 50 indicates UDP.
(1) holding a session wait status;
(2) requesting a transmitting party's session managing server to call;
(3) requesting a receiving party's session managing server to connect;
(4) replying with the call status of the receiving party's terminal;
(5) calling the receiving party/designating a direct call;
(6) calling transmitting party/processing for the call busy status/designating a direct call; and
(7) direct call processing.

Figure 51:
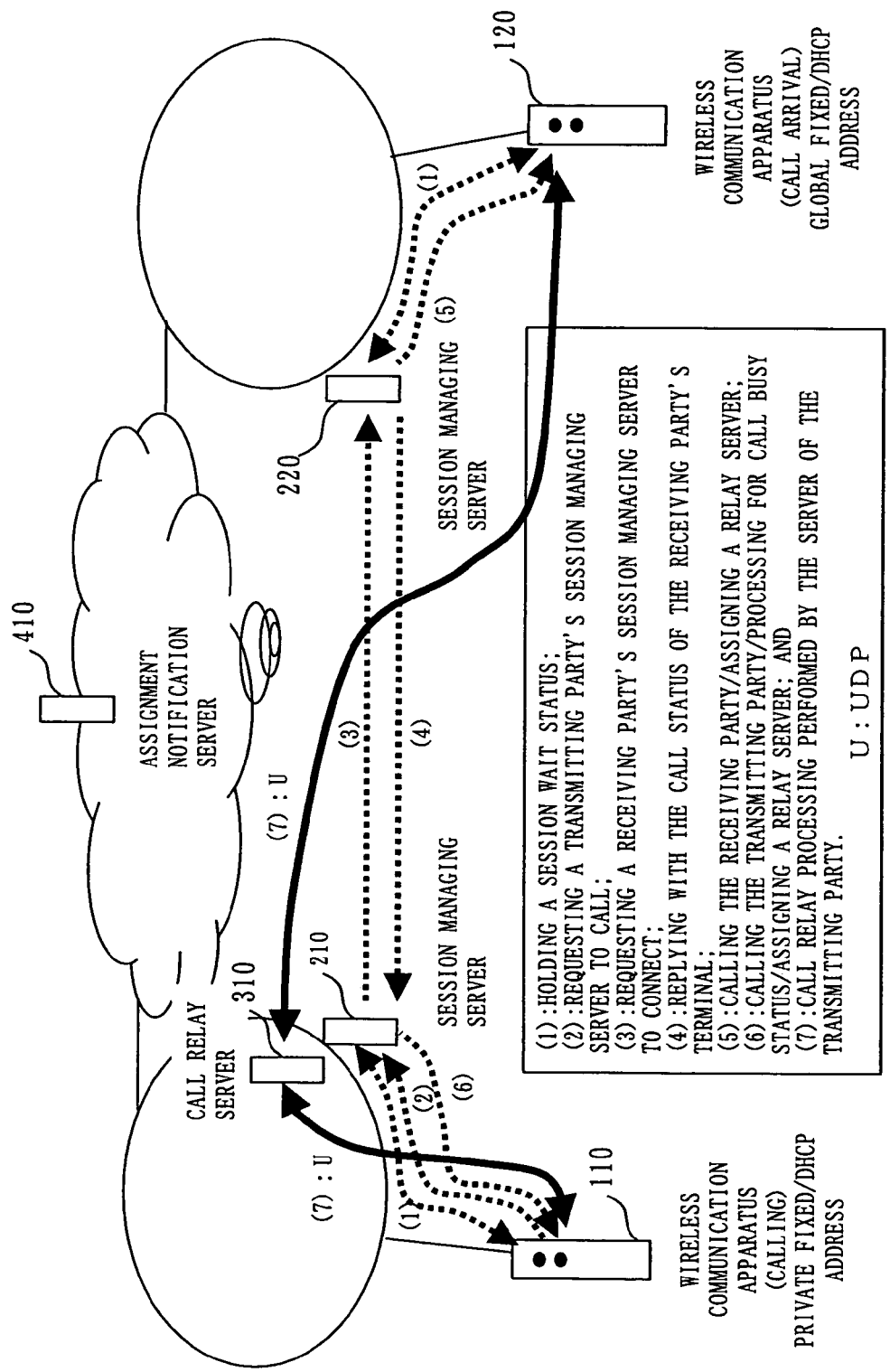
FIG. 51 is a diagram illustrating an example of the procedure of transmission and reception of a message according to the sixth embodiment.

FIG. 51 illustrates a message transmitting and receiving procedure according to Type "UU-" of system 2 shown in FIG. 39.

With Type "UU-", a message is transmitted and received through the procedure from (1) to (7) below.

It is to be noted that "U" in FIG. 51 indicates UDP.
(1) holding a session wait status;
(2) requesting a transmitting party's session managing server to call;
(3) requesting a receiving party's session managing server to connect;
(4) replying with the call status of the receiving party's terminal;
(5) calling the receiving party/assigning a relay server;
(6) calling the transmitting party/processing for the call busy status/assigning a relay server; and
(7) call relay processing by the receiving party's server.

Figure 52:
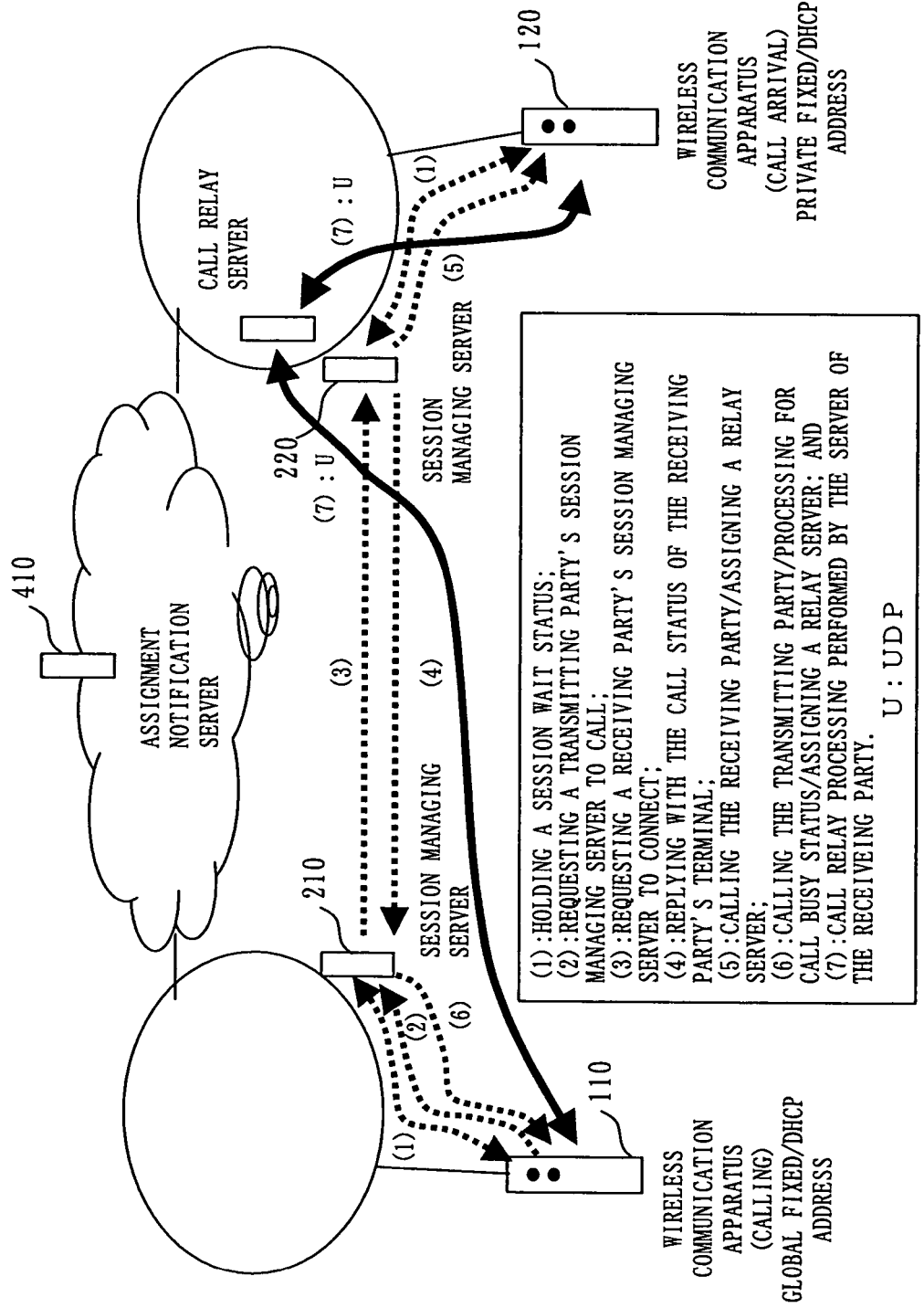
FIG. 52 is a diagram illustrating an example of the procedure of transmission and reception of a message according to the sixth embodiment.

FIG. 52 illustrates a message transmitting and receiving procedure according to Type "-UU" of system 2 shown in FIG. 39.

With Type "-UU", a message is transmitted and received through the procedure from (1) to (7) below.

It is to be noted that "U" in FIG. 52 indicates UDP.
(1) holding a session wait status;
(2) requesting a transmitting party's session managing server to call;
(3) requesting a receiving party's session managing server to connect;
(4) replying with the call status of the receiving party's terminal;
(5) calling the receiving party/assigning a relay server;
(6) calling the transmitting party/processing for the call busy status/assigning a relay server; and
(7) call relay processing by the receiving party's server.

Figure 53:
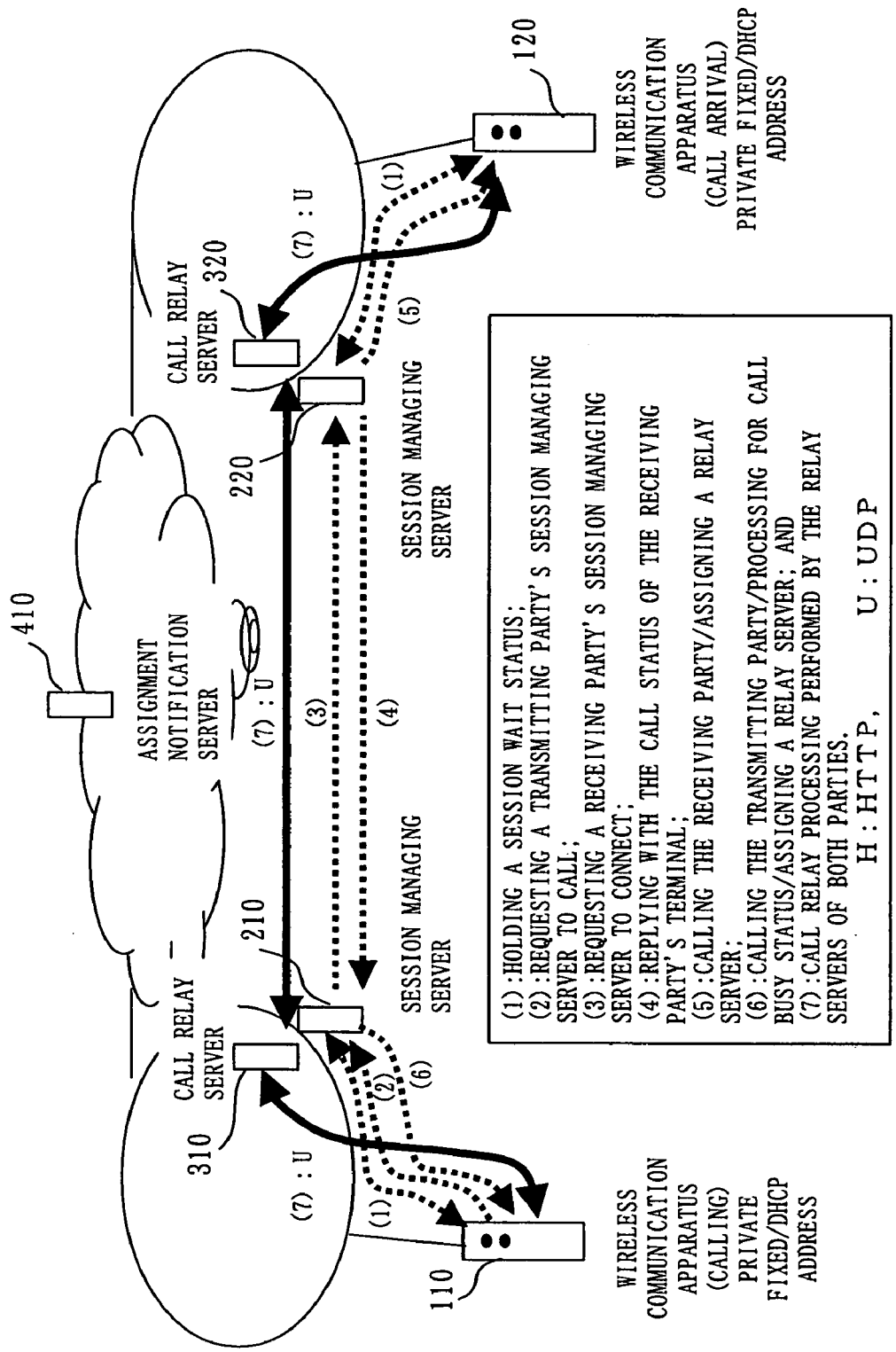
FIG. 53 is a diagram illustrating an example of the procedure of transmission and reception of a message according to the sixth embodiment.

FIG. 53 illustrates a message transmitting and receiving procedure according to Type "UUU" of system 2 shown in FIG. 39.

With Type "UUU", a message is transmitted and received through the procedure from (1) to (7) below.

It is to be noted that "U" in FIG. 53 indicates UDP.
(1) holding a session wait status;
(2) requesting a transmitting party's session managing server to call;
(3) requesting a receiving party's session managing server to connect;
(4) replying with the call status of the receiving party's terminal;
(5) calling the receiving party/assigning a relay server;
(6) calling the transmitting party/processing for the call busy status/assigning a relay server; and
(7) call relay processing by the relay servers of both parties.

Embodiment 7

In a seventh embodiment, a description is given of an example in which the assignment notification server provided with a remote control maintenance server function acts as a remote control maintenance server.

Figure 54:
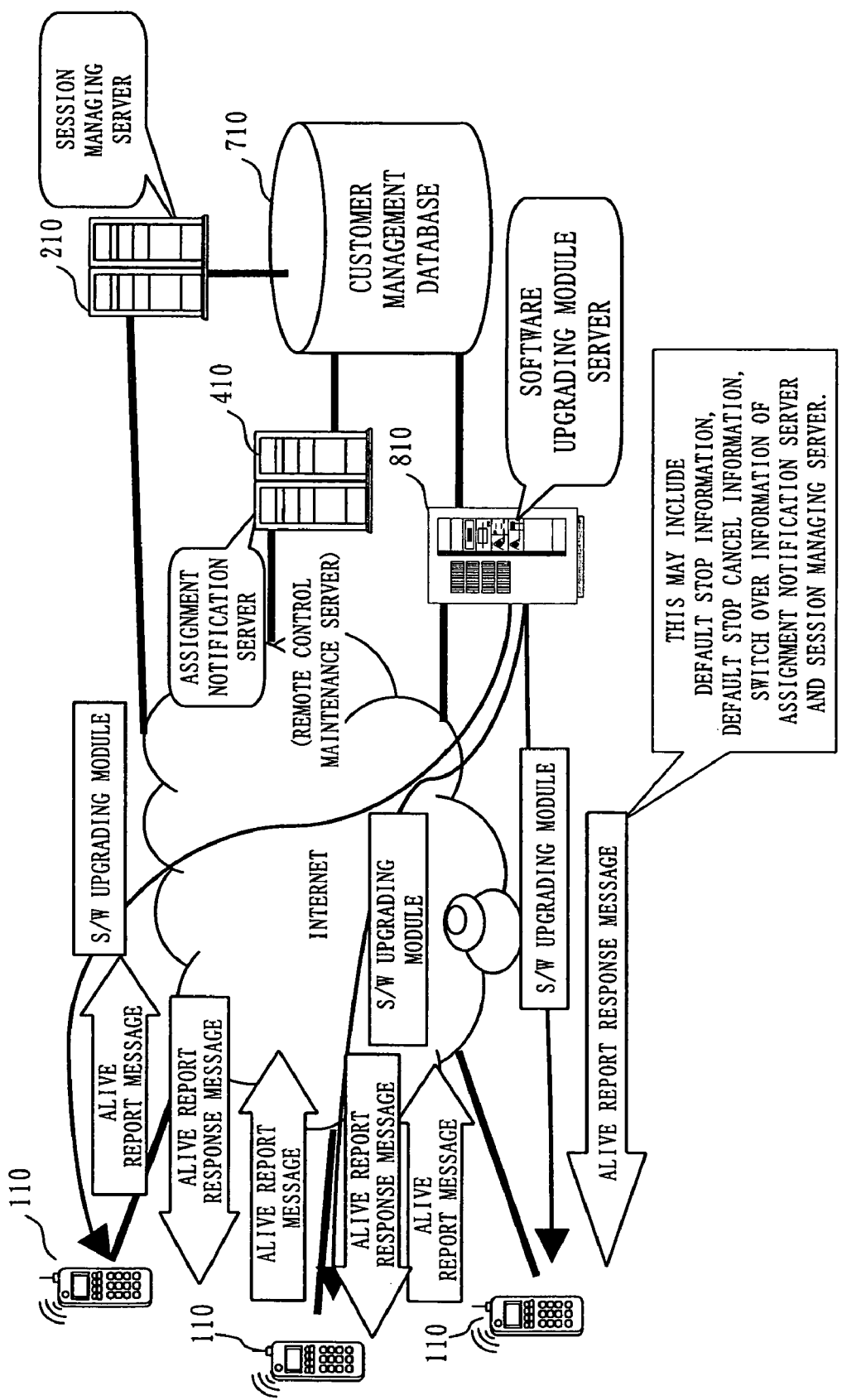
FIG. 54 is a diagram explaining a remote control maintenance function according to a seventh embodiment.

As shown in FIG. 54, when the wireless communication apparatus is connected to the Internet and the power is turned ON, it transmits an alive report message (manufacture's serial number, IP address, information of confirmation for normal operation) to the remote control maintenance server in a fixed cycle (e.g., once per day).

The remote control maintenance server confirms a new item in the alive report message, and registers it in a customer management database. The remote control maintenance server then checks the alive report together with registered items whether they are of normal or not. The contents of this alive report may include the addition that the hardware of the wireless communication apparatus is partially damaged. Once such an abnormal state is identified, the administrator who manages the assignment notification server may report the user of the abnormal state of the wireless communication apparatus and start a procedure for replacing it with a substitute and the like.

As an alive report message, information about whether the assignment notification server or the like is operating normally or not may be sent back as a response message in the case of using the GET method of HTTP. In this case, by notifying the wireless communication apparatus side of the abnormal condition of such as the assignment notification server or the session managing server, an error message may be displayed on the display unit of the wireless communication apparatus. Alternatively, the user may be notified of the condition by hearing through the receiver (one example of voice output unit) with such a message as "Due to a failure on the server side, you will be put through via the public line".

Figure 55:
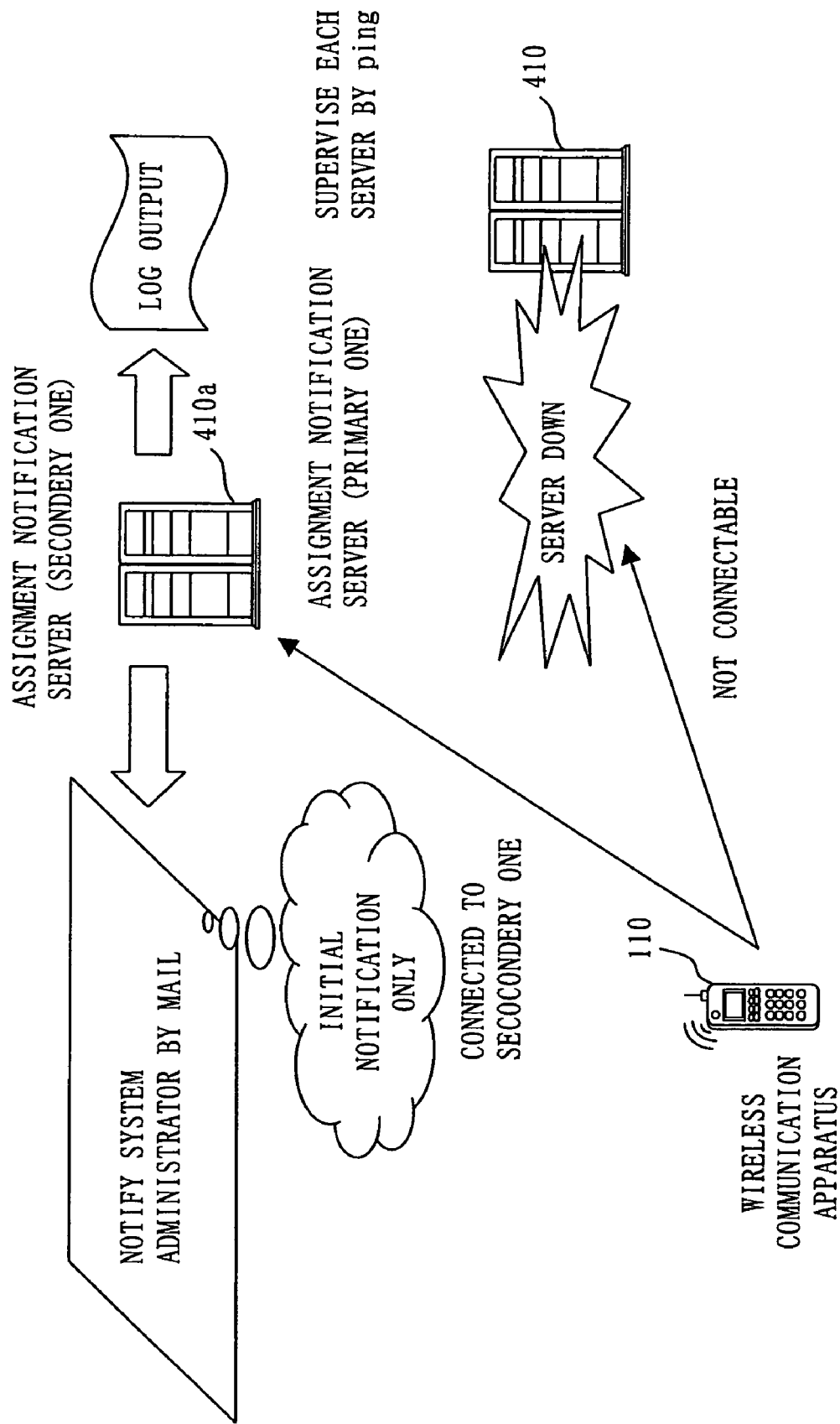
FIG. 55 is a diagram explaining that the connection of an assignment notification server is switched over to a secondary one from a primary one in case that the assignment notification server had a failure according to the seventh embodiment.
Figure 56:
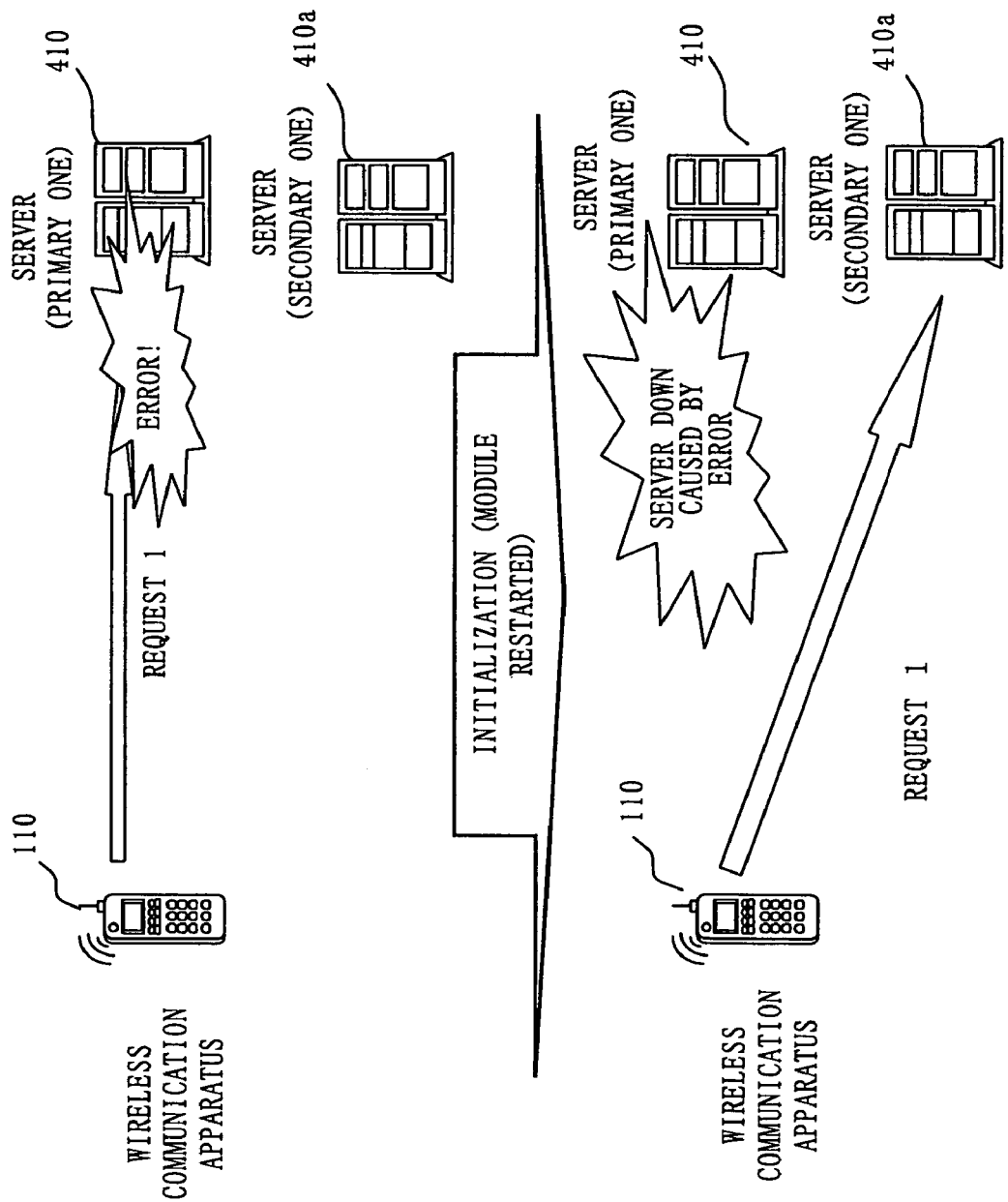
FIG. 56 is a diagram explaining that the connection of an assignment notification server is switched over to a secondary one from a primary one in case that the assignment notification server had a failure according to the seventh embodiment.

On the other hand, with referring to the assignment notification server and the session managing server, it is possible to have a redundant system provided in case that the hardware breaks down. In this case, assuming that primarily used assignment notification server and session managing server are called primary servers, ones, which may be used as backups are set up as secondary servers. In addition, when each server's IP address is notified to the assignment notification server as the response message to the alive report response message, it may be sent to both the primary one and the secondary one. Alternatively, the redundant system is not limited to the primary and the secondary, but may have three or more servers. FIG. 55 and FIG. 56 show how the secondary server is replaced for the primary server when it breaks down.

In addition, according to this embodiment, it is assumed that the internet telephone network system is used for accounting. For this accounting operation, as shown in FIG. 54, a customer management database 710 is provided. This customer management database 710 manages the payment of service charges. Then, in the case of default in payment being confirmed, when the assignment notification server receives the alive report message, the customer management database 10 disenables reception in an HTTP relay on the session managing server side, or disenables the operation of the wireless communication apparatus directly by the response message to the alive report message. Subsequently, if a customer paid the charge, and a paid-up registration has been made in the customer management database, then the setting of disenabled use is canceled when the alive report message is transmitted again to the assuagement notification server.

In addition, the alive report message to the assignment notification server is used for another purpose, that is, the software version management of the wireless communication apparatus. When the software of the wireless communication apparatus needs upgrading, the download version upgrading process of software upgrading module server 810 is started from the assignment notification server based on a customer management database 710 through remote control. Or, a version upgrading command is inputted through the telephone by the customer so that it is downloaded to the wireless communication apparatus. It is to be noted that, in the former case, since the software upgrading of the wireless communication apparatus is made purely depend on the administrator's convenience, the user is not allowed to use it during the upgrading in process. For that reason, while the user is engaged in a call, the software upgrading is to be delayed until the calling process ends. In addition, the wireless communication apparatus may be provided with the user interface, which allows the operation below. Before performing the upgrading, the user may be reported by means of a display device or a speaker device of the start of upgrading. If the user is not willing to have the upgrading for reasons of his/her own, then the process of upgrading is stopped.

Thus, the system administrator is allowed to perform downloading through remote control for a wireless communication apparatus owned by the user by way of the assignment notification server. Also, it is possible by using the same mechanism that a self-diagnostic program is executed on the wireless communication apparatus, and resultant information is transmitted to the assignment notification server side. Similarly, it is also possible that an optional self-diagnostic program for acquiring more detailed information based on the resultant information is executed through remote control, and that fault information is sent to the user.

In addition, the calling party's wireless communication apparatus 110 transmits information notifying the operational state of the calling party's wireless communication apparatus 110 to the assignment notification server 410.

The assignment notification server 410 checks whether or not the calling party's wireless communication apparatus 110 is normal based on the information notifying the operational state transmitted from the calling party's wirelesses communication apparatus 110. Then, the assignment notification server 410 transmits the operational state of the assignment notification server 410 itself along with a check result to the calling party's wireless communication apparatus 110 in response to the notification of the operational state transmitted from the calling parry's wireless communication apparatus 110.

The assignment notification server 410 is configured with a plurality of server devices including a primary server and a secondary server. The primary server is designed to act as the assignment notification server, but if the operation of the primary server gets abnormal, then the secondary server is switched over so as to operate as the assignment notification server. Subsequently, the assignment notification server 410 notifies the calling party's wireless communication apparatus 110 that the secondary server is now acting as the assignment notification server.

Furthermore, the internet communication system according to this embodiment is thus equipped with the client management database 710. The client management database 710 manages system service charge for each wireless communication apparatus of calling party.

Thus, as aforementioned, the assignment notification server 410, upon transmission of the server ID of the session managing server 210 that manages the wireless communication apparatus 110 to the calling party's wireless communication apparatus 110, receives from the client management database a service charge statement for the calling party's wireless communication apparatus 110, and transmits the service charge statement received and the server ID to the calling party's wireless communication apparatus 110.

The calling party's wireless communication apparatus 110 determines whether to render its own communication facility in operable or not based on the communication charge statement received from the assignment notification server 410.

The calling party's wireless communication apparatus 110 whose communication facility is thus inoperable determines whether to render it operable or not based on the service charge statement received from the assignment notification server 410.

Still more, as aforementioned, the calling party's communication apparatus 110 includes built-in software for executing the wireless communication apparatus facility, the software carrying its version information. The calling party's wireless communication apparatus 110 transmits the version information of the software along with the information notifying the operational state of the calling party's wirelesses communication apparatus to the assignment notification server 410.

The assignment notification server 410 determines whether to switch the built-in software within the calling party's wireless communication apparatus 110 over to different version software or not based on the version information transmitted from the calling party's wireless communication apparatus 110, and transmits a determination result to the calling party's wireless communication apparatus 110.

The assignment notification server 410 manages the address of a Web server that manages the built-in software in the calling party's wireless communication apparatus 110. Then, the assignment notification server 410 transmits the address of a Web server dealing with the different version software to the calling party's wireless communication apparatus 110 in the case where the assignment notification server 410 determined to switch the built-in software in the calling party's wireless communication apparatus 110 over to the different version software.

Embodiment 8

The wireless communication apparatus is not substantially allowed to make a phone call by way of the IP line if it is not allowed to communicate with the session managing server or the call relay server, which manage call control. In light of the above, according to the call control of this embodiment, it is designed that when an IP line based call is not allowed, the user is informed accordingly by way of a wireless communication apparatus. Artificial voice may be used as one of the methods to inform through the receiver (one example of voice output unit) of a telephone that an IP line based call is not available. Artificial voice may be produced by the method in which a human voice message is recorded in advance, and its digitized information is stored in a server or a memory in a wireless communication apparatus and then reproduced. As another method, voice sound may be artificially synthesized from the text data of a message and then produced. Alternatively, it is also possible to use the display unit of a wireless communication apparatus to inform of it similarly. In addition, this wireless communication apparatus may also be provided with a public line based call function in addition to the IP line based call function so that in case that an IP line based call is not allowed, a public line based call may automatically be started.

Figure 57:
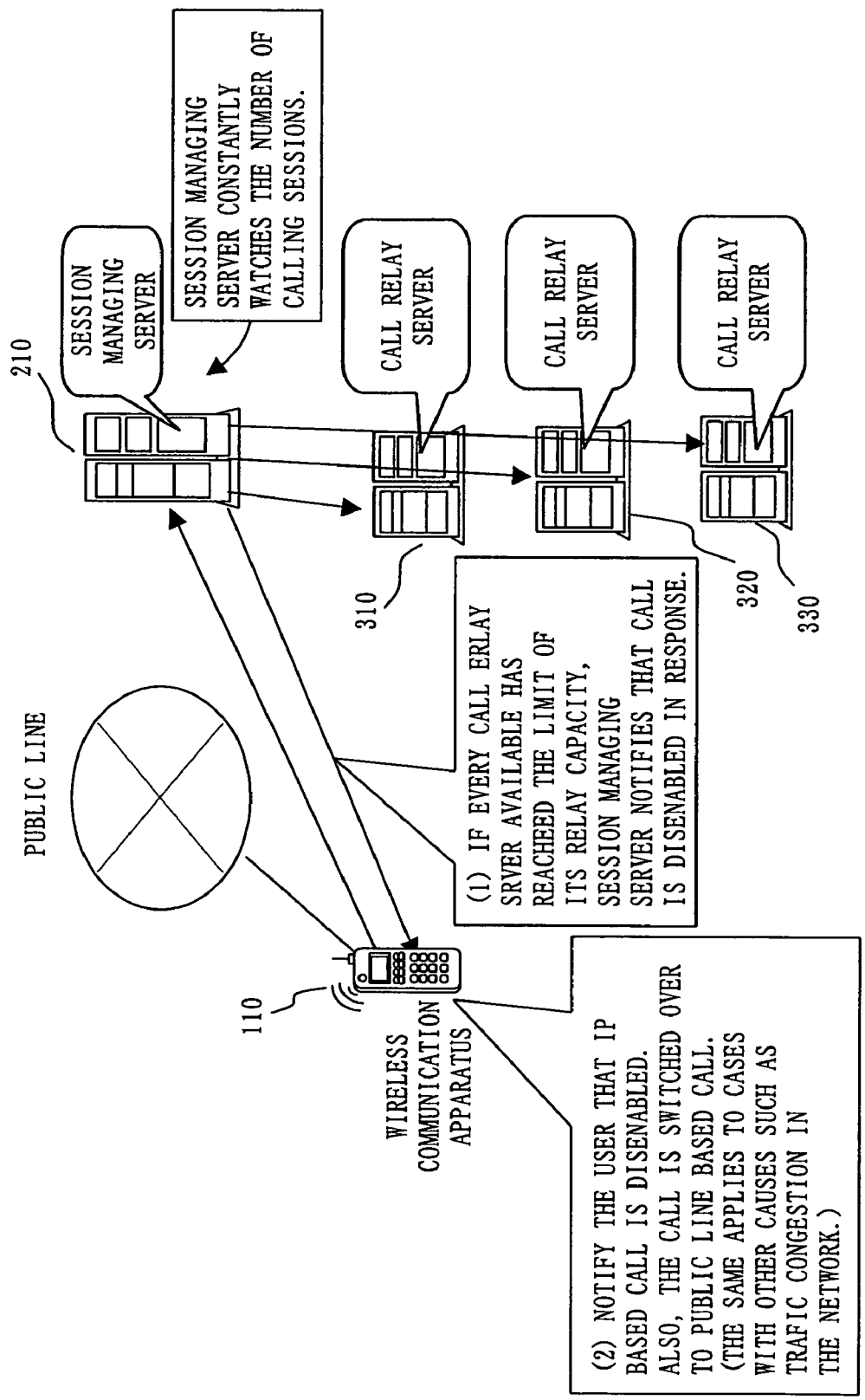
FIG. 57 is a diagram explaining a management function of a session managing server according to an eighth embodiment.

As shown in FIG. 57, the session managing server constantly counts the number of call sessions of the call relay server, which it manages. For that reason, the session managing server is allowed to confirm that the call relay server has performed the process of call relaying up to the limit of its call capacity for relay ((1) in FIG. 57). In that situation, the call relay server cannot afford of relaying a call any more by way of the IP line. Consequently, it may be designed that the disenabled IP line based call is notified to the user, or the call is switched to a public line based call ((2) in FIG. 57) as aforementioned.

A warning message to be sent to the user about such as an abnormal state of the wireless communication apparatus is summarized below.

(1) Such as an abnormal state is informed by means of such as Light Emitting Diode, a liquid crystal display, and buzzer.

(2) During a call, a message of such as warning is reproduced through the receiver. The samples are listed below.

(A) Your setting is wrong. Please reset.

(B) Since the network is congested, you will be connected through the public line.

(C) Since the relay station is congested, you will be connected through the public line.

(D) You will be put through by the IP telephone, but since the network is congested, voice may be heard in poor quality.

(E) Since network is becoming congested sharply, the line will be disconnected for now. Please call later.

(F) Since the network is becoming congested sharply, the communication route will be changed. Please wait for a while. (Some time later after processing.) Now, I will put you through.

Embodiment 9

Figure 58:
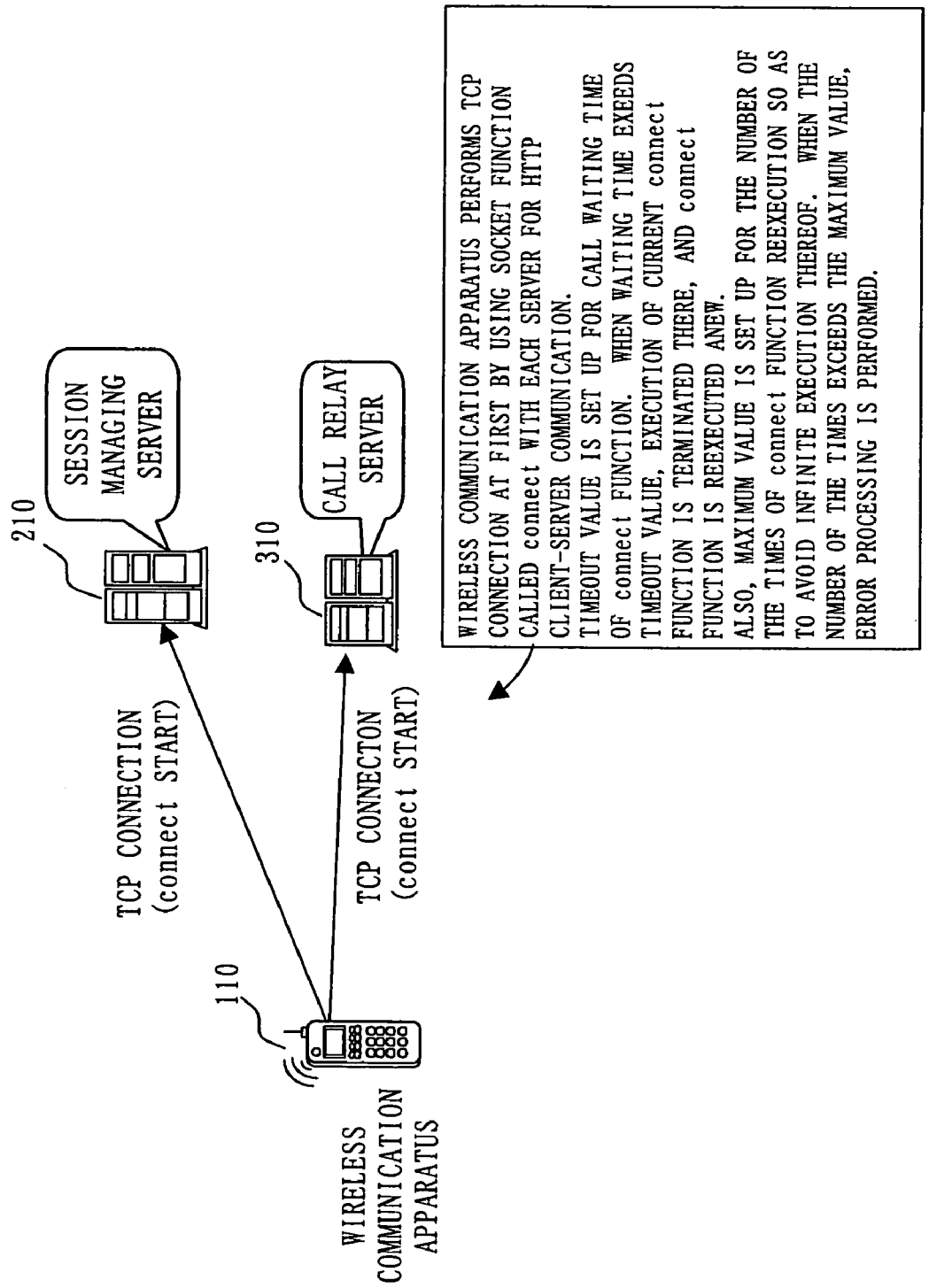
FIG. 58 is a diagram explaining TCP connection processing to a session managing server or a call relay server according to the eighth embodiment.
Figure 59:
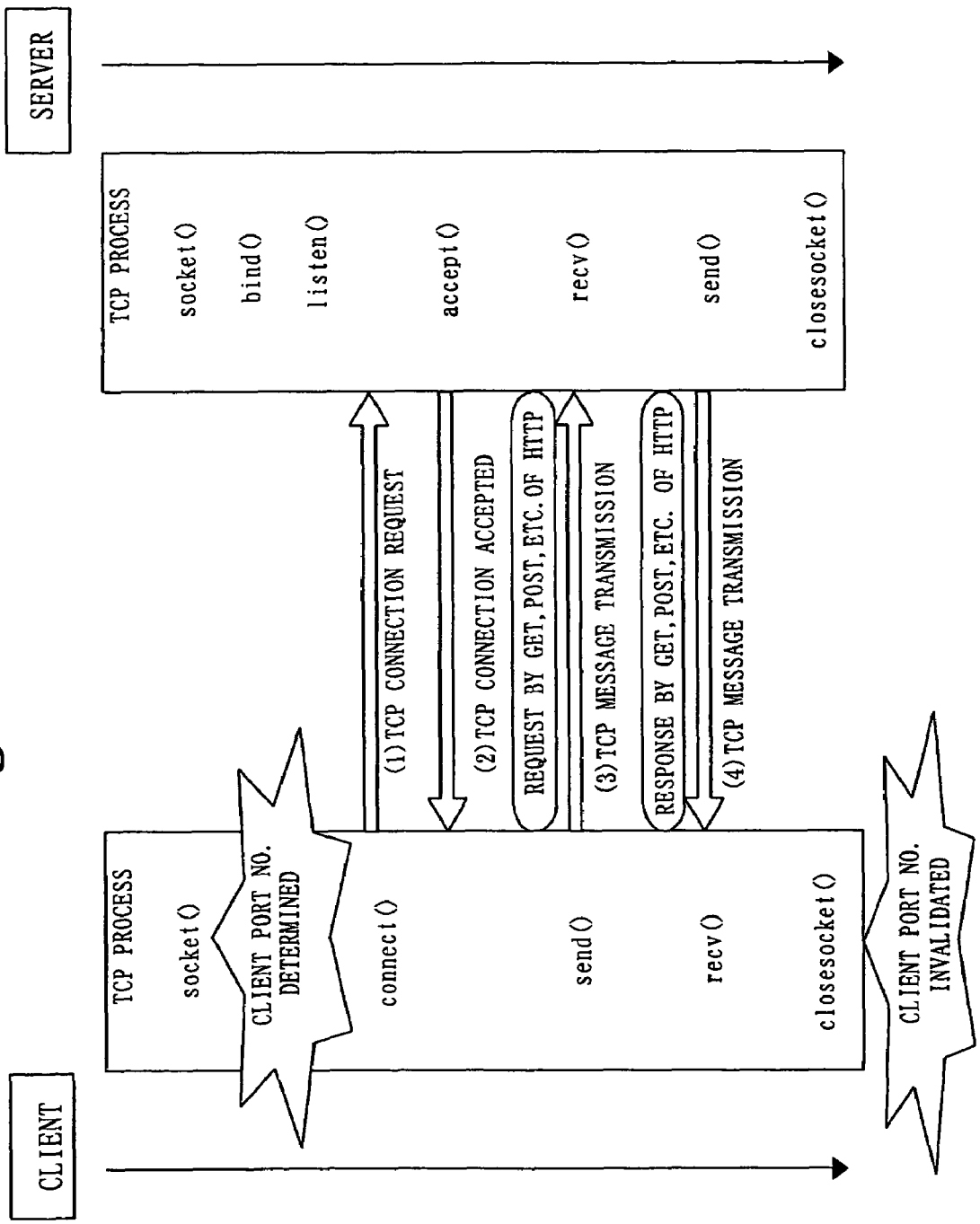
FIG. 59 is a diagram illustrating a relation between HTTP data transmission and reception process and socket function call according to a ninth embodiment.

According to the system of this embodiment, the wireless communication apparatus communicates with the session managing server or the call relay server, which manages call control by using HTTP. For that reason, TCP based communication is executed at the start of communication as shown in FIG. 58. The wireless communication apparatus 110 executes a TCP connection to each server by using a socket function called "connect" in the first place for an HTTP communication from a client to a server. A timeout value is set up for connect function call waiting time. When the waiting time exceeds the timeout value, the current execution of the connect function is terminated there, and the execution of the connect function is restarted. In addition, an upper limit value is set up also for the number of reexecuting times of the connect function. This is designed for avoiding an infinite execution. In the case where the number of reexecuting times of the connect function exceeds the upper limit value, error processing is to be carried out. FIG. 59 shows how HTTP messages are transmitted and received by the TCP socket function. FIG. 59 illustrates a relation between HTTP data transmission and reception and socket function call.

Initial processing of the connection for TCP communication is started with the wireless communication apparatus calling the connect function as a client ("(1) TCP connection request" in FIG. 59). In this situation, if the blocking mode (the "blocking mode" means that the client side is to wait to proceed to execute further processing until it receives a response from the server side) of the connect function is used, the connect function is not terminated until the TCP connection is established ("(2) TCP connection acceptance" in FIG. 59), so that the execution of a program is blocked and suspended. There is no problem if the TCP connection is established in a shorter period of time. However, it may take a very long period of time to establish this TCP connection due to some causes such as a network related cause. In such a case, the TCP connection may be established soon in many cases if the execution of the connect function is led to forced termination once and then reexecuted anew. For that reason, a timeout value may be set up for the execution of the connect function. Then, when the timeout value is exceeded, the execution of the connect function may be stopped or led to forced termination, and then reexecuted a new. This assures a successful TCP connection without the processing being kept waiting for a long period of time. This reexecution is not necessarily limited to only once. If the waiting time still exceeds the timeout value even after reexecution, reexecution may be repeated. This may enhance efficiency in restoration in case of a failure. On the other hand, it is meaningless to repeat execution infinitely. For that reason, a fixed maximum value may be set up for the times of reexecution. Then, the TCP connection is repeated until the maximum value. Then, in the case of the times of reconnection exceeding the maximum value, it is considered that some failure has occurred with the network, etc., and error processing should be carried out.

In addition, a fixed constant is given to the timeout value for starting the TCP connection or the maximum value for the times of reexecution at the time of starting the wireless communication apparatus. Then, with a higher success rate of starting the TCP connection in a short period of time, the timeout value is made shorter, and the times of reconnections are reduced. As a result, in case that an error occurs, the occurrence of error may be recognized in a short time. On the other hand, if the success rate is lower, then it is desirable that the timeout value is made longer, and the times is increased in order to secure the TCP connection. Thus, it is allowed to implement the function of automatically adjusting the timeout value or the number of times for reexecutions to an optimal value, while an actual period of time before starting the TCP connection or an actual number of times for reexecution is measured. This allows manual labor to be saved for adjusting the timeout value or the number of repeating times to the optimal setting.

Embodiment 10

In call processing of voice data to be transmitted and received over the Internet, the call quality depends largely on data traffic congestion in an actual path on the internet. Then, the delay time of data at arrival is constantly watched in a specific call route, and it is examined whether or not the delay is in the level of affecting the call quality. In addition, if it is confirmed that there is no doubt about that the delay, which would affect the call quality, has occurred, the user may be informed that the call quality has been degraded by means of such as a display unit of the wireless communication apparatus.

The session managing servers installed throughout the nation store the IP addresses of the respective session managing servers as database. It is possible to measure general communication delay time regularly between specific session managing servers (a call relay server is assumed to be in almost the same position as that of this session managing server) by an OS command called ping of Windows OS ("Windows" is the operating system of Microsoft Corp) or an OS command called tracert of Unix OS ("Unix" is the name of an operating system developed by AT&T Bell Laboratories). Alternatively, the communication delay time may be measured by actually transmitting and receiving a voice packet based on UDP, HTTP, or the like to be used in the IP telephone network system of this invention separately, and creating software for measuring the delay time. Accordingly, a direct route delay between the session managing servers at the two points to which the adapters of calling and called parties are assigned, respectively, may be obtained by means of the OS command or the software. In addition, bypass route delay caused through a third session managing server may also be obtained. As a result, if the time of bypass route delay sum is shorter than the time of the route delay between the session managing servers at the two points, then the setup of the voice data relay route may be changed such that the bypass route is selected and the call relay server route includes the call relay server at the third point.

Figure 60:
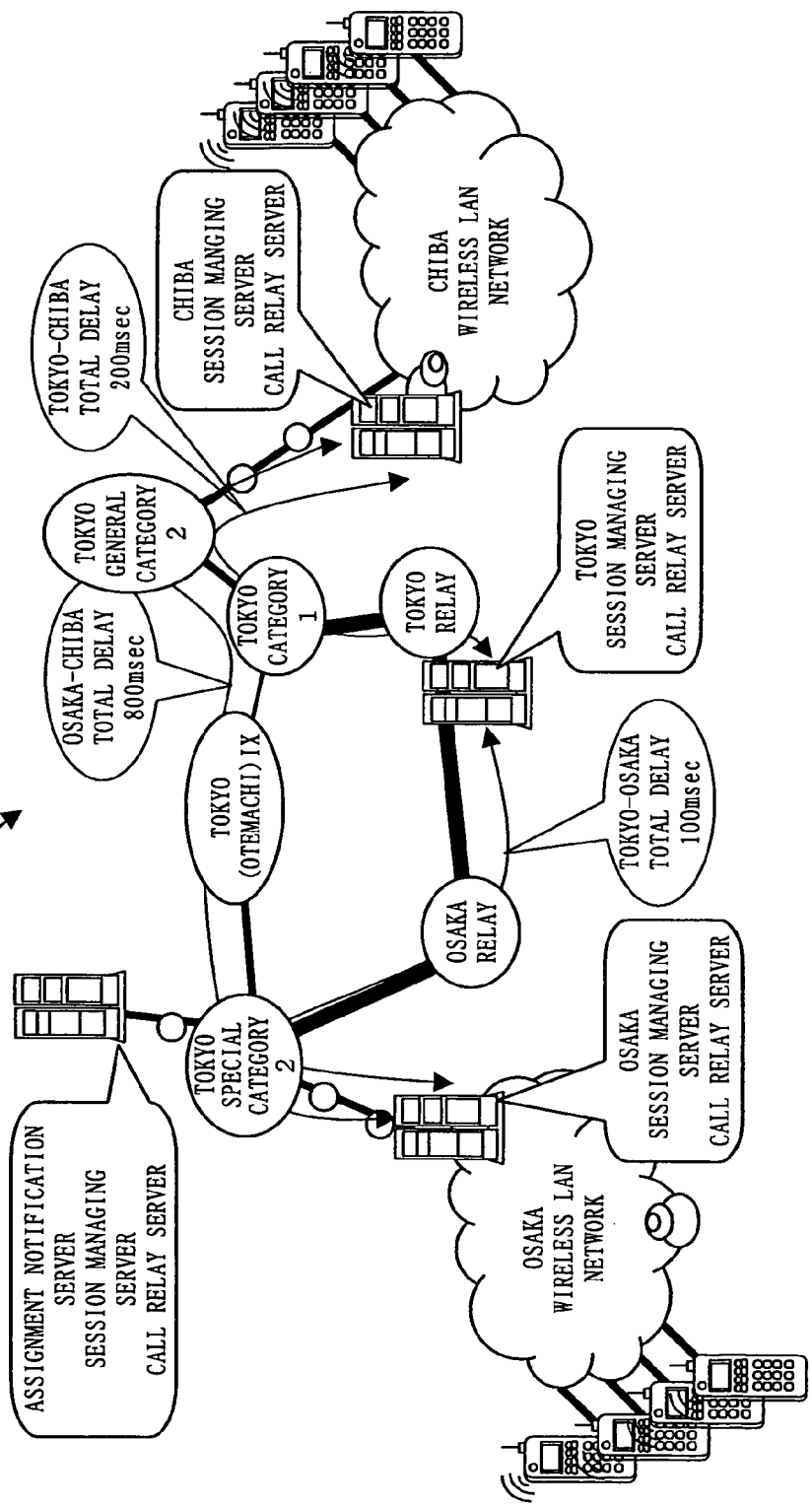
FIG. 60 is a diagram explaining the confirmation of traffic congestion by an internet path delay state search according to a tenth embodiment.

FIG. 60 is a diagram illustrating the processing of confirming for congestion based on an internet route delay check.

With reference to FIG. 60, a check result, a total delay between Tokyo and Osaka is 100 msec, a total delay between Tokyo and Chiba is 800 msec, and a total delay between Tokyo and Chiba is 200 msec. Consequently, the total of delay between Tokyo and Osaka and delay between Tokyo and Chiba is shorter than a total delay between Osaka and Chiba. For that reason, the communication path of the Tokyo-Osaka route is replaced by the Tokyo-Osaka route and the Tokyo-Chiba route. As for the selection of this third relay point, if the number of session managing servers arranged throughout the country is large, the optimum may be selected by calculating the sum of delay time and comparing them. As a result, a more comfortable condition may be secured for communication. As a matter of course, since many communication paths coexist, those communication paths may be controlled, wherever possible, so that they are appropriately decentralized without concentrating in one place.

Note that software may be implemented to display a diagram illustrating a network traffic condition between the respective session managing servers and call relay servers as shown in FIG. 60. This allows the system administrator to visually check network congestion. As a result, the system administrator is allowed to directly instruct the session managing server to select the call relay server at the third relay point so that a less congested network route is allocated to the voice data transmission and reception path. This allows an effective operation in an emergency when automatic server processing is not enough time-wise.

In FIG. 60, a total delay is indicated by text near its communication path like "Total Delay 800 msec between Osaka-Chiba", for example. Alternatively, however, a communication route may be discriminated from others by color or blinking according to delay speed.

The administrator is requested to review, redesign and reconstruct the IP telephone network system, which has been provided, if calling failures occur frequently. For this reason, a warning function to the administrator is important. The following is the summary of warning details for the administrator.

(1) Dual system is basically used for handling server failure. An automatic restoration is performed for a failure, and the condition is notified to the administrator by means of such as automatic message transmission or log output.

(2) In trying to make an IP telephone call, an access to a server is failed by timeout in many times, and there is no other way than calling through the public line more than a fixed number of times. In this case, a warning is sent to the administrator by means of such as automatic message transmission or log output.

(3) In making an IP telephone call, there is more than a fixed amount of traffic, so that the call quality of many users is poor. In this case, a warning is sent to the administrator by means of such as automatic message transmission or log output.

(4) For making an IP telephone call, the normal voice data transmission and reception path of the call relay server is rarely available, so that the call route had to be changed frequently, and the number of the changes exceeds a fixed value. In this case, a warning is sent to the administrator by means of such as automatic message transmission or log output.

Embodiment 11

Figure 61:
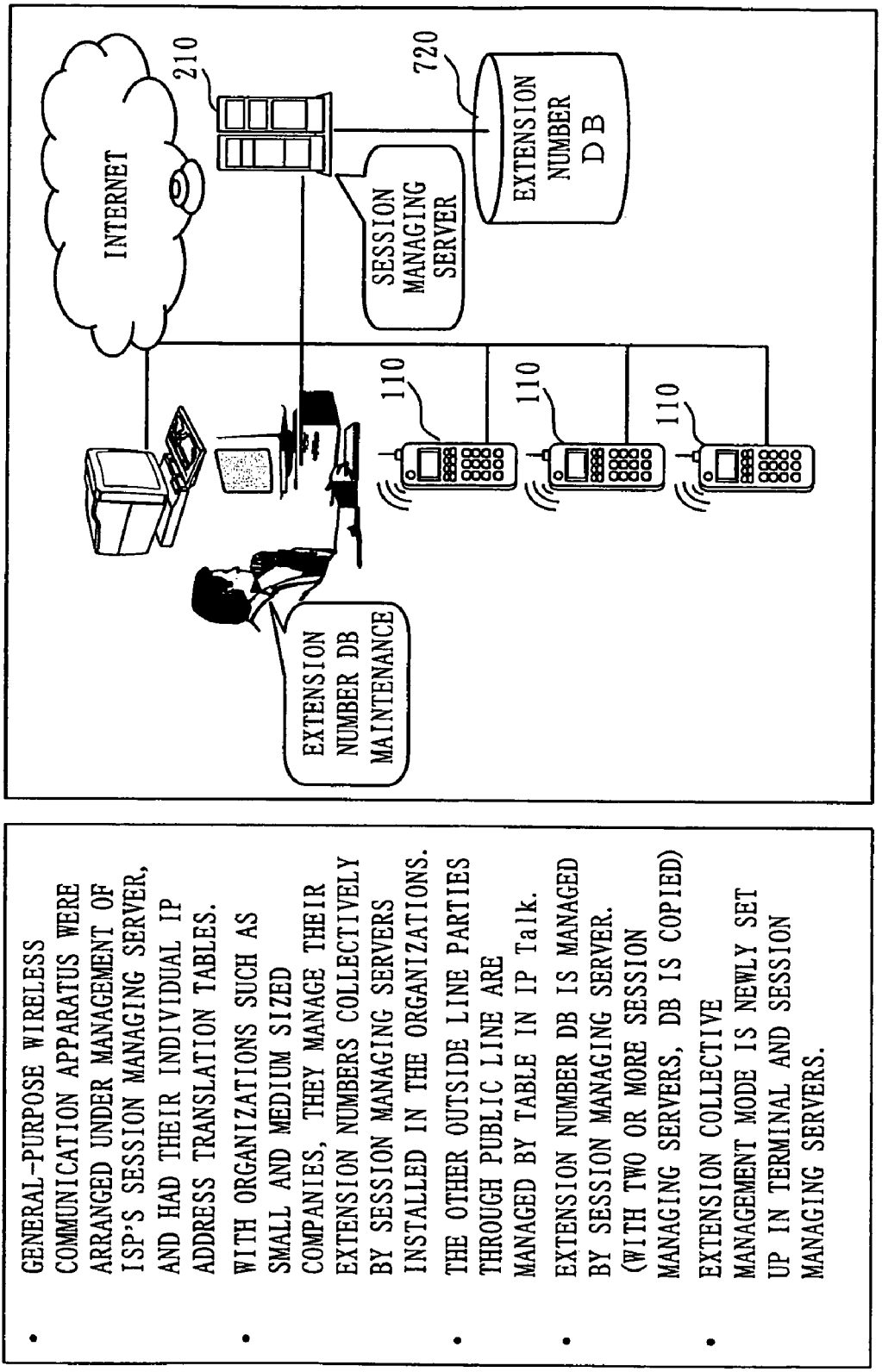
FIG. 61 is a diagram explaining a session managing server, which manages extension telephones according to an eleventh embodiment.

The session managing server and the call relay server may also be installed in a limited area in an organization such as a company and a school. In this case, an extension number system which is available only within a specific area may be set up for telephone calls within the area, unlike outside lines, in many cases. Therefore, it would be convenient if those extension numbers can be managed collectively with a conversion table for translating the extension numbers into the IP addresses and identifiers of the wireless communication apparatuses of the present invention as a database. For that reason, as shown in FIG. 61, this translation table may be set up in the session managing server (extension number database 720). In this case, when an extension number is inputted from a wireless communication apparatus, the wireless communication apparatus transmits extension number information to the session managing server. On the session managing server, the wireless communication apparatus of the call partner is specified. Then, call control is performed with the specified wireless communication apparatus of the other party through the procedures of (1) to (6) shown in FIG. 62.

Figure 62:
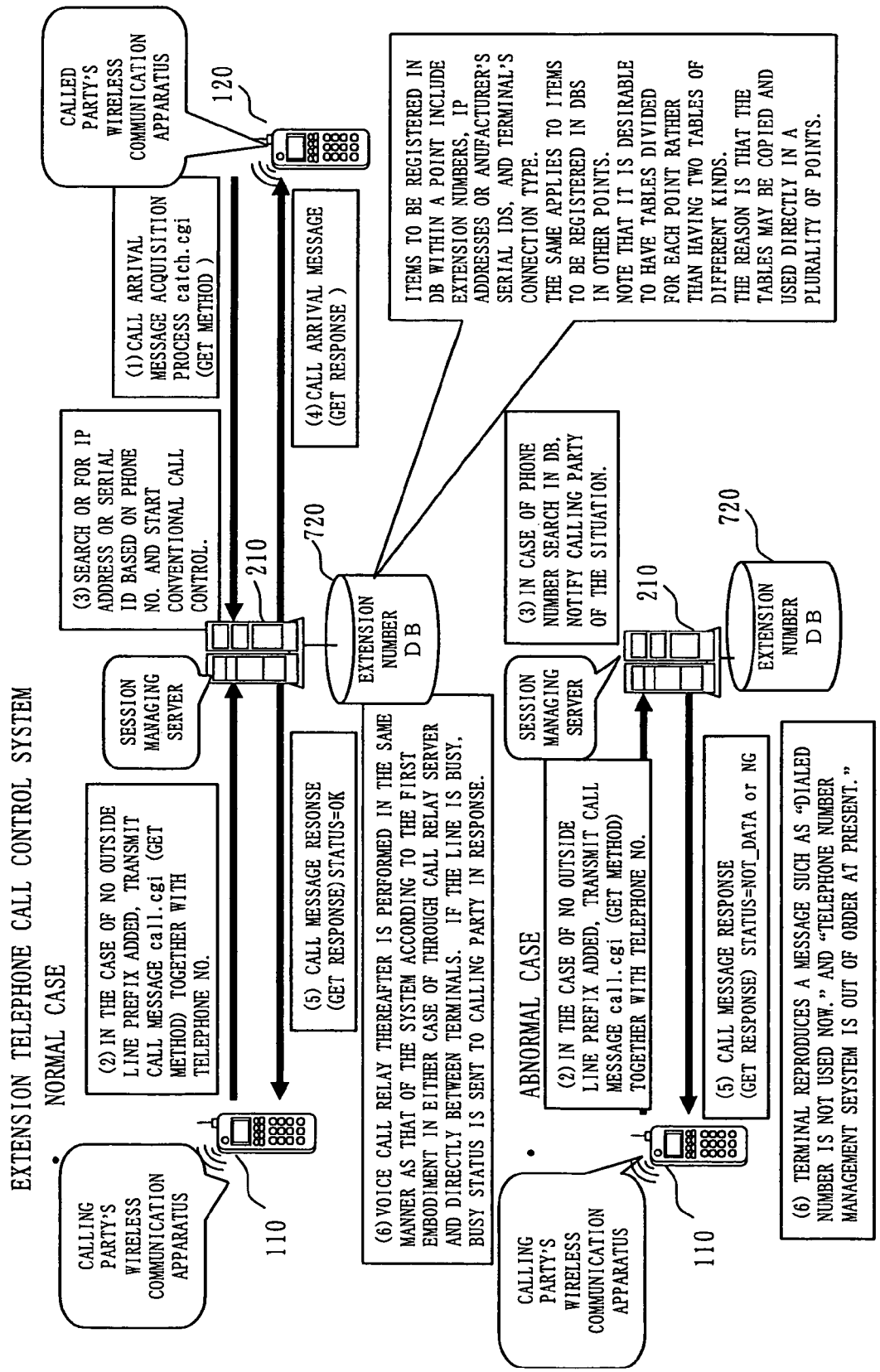
FIG. 62 is a diagram explaining a session managing server, which manages extension telephones according to the eleventh embodiment.

A procedure of an extension telephone call control system is discussed with reference to FIG. 62.

The calling party's wireless communication apparatus, upon reception of an extension number, transmits a call message together with the telephone number received to the session managing server (2). The session managing server specifies a communication partner based on the transmitted extension number with reference to the extension number database 720 (3). The session managing server, if a call arrival message acquisition is performed by the called party's wireless communication apparatus (1), sends a call arrival message back to the called party's wireless communication apparatus. In addition, the session managing server also responds to the call message to the calling party's wireless communication apparatus (5). After (4) and (5), the calling party and the called party make a call with each other in the same manner as that of the call processing performed between wireless communication apparatuses in the normal UDP direct communication (6). In case of failing to specify the wireless communication apparatus of the other party even by searching the extension number database 720 in the session managing server, the search failure is reported to the calling party (3). The calling party's wireless communication apparatus sends the user a message such as "The dialed number is not used." and "Number management system is currently out of order."

Figure 63:
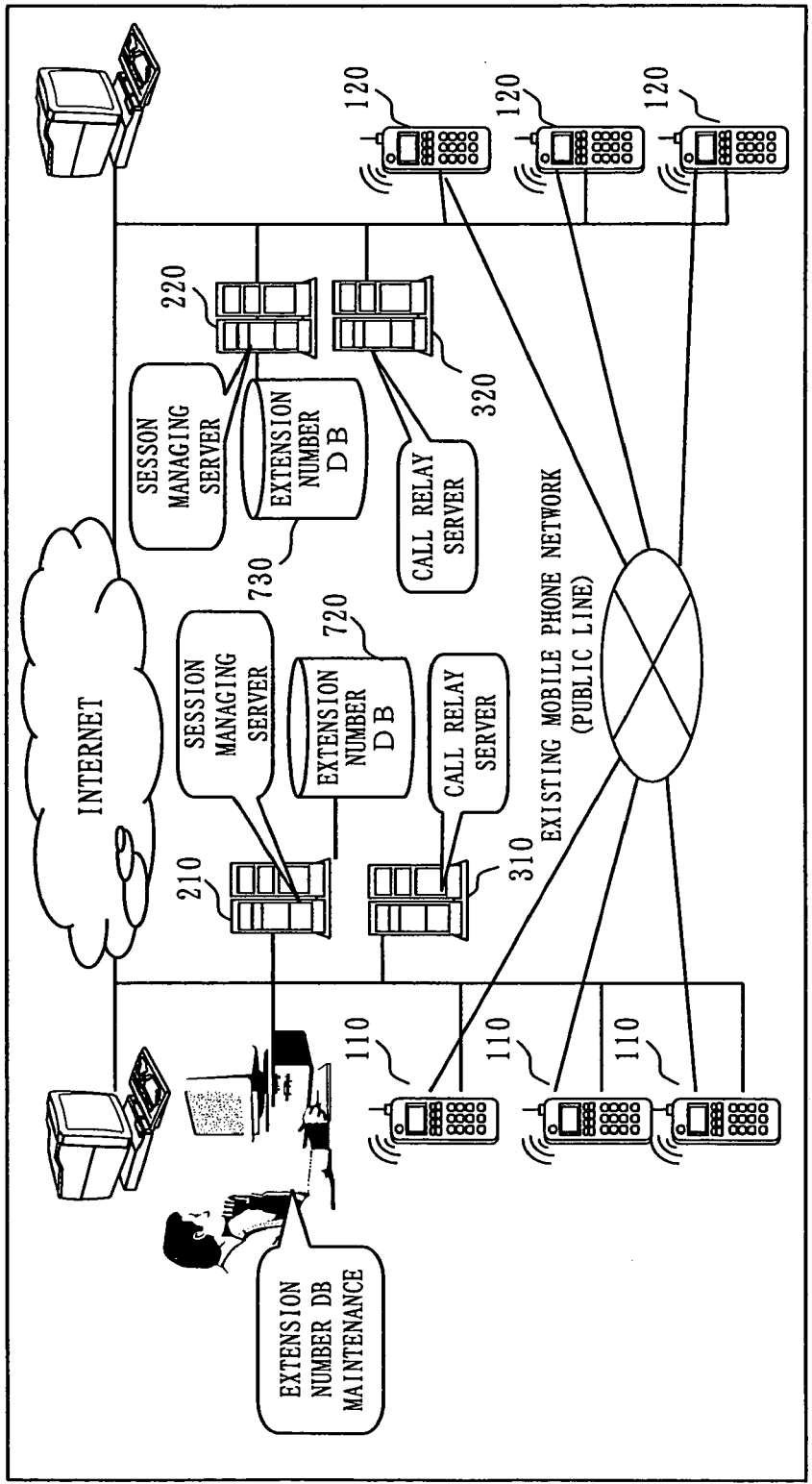
FIG. 63 is a diagram explaining a session managing server, which manages extension telephones according to the eleventh embodiment.

As an implementation type for actually implementing a call control system using an extension number, there are some examples each for a case with PBX 130 (FIG. 64, FIG. 65) and a case without PBX (FIG. 63).

According to the implementation type without PBX shown in FIG. 63, a type internal U Direct (Type "U Direct" indicates a message transmission and reception process using UDP, which uses no call relay server, of system 1 discussed with reference to FIG. 39 in the sixth embodiment) is applied to extension calls within a base. Then, a point-to-point call UUU is applied there to between bases ("UUU" indicates a message transmission and reception process performed between a wireless communication apparatus and a call relay server and between call relay servers by using UDP according to the system 3 using two call relay servers discussed with reference to FIG. 39 in the sixth embodiment in which). The extension number is determined as follows. Since it is connected directly to a public line network, a point-to-point call is transmitted by using a prefix "7" like "7-area number-extension number". The session managing server transmits telephone number information, "area number-extension number", after removing the prefix from it.

Now, the implementation type with PBX is discussed.

Figure 64:
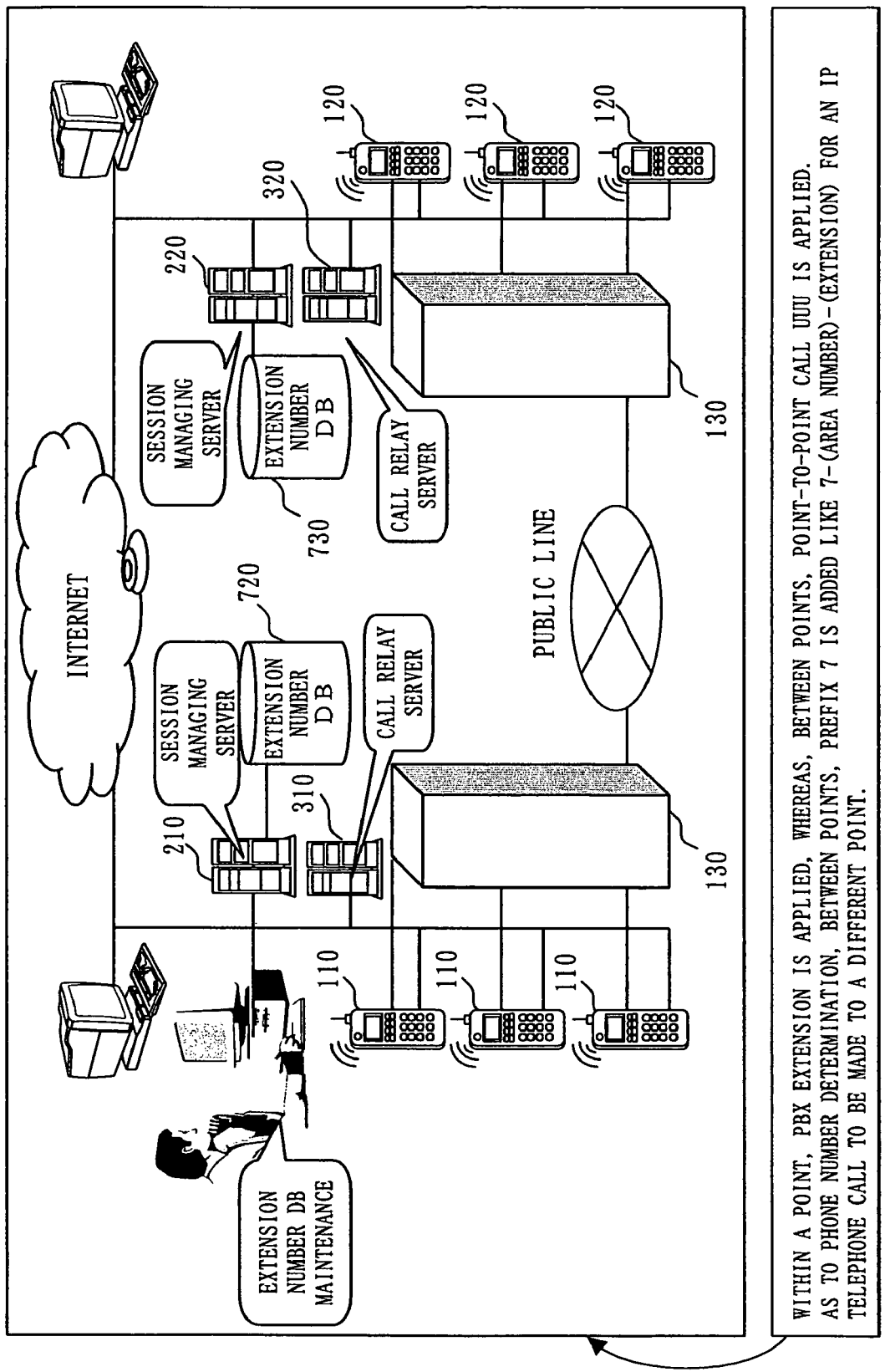
FIG. 64 is a diagram explaining a session managing server, which manages extension telephones according to the eleventh embodiment.

FIG. 64 shows the type in which a wireless communication apparatus is installed on the PBX extension side.

In the case of FIG. 64, PBX extension is used within a base, but the point-to-point call "UUU" is used between bases ("UUU" corresponds to Type "UUU" of System 3 discussed with reference to FIG. 39 in the sixth embodiment). The telephone number is determined as follows. Between bases, a prefix "7" is used like "7-area number-extension number" for an IP telephone call made to a different base.

Embodiment 12

Figure 65:
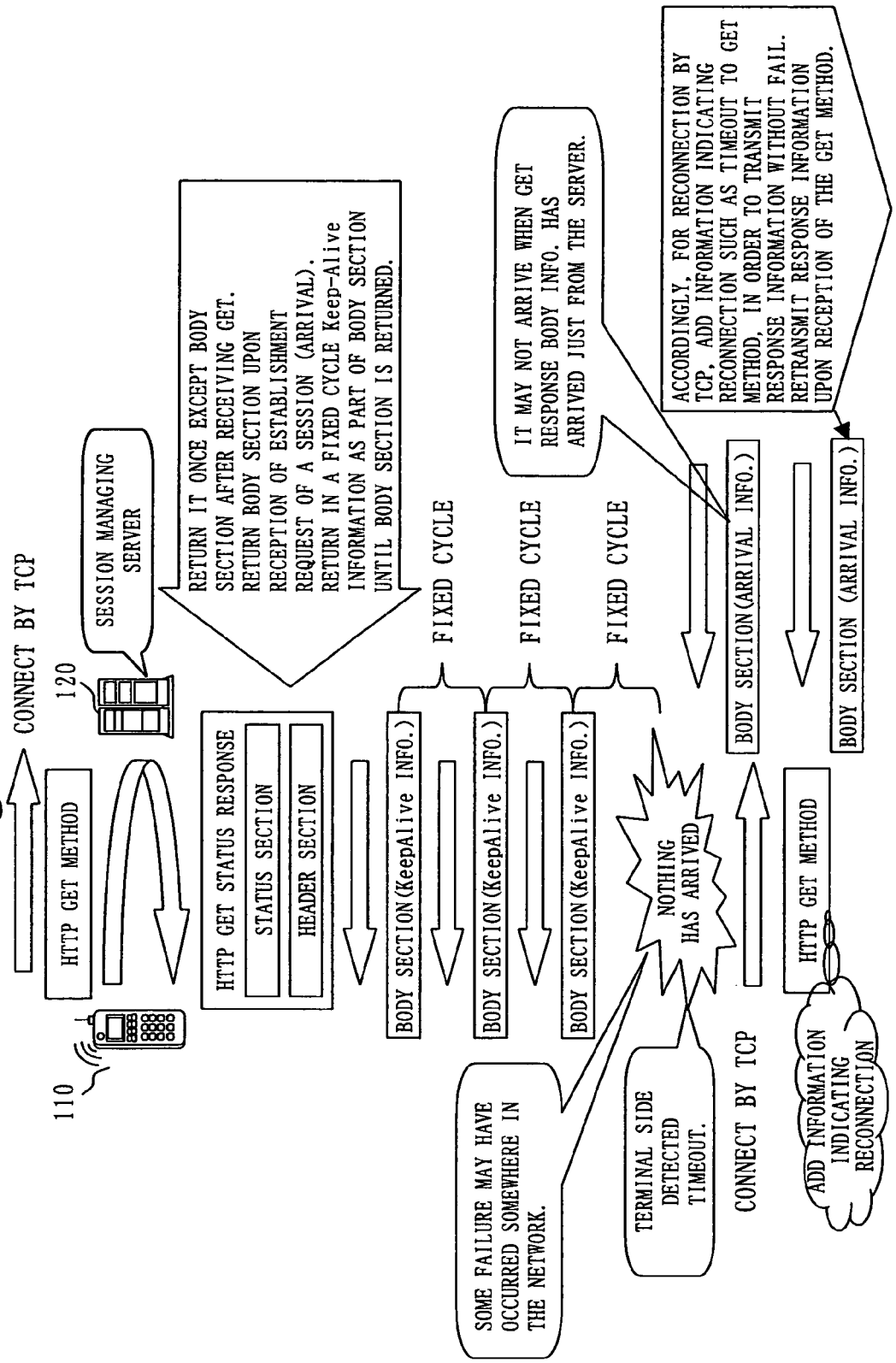
FIG. 65 is a diagram explaining communication details at the time of TCP connection between a wireless communication apparatus and a session managing server according to a twelfth embodiment.

It has already been discussed in the first embodiment that under the condition that the wireless communication apparatus does not know the state of TCP connection from the wireless communication apparatus to the session managing server, the TCP connection is cut somewhere in the internet path in some cases. In order to allow the wireless communication apparatus to confirm that the TCP connection is cut somewhere in the internet path, as shown in FIG. 65, the session managing server sends "HTTP GET status response", except the body section in response to "HTTP GET method" received from the wireless communication apparatus. Then, the body section is sent back upon reception of an establishment request of a session. The session managing server sends "Keep-Alive information" as part of the body section to the wireless communication apparatus in a fixed cycle until the establishment request of a session is received. The wireless communication apparatus, in the case of not receiving the body section (Keep-Alive information) even with the timeout, makes a request for reconnection with the session managing server. In this case, information notifying of its reconnection may be added to data in the GET method. Consequently, if arrival information arrived a little later than the timeout, the session managing server may reply with the reception or arrival information, which was supposed to be sent after confirming that it is a request for reconnection, as the body section.

On the other hand, the wireless communication apparatus may also transmit and receive voice information by using HTTP or with the TCP connection secured. For that reason, if the TCP connection is cut similarly, then the transmission and reception of voice information is interrupted.

Figure 66:
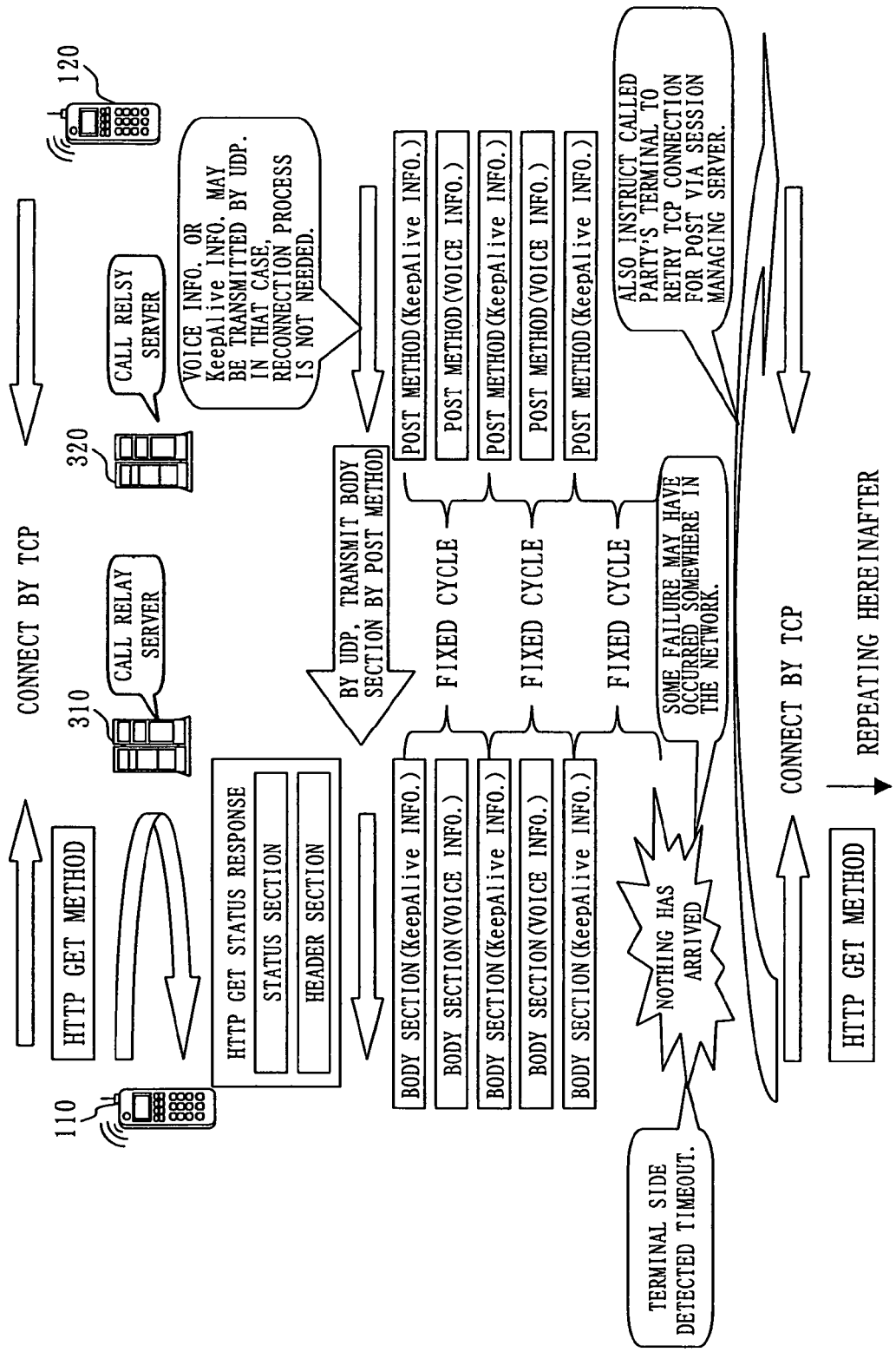
FIG. 66 is a diagram explaining the transmission and reception of voice information between a wireless communication apparatus and a call relay server according to the twelfth embodiment.

Then, as shown in FIG. 66, also with the transmission and reception of voice information, in the case of HTTP used somewhere in the voice information transmission and reception path, Keep-Alive information is transmitted and received in a fixed cycle through the same TCP connection, regardless of whether voice information exists or not. As a result, when a wireless communication apparatus as the destination of the voice information detects a timeout, the TCP connection may be retried. This may prevent the transmission and reception of voice information from being interrupted.

In addition, voice information may be transmitted and received with a single communication relay server or even two communication relay servers. With the latter case, the TCP reconnection is needed to be made not only by the wireless communication apparatus of the destination of the voice information, but also by the wireless communication apparatus of the transmitting source thereof. The instruction of this TCP reconnection maybe transmitted to the wireless communication apparatus of the transmitting source through the session managing server in the same manner as that of the first embodiment where the off-hook information of the wireless communication apparatus is notified to the wireless communication apparatus of the destination. Thus, the TCP reconnection is made by the wireless communication apparatuses on both sides of the transmitting source and the destination of the voice information. Hence, even if the TCP connection is cut somewhere on the Internet, the transmission of voice information is allowed to continue.

With referring to FIG. 66, the wireless communication apparatus 120 inserts "Keep-Alive information" between pieces of voice information in a fixed cycle, and transmits it to the wireless communication apparatus 110. The wireless communication apparatus 110 waits for the "Keep-Alive information" from the wireless communication apparatus 120. The wireless communication apparatus 110, if not receiving the "Keep-Alive information" with a timeout, makes a request for TCP reconnection to the calling party's call relay server 310. At the same time, the wireless communication apparatus 110 instructs the wireless communication apparatus 120 of the called party through the session managing server to reconnect the call relay server.

Embodiment 13

The wireless communication apparatuses discussed hereinbefore transmit and receive voice data. The voice data is obtained by converting voice analog data inputted to the wireless communication apparatus through such as a microphone speaker device (one example of voice input unit) of the wireless communication apparatus into voice digital data by means of an analog-to-digital conversion device or software installed in the wireless communication apparatus, and further converting the voice digital data into compressed voice data by means of a voice codec (a voice coder and decoder, or software) which is installed in the wireless communication apparatus.

Compressed voice data per unit time to be subject to voice encoding and decoding by this voice codec is called voice frame data. In the case of transmitting voice data over the IP network, one or more pieces of this voice frame data are accumulated to form an IP packet. The number of pieces of voice frame data to be stored in a single IP packet is determined by the wireless communication apparatus specifying a suitable accumulation time in consideration of quality based on the traffic congestion of the IP network and delay time. For example, the time length of voice frame data becomes 20 msec, and the accumulation time becomes 60 msec. In this case, three pieces of voice frame data are to be stored in a single IP packet.

As shown in FIG. 67, according to the conventional method, voice frame data is generated after 20 msec, and stored mechanically in an IP packet. Then, an IP packet is automatically transmitted after each 60 msec.

On the other hand, there is a method called silent compression. According to this method, voice lower than a fixed level in quantity is regarded as silent. Hence, it is designed not to generate voice frame data so as not to transmit unnecessary IP packets.

Now, it is to be noted that the voice codec generates in many cases voice frame data indicating that ending is voiced when having silence after contiguous voiced sound. Based on the voice frame data indicating that ending is voiced, a voice codec is allowed to reproduce natural voice attenuation and disappearance on the reception side. On the other hand, bit information called marker bit may be turned ON with the first voice frame data after the sound changed from silence to voiced. This shows the voice codec on the reception side the resumption of voiced sound. Hence, voice may be reproduced with a natural rising edge. In addition, on the reception side, natural background sound is supplied to the user by reproducing suitable noise in silence with no voice data arriving.

The voice codec by the silent compression method on the reception side receives the voice frame data indicating that ending is voiced and the voice frame data having the marker bit turned ON indicating the resumption of voiced sound discussed hereinbefore. This allows reproducing natural shift between a voiced state and a silent state. On the other hand, if the voice codec on the reception side fails to receive either one of the voice frame data indicating that ending is voiced and the voice frame data having the marker bit indicating the resumption of voiced sound being turned ON, then loss may occur at the rising edge of voiced sound, unpleasant noise may occur, distortion may occur at the end of voiced sound, or the like.

Figure 68:
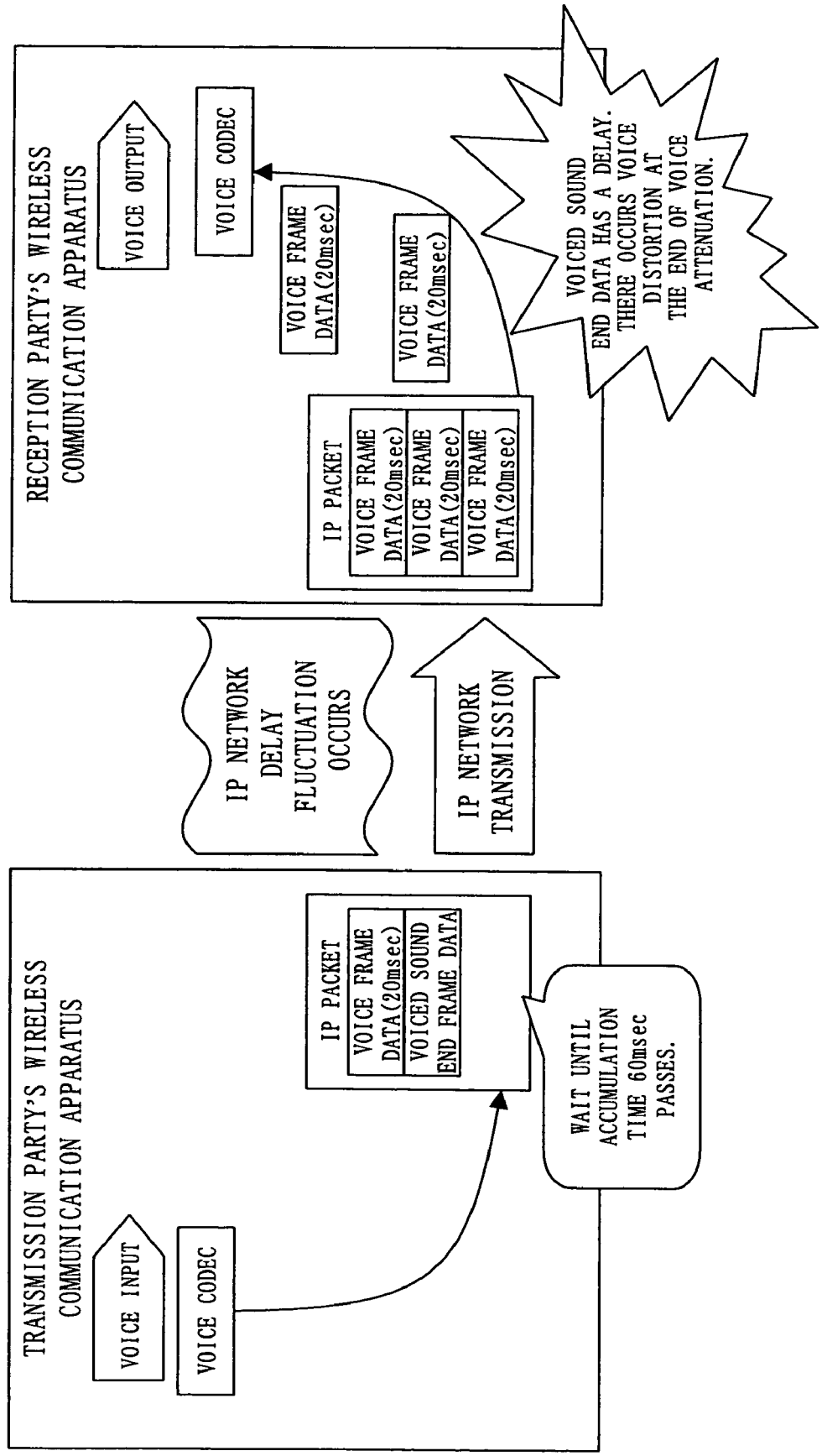
FIG. 68 is a diagram explaining a state of considerable delay fluctuation occurred in the transmission and reception of the general voice data IP packet between wireless communication apparatuses according to the thirteenth embodiment.

Consequently, as shown in FIG. 68, according to this conventional method, in the case where a substantive transmission delay fluctuation of IP packets occurs, only an IP packet including the voice frame data indicating that ending is voiced may arrive with a substantive delay from the preceding voiced voice frame data. In that case, silent compression based reproduction process of the voice codec on the reception side may be affected. As a result, distortion may occur at the end of voiced sound if the IP packet is not damaged.

Figure 69:
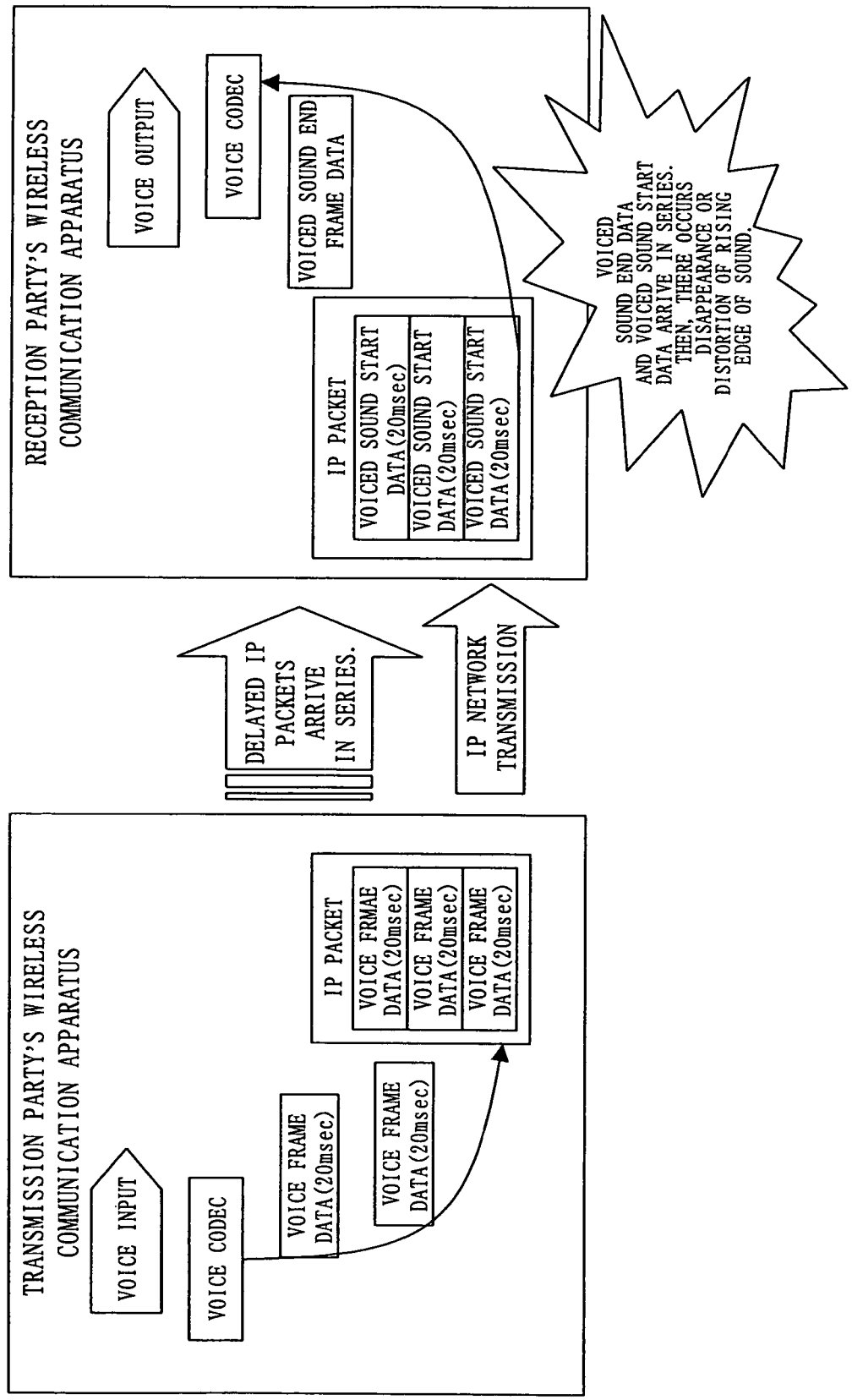
FIG. 69 is a diagram explaining a state immediately after having considerable delay fluctuation occurred in the transmission and reception of the general voice data IP packet between wireless communication apparatuses according to the thirteenth embodiment.

In addition, with referring to FIG. 69, an IP packet including the voice frame data indicating that the ending is voiced may arrive late as illustrated, and soon after that the voice frame data having the marker bit turned ON indicating the resumption of incoming voiced sound may arrive. In this case, the end of voiced sound and the start of voiced sound are instructed in series in a short time to the voice codec on the reception side. As a result, loss may occur at the rising edge of voiced sound, or unpleasant noise may occur.

Figure 70:
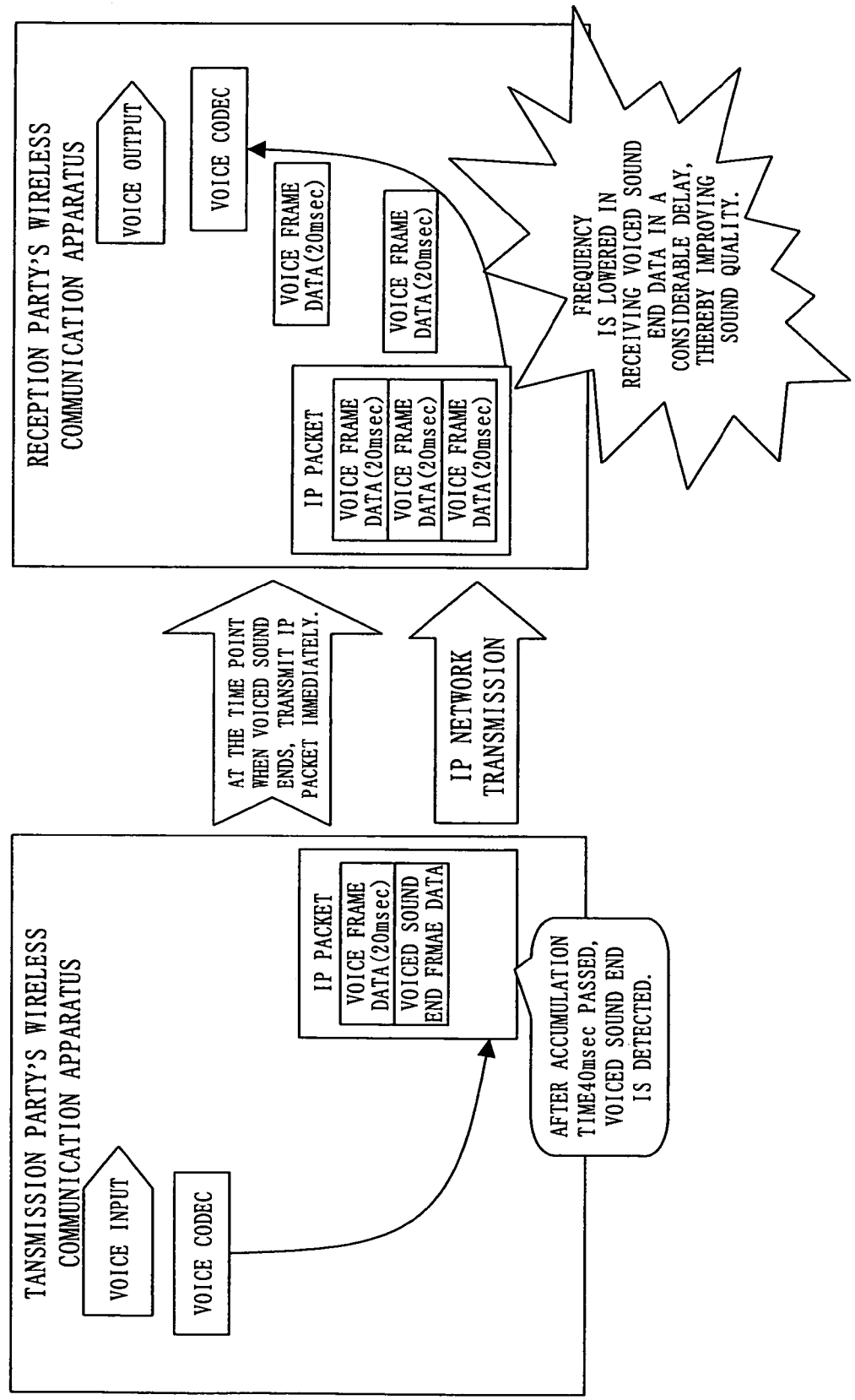
FIG. 70 is a diagram explaining a transmission and reception system of the voice data IP packet between wireless communication apparatuses according to the thirteenth embodiment.

For that reason, as shown in FIG. 70, according to the present invention, it is designed to maintain the quality of voice even in the case where the IP network has substantive delay fluctuation as mentioned above. Specifically, in the case where the voice frame data indicating that ending is voiced is generated by the voice codec on the transmission side, the formation of an IP packet is immediately stopped there regardless of the accumulation time of an IP packet, and then the IP packet is transmitted over the IP network. As a result, the voice codec by the silent compression on the reception side is allowed to reproduce natural voice attenuation and disappearance and voice may be reproduced with a natural rising edge on the reception side.

Embodiment 14

Figure 71:
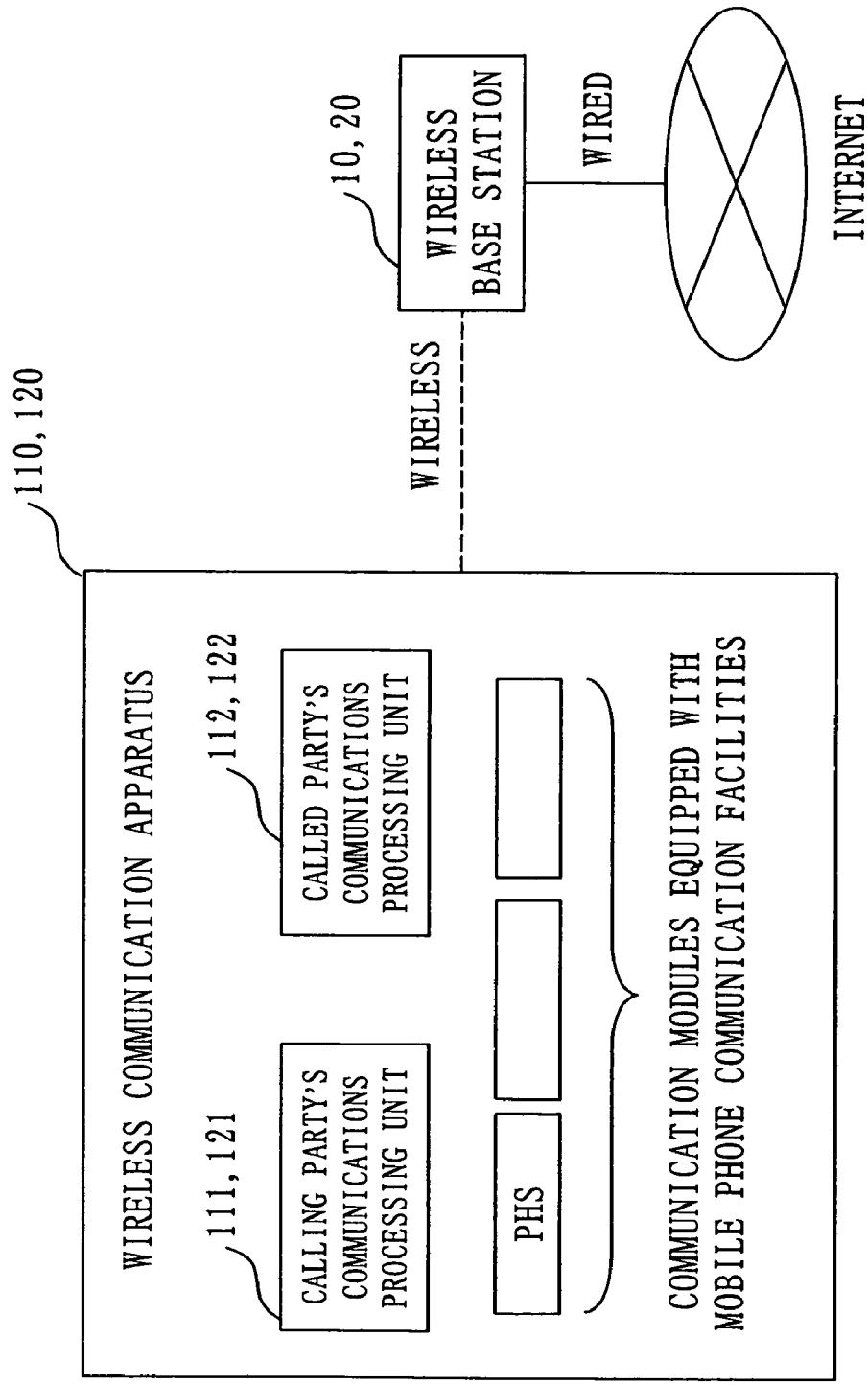
FIG. 71 is a diagram showing a configuration according to a fourteenth embodiment.

FIG. 71 is a diagram showing a configuration according to a fourteenth embodiment. Each element of the configuration is the same as that of the first embodiment.

With referring to FIG. 71, the wireless communication apparatus 110 or the wireless communication apparatus 120 is connected to the Internet via the wireless base station 10 or the wireless base station 20, respectively. The wireless base station 10, 20 converts and translates between wireless communications and wired communications.

The wireless communication apparatus 110, 120 is equipped with a plurality of communication facilities for mobile phone including PHS (PERSONAL HANDY-PHONE SYSTEM), and carries out communications by use of one of the plurality of communication facilities that is selected by a user.

Thus, the wireless communication apparatus 110, 120 is characterized by not only having the communication facilities of the wireless communication apparatus 110, 120 mentioned above, but also having the existing communication facilities for mobile phone including such as PHS (PERSONAL HANDYPHONE SYSTEM). Thus, the user thereof is allowed to select one of the communication facilities mentioned above to perform a communication operation.

FIG. 71 shows the wireless communication apparatus 110, 120 that is equipped with a plurality of communication modules, each of which is equipped with a communication facility for mobile phone, including PHS. The wireless communication apparatus 110, 120 selects and inputs at least one of the plurality of communication modules, and carries out communications by use of an inputted communication module for communications.

The plurality of communication modules includes a communication module that can be connected to a wired network such as the Internet and is capable of communication.

The wireless communication apparatus 110, 120 selects from among the plurality of communication modules a communication module that can be connected to a wired network and is capable of communication, and inputs a selected communication module.

Thus, the wireless communication apparatus 110, 120 is characterized in that it can arbitrarily select two or more communication apparatus modules, each being equipped with a conventional communication facility for mobile phone including PHS (PERSONAL HANDY PHONE SYSTEM), and add them to the wireless communication apparatus.

Another characteristic of the wireless communication apparatus 110, 120 is that it can select the communication apparatus module that can be connected to the wired network and is capable of communication, and add it to the wireless communication apparatus as the communication module.

Embodiment 15

Figure 72:
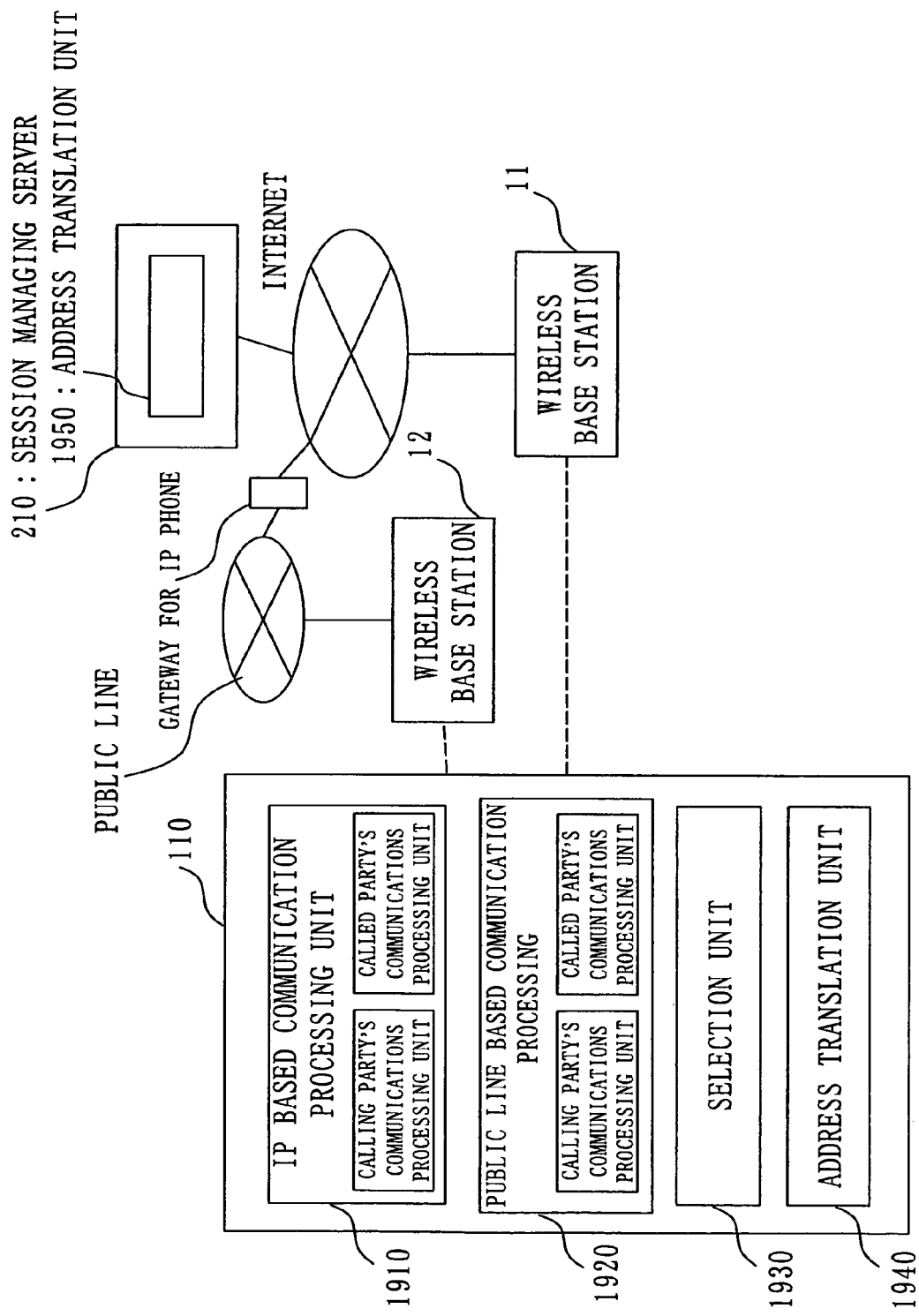
FIG. 72 is a diagram showing a configuration according to a fifteenth embodiment.

FIG. 72 is a diagram showing a configuration according to a fifteenth embodiment.

With referring to FIG. 72, reference numerals 11 and 12 each denote a wireless base station. A reference numeral 1910 denotes an IP based communication processing unit. A reference numeral 1920 denotes a public line based communication processing unit. A reference numeral 1930 denotes a selection unit. A reference numeral 1940 denotes an address translation unit. A reference numeral 1950 denotes an address translation unit. Elements other than those are the same as the elements of the first embodiment.

FIG. 72 shows the Internet, which is connected to a public line via a gateway for IP phone.

The wireless communication apparatus 110 receives phone number information from a user.

The IP based communication processing unit 1910 carries out communications over the Internet via the wireless base station 11.

The public line based communication processing unit 1920 carries out communications by way of a public line for analog data communications via the wireless base station 12.

The selection unit 1930 selects between the Internet and the public line.

The address translation unit 1940 translates the phone number information to the identification number of a destination wireless communication apparatus.

The wireless communication apparatus 110 is equipped with the IP based communication processing unit 1910, the public line based communication processing unit 1920, the selection unit 1930, and the address translation unit 1940.

The public line based communication processing unit 1920 is equipped with calling means. The public line based communication processing unit 1920, in the case where the public line is selected by the selection unit 1930, inputs the phone number information received from the user directly to the calling means to carry out telephone communications.

The address translation unit 1940, in the case where the Internet is selected by the selection unit 1930, inputs the phone number information received from the user, and translates the phone number information inputted to the identification number of the designation wireless communication apparatus.

The IP based communication processing unit 1910 acquires the identification number of the destination wireless communication apparatus translated by the address translation unit 1940, and carries out telephone communications with the destination wireless communication apparatus.

FIG. 72 shows the calling party's session managing server 210, which is connected to the Internet. The calling party's session managing server 210 is equipped with the address translation unit 1950 for translating phone number information to the identification number of the destination wireless communication apparatus.

The address translation unit 1950, in the case where an IP phone network is selected by the selection unit 1930, inputs the phone number information received from the user, and translates the phone number information inputted to the identification number of the destination wireless communication apparatus.

The IP based communication processing unit 1910 acquires the identification number of the destination wireless communication apparatus translated by the address translation unit 1950, and carries out telephone communications with the destination wireless communication apparatus.

Thus, the wireless communication apparatus 110 is characterized as follows. The wireless communication apparatus 110 is equipped with the plurality of communication facilities. In the case where the communication facility that allows the wireless communication apparatus to be used in the same way as an existing public line based telephone is selected, the wireless communication apparatus 110 inputs phone number information received from a user directly to the calling means of the communications facility, so that telephone communications can be carried out. In the case where the IP communication facility is selected, the wireless communication apparatus 110 inputs the phone number information at the address translation means for translating a phone number stored in the wireless communication apparatus 110 or the session managing server 210 to which the wireless communication apparatus 110 is assigned to the identification number of the destination wireless communication apparatus to acquire the identification number of the destination wireless communication apparatus, so that telephone communications can be carried out with the destination.

In addition, in the case where the Internet is selected by the selection unit 1930, the wireless communication apparatus 110 transmits the phone number information received from the user to the session managing server 210 to which the wireless communication apparatus 110 is assigned.

The session managing server 210 connects to a predetermined gateway for IP phone and transmits the phone number information. This allows telephone communications to be carried out with an ordinary telephone communications apparatus from the session managing server 210 over the IP phone network with the gateway for IP phone set up.

Thus, the wireless communication apparatus 110 is characterized as follows. In the case where the communication facility of the IP based communication processing unit 1910 is selected, the wireless communication apparatus 110 transmits phone number information received from a user to the session managing server 210 to which the wireless communication apparatus 110 is assigned. The session managing server 210 connects to an existing standard-based gateway for IP phone such as SIP or H. 323, and transmits the phone number information. This allows telephone communications to be carried out with an ordinary telephone communications apparatus from the session managing server 210 over the IP phone network with the gateway for IP phone set up.

FIG. 72 shows the configuration of the calling party. The same can be applied to the configuration of the called party. With the configuration of the called party, the wireless communication apparatus 110 is replaced by the wireless communication apparatus 120, the wireless base station 10 is replaced by the wireless base station 20, and the session managing server 210 is replaced by the session managing server 220.

The called party's session managing server 220 carries out connections to accept a call for communication issued by a telephone communications apparatus over the Internet, performs accepting a call for communication with the corresponding wireless communication apparatus 120, and carries out telephone communications.

Thus, the wireless communication apparatus 120 is characterized as follows. The session managing server 220 carries out connections to accept a call for communication issued by an ordinary telephone communication apparatus over the Internet, and performs accepting a call for communication with the corresponding wireless communication apparatus 120. This allows the wireless communication apparatus 120 to carry out telephone communications.

Figure 73:
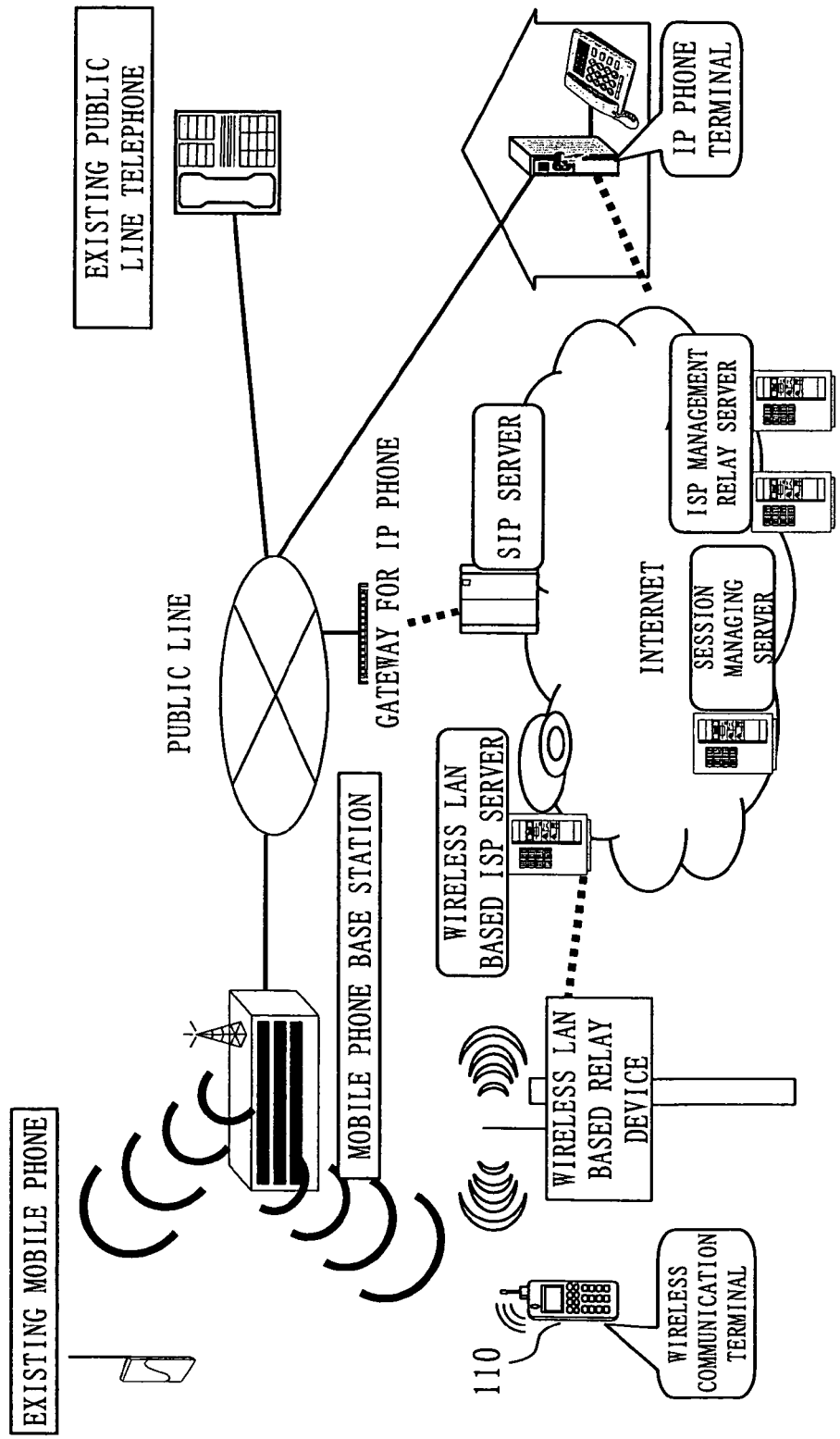
FIG. 73 is a diagram showing a concrete example of the fifteenth embodiment.

FIG. 73 is a diagram showing a concrete example of the fifteenth embodiment.

FIG. 73 shows examples of the base station apparatus including a mobile phone base station and a wireless LAN (Local Area Network) based ISP (Internet Service Provider) server. The wireless LAN based ISP server connects to the wireless communication apparatus by way of a wireless LAN based relay device. The wireless LAN based ISP server is connected to the Internet. A session managing server, a SIP (Session Initiation Protocol) server, ISP management relay servers, and an IP phone terminal are connected over the Internet. The SIP server is connected to a public line via the gateway for IP phone. The mobile phone base station is connected to the public line. An existing public line based telephone and the IP phone terminal are connected to the public line. The mobile phone base station carries out a telephone communication function as an existing base station for mobile phone. The wireless communication apparatus can make phone calls by way of the mobile phone base station in the same way as an existing mobile phone.

Figure 74:
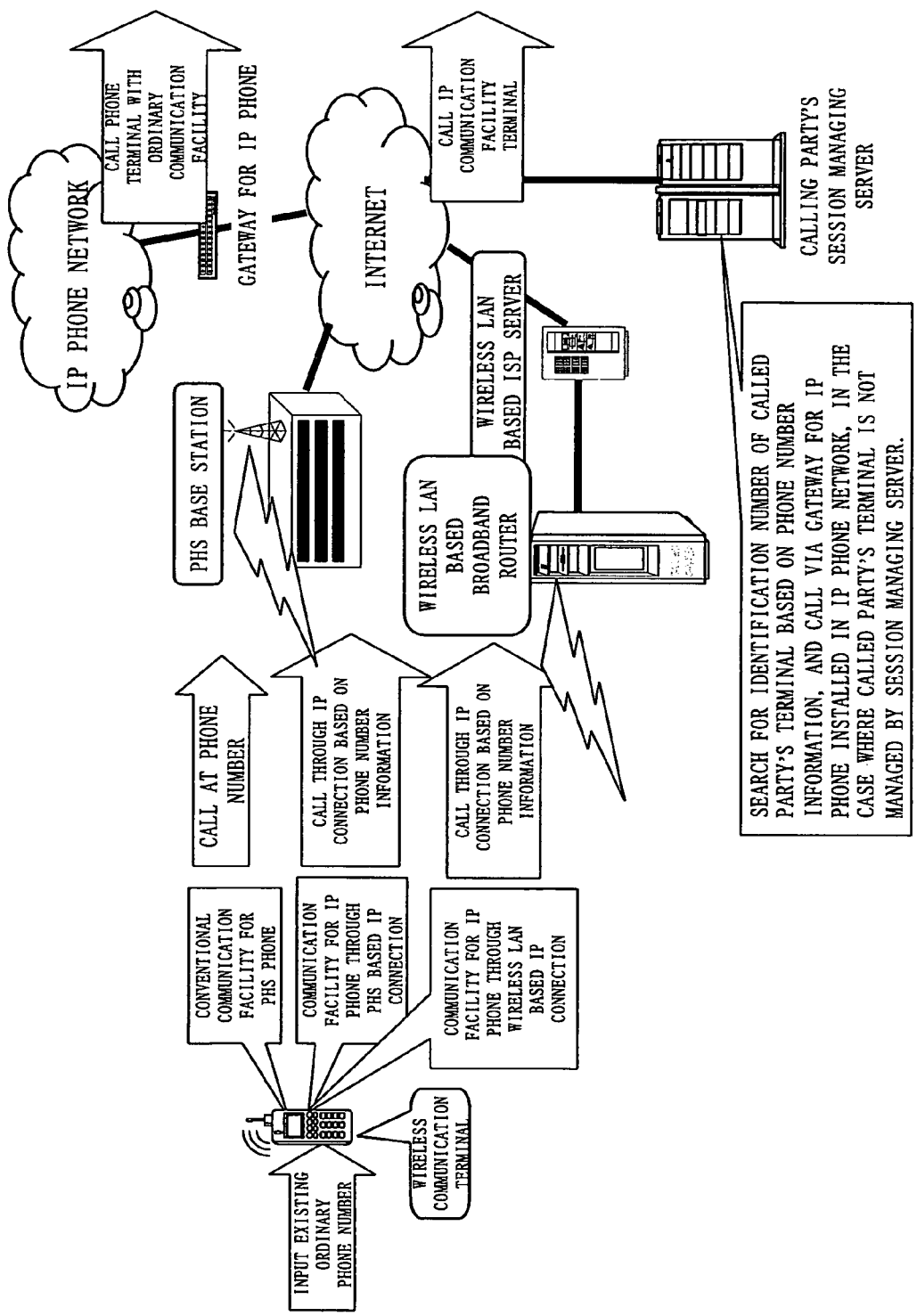
FIG. 74 is a diagram showing an example of carrying out communications.

FIG. 74 is a diagram showing a communication example.

FIG. 74 shows a wireless communication terminal as an example of the wireless communication apparatus, and a PHS (PERSONAL HANDYPHONE SYSTEM) base station and a wireless LAN based broadband router as examples of the wireless base station apparatus. The PHS base station is connected to the Internet. The wireless LAN based broadband router is connected to a wireless LAN based ISP server. The wireless LAN based ISP server is connected to the Internet. A calling party's session managing server is also connected to the Internet. The Internet is connected to an IP phone network via a gateway for IP phone.

Firstly, the wireless communication terminal receives a conventional ordinary phone number from a user. The wireless communication terminal is equipped with a conventional communication facility for PHS phone, a communication facility for IP phone through IP connection of PHS phone, and a communication facility for wireless LAN based IP phone.

With the conventional communication facility for PHS telephone, the wireless communication terminal calls a phone number directly by way of a PHS base station. The PHS base station connects the other party over an existing public line to call.

With the communication facilities for IP phone through IP connection of PHS phone, the wireless communication terminal calls based on the phone number information through IP connections by way of the PHS base station. The PHS base station connects the wireless communication apparatus to the Internet.

With the communication facility for wireless LAN based IP phone, the wireless communication terminal calls based on the phone number information through IP connections by way of the wireless LAN based broadband router. The wireless LAN based broadband router connects to the wireless LAN based ISP server. The wireless LAN based ISP server connects the wireless communication terminal to the Internet.

In the case of calling based on the phone number information through IP connection, the calling party's session managing server searches for the identification number of the called party's terminal based on the phone number information. The calling party's session managing server calls by way of the gateway for IP phone set up in the IP phone network, in the case where the called party terminal is not managed by the session managing server. The calling party's session managing server calls directly over the Internet in the case where the called party's terminal is a terminal with the communication facility for IP phone that is managed by the session managing server.

The communication processing discussed above is also applicable to a reversed case between the calling and the called.

Figure 75:
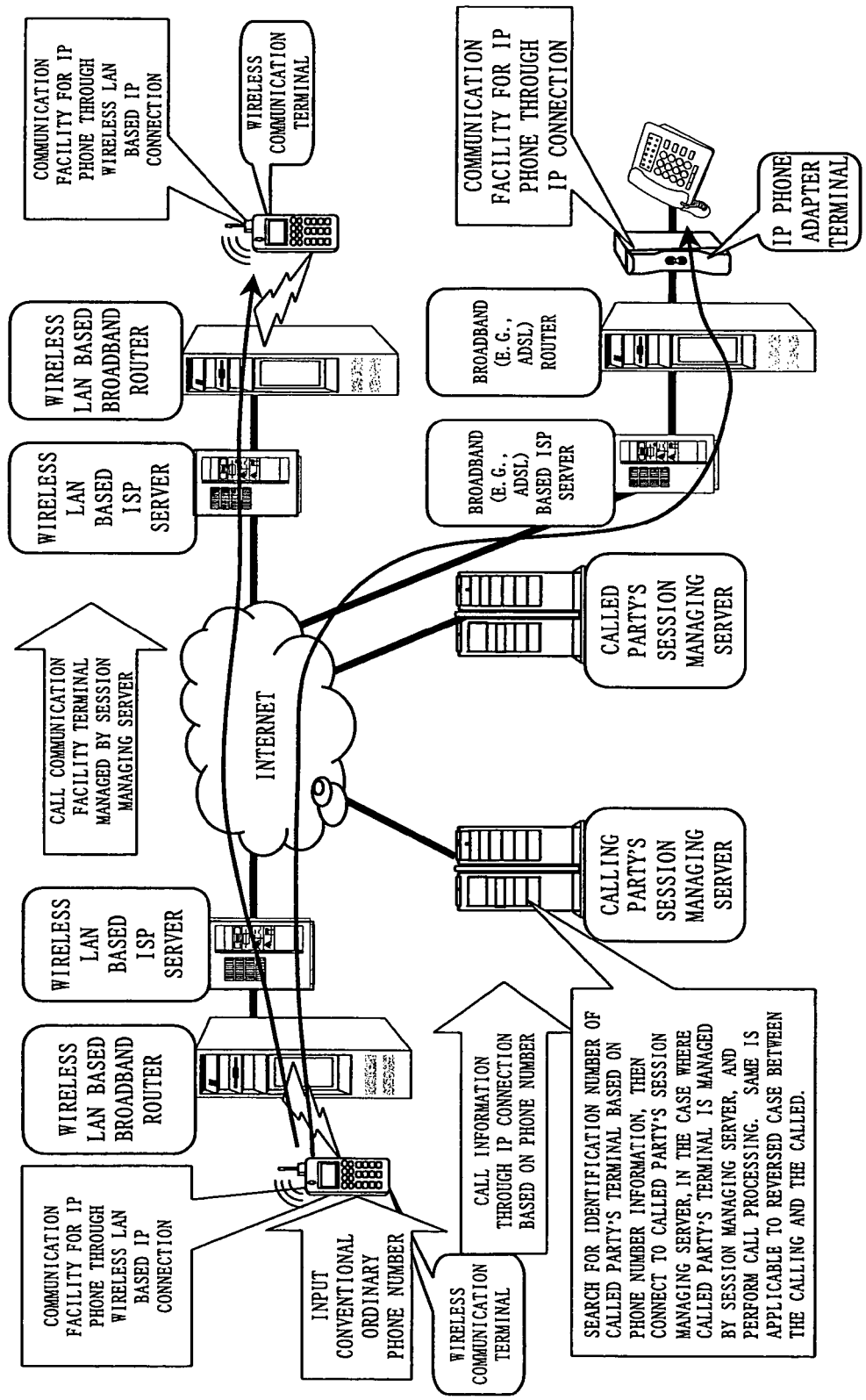
FIG. 75 is a diagram showing a case of calling by way of the Internet.

FIG. 75 is a diagram showing a case of calling over the Internet.

Firstly, a wireless communication terminal receives a conventional ordinary phone number from a user. The wireless communication terminal is equipped with the communication facility for wireless LAN based IP phone.

The wireless communication terminal calls based on phone number information through IP connections by way of a calling party's wireless LAN based broadband router. The calling party's wireless LAN based broadband router connects to a calling party's wireless LAN based ISP server. The calling party's wireless LAN based ISP server connects the wireless communication terminal to the Internet.

The calling party's session managing server searches for the identification number of the called party's terminal based on the phone number information. The calling party's session managing server connects to a called party's session managing server over the Internet and carries out call processing, in the case where the called party's terminal is a terminal with the communication facility for IP phone that is managed by a session managing server.

The called party's session managing server carries out processing to accept a call, and is connected to a called party's wireless LAN based ISP server, a broadband (such as ADSL) based ISP server or the like.

The called party's wireless LAN based ISP server is connected to a called party's wireless LAN based broadband router. The called party's wireless LAN based broadband router connects to a wireless communication terminal that is equipped with the communication facility for wireless LAN based IP phone by way of wireless communications.

The broadband (such as ADSL) based ISP server is connected to a broadband (such as ADSL) router. The broadband (such as ADSL) router connects to an IP phone adapter terminal that is equipped with the communication facility for wireless LAN based IP phone. The IP phone adapter terminal connects to a telephone apparatus.

The communication processing discussed above is also applicable to a reversed case between the calling and the called.

Figure 76:
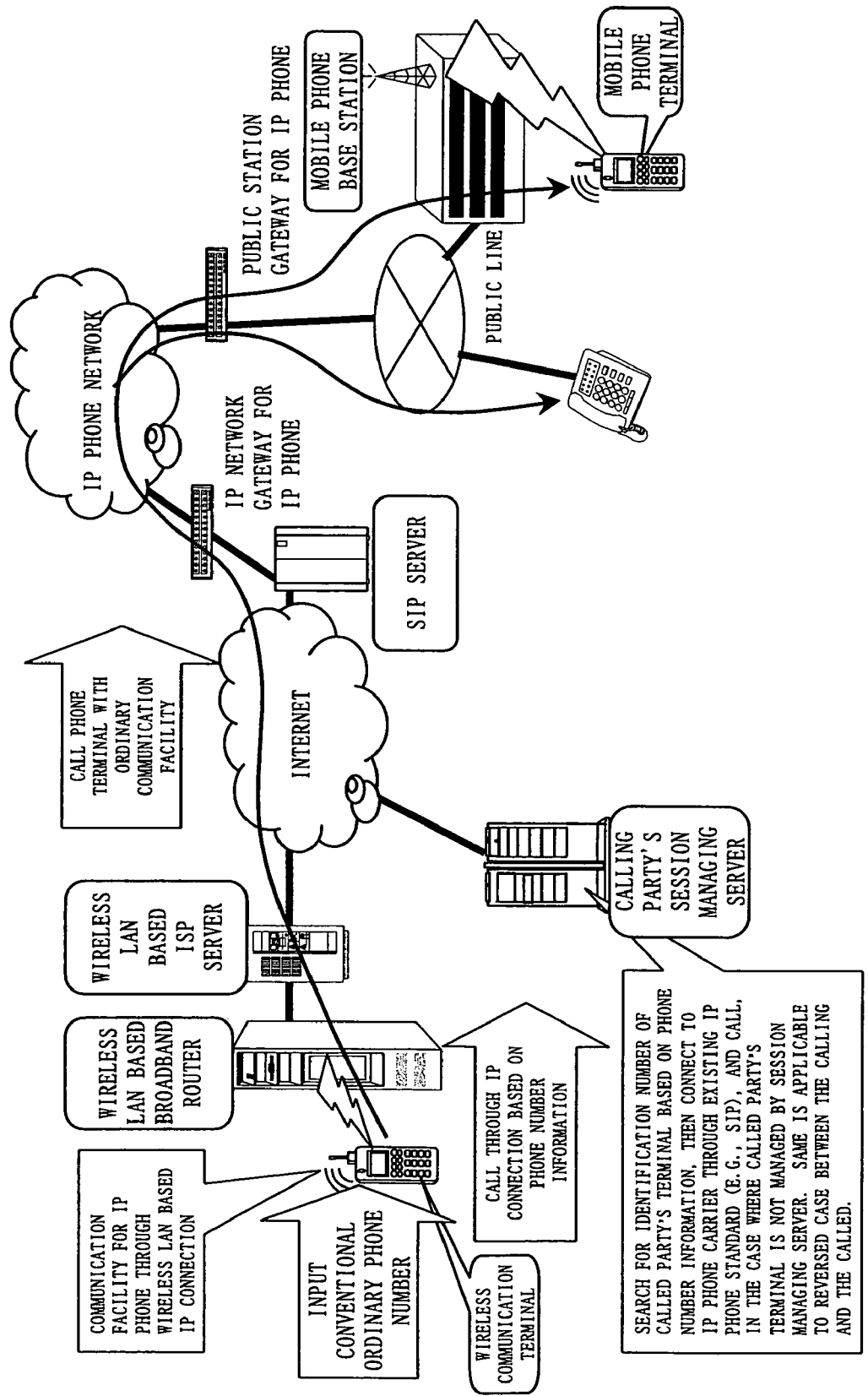
FIG. 76 is a diagram showing a case of calling by way of an IP phone network.

FIG. 76 is a diagram showing a case of calling over the IP phone network.

Firstly, the wireless communication terminal receives a conventional ordinary phone number from a user. The wireless communication terminal is equipped with the communication facility for wireless LAN based IP phone.

The wireless communication terminal calls based on telephone number information through IP connections by way of a calling party's wireless LAN based broadband router. The calling party's wireless LAN based broadband router connects to the calling party's wireless LAN based ISP server. The calling party's wireless LAN based ISP server connects to the Internet.

The calling party's session managing server searches for the identification number of the called party's terminal based on the phone number information. The calling party's session managing server connects to an IP phone carrier based on an existing standard for IP phone (e.g., SIP) and calls, in the case where the called party's terminal is a terminal with the communication facility for IP phone that is not managed by the session managing server. FIG. 76 shows a SIP server used as the server of the IP phone carrier.

The SIP server connects to an IP phone network by way of a gateway for IP phone on the IP side. The IP phone network is connected to a public line by way of a public station gateway for IP phone. The SIP server connects to an existing telephone apparatus or a mobile phone base station by way of the IP phone network or a public line. The mobile phone base station connects to a mobile phone terminal through mobile phone wireless service.

The communication processing discussed above is also applicable to a reversed case between the calling and the called.

Embodiment 16

Figure 77:
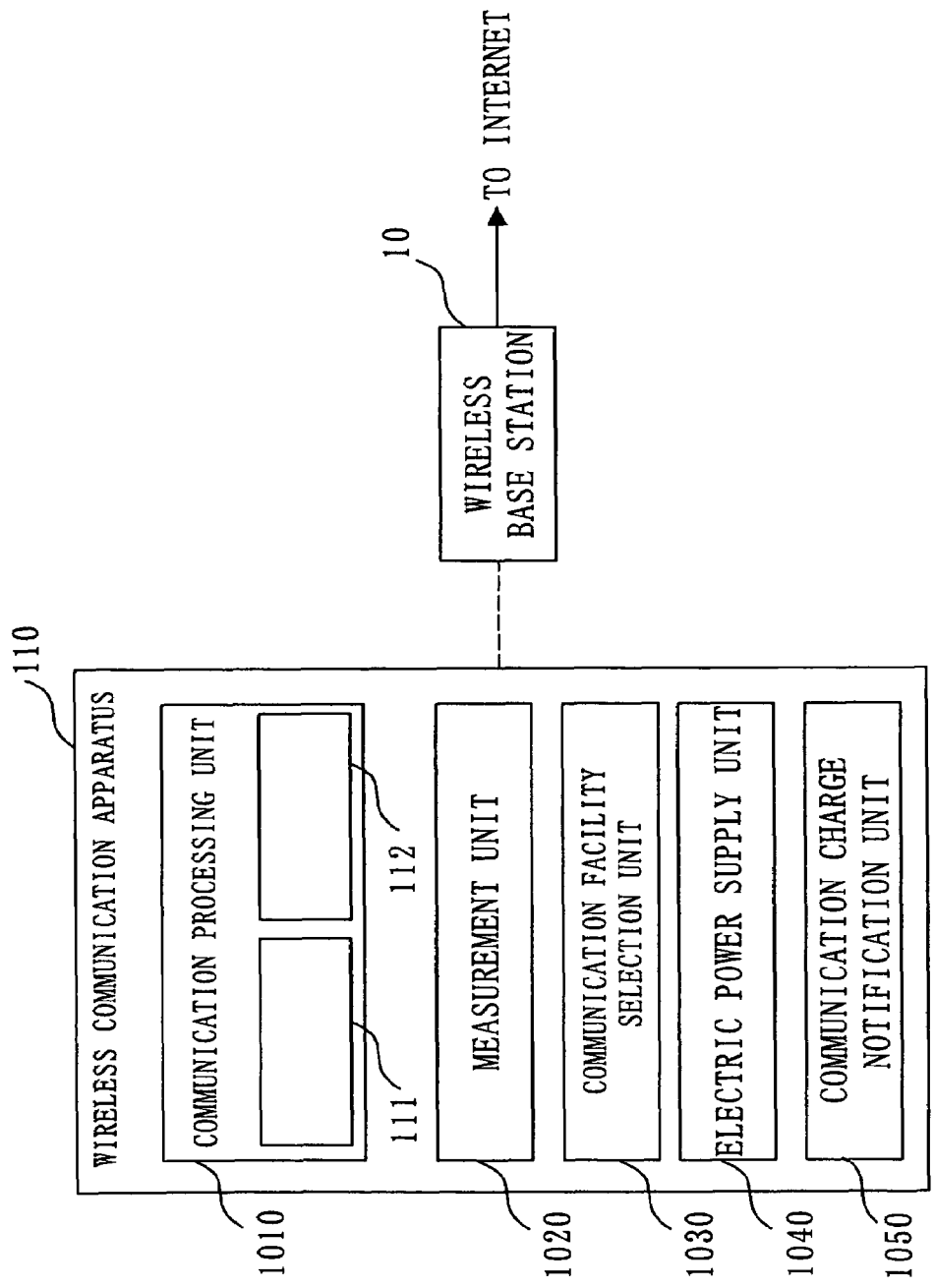
FIG. 77 is a diagram showing a configuration according to a sixteenth embodiment.

FIG. 77 is a diagram showing a configuration according to a sixteenth embodiment.

With referring to FIG. 77, a reference numeral 1010 denotes a communication processing unit, a reference numeral 1020 denotes a measurement unit, a reference numeral 1030 denotes a communication facility selection unit, a reference numeral 1040 denotes an electric power supply unit, and a reference numeral 1050 denotes a communication charge notification unit. Elements other than those are the same as the elements of the first embodiment.

The wireless communication apparatus 110 of FIG. 77 is equipped with the communication processing unit 1010, the measurement unit 1020, the communication facility selection unit 1030, the electric power supply unit 1040, and the communication charge notification unit 1050.

The communication processing unit 1010 includes a plurality of communication facilities.

The measurement unit 1020 measures radio wave strength for communication that is affected by at least one of a plurality of communication states in connection with distance from the wireless base station 10, location relation, topographic features, atmospheric phenomena, communication time zones, and radio wave characteristics.

The communication facility selection unit 1030 selects from among the plurality of communication facilities a communication facility that holds the radio wave strength for communication measured by the measurement unit 1020 most stably and strongly.

The communication processing unit 1010 carries out communications by use of the communication facility selected by the communication facility selection unit 1030.

The communication facility selection unit 1030 calculates electric power consumption of each of the plurality of communication facilities in case it is used by the communication processing unit 1010, and selects a communication facility that consumes electric power as low as possible.

The communication processing unit 1010 carries out communications by use of the communication facility selected by the communication facility selection unit 1030 so that communication can continue.

The electric power supply unit 1040 has electric power charged.

The communication facility selection unit 1030 also manages the consumption of electric power supply charged in the electric power supply unit 1040. In the case where the consumption of electric power managed exceeds a predetermined value, the communication facility selection unit 1030 selects the communication facility that consumes electric power as low as possible.

The communication facility selection unit 1030 also selects one of the plurality of communication facilities based on a predetermined condition.

The communication charge notification unit 1050 notifies a user of the communication charge for the communication facility selected by the communication facility selection unit 1030, in case communications are carried out by use of the communication facility selected, by means of at least one of colors, numerical values, graphics, and sounds indicating that the cost of the communication charge for the communication facility selected is high or low.

Thus, the wireless communication apparatus 110 is characterized as follows. The wireless communication apparatus 110 is equipped with the plurality of communication facilities, the facility to measure radio wave strength for communication that is affected by at least one of the plurality of communication states in connection with distance from the wireless base station 10, location relation, topographic features, atmospheric phenomena, communication time zones, and radio wave characteristics, and the facility to select the communication facility that holds radio wave strength for communication most stably and strongly. Then, the wireless communication apparatus 110 can carry out communications by use of the selected communications facility.

Another characteristic of the wireless communication apparatus 110, as aforementioned, is to have the plurality of communication facilities, calculate the electric power consumption of each communication facility in case it is used, and select the communication facility that consumes electric power as low as possible when electric power is becoming low, so that communication can continue.

Still another characteristic of the wireless communication apparatus 110 is, as aforementioned, to notify a user of communication charge for the automatically selected communication facility by means of colors, numerical values, graphics, and sounds indicating that the cost of the communication charge for the automatically selected communication facility is high or low, in case communications are carried out by use of the automatically selected communications facility.

Embodiment 17

Figure 78:
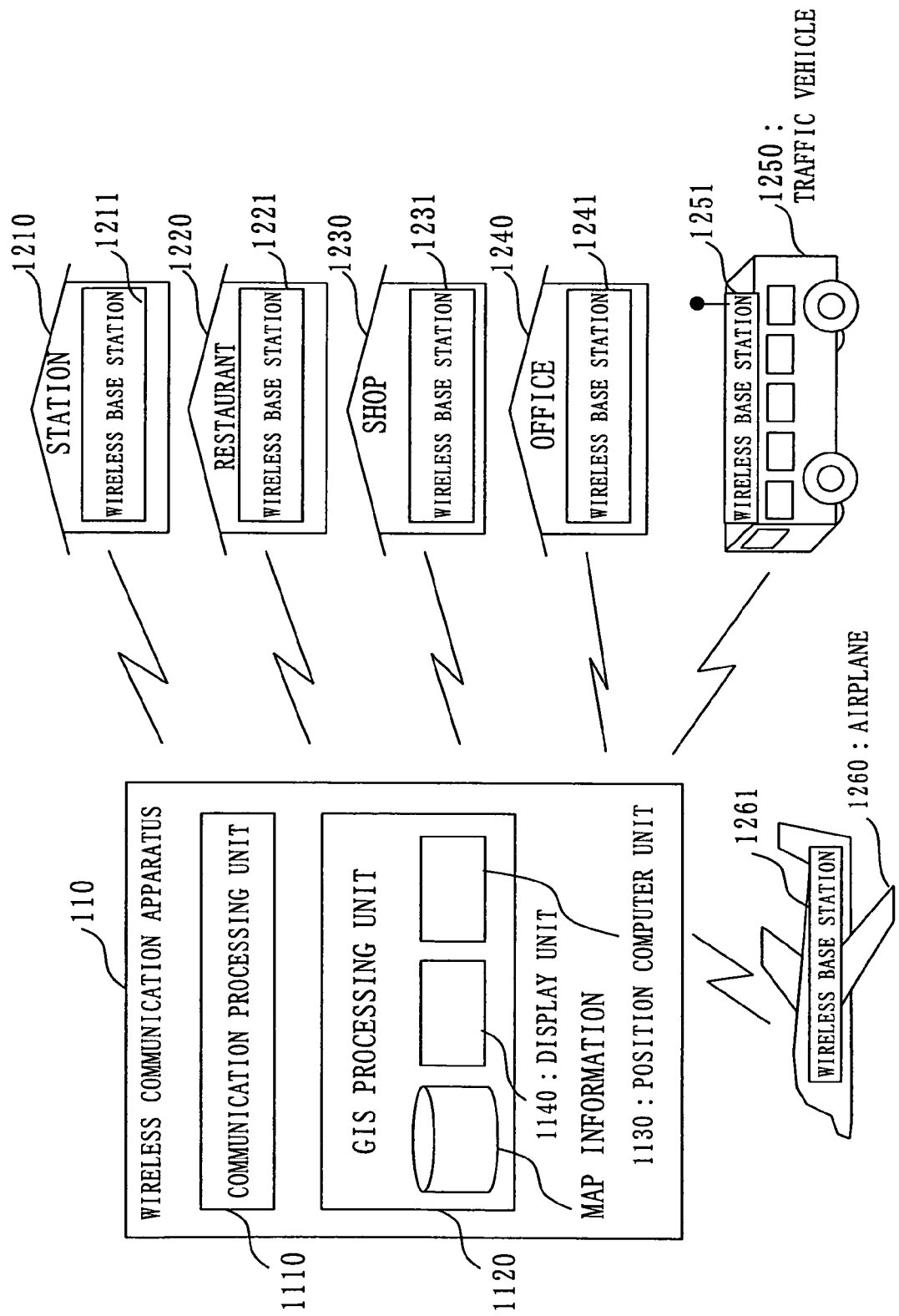
FIG. 78 is a diagram showing a configuration according to a seventeenth embodiment.

FIG. 78 is a diagram showing a configuration according to a seventeenth embodiment.

With referring to FIG. 78, a reference numeral 1110 denotes a communication processing unit, and a reference numeral 1120 denotes a GIS (Geographic Information System) processing unit. Elements other than those are the same as the elements of the first embodiment.

In FIG. 78, the wireless communication apparatus 110 is equipped with the communication processing unit 1110 and the GIS processing unit 1120. The GIS processing unit 1120 includes map information, a display unit 1140, and a position computer unit 1130.

The communication processing unit 1110 includes a plurality of communication facilities.

The GIS processing unit 1120 includes the map information, and a GIS (Geographic Information System) facility. The position computer unit 1130 checks the present position of the wireless communication apparatus 110. The display unit 1140 notifies a user of the present position based on present position information obtained through the GIS facility and the map information, and displays on a map the available range of communication facilities at low cost for each of the plurality of communication facilities based on the map information.

With further reference to FIG. 78, a reference numeral 1210 denotes a station, and a reference numeral 1211 denotes a wireless base station set up at the station 1210. A reference 1220 denotes a restaurant, and a reference numeral 1221 denotes a wireless base station set up at the restaurant 1220. A reference numeral 1230 denotes a shop, and a reference numeral 1231 denotes a wireless base station set up at the shop 1230. A reference numeral 1240 denotes an office, and a reference numeral 1241 denotes a wireless base station set up at the office 1240. A reference numeral 1250 denotes a traffic vehicle, and a reference numeral 1251 denotes a wireless base station set up on board the traffic vehicle 1250. A reference numeral 1260 denotes an airplane, and a reference numeral 1261 denotes a wireless base station set up on board the airplane 1260.

The display unit 1140 of the wireless communication apparatus displays on the map based on the map information at least one of the station 1210, the restaurant 1220, the shop 1230, and the office 1240 as structural examples, and the movable traffic vehicle 1250, the movable airplane 1260, etc., with the wireless base stations setup for low-cost communication facility 1211, 1221, 1231, 1241, 1251, 1261, etc., respectively, for each of the plurality of communication facilities. The structures here may be of any ordinary buildings other than the station 1210 of public transport, the restaurant 1220, the shop 1230, and the office 1240 shown. Or, other structures are also applicable. Similarly, any movable object that is capable of setting up a wireless base station on board may be replaced for the movable traffic vehicle 1250 or the movable airplane 1260 shown. An example may be a movable vessel.

Thus, the wireless communication apparatus 110 is characterized by including the GIS facility. Consequently, the wireless communication apparatus 110 can check the present position of the wireless communication apparatus 110, notify a user of the present position through the map display facility based on the present position information obtained through the GIS facility, and display on the map for each of the plurality of communication facilities based on the map information the range within which low-cost communication facility is available.

Another characteristic of the wireless communication apparatus 110 is to allow the station 1210 of public transport such as railway transportation, the restaurant 1220, the shop 1230, the office 1240, the moving traffic vehicle 1250, the airplane 1260, etc. with the wireless base stations set up for low-cost communication facility to be displayed on the map through the map display facility for each of the plurality of communication facilities.

Embodiment 18

Figure 79:
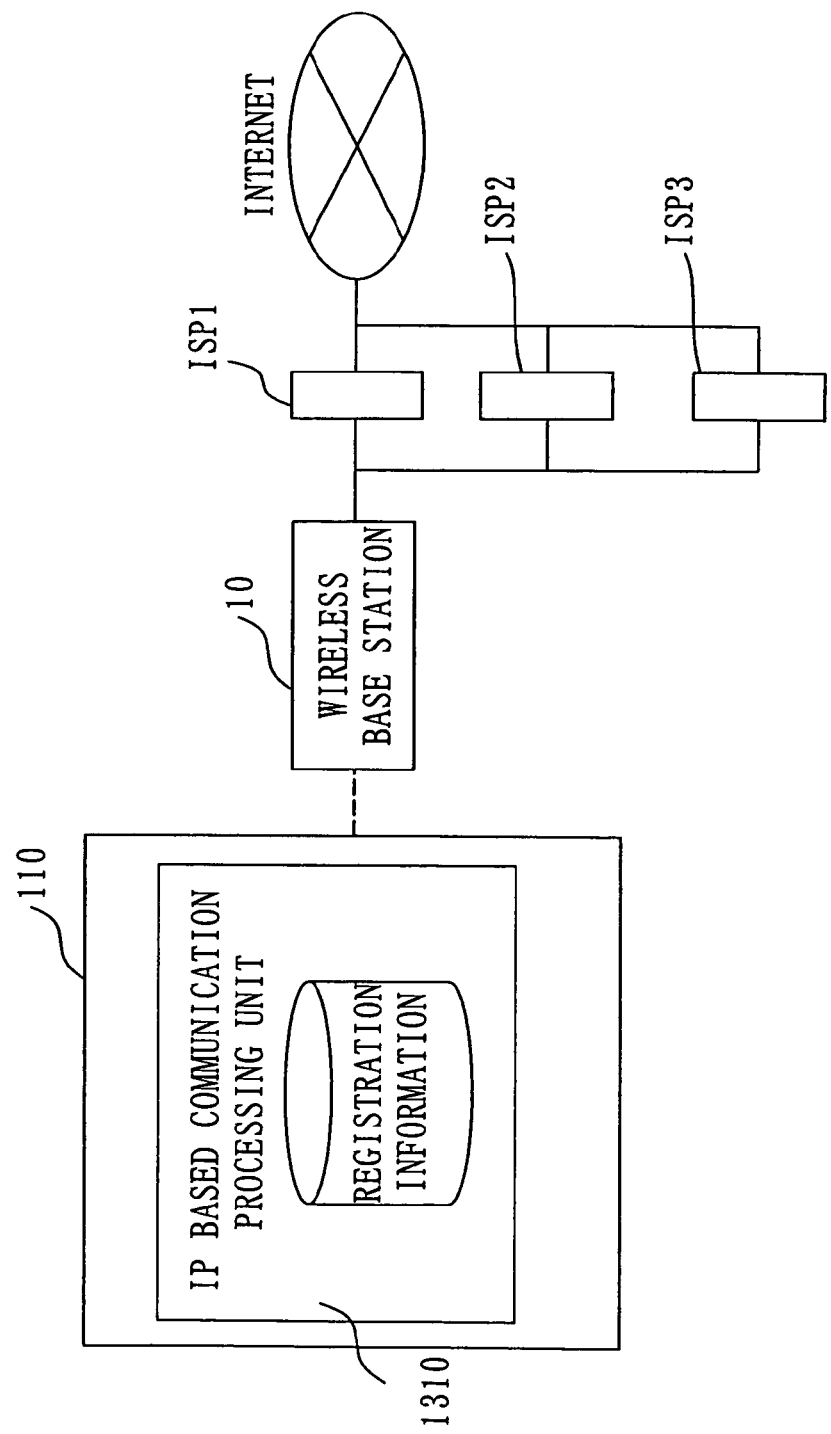
FIG. 79 is a diagram showing a configuration according to an eighteenth embodiment.

FIG. 79 is a diagram showing a configuration according to an eighteenth embodiment.

With referring to FIG. 79, a reference numeral 1310 denotes an IP based communication processing unit. Elements other than the IP based communication processing unit are the same as those of the first embodiment.

The wireless communication apparatus 110 of FIG. 79 is equipped with the IP based communication processing unit 1310. The wireless communication apparatus 110 can be connected to a plurality of ISPs (Internet Service Provider) by way of the wireless base station 10, and is connected to the Internet via one of the plurality of ISPs.

The IP based communication processing unit 1310 carries out communications over an IP (Internet Protocol) network.

The IP based communication processing unit 1310 stores registration information for connecting to the plurality of ISPs (Internet Service Provider), which are used for implementing communication facilities, on the Internet and selects one of the plurality of ISPs stored based on a predetermined rule.

The IP based communication processing unit 1310 also selects an optimal one based on at least one of a plurality of conditions including calling charge, access congestion, availability at the wireless base station apparatus 10, etc.

Thus, the wireless communication apparatus 110 is characterized as follows. The wireless communication apparatus can store the plurality of pieces of registration information used for connecting to the ISPs (Internet Service Provider), which are used for implementing the IP communications facility, on the Internet. Then, the wireless communication apparatus can automatically select an optimal one of the plurality of ISPs depending on the conditions including calling rate, accessing congestion, availability at the wireless base station, and the like.

Embodiment 19

Figure 80:
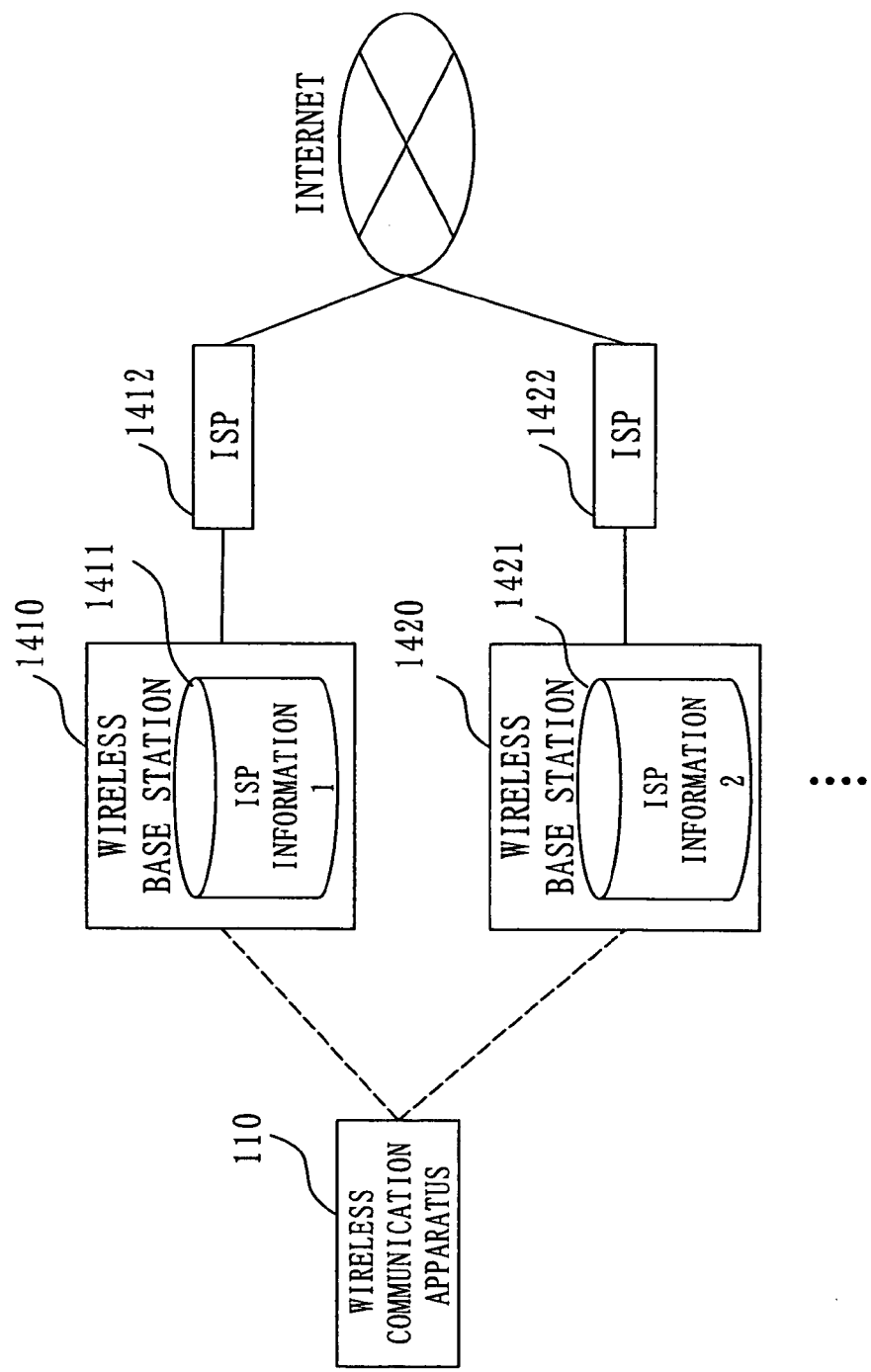
FIG. 80 is a diagram showing a configuration according to a nineteenth embodiment.

FIG. 80 is a diagram showing a configuration according to a nineteenth embodiment.

With referring to FIG. 80, reference numerals 1410 and 1420 each denote a wireless base station, reference numerals 1411 and 1412 each denote ISP information, and reference numerals 1412 and 1422 each denote an ISP (Internet Service Provider). Elements other than those are the same as the elements of the first embodiment.

In FIG. 80, the wireless base station 1410, 1420 is an apparatus that is set up on individual basis by an individual who has nothing to do with a public institution nor a corporate entity. The wireless base station 1410 stores and holds the ISP information 1411 that is information about the ISP 1412 that is available at the wireless base station 1410 itself. Similarly, the wireless base station 1420 stores and holds the ISP information 1421 that is information about the ISP 1422 that is available at the wireless base station 1420 itself. The wireless base station 1410, 1420 is connected to the Internet by way of the ISP 1412, 1422, respectively, that is available at the wireless base station 1410, 1420 itself.

The wireless communication apparatus 110, in the case of accessing the wireless base station 1410, 1420 that is set up on individual basis, inputs the information about the ISP 1412, 1422 that is available at the wireless base station 1410, 1420 itself from the wireless base station 1410, 1420, respectively. Then, the wireless communication apparatus 110 carries out communications by use of the ISP 1412, 1422 inputted based on the information about the ISP 1412, 1422, respectively.

Figure 81:
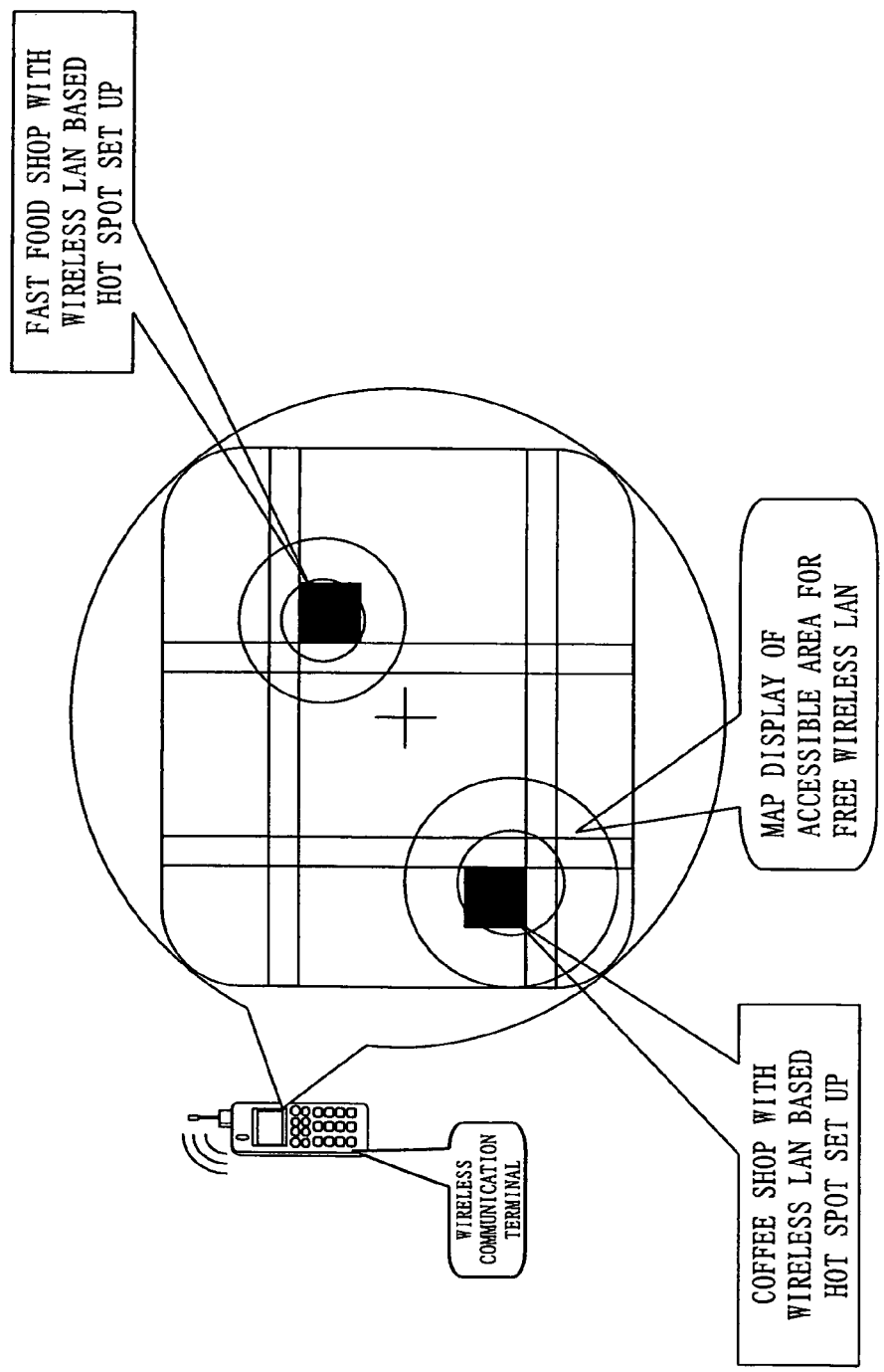
FIG. 81 is a diagram showing a wireless communication terminal with wireless LAN based hot spots displayed.

FIG. 81 is a diagram showing a wireless communication terminal with wireless LAN based hot spots displayed.

The wireless communication terminal is an example of the wireless communication apparatus 110. The wireless communication terminal is equipped with a display facility. On the display screen of the wireless communication terminal, a local map is displayed. The map displays the position of a fast food restaurant having a wireless LAN based hot spot set up therein as an example of the wireless base station apparatus, the position of a coffee shop having a wireless LAN based hot spot set up therein as an example of the wireless base station apparatus, and the available area (range) of free wireless LAN.

Figure 82:
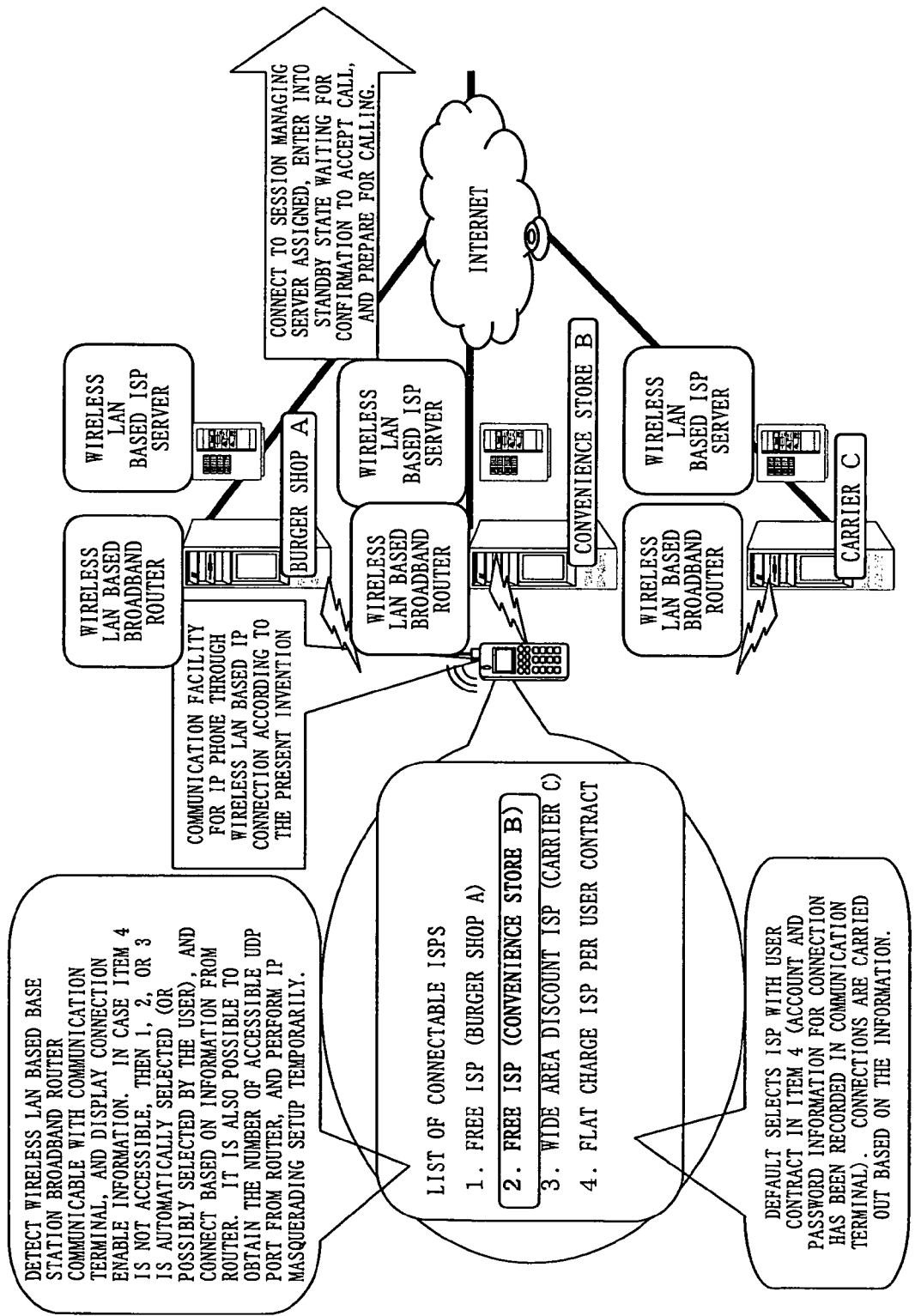
FIG. 82 is a diagram showing a case of carrying out communications based on information about an ISP available at a wireless base station.

FIG. 82 is a diagram showing a case of carrying out communications by use of the information about an ISP that is available at a wireless base station.

With referring to FIG. 82, a wireless communication terminal is an example of the wireless communication apparatus 110. The wireless communication terminal is equipped with the display facility. The display screen of the wireless communication terminal shows a list of ISPs available for connections including "1. Free ISP (Burger Shop A), 2. Free ISP (Convenience Store B (a convenience store)), 3. Discount Wide Area ISP (Carrier C), and 4. Flat Charge ISP per user contract". The wireless communication terminal is equipped with a communication facility for IP phone through wireless LAN based IP connection.

FIG. 82 shows examples of the wireless base station apparatus including a wireless LAN based broadband router that is set up at Burger Shop A, a wireless LAN based broadband router set up at Convenience Store B, and a wireless LAN based broadband router set up at Carrier C. The three wireless LAN based broadband routers are connected, respectively, to wireless LAN based ISP servers available. The three wireless LAN based ISP servers are connected to the Internet.

The wireless communication terminal detects a wireless LAN based base station broadband router that is available, and displays connections enable information. In the case where the piece 4 listed on the display screen of FIG. 82 is not available, the piece 1, 2 or 3 is automatically selected (or may be selected by the user), and connected based on information received from the base station broadband router. The wireless communication terminal can acquire a UDP port number available from the base station broadband router, and perform an IP masquerading setup for temporarily. A default selects the ISP with user contract of the piece 4 listed on the display screen of FIG. 82. (The wireless communication terminal stores the account and password information for connections.) Thus, the wireless communication apparatus carries out connections based on the information.

The wireless communication terminal carries out connections based on information from the three base station broadband routers of the pieces 1, 2, and 3 listed on the display screen, or the ISP information of the ISP with user contract of the piece 4 listed on the display screen. A connected ISP server connects to the session managing server to which the wireless communication terminal is assigned (managed), and enters into a standby state waiting for confirmation of accepting a call and at the same time prepares for calling.

Thus, the wireless communication apparatus 110 is characterized as follows. As the wireless base station 1410, 1420 being accessed through the IP communications facility, not only the wireless base stations set up at public institutions, corporate entities, and the like, but also the wireless base stations set up arbitrarily by ordinary individuals are applicable. Then, the wireless communication apparatus 110, in the case of accessing the wireless base station 1410, 1420, can acquire from the wireless base station 1410, 1420 the information about the ISP that is available at the wireless base station. Then, the wireless communication apparatus 110 can carry out communications by use of the ISP 1412, 1422 specified based on the information about the ISP.

Figure 83:
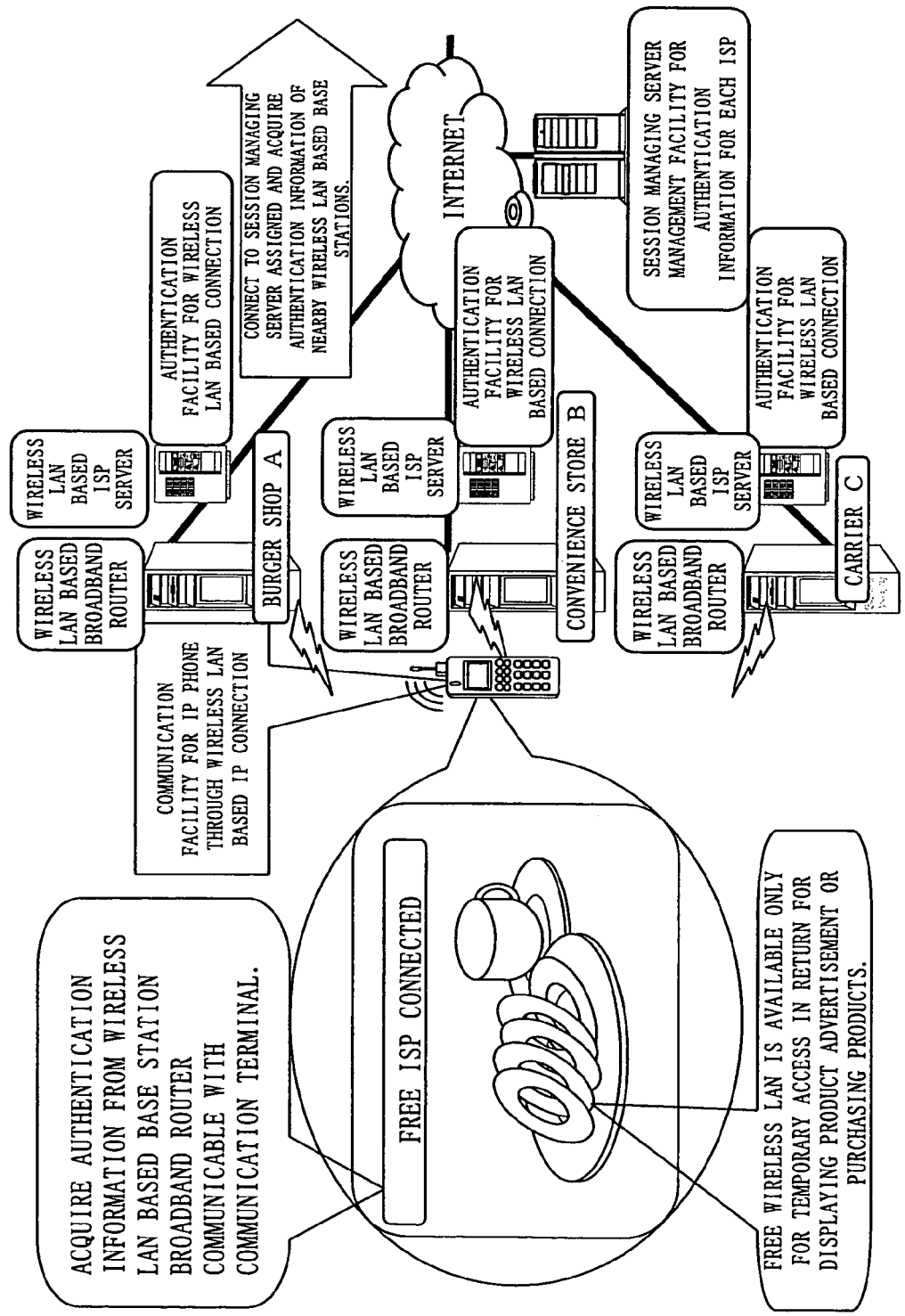
FIG. 83 is a diagram showing a case of acquiring authentication information.

FIG. 83 shows a case of acquiring authentication information.

FIG. 83 shows a wireless communication terminal as an example of the wireless communication apparatus 110. The wireless communication terminal is equipped with a display facility. On the display screen of the wireless communication terminal, "Free ISP Connected" is shown and also product advertisement is displayed. FIG. 83 shows a set product of coffee and donuts as an example of the product advertisement. The wireless communication terminal is equipped with a communication facility for IP phone through wireless LAN based IP connections.

FIG. 83 shows examples of the wireless base station apparatus including a wireless LAN based broadband router set up at Burger Shop A, a wireless LAN based broadband router set up at Convenience Store B, and a wireless LAN based broadband router set up at Carrier C. The three wireless LAN based broadband routers are connected, respectively, to wireless LAN based ISP servers that are available. The three wireless LAN based ISP servers are connected to the Internet. The three wireless LAN based ISP servers each are equipped with a wireless LAN based connection authentication facility. The session managing server is also connected to the Internet. The session managing server is equipped with authentication information management facility for each ISP as an example of an authentication information management apparatus for managing the authentication information of each ISP.

Thus, as aforementioned, the internet communication system is further equipped with the authentication information management apparatus, which is connected to the wireless base station apparatus, for managing the registration information to connect to the ISP. The registration information includes the authentication information that allows the wireless communication terminal to carry out connections for communication. The authentication information is an example of the registration information.

The wireless communication terminal is equipped with the IP based communication processing unit 1310 of FIG. 79.

The wireless communication terminal performs an acquisition operation of the authentication information with the wireless LAN based base station broadband that is communicable with the wireless communication terminal. The wireless communication terminal connects to the session managing server to which the wireless communication terminal is assigned via a wireless LAN based ISP server corresponding to one of the three wireless LAN based broadband routers. The wireless communication terminal acquires from the session managing server assigned the authentication information of nearby wireless LAN based base stations.

The authentication information management apparatus controls the registration information so that the registration information can be used for a predetermined time period, and outputs the authentication information controlled as an example of the registration information to the IP based communication processing unit 1310.

The IP based communication processing unit 1310 inputs the registration information controlled from the authentication information management apparatus, and carries out connections for communication based on the registration information inputted.

The authentication information management apparatus charges by way of the IP based communication processing unit 1310 for the period of connection for communications based on the registration information.

As aforementioned, the IP based communication processing unit 1310 may be configured so as to input the registration information controlled, without being charged from the authentication information management apparatus, in return for at least one of the act of displaying advertisement information on the wireless communication apparatus and the act of purchasing products.

The authentication information management apparatus also controls the registration information so that the registration information can be used for the predetermined time period, and stores software to perform processing of outputting the registration information controlled to the IP based communication processing unit 1310.

Then, the IP based communication processing unit 1310 may be configured so as to input the software stored in the authentication information management apparatus, and input the controlled registration information by use of the software, in return for the act of displaying advertisement information on the wireless communication apparatus.

Thus, the wireless base station is characterized as follows. The wireless base station can download from the session managing server, in return for the act of displaying such as advertisement information, the software that is capable of performing a series of processings of translating the registration information for connecting to the ISP into a form temporary available and providing the wireless communication apparatus with the registration information. Accordingly, the facility mentioned above can be added later supplementarily by downloading the software.

Furthermore, the wireless base station apparatus also distributes the advertisement information.

Then, the wireless communication apparatus may be configured so as to automatically receive the advertisement information, and display the advertisement information received, in the case of moving within communicable range of the wireless base station apparatus that distributes the advertisement information.

Thus, the wireless communication apparatus is characterized as follows. The wireless communication apparatus can automatically receive the advertisement information and the like, and display those through various types of display means, in the case of moving within communicable range of the wireless base station apparatus distributing the advertisement information.

With further referring to FIG. 83, the session managing server is equipped with the authentication information management facility for each ISP as an example of the authentication information management apparatus for managing the authentication information of each ISP. However, the three wireless LAN based broadband routers as examples of the wireless base station apparatus or the three wireless LAN based ISP servers corresponding to the three wireless LAN based broadband routers, respectively, may be equipped with the authentication information management facility as an example of the authentication information management apparatus for managing the authentication information for each ISP. In this case, the wireless base station apparatus manages the authentication information as an example of the registration information for connecting to the ISP.

Then, the wireless base station apparatus controls the registration information so that the registration information can be used for a predetermined time period, and outputs the registration information controlled to the IP based communication processing unit 1310.

The IP based communication processing unit 1310 inputs the registration information controlled from the wireless base station apparatus, and carries out connections for communication based on the registration information inputted.

The wireless base station apparatus charges for the period of connection for communications, based on the registration information, by way of the IP based communication processing unit 1310.

Similarly, as aforementioned, the IP based communication processing unit 1310 may be configured so as to input the registration information controlled, without being charged by the wireless base station apparatus, in return for at least one of the act of displaying advertisement information on the wireless communication apparatus and the act of purchasing products.

Still more, the wireless base station apparatus controls the registration information so that the registration information can be used for a predetermined time period, and stores the software to perform processing of outputting the controlled registration information to the IP based communication processing unit.

Furthermore, the IP based communication processing unit 1310 may be configured so as to input the software stored in the wireless base station apparatus, in return for the act of displaying advertisement information on the wireless communication apparatus, and input the registration information controlled by use of the software inputted.

Similarly, as aforementioned, the wireless base station apparatus distributes the advertisement information.

Then, the wireless communication apparatus may be configured so as to automatically receive the advertisement information, and display the advertisement information received, in the case of moving within communicable range of the wireless base station apparatus distributing the advertisement information.

Furthermore, as aforementioned, there is a plurality of wireless LAN based broadband routers as an example of the wireless base station apparatus.

Then, the session managing server stores a plurality of pieces of authentication information for the wireless communication apparatus managed by the session managing server itself so that the wireless communication apparatus can use a plurality of wireless base station apparatuses.

The wireless communication apparatus, while connecting with one of the plurality of wireless base station apparatuses, acquires from the session managing server, by way of an IP (Internet Protocol) line, the plurality of pieces of authentication information for accessing the plurality of wireless base station apparatuses other than the wireless base station apparatus with which the wireless communication apparatus is currently being connected. The wireless communication apparatus, in the case of moving within accessible range to one of the plurality of wireless base station apparatuses other than the wireless base station apparatus currently being connected, carries out connections for communication with the one of the plurality of wireless base station apparatuses positioned in the accessible range based on the plurality of pieces of authentication information acquired.

Thus, the wireless communication apparatus is characterized as follows. The wireless communication apparatus makes toll charge contract only for the period of temporary access to the wireless base station or the authentication information management apparatus connected to the wireless base station. This allows the wireless communication apparatus to acquire the registration information for connecting to the ISP for temporary access and carry out connections for communication.

Another characteristic of the wireless communication apparatus is as follows. The wireless communication apparatus is allowed to display on the wireless communication apparatus the advertisement information and the like obtained from the wireless base station or the authentication information management apparatus connected to the wireless base station. The wireless communication apparatus is also allowed to acquire the registration information for connecting to the ISP for temporary access, and carry out connections for communication, in return for the act of purchasing products.

Still another characteristic of the wireless communication apparatus is as follows. The wireless communication apparatus, while connected to one of the plurality of nearby wireless base stations, is allowed to obtain from the session managing server assigned by way of IP line authentication information for accessing the plurality of nearby wireless base stations. Then, in the case of moving within accessible area to a corresponding wireless base station, the wireless communication apparatus can carry out connections for communication with the wireless base station based on the authentication information thereof.

Figure 84:
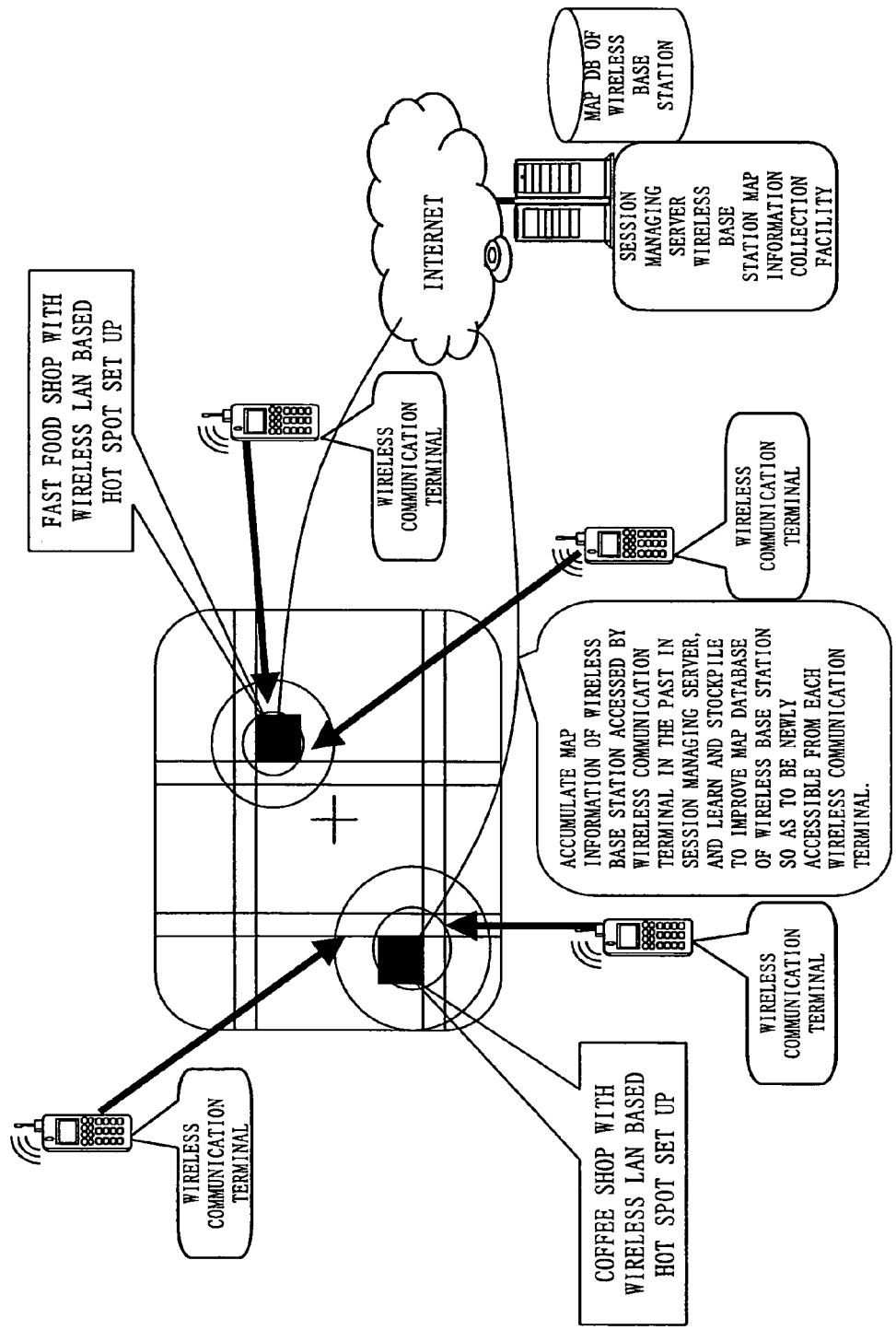
FIG. 84 is a diagram showing a wireless communication terminal with wireless LAN based hot spots displayed.

FIG. 84 is a diagram showing a wireless communication terminal with wireless LAN based hot spots displayed.

The wireless communication terminal is an example of the wireless communication apparatus 110. The wireless communication terminal is equipped with a display facility. On the display screen of the wireless communication terminal, a local map is shown. The map shows the positions of a fast food restaurant and a coffee shop, each of which sets up a wireless LAN based hot spot as an example of the wireless base station apparatus, and the available area (range) of wireless LAN. The wireless communication terminal is also equipped with the GIS processing unit 1120 of FIG. 78.

The session managing server is equipped with a collection facility of wireless base station map information. As an example, the collection facility accumulates map information of wireless base stations (an example of the position information of the wireless base station apparatus) that the wireless base station terminal accessed in the past, and includes a wireless base station map DB (Data Base) storing new wireless base stations that are accessible for each wireless communication terminal. The session managing server learns and accumulates map information in the wireless base station map DB.

The GIS processing unit 1120 includes the position information of wireless base station apparatuses newly accessed, and outputs the position information of the wireless base station apparatuses to the session managing server.

The session managing server transmits the position information of the wireless base station accumulated in the wireless base station map DB, as an example of database, to another wireless communication apparatus. Then, the session managing server persuades the another wireless communication apparatus to use the position information with the map displayed.

The GIS processing unit 1120 also acquires position information indicating the position of the other party's wirelesses communication apparatus from the other party's wireless communication apparatus by way of the session managing server.

The GIS processing unit 1120 displays the position information acquired on the map as at least one of text information and map information.

Thus, the wireless communication apparatus according to this embodiment is characterized as follows. The position information of wireless base stations newly accessed is accumulated in the wireless base station database of the session managing server, and the position information of wireless base stations accumulated is transmitted to the users of other wireless communication apparatuses, so that the position information of wireless base stations can be display on a map and used.

Another characteristic of the wireless communication apparatus is as follows. The wireless communication can acquire from the other party's wireless communication apparatus the information indicating the position of the other party by way of the session managing server, and display the information as text information or map information.

Figure 85:
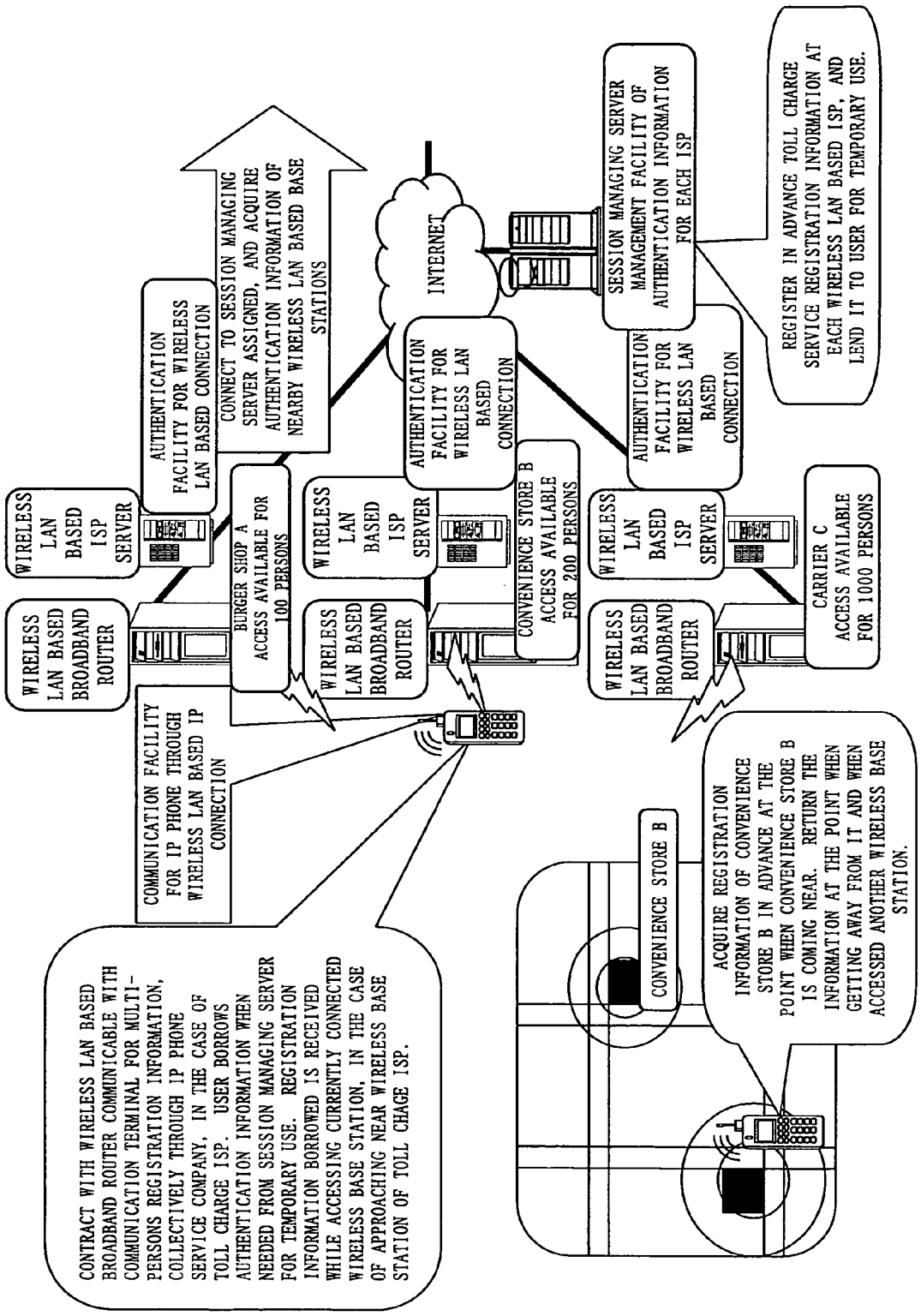
FIG. 85 is a diagram showing a case of carrying out communications based on information about an ISP available at a wireless base station.

FIG. 85 is a diagram showing a case of carrying out communications by use of information about an ISP available at a wireless base station.

With referring to FIG. 85, the wireless communication terminal is equipped with the IP based communication processing unit 1310 of FIG. 79, and the GIS processing unit 1120 of FIG. 78. The GIS processing unit 1120 includes map information, the display unit 1140, and the position computer unit 1130.

FIG. 85 shows examples of the wireless communication apparatus including a wireless LAN based broadband router set up at Burger Shop A, a wireless LAN based broadband router set up at Convenience Store B, and a wireless LAN based broadband router set up at Carrier C. The three wireless LAN based broadband routers are connected to wireless LAN based ISP servers available, respectively. The three wireless LAN based ISP servers are connected to the Internet. The three wireless LAN based ISP servers each are equipped with a wireless LAN based connection authentication facility. The session managing server is also connected to the Internet. The session managing server is equipped with an authentication information management facility for each ISP as an example of the authentication information management apparatus for managing the authentication information for each ISP. With the authentication information management facility for each ISP, each wireless LAN based ISP registers toll charge service registration information in advance, and loans the toll charge service registration information to a user for temporary use.

With a toll charge service ISP, the wireless communication terminal makes a contract with a wireless LAN based base station broadband router with which the wireless communication terminal can communicate for multi-persons registration information collectively through an IP phone service company. Then, the user can have a loan of and access to authentication information when needed for temporary use from the session managing server. Then, the wireless communication terminal, when approaching the wireless base station of the toll charge service ISP, has a loan of and access to the registration information while accessing the currently connected wireless base station.

FIG. 85 shows a local map displayed on the display screen of the wireless communication terminal including the position of the wireless base station to which the wireless communication terminal is currently connected and the position of Convenience Store B.

The wireless communication terminal acquires the registration information of Convenience Store B from the server at this stage since the wireless communication terminal is near to Convenience Store B. On the other hand, when getting away from Convenience Store B and upon access to another wireless base station, the wireless communication terminal returns the registration information of Convenience Store B.

Thus, the internet communication system is equipped with the authentication information management apparatus, connected to the wireless base station apparatus, for managing the plurality of pieces of toll charge service registration information for connecting to the ISPs.

The IP based communication processing unit 1310 inputs one of the plurality of pieces of toll charge service registration information from the authentication information management apparatus, in the case where the wireless communication terminal as an example of the wireless communication apparatus and the wireless base station apparatus are within communicable range with each other. Then, the IP based communication processing unit 1310 carries out connections for communication based on the toll charge service registration information inputted.

The GIS processing unit 1120 detects that the wireless communication apparatus is approaching a wireless base station apparatus that requires the toll charge service registration information.

Then, the IP based communication processing unit 1310 inputs the toll charge service registration information while carrying out connections for communication by way of the currently accessing wireless base station apparatus, in the case where it is detected that the wireless communication apparatus is approaching the wireless base station apparatus that requires the toll charge service registration information.

Thus, the wireless communication apparatus is characterized as follows. The communication service company or the like makes a contract in advance for a certain number of pieces of the toll charge service registration information available to users. Then, the user of a wireless communication apparatus makes an inquiry with the database apparatus storing the plurality of pieces of contract information via such as the session managing server, when moving within communicable range of the wireless communication apparatus, and asks for one of pieces of the registration information transmitted. Thus, the wireless communication apparatus can obtain the registration information and have access to and use the wireless base station.

Another characterized is as follows. In the case of detecting based on the GIS based position information that a wireless base station apparatus requiring the toll charge service registration information is approaching, the wireless communication apparatus, while accessing the currently connected wireless base station, can receive the registration information required transmitted in advance by way of the currently connected wireless base station.

Embodiment 20

Figure 86:
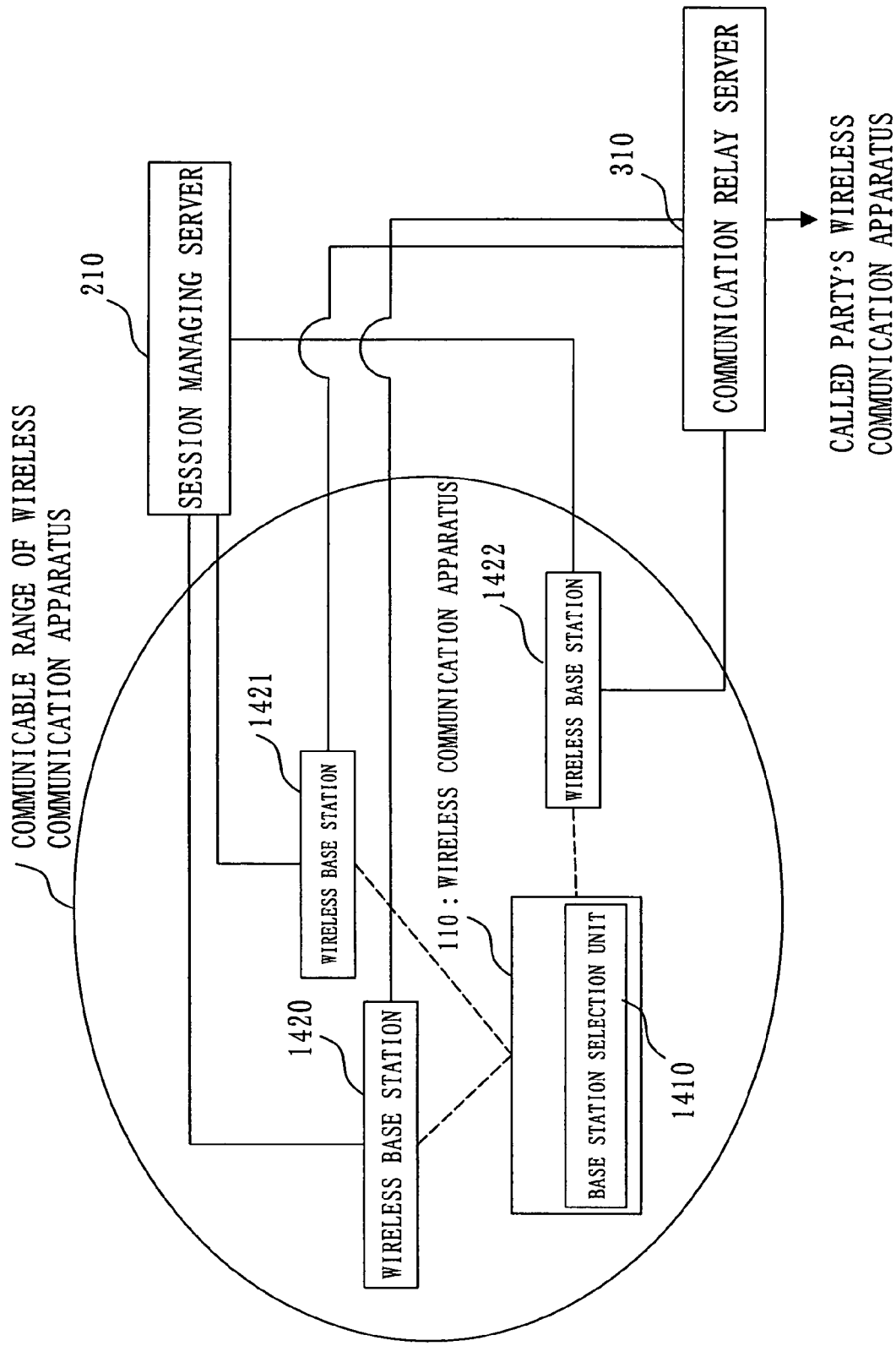
FIG. 86 is a diagram showing a configuration according to a twentieth embodiment.

FIG. 86 is a diagram showing a configuration according to a twentieth embodiment.

With referring to FIG. 86, a reference numeral 1410 denotes a base station selection unit, reference numerals 1420, 1421, and 1422 each denote a wireless base station. Elements other than those are the same as the elements of the first embodiment.

The wireless communication apparatus 110 is equipped with the base station selection unit 1410. The wireless communication apparatus 110 carries out communications while moving.

A plurality of wireless base stations 1420, 1421, and 1422 are within communicable range of the wireless communication apparatus 110.

The base station selection unit 1410 selects a wireless base station that holds radio wave strength for communication most stably and strongly, in the case where two or more of the plurality of wireless base stations 1420, 1421, and 1422 are within communicable range of the wireless communication apparatus 110.

The wireless communication apparatus 110 carries out communications by way of the wireless base station selected by the base station selection unit 1410.

Figure 87:
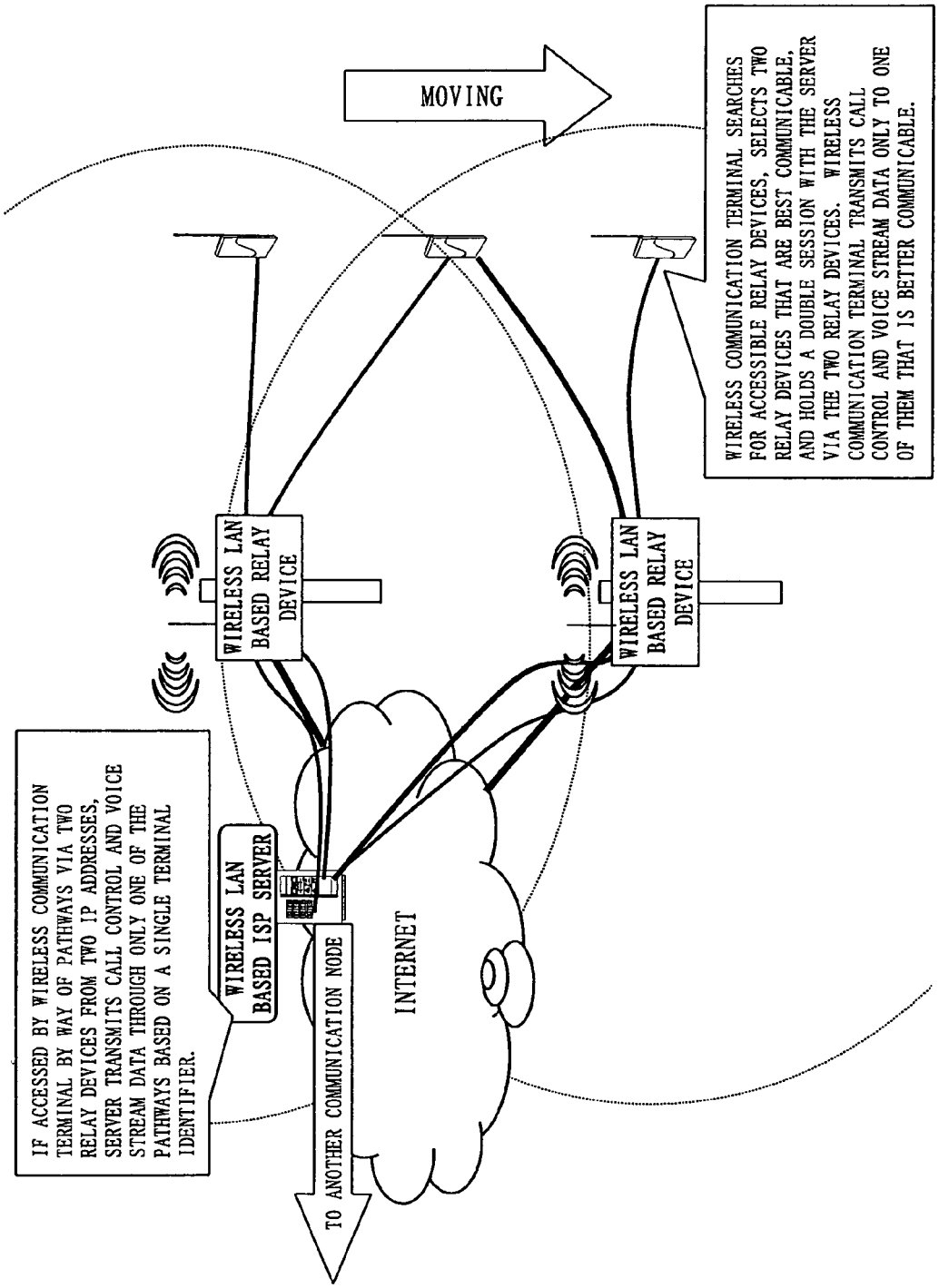
FIG. 87 is a diagram showing a case of a wireless communication apparatus carrying out communications while moving.

FIG. 87 is a diagram showing a case where the wireless communication apparatus carries out communications while moving.

FIG. 87 shows that the wireless communication terminal as an example of the wireless communication apparatus carries out communications while moving. FIG. 87 also shows two wireless LAN based relay devices, each wireless LAN based relay device, as an example of the wireless base station apparatus, has a predetermined communicable range, and a wireless LAN based ISP server. The wireless LAN based ISP server is connected to the Internet. The wireless LAN based ISP server connects to another communication node.

The wireless communication terminal searches for accessible wireless LAN based relay devices, and selects two of them in the best communication state. The wireless communication terminal holds a double session with the wireless LAN based ISP server by way of the selected two wireless LAN based relay devices. Of the two, call control and voice stream data is transmitted to only one that is better communicable.

The wireless LAN based ISP server, even if accessed by a wireless communication terminal through paths by way of two wireless LAN based relay devices carrying two IP addresses, respectively, transmits call control and voice stream data to only one of the paths based on one terminal identifier.

It is to be noted here that other wireless base stations, not shown, are out of communicable range of the wireless communication apparatus 110.

The base station selection unit 1410 calculates radio wave strength for communication, in case the wireless communication apparatus 110 moves from within communicable range of one wireless base station to another range, and switches connection to another wireless base station that is capable of providing connection more stable than that by the currently connected wireless base station.

The wireless communication apparatus 110, in the case of staying within communicable range of the plurality of wireless base stations 1420, 1421, and 1422, connects to the plurality of wireless base stations 1420, 1421, and 1422 at the same time for communication.

However, the wireless communication apparatus 110 may be configured so as to divide information to be transmitted, and transmits and receives divided information to be transmitted in order one after another through paths to the plurality of wireless base station apparatuses in turn.

Still more, the wireless communication apparatus 110 may be configured so as to divide information to be transmitted, and transmits and receives divided information to be transmitted one after another in random order through paths to the plurality of wireless base station apparatuses in turn.

The wireless communication apparatus 110 in the standby state waiting for receiving a call, in the case of staying within communicable range of the plurality of wireless base stations 1420, 1421, and 1422, connects to each of the plurality of wireless base stations 1420, 1421, and 1422, and also connects to the session managing server 210 to which the wireless communication apparatus 110 itself is assigned. Then, the wireless communication apparatus 110 performs processing of at least one of calling and accepting a call for communication by way of one of the connection paths to the plurality of wireless base stations 1420, 1421, and 1422.

The wireless communication apparatus 110, in the case of performing the processing of at least one of calling and accepting a call for communication, transmits and receives the data of the at least one of calling and accepting a call for communication by way of an arbitrary one of the communication paths to the plurality of wireless base stations 1420, 1421, and 1422.

The data includes User Datagram Protocol (UDP) data.

The wireless communication apparatus 110 transmits and receives the UDP data by way of an arbitrary one of the connection paths to the plurality of wireless base stations 1420, 1421, and 1422.

In addition, the data includes Hyper Text Transfer Protocol (HTTP) data.

The wireless communication apparatus 110 performs the Method transmission of HTTP data and the Status Response reception of the HTTP data by way of an arbitrary one of the communication paths to the plurality of wireless base stations 1420, 1421, and 1422.

The communication relay server 310 is connected to the wireless base stations 1420, 1421, and 1422, and relays communications between the calling party's wireless communication apparatus 110 and the called party's wireless communication apparatus 120, which is not shown in the diagram. Although the communication relay server 310 is shown alone in FIG. 86, the internet communication system according to this embodiment includes two or more communication relay servers in addition.

The wireless communication apparatus 110, in the case of staying within communicable range of the plurality of wireless base stations 1420, 1421, and 1422 and carrying out communications while moving, transmits and receives communication data by way of one of the plurality of communication relay servers (e.g., the communication relay server 310) with dynamic switching among the plurality of wireless base stations 1420, 1421, and 1422 to connect to the most stable wireless base station 1420, 1421, 1422 based on the radio wave strength.

Still more, the wireless communication apparatus 110 may be configured so as to change the codec systems of voice data according to the wireless communication systems for the plurality of wireless base stations 1420, 1421, and 1422, which are different from one another, and wireless communication bands corresponding to the different wireless communication systems.

Furthermore, the wireless communication apparatus 110 may be configured so as to display information about the wireless communication systems, the wireless communication bands corresponding to the wireless communication systems, and the voice data codec systems.

The wireless communication apparatus 110, in the case of staying within communicable range of the plurality of wireless base station 1420, 1421, and 1422, carries out communications via the communication relay server (e.g., the communication relay server 310) by way of an arbitrary one of the communication paths to the plurality of wireless base station 1420, 1421, and 1422.

The communication relay server 310 relays User Datagram Protocol (UDP) data.

The wireless communication apparatus 110 carries out UDP data communications via the communication relay server 310 by way of an arbitrary one of the connection paths to the plurality of wireless base station 1420, 1421, and 1422.

In addition, the communication relay server 310 relays Hyper Text Transfer Protocol (HTTP) data.

The wireless communication apparatus 110 performs the Method transmission of HTTP data and the Status Response reception of the HTTP data via the communication relay server 310 by way of an arbitrary one of the connection paths to the plurality of wireless base station 1420, 1421, and 1422.

It is to be noted, however, that the wireless communication apparatus 110 may display the one of the connection paths through which communications are currently being carried out.

Furthermore, the wireless communication apparatus 110 may display the one of the connection paths through which communications are currently being carried out by use of at least one of graphics information and text information indicating which paths are currently being taken to transmit and receive the communication data.

Thus, a characteristic of the wireless communication apparatus 110 is to have the facility of selecting the wireless base station that holds radio wave strength for communication most stably and strongly, in the case where a plurality of wireless base stations are accessible through the IP communication facility within communicable range of the wireless communication apparatus 110. Then, the wireless communication apparatus 110 can carry out communications by way of the selected wireless base station.

Another characteristic of the wireless communication apparatus 110 is to calculate the radio wave strength for communication automatically, in case it moves from within communicable range of the plurality of wireless base stations 1420, 1421, and 1422 to another range, and switch connection to the wireless base station that is capable of providing more stable connection than before.

Still another characteristic of the wireless communication apparatus 110, in the case of staying within communicable range of the plurality of wireless base stations 1420, 1421, and 1422, is to connect to the plurality of wireless base stations 1420, 1421, and 1422 to carry out communications at the same time.

Still another characteristic of the wireless communication apparatus 110 is to connect to the plurality of wireless base stations 1420, 1421, and 1422 at the same time, in the case of staying within communicable range of the plurality of wireless base stations 1420, 1421, and 1422, and transmit and receive such as voice data one after another in order or in random order through the paths to the respective wireless base stations in turn. This can protect communication from decoding even if communication is monitored by way of a specific path.

Still another characteristic of the wireless communication apparatus 110 in the standby state waiting for communication is to connect to the plurality of wireless base stations 1420, 1421, and 1422, in the case of staying within communicable range of the plurality of wireless base stations 1420, 1421, and 1422, and connect to a session managing server 210 to which the wireless communication apparatus 110 is assigned. Thus, the wireless communication apparatus 110 can perform one of calling for communication or waiting for accepting a call for communication by way of one of the connection paths to the plurality of wireless base stations 1420, 1421, and 1422.

In addition, the processing of transmitting or receiving data about calling or accepting a call for communication may be carried out by way of any one of the connection paths to the plurality of wireless base stations 1420, 1421, and 1422.

In addition, the processing of transmitting or receiving UDP data about calling or accepting a call for communication may be carried out by way of any one of the connection paths to the plurality of wireless base stations 1420, 1421, and 1422.

In addition, the processing of the Method transmission of HTTP data and the Status Response reception of HTTP data about calling or accepting a call for communication may be carried out by way of any one of the connection paths to the plurality of wireless base stations 1420, 1421, and 1422.

Still another characteristic of the wireless communication apparatus 110 is to connect to a session managing server 310 by way of the plurality of wireless base stations 1420, 1421, and 1422 at the same time, in the case of staying within communicable range of the plurality of wireless base stations 1420, 1421, and 1422, and carrying out communications while moving. Then, the wireless communication apparatus can transmit and receive communication data with dynamic switching among the plurality of wireless base stations 1420, 1421, and 1422 to connect to the most stable wireless base station based on the radio wave strength.

Still another characteristic of the wireless communication apparatus 110 is to change the codec systems of voice data according to the wireless communication systems of the plurality of wireless base stations different from one another and corresponding wireless communication bands.

Still another characteristic of the wireless communication apparatus 110 is that information about the wireless communication systems and their corresponding wireless communication bands, and the codec systems of voice data automatically changed are allowed to be displayed by means of various types of display devices.

In addition, communication data may be transmitted and received via the communication relay server 310 by way of any one of the connection paths to the plurality of wireless base stations 1420, 1421, and 1422.

In addition, UDP communication data may be transmitted and received via the communication relay server 310 by way of any one of the connection paths to the plurality of wireless base stations 1420, 1421, and 1422.

In addition, the Method transmission of HTTP communication data and the Status Response reception of HTTP communication data may performed via the communication relay server 310 by way of any one of the connection paths to the plurality of wireless base stations 1420, 1421, and 1422.

Still another characteristic of the wireless communication apparatus 110 is to notify of the connection paths by use of simple graphic information or text information indicating which path is being currently taken to transmit and receive communication data using various types of display means.

Embodiment 21

Figure 88:
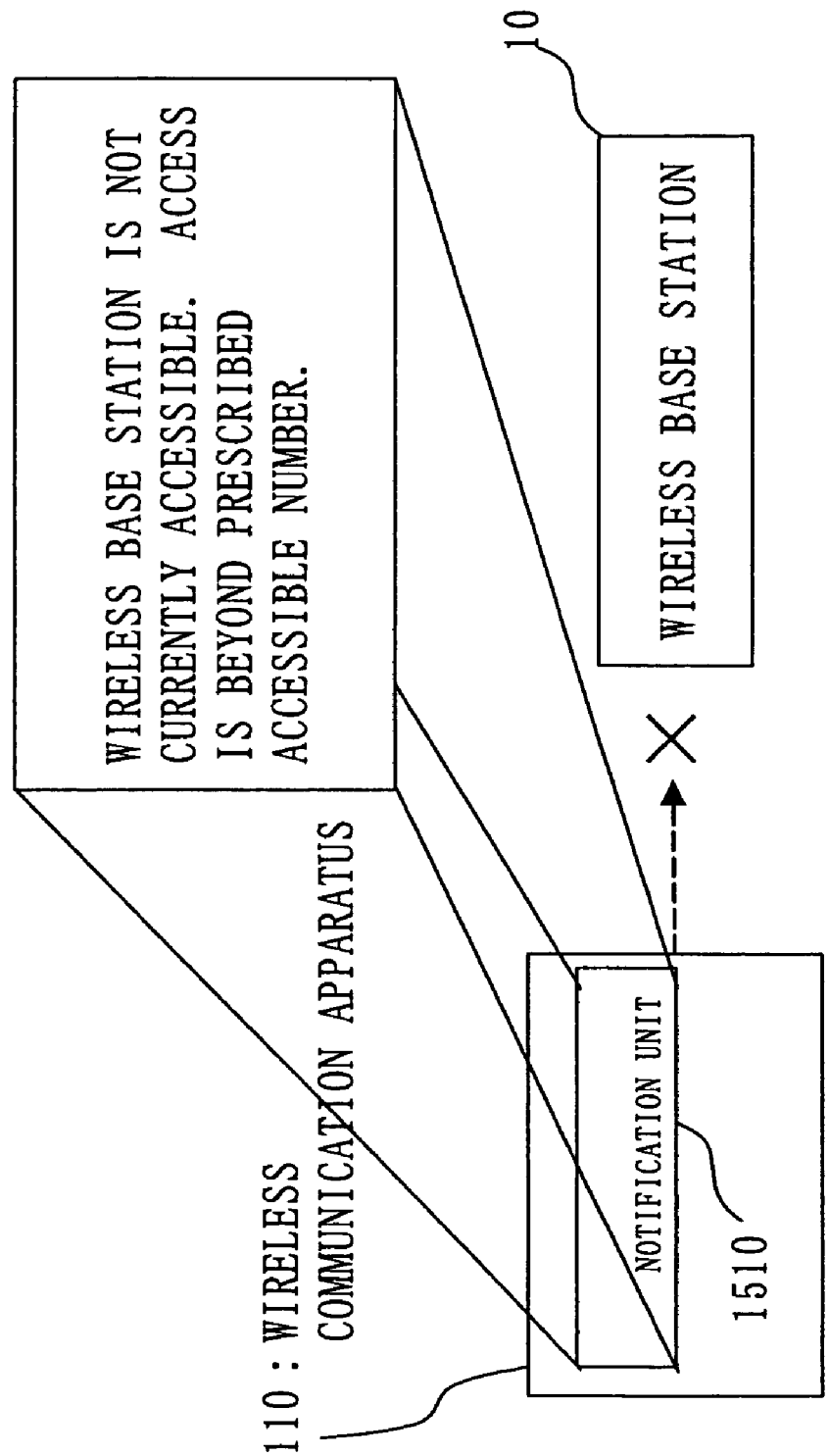
FIG. 88 is a diagram showing a configuration according to a twenty-first embodiment.

FIG. 88 is a diagram showing a configuration according to a twenty-first embodiment.

With referring to FIG. 88, a reference numeral 1510 denotes a notification unit. Elements other than the notification unit are the same as the elements of the first embodiment.

The wireless communication apparatus 110 is equipped with the notification unit 1510.

The wireless base station 10 sets up a prescribed number of wireless communication apparatuses 110 that are accessible to the wireless base station 10.

The notification unit 1510 notifies a user of a communication disable state of the wireless communication apparatus 110, in case the number of wireless communication apparatuses accessing the wireless base station 10 has already met the prescribed number accessible, so that the wireless communication apparatus 110 cannot afford to carry out communications. Thus, the notification unit 1510 notifies the user of the communication disable state by use of display means for displaying. FIG. 88 shows an example of display by the display means: "Wireless base station is not currently accessible. Access is beyond the prescribed accessible number."

Thus, the wireless communication apparatus 110 is characterized as follows. The wireless communication apparatus 110, when moving within the communicable range of the wireless base station 10 to be accessed through the IP communications facility, and finding out that the wireless communication apparatus 110 cannot afford to carry out communications because the number of wireless communication apparatuses accessing the wireless base station 10 within the range has already met the prescribed number accessible, notifies the user of the communication disable state of itself by use of various types of display means.

Embodiment 22

Figure 89:
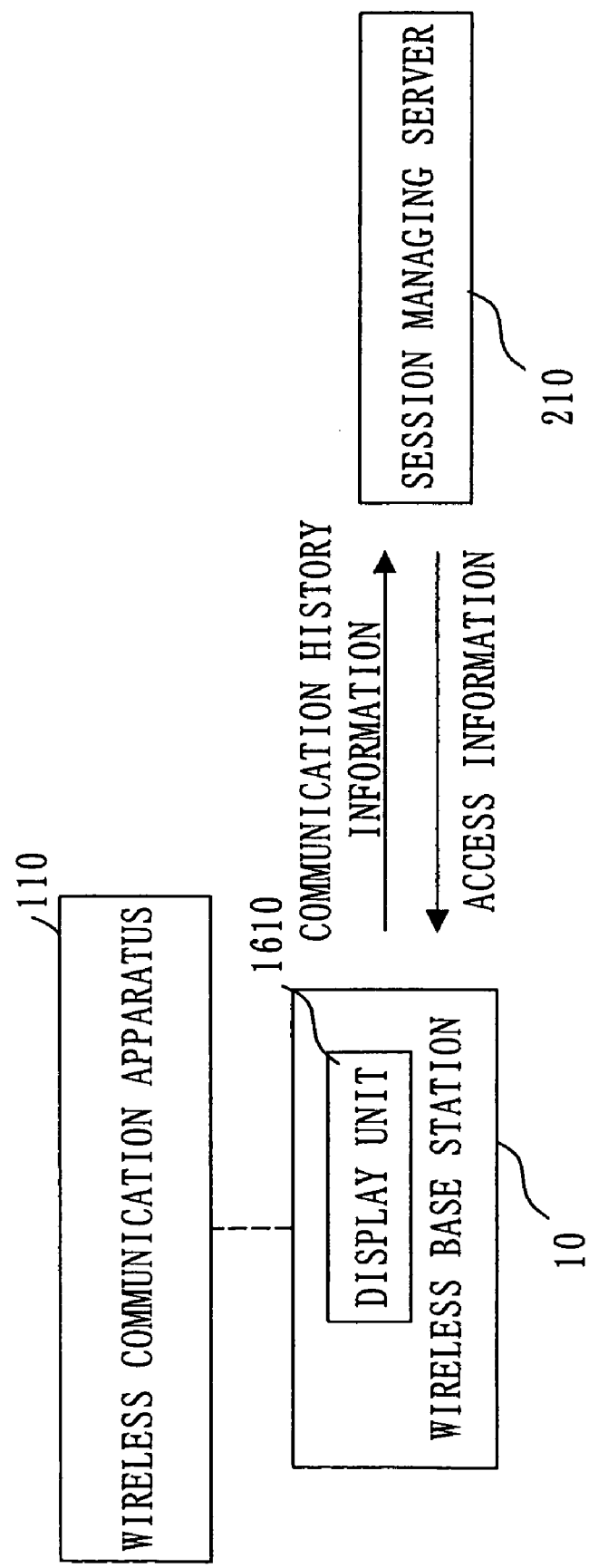
FIG. 89 is a diagram showing a configuration according to a twenty-second embodiment.

FIG. 89 is a diagram showing a configuration according to a twenty-second embodiment.

With referring to FIG. 89, a reference numeral 1610 denotes a display unit. Elements other than the display unit are the same as the elements of the first embodiment.

The wireless base station 10 is equipped with the display unit 1610.

At least one of the wireless communication apparatus 110 and the wireless base station 10 records at least one of access time information indicating the period of accessing the wireless base station 10 by the wireless communication apparatus 110, communication charge information and destination information, and transmits recorded information to the session managing server 210 as communication history information.

The session managing server 210 transmits access information based on the communication history information to the wireless base station 10.

The display unit 1610 of the wireless base station 10 receives the access information transmitted from the session managing server 210, and outputs (displays) an access condition received.

The session managing server 210 also stores software that is capable of controlling the access information.

However, the wireless base station 10, as an example of wireless base station apparatus, may be configured so as to input the software, receive the access information using the software inputted, and output the access information received.

Still more, the wireless base station 10 may be configured so as to output the access information received to the user of the wireless base station 10 so that the user can confirm the access information.

Still more, the wireless communication apparatus 110 may be configured so as to receive the access information, and output the access condition in the past based on the access information to the user of the wireless communication apparatus 110 so that the user can confirm the access condition in the past.

In addition, the access information includes area information of an area around the wireless base station 10, as an example of the wireless base station apparatus, which has visited.

However, the wireless communication apparatus 110 may be configured so as to output, to the user of the wireless communication apparatus 110, the area information of the area around the wireless base station 10, as an example of wireless base station apparatus, which has visited that the user can confirm the area information.

Thus, the wireless communication apparatus 110 and the wireless base station 10 are characterized in that they are allowed to record the access time information indicating the period of accessing the wireless base station 10, communication charge information, and destination information, and transmit them to the session managing server 210 as the communication history information.

Furthermore, a characteristic of the wireless base station is to receive the access information based on the communication history information transmitted from such as the session managing server 210. Thus, the manager of the wireless base station 10 is allowed to confirm the access condition.

Still another characteristic of the wireless base station is to download from such as the session managing server the software by which the wireless base station can confirm the access condition. Thus, the facility can be added later supplementarily.

In addition, a characteristic of the wireless communication apparatus is to receive the access information based on the communication history information accumulated in such as the session managing server, so that the user of the wireless communication apparatus can confirm the access condition in the past.

Still another characteristic of the wireless communication apparatus is to display the area information of the area around the wireless base station that has visited by use of various types of display means, so that the user of the wireless communication apparatus can confirm the area information.

INDUSTRIAL APPLICABILITY

As aforementioned, the called party's session managing server stores the fact that it has received the establishment request of a session from the calling party's wireless communication apparatus. This allows the calling party's wireless communication apparatus to make the establishment request of a session regardless of the communication state of the called party. Even if the called party's wireless communication apparatus was incapable of communicating at the time when the calling party's wireless communication apparatus made the establishment request of a session, the establishment request of a session by the calling party's wireless communication apparatus remains on the session managing server. Subsequently, the session is established between the calling party and the called party upon notification of a communication enable state from the called party's wireless communication apparatus. As a result, the user of the calling party is allowed to save labor of redialing.

In addition, the session managing server is identified by the server ID, and the wireless communication apparatus is identified by the adapter ID. Consequently, the adapter ID allows the session managing servers of the calling party and the called party to manage the establishment request of a session requested by the calling party's wireless communication apparatus. Furthermore, the adapter ID allows for specifying the called party's wireless communication apparatus with which the session is requested to be established. In addition, the server ID allows the wireless communication apparatus of the calling party or the called party to specify the session managing server which manages the wireless communication apparatus itself and the wireless communication apparatus of the other party.

In addition, according to the internet communication system, the assignment notification server notifies the wireless communication apparatus of the server ID of the session managing server, which manages the wireless communication apparatus. For that reason, two or more session managing servers may be installed. In addition to that, the number of wireless communication apparatuses to be managed by each session managing server may be equalized among the session managing servers, or determined according to a fixed condition.

In addition, according to the internet communication system, the called party's session managing server determines the called party's communication relay server for relaying data between the wireless communication apparatuses of the calling party and the called party, and notifies the wireless communication apparatuses of the calling party and the called party of the determined call relay server. For that reason, the wireless communication apparatus is allowed to reduce the processing load of determining the communication relay server.

In addition, the called party's communication relay server is identified by the communication relay server ID. For that reason, the communication relay server ID allows the wireless communication apparatuses of the calling party and the called party to connect the called party's communication relay server for transmitting and receiving communication data.

In addition, according to the internet communication system, the calling party's session managing server determines the calling party's communication relay server for relaying data between the wireless communication apparatuses of the calling party and the called party, and notifies the calling party's wireless communication apparatus and the called party's session managing server. The called party's session managing server notifies the called party's wireless communication apparatus of the notified calling party's communication relay server. As a result, the wireless communication apparatus is allowed to reduce the processing load of determining the communication relay server.

In addition, the calling party's communication relay server is identified by the communication relay server ID. For that reason, the communication relay server ID allows the wireless communication apparatuses of the calling party and the called parity to connect the calling party's communication relay server for transmitting and receiving communication data.

In addition, according to the internet communication system, the adapter ID contains the identifier of an ISP. For that reason, in the case where the user already has a contract with a predetermined ISP, data may be transmitted and received between the calling party and the called party by connecting the Internet through the ISP. Furthermore, even if the users of the calling party and the called party have contracts with different ISPs from each other, since the adapter ID contains the identifier of each ISP, the calling party and the called party are allowed to connect the Internet through the different ISPs.

In addition, according to the internet communication system, the adapter ID contains the identifier of the area in which the wireless communication apparatus is installed. This allows the calling party's session managing server to select the nearest communication relay server to the area in which the calling party's wireless communication apparatus is installed, and allows the called party's session managing server to select a nearest communication relay server to the area in which the called party's wireless communication apparatus is installed. This may make a distance between the wireless communication apparatus and the communication relay server as close as possible Hence, call cost through distance based calculation may be reduced. The distance here is not a geographical distance but the network route distance, which is indicated by the number of hopping routers in a network route.

The session managing server is provided with the calling party's session managing unit and the called party's session managing unit. For that reason, this session managing server is allowed to be used by the calling party or by the called party.

The wireless communication apparatus is provided with the calling party's wireless communication apparatus and the called parity's wireless communication apparatus. For that reason, this wireless communication apparatus is allowed to be used by the calling party or by the called party.

The internet communication system carries out communications over the Internet between the calling party's wireless communication apparatus and the calling party's communication relay server by using HTTP. As a result, there is no problem in transmitting and receiving data between the calling party's wireless communication apparatus and the calling party's communication relay server, even if the environment in which the calling party's wireless communication apparatus is installed may be protected by firewall. In addition, between the called party's wireless communication apparatus and the called party's communication relay server, communications are carried out over the Internet by using HTTP. As a result, there is no problem in transmitting and receiving data between the called party's wireless communication apparatus and the called party's communication relay server, even if the environment in which the called party's wireless communication apparatus is installed may be protected by firewall. Still in addition, between the communication relay servers of the called party and the called party, communications are carried out by using a protocol other than HTTP. By using the protocol having an excellent real-time characteristic for communication processing, for example, communications quality may be enhanced.

In particular, UDP which is the protocol having an excellent real-time characteristic for communication processing may be used as the protocol other than HTTP. Hence, communications quality may be enhanced.

In addition, RTP, in particular, which is the protocol having an excellent real-time characteristic for communication processing may be used as the protocol other than HTTP. Hence, communications quality may be enhanced.

In addition, in particular, the protocols, which are designed for various types of applications created by using TCP and widely used as a protocol other than HTTP may be used. This may provide the easy use environment of this internet communication system to the user who has already set up the internet environment in which he/she is allowed to use the Internet.

In addition, the internet communication system connects the communication relay servers of the calling party and the called party through the private network of an ISP. For that reason, an existing server owned by the ISP is allowed to be used as the communication relay server. Furthermore, the ISP is allowed to use the existing network environment for managing this inventive internet communication system. As a result, the management of this inventive internet communication system may be implemented with a lower cost for launching a project if people in ISP business use it.

In addition, the communication relay server is provided with the HTTP communication unit and the UDP communication unit. For that reason, the communication relay server may be installed in the network environment using the protocol of HTTP or using the protocol of UDP.

The program, which operates in the session managing server causes the computer to execute the session management process of the calling party and the session management process of the called party. For that reason, this session managing server may be installed as the calling party's session managing server or as the called party's session managing server.

The program, which operates in the wireless communication apparatus causes the computer to execute the wireless communication apparatus process of the calling party and the wireless communication apparatus process of the called party. For that reason, this wireless communication apparatus may be installed as the calling party's wireless communication apparatus or as the called party's wireless communication apparatus.

The program, which operates in the communication relay server causes the computer to execute the HTTP communication process and the UDP communication process. For that reason, this communication relay server may be used in the network environment of using the protocol of HTTP or using the protocol of UDP.

The invention claimed is:

1. An internet communication system for data communications carried out by using an internet, the internet communication system comprising:
    a calling party's wireless communication apparatus;
    a calling party's wireless base station apparatus connecting the calling party's wireless communication apparatus and the internet, and converting between wireless communication and wired communication;
    a called party's wireless communication apparatus;
    a called party's wireless base station apparatus connecting the called party's wireless communication apparatus and the internet, and converting between wireless communication and wired communication; a calling party's session managing server which manages the calling party's wireless communication apparatus; and
    a called party's session managing server which manages the called party's wireless communication apparatus;
    wherein the calling party's wireless communication apparatus transmits an wireless communication apparatus ID of the called party's wireless communication apparatus to the calling party's session managing server via the calling party's wireless base station apparatus,
    wherein the calling party's session managing server receives the wireless communication apparatus ID of the called party's wireless communication apparatus from the calling party's wireless communication apparatus, and transmits back to the calling party's wireless communication apparatus a server ID of the called party's session managing server managing the called party's wireless communication apparatus which is identified by the wireless communication apparatus ID,
    wherein the calling party's wireless communication apparatus receives the server ID of the called party's session managing server from the calling party's session managing server via the calling party's wireless base station apparatus, transmits the wireless communication apparatus ID of the called party's wireless communication apparatus to the called party's session managing server which is identified by the server ID received, and transmits an establishment request of a session with the called party's wireless communication apparatus,
    wherein the called party's session managing server receives the wireless communication apparatus ID of the called party's wireless communication apparatus from the calling party's wireless communication apparatus, and stores that the establishment request of the session with the adapter identified by the wireless communication apparatus ID received is received,
    wherein the called party's wireless communication apparatus searches via the called party's wireless base station apparatus by using the wireless communication apparatus ID of self for the establishment request of the session if it is stored in the called party's session managing server, and transmits a communication enable state of the self to the called party's session managing server in a case where the establishment request of the session is stored in the called party's session managing server and also the self is in the communication enable state, and
    wherein the called party's session managing server allows the calling party's wireless communication apparatus and the called party's wireless communication apparatus to establish the session by using the internet in a case where the communication enable state is notified from the called party's wireless communication apparatus.

2. The internet communication system according to claim 1, further comprising an assignment notification server which receives an wireless communication apparatus ID from a wireless communication apparatus, assigns a session managing server which manages the wireless communication apparatus based on the wireless communication apparatus ID, and notifies the wireless communication apparatus of a server ID of the session managing server assigned.

3. The internet communication system according to claim 1, further comprising a called party's communication relay server, which relays communications between the calling party's wireless communication apparatus and the called party's wireless communication apparatus,
    wherein the called party's session managing server transmits a called party's communication relay server ID for identifying the called party's communication relay server to the calling party's wireless communication apparatus and the called party's wireless communication apparatus, and
    wherein the calling party's wireless communication apparatus and the called party's wireless communication apparatus, upon reception of the called party's communication relay server ID, establish the session via the called party's communication relay server which is identified by the called party's communication relay server ID.

4. The internet communication system according to claim 1, further comprising a calling party's communication relay server, which relays communications between the calling party's wireless communication apparatus and the called party's wireless communication apparatus,
    wherein the calling party's session managing server transmits a calling party's communication relay server ID for identifying the calling party's communication relay server to the calling party's wireless communication apparatus,
    wherein the calling party's wireless communication apparatus receives the calling party's communication relay server ID, and transmits the calling party's communication relay server ID to the called party's session managing sever, wherein the called party's session managing server transmits the calling party's communication relay server ID to the called party's wireless communication apparatus, wherein the called party's wireless communication apparatus receives the calling party's communication relay server ID, and wherein the calling party's wireless communication apparatus and the called party's wireless communication apparatus establish the session via the called party's communication relay server which is identified by the calling party's communication relay server ID.

5. The internet communication system according to claim 1, wherein the wireless communication apparatus ID includes an identifier of an internet service provider (ISP).

6. The internet communication system according to claim 1, wherein the wireless communication apparatus ID includes an identifier of an area where the wireless communication apparatus is installed.

7. An internet communication method for carrying out data communications by using an internet, the internet communication method comprising:

making an inquiry with the calling party's session managing server for a called party's session managing server, which manages a called party's wireless communication apparatus, by a calling party's wireless communication apparatus;

responding to the calling party's wireless communication apparatus about the called party's session managing server, which manages the called party's wireless communication apparatus, by the calling party's session managing server;

transmitting an establishment request of a session with the called party's wireless communication apparatus to the called party's session managing server from the calling party's wireless communication apparatus;

storing in the called party's session managing server that the establishment request of the session with the called party's wireless communication apparatus has been issued, by the calling party's wireless communication apparatus;

making an inquiry with the called party's session managing server for the establishment request if it is issued, by the called party's wireless communication apparatus;

notifying the called party's session managing server that the called party's wireless communication apparatus is in a communication enable state, from the called party's wireless communication apparatus, in a case where the establishment request is issued and where the called party's wireless communication apparatus is in the communication enable state; and allowing a session between the calling party's wireless communication apparatus and the called party's wireless communication apparatus to be established by using the internet by the called party's session managing server in a case where it is notified that the called party's wireless communication apparatus is in the communication enable state.

8. A session managing server, which is connected with a calling party's wireless communication apparatus and a called party's wireless communication apparatus, the session managing server comprising:

a calling party's session managing unit, which receives an wireless communication apparatus ID of the called party's wireless communication apparatus from the calling party's wireless communication apparatus, and transmits back to the calling party's wireless communication apparatus a server ID of a called party's session managing server which manages the called party's wireless communication apparatus identified by the wireless communication apparatus ID; and a called party's session managing unit, which receives the wireless communication apparatus ID of the called party's wireless communication apparatus from the calling party's wireless communication apparatus, stores that an establishment request of a session with the adapter identified by the wireless communication apparatus ID received is received, makes the called party's wireless communication apparatus search for the establishment request of the session stored, and allows the session between the calling party's wireless communication apparatus and the called party's wireless communication apparatus using an internet to be established in a case where a communication enable state is notified by the called party's wireless communication apparatus.

9. A wireless communication apparatus, which is connected with a calling party's session managing server and a called party's session managing server via a wireless base station apparatus converting between wireless communication and wired communication, the wireless communication apparatus comprising:

a calling party's communication processing unit, which converts between the wireless communication and the wired communication via the wireless base station apparatus, transmits an wireless communication apparatus ID of a called party's wireless communication apparatus to the calling party's session managing server, receives from the calling party's session managing server a server ID of the called party's session managing server which manages the called party's wireless communication apparatus, transmits the wireless communication apparatus ID of the called party's wireless communication apparatus to the called party's session managing server which is identified by the server ID received, and transmits an establishment request of a session; and a called party's communication processing unit, which searches for the establishment request of the session whether it is stored in the called party's session managing server by using an wireless communication apparatus ID of self through conversion between the wireless communication and wired communication, and transmits to the called party's session managing server that the called party's wireless communication apparatus itself is in a communication enable state in a case where the establishment request of the session is stored in the called party's session managing server and where the called party's wireless communication apparatus itself is in the communication enable state.

10. A program operating with a session managing server which is connected with a calling party's wireless communication apparatus and a called party's wireless communication apparatus via a wireless base station converting between wireless communication and wired communication, the program causing a computer to carry out:

a calling party's session managing process for receiving an wireless communication apparatus ID of the called party's wireless communication apparatus from the calling party's wireless communication apparatus, and transmitting back to the calling party's wireless communication apparatus a server ID of a called party's session managing server which manages the called party's wireless communication apparatus identified by the wireless communication apparatus ID, and a called party's session managing process for receiving the wireless communication apparatus ID of the called party's wireless communication apparatus from the calling party's wireless communication apparatus, storing that an establishment request of a session with the adapter identified by the wireless communication apparatus ID received has been received, making the called party's wireless communication apparatus search for the establishment request of the session stored, and allowing the session between the calling party's wireless communication apparatus and the called party's wireless communication apparatus using an internet to be established in a case where a communication enable state is notified from the called party's wireless communication apparatus.

11. A program operating with a wireless communication apparatus which is connected with a calling party's session managing server and a called party's session managing server, the program causing a computer to carry out:

a calling party's wireless communication apparatus process for transmitting an wireless communication apparatus ID of a called party's wireless communication apparatus to the calling party's session managing server, receiving a server ID of the called party's session managing server which manages the called party's wireless communication apparatus from the calling party's session managing server, transmitting the server ID of the called party's wireless communication apparatus to the called party's session managing server identified by the server ID received, and transmitting an establishment request of a session, and a called party's wireless communication apparatus process for searching for the establishment request of the session stored in the called party's session managing server by using the wireless communication apparatus ID of the called party's wireless communication apparatus itself, and transmitting to the called party's session managing server that the called party's wireless communication apparatus itself is in a communication enable state in a case where the establishment request of the session is stored in the called party's session managing server and the called party's wireless communication apparatus itself is in the communication enable state.

12. An internet communication system for data communications to be carried out by using an internet, the internet communication system comprising:

a calling party's wireless communication apparatus;

a called party's wireless communication apparatus;

a calling party's session managing server which manages the calling party's wireless communication apparatus; and a called party's session managing server which manages the called party's wireless communication apparatus;

wherein the calling party's wireless communication apparatus transmits an establishment request of a session including an wireless communication apparatus ID of the called party's wireless communication apparatus to the calling party's session managing server, wherein the calling party's session managing server receives the wireless communication apparatus ID of the called party's wireless communication apparatus from the calling party's wireless communication apparatus, searches for a server ID of the called party's session managing server which manages the called party's wireless communication apparatus, the server ID being identified by the wireless communication apparatus ID, transmits the wireless communication apparatus ID to the called party's session managing server identified by the server ID searched for, and transmits the establishment request of the session with the called party's wireless communication apparatus, wherein the called party's session managing server receives the wireless communication apparatus ID of the called party's wireless communication apparatus from the calling party's session managing server, stores that the establishment request of the session with an identified adapter by the received wireless communication apparatus ID is received, receives a communication enable state from the called party's wireless communication apparatus, and allows the session between the calling party's session managing server and the called party's wireless communication apparatus using the internet to be established in a case where the establishment request of the session with the called party's wireless communication apparatus in the communication enable state received is stored, wherein the called party's wireless communication apparatus, in the communication enable state, transmits that it is in the communication enable state to the called party's session managing server, and wherein the calling party's wireless communication apparatus receives from the calling party's session managing server that the session using the internet is allowed to be established by the called party's session managing server.

13. An internet communication method for carrying out data communications by using an internet, the internet communication method comprising:

transmitting an establishment request of a session with a called party's wireless communication apparatus to a calling party's session managing server from a calling party's wireless communication apparatus;

transmitting from the calling party's session managing server to a called party's session managing server which manages the called party's wireless communication apparatus the establishment request of the session received from the calling party's wireless communication apparatus;

storing in the called party's session managing server that the establishment request of the session with the called party's wireless communication apparatus has been received from the calling party's wireless communication apparatus;

notifying the called party's session managing server from the called party's wireless communication apparatus that the called party's wireless communication apparatus itself is in a communication enable state in a case where the called party's wireless communication apparatus is in the communication enable state;

allowing by the called party's session managing server the session between the calling party's session managing server and the called party's wireless communication apparatus using the internet to be established in a case where it is notified of the communication enable state from the called party's wireless communication apparatus, and where the establishment request of the session has been issued with the called party's wireless communication apparatus which is in the communication enable state; and notifying by the calling party's session managing server the calling party's wireless communication apparatus that the session using the internet has been allowed to be established between the calling party's session managing server and the called party's wireless communication apparatus in a case where the session is allowed to be established.

14. A session managing server, which is connected with a calling party's wireless communication apparatus and a called party's wireless communication apparatus, the session managing server comprising:

a calling party's session managing unit, which receives an establishment request of a session including an wireless communication apparatus ID of the called party's wireless communication apparatus from the calling party's wireless communication apparatus, and transmits the establishment request of the session including the wireless communication apparatus ID of the called party's wireless communication apparatus received from the calling party's wireless communication apparatus to a called party's session managing server which manages the called party's wireless communication apparatus identified by the wireless communication apparatus ID, and a called party's session managing unit, which receives the wireless communication apparatus ID of the called party's wireless communication apparatus from the calling party's session managing server, stores that the establishment request of the session with the adapter identified by the wireless communication apparatus ID received has been received, searches for the establishment request of the session stored and allows the session between the calling party's wireless communication apparatus and the called party's wireless communication apparatus using an internet to be established in a case where a communication enable state is notified from the called party's wireless communication apparatus.

15. A program operating with a session managing server which is connected with a calling party's wireless communication apparatus and a called party's wireless communication apparatus, the program causing a computer to carry out:

a calling party's session managing process for receiving an establishment request of a session including an wireless communication apparatus ID of the called party's wireless communication apparatus from the calling party's wireless communication apparatus, and transmitting back to a called party's session managing server which manages the called party's wireless communication apparatus identified by the wireless communication apparatus ID the establishment request of the session received from the calling party's wireless communication apparatus, and a called party's session managing process for receiving the establishment request of the session including the wireless communication apparatus ID of the called party's wireless communication apparatus from the calling party's session managing server, storing that the establishment request of the session with the adapter identified by the wireless communication apparatus ID received has been received, searching, in a case where a communication enable state of the called party's wireless communication apparatus is notified, for the establishment request of the session stored, allowing the session between the calling party's wireless communication apparatus and the called party's wireless communication apparatus using an internet to be established, and notifying the called party's wireless communication apparatus that the establishment request of the session has been received.

16. A program operating with a wireless communication apparatus which is connected with a calling party's session managing server and a called party's session managing server, the program causing a computer to carry out:

a calling party's wireless communication apparatus process for transmitting an establishment request of a session including an wireless communication apparatus ID of a called party's wireless communication apparatus to the calling party's session managing server, and a called party's wireless communication apparatus process for transmitting to the called party's session managing server that the called party's wireless communication apparatus itself is in a communication enable state in a case where the called party's wireless communication apparatus itself is in the communication enable state, and receives from the called party's session managing server that the establishment request has been received.

17. A wireless communication apparatus, which is of a calling party, and connected with a calling party's session managing server and a called party's session managing server via a wireless base station apparatus converting between wireless communication and wired communication, wherein the calling party's wireless communication apparatus outputs that a called party's wireless communication apparatus is busy communicating and therefore is in a state of communication disenabled at a moment, upon reception from the called party's session managing server through conversion between wireless and communication wired communication via the wireless base station apparatus by way of the calling party's session managing server that the called party's wireless communication apparatus is busy communicating and therefore is in the state of communication disenabled at the moment.

18. A wireless communication apparatus, which is connected to a calling party's session managing server and a called party's session managing server via a wireless base station apparatus converting between wireless communication and wired communication, and wherein the wireless communication apparatus converts between wireless communication and wired communication via the wireless base station apparatus, transmits a start of a communication to the called party's session managing server in a case of starting the communication, and transmits an end of the communication to the called party's session managing server in a case of ending the communication.

19. The internet communication system according to claim 1, wherein the calling party's wireless communication apparatus and the called party's wireless communication apparatus each are installed in a predetermined network environment and assigned an IP (Internet Protocol) address according to the predetermined network environment, and store a connection type of the wireless communication apparatus which is determined according to an assignment type of the IP address, wherein the calling party's wireless communication apparatus transmits the connection type of the calling party's wireless communication apparatus to the calling party's session managing server, wherein the called party's wireless communication apparatus transmits the connection type of the called party's wireless communication apparatus to the called party's session managing server, wherein the called party's session managing server determines to communicate data with the called party's wireless communication apparatus by using one communication protocol of Hyper Text Transfer Protocol (HTTP) and User Datagram Protocol (UDP) based on the connection type transmitted from the called party's wireless communication apparatus, and then transmits information notifying of the one communication protocol determined to the called party's wireless communication apparatus, wherein the calling party's session managing server determines to communicate data with the calling party's wireless communication apparatus by using one communication protocol of Hyper Text Transfer Protocol (HTTP) and User Datagram Protocol (UDP) based on the connection type transmitted from the calling party's wireless communication apparatus, and then transmits information notifying of the communication protocol determined to the calling party's wireless communication apparatus, wherein the calling party's wireless communication apparatus communicates the data according to the information notifying of the communication protocol transmitted from the calling party's session managing server, and wherein the called party's wireless communication apparatus communicates the data according to the information notifying of the communication protocol transmitted from the called party's session managing server.

20. The internet communication system according to claim 1, wherein the called party's wireless communication apparatus issues a GET method of Hyper Text Transfer Protocol (HTTP) to the called party's session managing server in order to confirm that the establishment request of the session from the calling party's wireless communication apparatus is stored in the called party's session managing server; and wherein the called party's session managing server, upon reception of the GET method issued by the called party's wireless communication apparatus, searches for the establishment request of the session with the called party's wireless communication apparatus which issued the GET method stored, and transmits a result of the establishment request of the session searched for, which is included in a GET response to the GET method, to the called party's wireless communication apparatus.

21. The internet communication system according to claim 1, wherein the called party's wireless communication apparatus transmits a GET method of Hyper Text Transfer Protocol (HTTP) to the called party's session managing server at fixed intervals, and wherein the called party's session managing server, upon reception of the GET method from the called party's wireless communication apparatus, transmits information to the called party's wireless communication apparatus indicating that there is no establishment request of the session from the calling party's wireless communication apparatus in a case where the establishment request of the session has been issued by the calling party's wireless communication apparatus but a communication has not been started yet between the calling party's wireless communication apparatus and the called party's wireless communication apparatus, and transmits information to the called party's wireless communication apparatus indicating that the establishment request of the session is received from the calling party's wireless communication apparatus in a case where the establishment request of the session has been issued by the calling party's wireless communication apparatus and a communication has been started between the calling party's wireless communication apparatus and the called party's wireless communication apparatus.

22. The internet communication system according to claim 1, wherein the called party's wireless communication apparatus transmits a GET method of Hyper Text Transfer Protocol (HTTP) to the called party's session managing server when one of applying power and preparing for a start of a call immediately after completing a call processing, and wherein the called party's session managing server holds the GET method transmitted from the called party's wireless communication apparatus, and transmits to the called party's wireless communication apparatus as a response to the GET method held that the establishment request of the session is received from the calling party's wireless communication apparatus in a case where the establishment request of the session is received from the calling party's wireless communication apparatus.

23. The internet communication system according to claim 1, wherein the called party's wireless communication apparatus transmits a GET method of Hyper Text Transfer Protocol (HTTP) to the called party's session managing server when one of power being applied and a call being prepared to be started immediately after completing a call processing, and wherein the called party's session managing server, upon reception of the GET method transmitted from the called party's wireless communication apparatus, continues transmitting to the called party's wireless communication apparatus alive confirmation information for maintaining a line connection between the called party's wireless communication apparatus and the called party's session managing server in a case where the establishment request of the session has not been issued by the calling party's wireless communication apparatus, and transmits to the called party's wireless communication apparatus that the establishment request of the session is received from the calling party's wireless communication apparatus in a case where the establishment request of the session has been issued by the calling party's wireless communication apparatus.

* * * * *